(12) United States Patent
Takashima et al.

(10) Patent No.: US 8,559,638 B2
(45) Date of Patent: Oct. 15, 2013

(54) CRYPTOGRAPHIC PROCESSING SYSTEM

(75) Inventors: Katsuyuki Takashima, Tokyo (JP);
Tatsuaki Okamoto, Tokyo (JP)

(73) Assignees: Mitsubishi Electric Corporation,
Tokyo (JP); **Nippon Telegraph and
Telephone Corporation**, Tokyo (JP)

( * ) Notice: Subject to any disclaimer, the term of this patent is extended or adjusted under 35 U.S.C. 154(b) by 17 days.

(21) Appl. No.: 13/266,002

(22) PCT Filed: Apr. 14, 2010

(86) PCT No.: PCT/JP2010/056639
§ 371 (c)(1),
(2), (4) Date: Nov. 8, 2011

(87) PCT Pub. No.: WO2010/122926
PCT Pub. Date: Oct. 28, 2010

(65) Prior Publication Data
US 2012/0045056 A1    Feb. 23, 2012

(30) Foreign Application Priority Data

Apr. 23, 2009   (JP) ................................ 2009-104915
Nov. 20, 2009   (JP) ................................ 2009-264576

(51) Int. Cl.
*H04L 9/00* (2006.01)
*H04K 1/00* (2006.01)

(52) U.S. Cl.
USPC .............................. 380/255; 380/277; 380/28

(58) Field of Classification Search
None
See application file for complete search history.

(56) References Cited

U.S. PATENT DOCUMENTS

| 2007/0223686 A1* | 9/2007 | Li ................................... 380/28 |
| 2009/0164435 A1* | 6/2009 | Routt .............................. 380/28 |
| 2010/0329454 A1 | 12/2010 | Takashima |
| 2012/0027201 A1* | 2/2012 | Fujisaki et al. ................. 380/28 |

OTHER PUBLICATIONS

Masayuki Abe, et al., "Tag-KEM/DEM: A New Framework for Hybrid Encryption and a New Analysis of Kurosawa-Desmedt KEM", EUROCRYPT 2005, LNCS 3494, 2005, pp. 128-146.

Dan Boneh, et al., "Efficient Selective-ID Secure Identity Based Encryption Without Random Oracles", EUROCRYPT 2004, LNCS, vol. 3027, 2004, Springer-Verlag, 20 pages.

Dan Boneh, et al., "Secure Identity Based Encryption Without Random Oracles", CRYPTO 2004, LNCS, Springer-Verlag, 2004, 24 pages.

Dan Boneh, et al., "Hierarchical Identity Based Encryption With Constant Size Ciphertext", EUROCRYPT 2005, LNCS, Springer-Verlag, 2005, pp. 440-456.

Dan Boneh, et al., "Short Group Signatures", CRYPTO 2004, LNCS 3152, Springer Verlag, 2004, pp. 41-55.

(Continued)

*Primary Examiner* — David Y Jung
(74) *Attorney, Agent, or Firm* — Oblon, Spivak, McClelland, Maier & Neustadt, L.L.P.

(57) ABSTRACT

It is aimed to implement a hierarchical predicate encryption (HPE) scheme. A cryptographic process is performed using dual vector spaces (dual distortion vector spaces (DDVS)) of a space V and a space V* paired through a pairing operation. An encryption device generates as a cipher vector a vector in the space V, the vector having transmission information embedded therein. A decryption device, using a predetermined vector in the space V* as a key vector, performs the pairing operation on the cipher vector generated by the encryption device and the key vector, to decrypt the cipher vector and to extract information concerning the transmission information.

47 Claims, 36 Drawing Sheets

(56) References Cited

OTHER PUBLICATIONS

Dan Boneh, et al., "Identity-Based Encryption From the Weil Pairing,", CRYPTO 2001, LNCS 2139, Springer Verlag, 2001, pp. 213-229.
Dan Boneh, et al., "Improved Efficiency for CCA-Secure Cryptosystems Built Using Identity-Based Encryption", RSA-CT 2005, LNCS, Springer Verlag, 2005, 16 pages.
John Bethencourt, et al., "Ciphertext-Policy Attribute-Based Encryption", Proceedings of the 2007, IEEE Symposium on Security and Privacy, 2007, 15 pages.
Dan Boneh, et al., "Conjunctive, Subset, and Range Queries on Encrypted Data", TCC 2007, LNCS 4392, Springer Verlag, 2007, pp. 535-554.
Xavier Boyen, et al., Anonymous Hierarchical Identity-Based Encryption (Without Random Oracles), CRYPTO 2006, 2006, pp. 290-307.
Ran Canetti, et al., "Chosen-Ciphertext Security from Identity-Based Encryption", EUROCRYPT 2004, LNCS, Springer-Verlag, 2004, 15 pages.
Clifford Cocks, "An Identity Based Encryption Scheme Based on Quadratic Residues", Proceedings of the $8^{th}$ IMA International Conference on Cryptography and Coding, LNCS 2260, Springer-Verlag, 2001, pp. 360-363.
Craig Gentry, "Practical Identity-Based Encryption Without Random Oracles", EUROCRYPT 2006, LNCS 4004, Springer-Verlag, 2006, pp. 445-464.
Craig Gentry, et al., "Hierarchical ID-Based Cryptography", ASIACRYPT 2002, LNCS, Springer-Verlag, 2002, 21 pages.
Vipul Goyal, et al., "Attribute-Based Encryption for Fine-Grained Access Control of Encrypted Data", ACM_CCCS 2006, LNCS, Springer Verlag, 2006, 28 pages.
Jens Groth, et al., "Efficient Non-Interactive Proof Systems for Bilinear Groups", EUROCRYPT 2008, LNCS 4965, Springer Verlag, 2008, pp. 415-432.
Jeremy Horwitz, et al., "Toward Hierarchical Identity-Based Encryption", EUROCRYPT 2002, LNCS 2332, Springer Verlag, 2002, pp. 466-481.
Jonathan Katz, et al. "Compact Signatures for Network Coding", Available at IACR ePrint, 2008/316, 14 pages.
Jonathan Katz, et al., "Predicate Encryption Supporting Disjunctions, Polynomial Equations, and Inner Products", EUROCRYPT, 2008, LNCS 4965, Springer Verlag, 2008, pp. 146-162.
Dennis Hofheinz, et al., "Secure Hybrid Encryption from Weakened Key Encapsulation", CRYPTO 2007, LNCS vol. 4622, Springer Verlag, 2007, pp. 553-571.
Tatsuaki Okamoto, et al., "Homomorphic Encryption and Signatures from Vector Decomposition", Pairing 2008, LNCS 5209, 2008 pp. 57-74.
Rafail Ostrovsky, et al., "Attribute-Based Encryption with Non-Monotonic Access Structures", ACM CCS 2007, 2007, pp. 195-203.
Matthew Pirretti, et al., "Secure Attribute-Based Systems", ACM CCS 2006, 2006, 14 pages.
Hovav Shacham, "A Cramer-Shoup Encryption Scheme from the Linear Assumption and from Progressively Weaker Linear Variants", Available at IACR ePrint Archive, 2007/074, 2007, pp. 1-23.
Amit Sahai, et al., "Fuzzy Identity-Based Encryption", EUROCRYPT 2005, LNCS, Springer Verlag, 2005, pp. 1-15.
Elaine Shi, et al., "Delegating Capabilities in Predicate Encryption Systems", ICALP 2008, LNCS, Springer Verlag, 2008, pp. 1-35.
Katsuyuki Takashima, "Efficiently Computable Distortion Maps for Supersingular Curves", ANTS, LNCS 5011, Springer Verlag, 2008, pp. 88-101.
Emily Shen, et al., "Predicate Privacy in Encryption Systems", TCC 2009, LNCS, vol. 5444, Theory of Cryptography, 2009, pp. 457-473.
Tatsuaki Okamoto, et al., "Relations Among Computational and Decisional Problems Concerning Vector Decomposition Problems", The 2009 Symposium on Cryptography and Information Security, Jan. 20, 2009, 2C3 Suron Oyo, 2C3-5, pp. 1-6.
Craig Gentry, et al., "Hierarchical Identity Based Encryption with Polynomially Many Levels", TCC 2009, LNCS, Theory of Cryptography, vol. 5444, 2009, pp. 437-456.
Tatsuaki Okamoto, et al., "Hierarchical Predicate Encryption for Inner-Products", Advances in Cryptology-ASIACRYPT 2009, LNCS. vol. 5912, , 2009, pp. 214-231.
Luan Ibraimi, et al., "Ciphertext-Policy Attribute-Based Threshold Decryption with Flexible Delegation and Revocation of User Attributes", Internal Report, 2009, 22 pages (with cover page).
Steven D. Galbraith, et al., "An Analysis of the Vector Decomposition Problem", PKC 2008, Springer LNCS 4939, 2008, pp. 308-327.
Iwan Duursma, et al., "The Vector Decomposition Problem for Elliptic and Hyperelliptic Curves", J. Ramanujan Math. Soc. 20 (1), 2005, 20 pages.
Iwan M. Duursma, et al., "ElGamal Type signature Schemes for $n$-Dimensional Vector Spaces", Available at IACR ePrint, 2006/312, 13 pages.
Maki Yoshida, et al., "Vector Decomposition Problem and the Trapdoor Inseparable Multiplex Transmission Scheme Based the Problem", SCIS 2003, The 2003 Symposium on Cryptography and Information Security, 2003, 6 pages.
Maki Yoshida, "Inseparable Multiplex Transmission Using the Pairing on Elliptic Curves and Its Application to Watermarking", Proceedings of the Fifth Conference on Algebraic Geometry, Number Theory, Coding Theory and Cryptography, 2003, 10 pages (with cover page).
Tatsuaki Okamoto, et al., "A Geometric Approach on Pairings and Hierarchical Predicate Encryption", Eurocrypt 2009, 1 page.
International Search Report issued Jul. 6, 2010 in PCT/JP2010/056639 (previously filed on Oct. 24, 2011).

* cited by examiner

DIAGRAM FOR EXPLAINING A BASIS AND A BASIS VECTOR

DIAGRAM FOR EXPLAINING A BASE CHANGE METHOD

DIAGRAM FOR EXPLAINING A STRUCTURE OF A BASIS

OPERATIONS OF DECRYPTION DEVICE 300

CRYPTOGRAPHIC PROCESSING SYSTEM

TECHNICAL FIELD

This invention relates to a hierarchical predicate key encapsulation mechanism scheme and a hierarchical predicate encryption scheme.

BACKGROUND ART

A predicate encryption (PE) scheme has been proposed (Non-Patent Literature 19). Delegation in a predicate encryption scheme has been proposed (Non-Patent Literature 26). Further, distortion eigenvector spaces have been proposed (Non-Patent Literature 21).

CITATION LIST

Non-Patent Literature

[Non-Patent Literature 1] M. Abe, R. Gennaro, K. Kurosawa, and V. Shoup, "Tag-KEM/DEM: A New Framework for Hybrid Encryption and New Analysis of Kurosawa-Desmedt KEM," Eurocrypt, 2005, LNCS 3494, pp. 128-146, 2005.

[Non-Patent Literature 2] D. Boneh and X. Boyen, "Efficient selective-ID secure identity based encryption without random oracles," EUROCRYPT 2004, LNCS, Springer-Verlag, 2004.

[Non-Patent Literature 3] D. Boneh and X. Boyen, "Secure identity based encryption without random oracles," CRYPTO 2004, LNCS, Springer-Verlag, 2004.

[Non-Patent Literature 4] D. Boneh, X. Boyen, and E. Goh, "Hierarchical identity based encryption with constant size ciphertext," EUROCRYPT 2005, LNCS, Springer-Verlag, pp. 440-456, 2005.

[Non-Patent Literature 5] D. Boneh, X. Boyen, and H. Shacham, "Short group signatures," CRYPTO 2004, LNCS 3152, Springer Verlag, pp. 41-55, 2004.

[Non-Patent Literature 6] D. Boneh and M. Franklin, "Identity-based encryption from the Weil pairing," CRYPTO 2001, LNCS 2139, Springer Verlag, pp. 213-229, 2001.

[Non-Patent Literature 7] D. Boneh and J. Katz, "Improved efficiency for cca-secure cryptosystems built using identity based encryption," RSA-CT 2005, LNCS, Springer Verlag, 2005.

[Non-Patent Literature 8] J. Bethencourt, A. Sahai and B. Waters, "Ciphertext-policy attribute-based encryption," Proceedings of the 2007 IEEE Symposium on Security and Privacy, 2007.

[Non-Patent Literature 9] D. Boneh and B. Waters, "Conjunctive, subset, and range queries on encrypted data," TCC 2007, LNCS 4392, Springer Verlag, pp. 535-554, 2007.

[Non-Patent Literature 10] X. Boyen and B. Waters, "Anonymous hierarchical identity-based encryption (without random oracles)," CRYPTO 2006, pp. 290-307, 2006.

[Non-Patent Literature 11] R. Canetti, S. Halevi and J. Katz, "Chosen-ciphertext security from identity-based encryption," EUROCRYPT 2004, LNCS, Springer-Verlag, 2004.

[Non-Patent Literature 12] C. Cocks, "An identity based encryption scheme based on quadratic residues," Proceedings of the 8th IMA International Conference on Cryptography and Coding, pp. 360-363, London, UK, 2001. Springer-Verlag, 2001.

[Non-Patent Literature 13] C. Gentry, "Practical identity-based encryption without random oracles," EUROCRYPT 2006, LNCS, Springer-Verlag, 2006.

[Non-Patent Literature 14] C. Gentry and A. Silverberg, "Hierarchical ID-based cryptography," ASIACRYPT 2002, LNCS, Springer-Verlag, 2002.

[Non-Patent Literature 15] V. Goyal, O. Pandey, A. Sahai and B. Waters, "Attribute-based encryption for fine-grained access control of encrypted data," ACM-CCCS 2006, LNCS, Springer Verlag, 2006.

[Non-Patent Literature 16] J. Groth and A. Sahai, "Efficient non-interactive proof systems for bilinear groups," EUROCRYPT 2008, LNCS 4965, Springer Verlag, pp. 415-432, 2008.

[Non-Patent Literature 17] J. Horwitz and B. Lynn, "Towards hierarchical identity-based encryption," EUROCRYPT 2002, LNCS, Springer Verlag, 2002.

[Non-Patent Literature 18] J. Katz and B. Waters "Compact signatures for network coding," available at IACR ePrint 2008/316.

[Non-Patent Literature 19] J. Katz, A. Sahai and B. Waters "Predicate encryption supporting disjunctions, polynomial equations, and inner products," EUROCRYPT 2008, LNCS 4965, Springer Verlag, pp. 146-162, 2008.

[Non-Patent Literature 20] D. Hofheinz and E. Kiltz, "Secure hybrid encryption from weakened key encapsulation," CRYPTO 2007, LNCS 4622, Springer Verlag, pp. 553-571, 2007.

[Non-Patent Literature 21] T. Okamoto and K. Takashima, "Homomorphic encryption and signatures from vector decomposition," Pairing 2008. LNCS 5209, pp. 57-74. Springer Verlag, 2008.

[Non-Patent Literature 22] R. Ostrovsky, A. Sahai and B. Waters, "Attribute-based encryption with non-monotonic access structures," ACM CCS 2007, 2007.

[Non-Patent Literature 23] M. Pirretti, P. Traynor, P. McDaniel and B. Waters, "Secure attribute-based systems," ACM CCS 2006, 2006.

[Non-Patent Literature 24] H. Shacham, "A Cramer-Shoup encryption scheme from the linear assumption and from progressively weaker linear variants," available at IACR ePrint Archive, 2007/074, 2007.

[Non-Patent Literature 25] A. Sahai and B. Waters, "Fuzzy identity-based encryption," EUROCRYPT 2005, LNCS, Springer Verlag, 2005.

[Non-Patent Literature 26] E. Shi and B. Waters, "Delegating capability in predicate encryption systems," ICALP 2008, LNCS, Springer Verlag, 2008.

[Non-Patent Literature 27] K. Takashima, "Efficiently computable distortion maps for supersingular curves," ANTS, LNCS 5011, Springer Verlag, pp. 88-101, 2008.

DISCLOSURE OF INVENTION

Technical Problem

Non-Patent Literature 19 does not discuss delegation in the predicate encryption scheme. Non-Patent Literature 26 discusses delegation in the predicate encryption scheme, but the discussion is limited to the predicate encryption scheme for a class of equality tests.

This invention aims to provide a delegatable predicate encryption process with a wide range of applications, for example.

Solution to Problem

A cryptographic processing system according to this invention performs a cryptographic process using dual vector spaces of a space V and a space V* paired through a pairing operation. The cryptographic processing system comprises:

an encryption device that, using a processing device, generates as a cipher vector a vector in the space V, the vector having predetermined information embedded therein; and a decryption device that, using the processing device and using a predetermined vector in the space V* as a key vector, performs the pairing operation on the cipher vector generated by the encryption device and the key vector, to decrypt the cipher vector and to extract information concerning the predetermined information.

Advantageous Effects of Invention

A cryptographic system according to this invention can implement a delegatable predicate encryption process with a wide range of applications.

DESCRIPTION OF EMBODIMENTS

Figure 1:
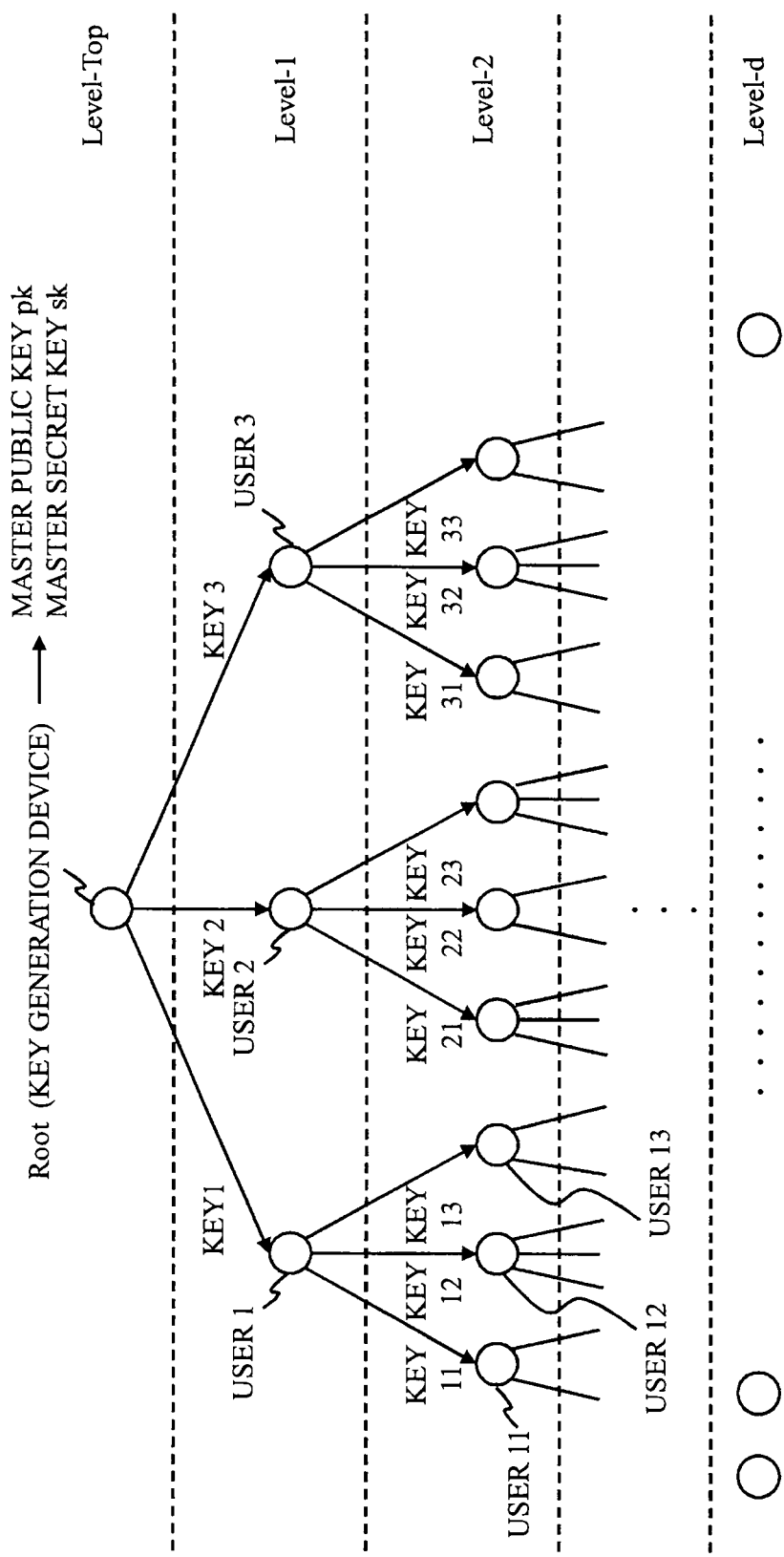
FIG. 1 is a diagram for explaining a notion of "hierarchical"

Embodiments of the invention will now be described with reference to drawings.

In the following description, a processing device is a CPU 911 or the like to be described later. A storage device is a ROM 913, a RAM 914, a magnetic disk 920 or the like to be described later. A communication device is a communication board 915 or the like to be described later. An input device is a keyboard 902, the communication board 915 or the like to be described later. An output device is the RAM 914, the magnetic disk 920, the communication board 915, an LCD 901 or the like to be described later. That is, the processing device, the storage device, the communication device, the input device, and the output device are hardware.

Notations to be used in the following description will be described.

When A is a random variable or distribution, Formula 43 denotes that y is randomly selected from A according to the distribution of A.

$$y \xleftarrow{R} A \qquad \text{[Formula 43]}$$

When A is a set, Formula 44 denotes that y is uniformly selected from A.

$$y \xleftarrow{U} A \qquad \text{[Formula 44]}$$

Formula 45 denotes that y is set, defined or substituted by z.

$$y := z \qquad \text{[Formula 45]}$$

When a is a fixed value, Formula 46 denotes that a machine (algorithm) A outputs a on an input x.

$$A(x) \to a \qquad \text{[Formula 46]}$$

For example, $$A(x) \to 1$$

A vector symbol denotes a vector representation over a finite field $F_q$, that is, Formula 47.
$\vec{x}$ denotes $$(x_0, \ldots, x_{n-1}) \in \mathbb{F}_q^n. \qquad \text{[Formula 47]}$$

Formula 48 denotes the inner-product of two vectors $\vec{x}$ and $\vec{v}$ shown in Formula 49, and Formula 50 shows this inner-product.

$$\vec{x} \cdot \vec{v} \qquad \text{[Formula 48]}$$

$$\vec{x} = (x_0, \ldots, x_{n-1}),$$

$$\vec{v} = (v_0, \ldots, v_{n-1}) \qquad \text{[Formula 49]}$$

$$\sum_{i=0}^{n-1} x_i v_i \qquad \text{[Formula 50]}$$

$\vec{0}$ denotes a zero vector in a finite field $F_q^n$ for any n.
$X^T$ denotes the transpose of a matrix X.
Formula 51 denotes that $x_{i,j}$ is set by the (i, j)-th entry of the matrix X.

$$(\mathcal{X}_{i,j}) := X \qquad \text{[Formula 51]}$$

In the following description, a cryptographic process shall include an encryption process, a decryption process, and a key generation process, and shall also include a key encapsulation process.

First Embodiment

In this embodiment, the basic concepts for implementing a "hierarchical predicate key encapsulation mechanism (HPKEM) scheme" and a "hierarchical predicate encryption (HPE) scheme" to be discussed in subsequent embodiments will be described, together with basic constructions of the HPKEM and HPE schemes.

Firstly, a notion of an "HPE (HPKEM) scheme for inner-product predicates", which is a type of HPKEM and HPE schemes, will be described. The HPKEM and HPE schemes to be discussed in the subsequent embodiments are HPKEM and HPE schemes for inner-product predicates. To describe the notion of the HPE scheme for inner-product predicates, a notion of "hierarchical" will be described first. Then, the "predicate encryption (PE) scheme for inner-product predicates" will be described. Then, the "HPE (HPKEM) scheme for inner-product predicates", which is the PE scheme for inner-product predicates with the notion of "hierarchical", will be described. Further, to reinforce the understanding of the HPE scheme for inner-product predicates, an application example of the HPE scheme for inner-product predicates will be described.

Secondly, an HPE scheme for inner-product predicates in a vector space will be described. In this and subsequent embodiments, the HPKEM and HPE schemes are implemented in a vector space.

Thirdly, basic constructions of the "HPKEM and HPE schemes" according to this and subsequent embodiments will be described, together with an outline of a "cryptographic processing system 10" that implements the HPKEM and HPE schemes.

Fourthly, concepts for implementing the HPKEM and HPE schemes will be described. Bilinear pairing groups will be described first. Then, using the bilinear pairing groups, other concepts will be described in the following six steps (1) to (6):
(1) extension of spaces V and V* of 1-dimensional pairing "$G_1 \times G_2 \to G_T$" to higher-dimensional spaces;
(2) canonical dual bases A and A*;
(3) efficient linear mapping using distortion maps;
(4) a method for generating key pair (B, B*) through a base change;
(5) computationally intractable problems over (V, B) and (V, B*) for cryptographic applications; and
(6) PE scheme for inner-product predicates using key pair (B, B*).

Fifthly, "dual distortion vector spaces (DDVS)" having rich mathematical structures for implementing the HPKEM and HPE schemes will be described.

Sixthly, based on the above descriptions, a method will be briefly described for implementing the HPKEM and HPE schemes to be described in detail in the subsequent embodiments.

<1. HPE Scheme for Inner-Product Predicates>
<1-1. Notion of Hierarchical>

The notion of "hierarchical" in the HPKEM and HPE schemes to be described in this and subsequent embodiments will be described.

FIG. 1 is a diagram for explaining the notion of "hierarchical".

The term "hierarchical" in the HPKEM and HPE schemes means having a system that is capable of delegation (a delegation system). The delegation means that a user who has a higher level key generates a lower level key having more restricted capabilities than the user's (higher level) key.

In FIG. 1, a root (a key generation device) generates secret keys for first level (level-1) users by using a master secret key. That is, the root generates keys 1, 2, and 3 for first level users 1, 2, and 3, respectively. Then, by using the key 1, for example, the user 1 can generate keys 11, 12, and 13 for users 11, 12, and 13, respectively, who are lower (second) level users of the user 1. Here, the keys 11, 12, and 13 possessed by the users 11, 12, and 13 have more restricted capabilities than the key 1 possessed by the user 1. The restricted capabilities mean that ciphertexts that can be decrypted by that secret key are restricted. That is, a lower level secret key can only decrypt some of ciphertexts that can be decrypted by a higher level secret key. This means that the keys 11, 12, and 13 possessed by the users 11, 12, and 13 can only decrypt some of ciphertexts that can be decrypted by the key 1 possessed by the user 1. Normally, the keys 11, 12, and 13 can decrypt respectively different ciphertexts. On the other hand, a ciphertext that can be decrypted by the keys 11, 12, or 13 can be decrypted by the key 1.

<1-2. PE Scheme for Inner-Product Predicates>

A "PE scheme for inner-product predicates" will now be described.

A PE scheme is a cryptographic scheme in which a ciphertext can be decrypted if a result of inputting attribute information x to predicate information $f_v$ is 1 (true) ($f_v(x)=1$).

Normally, the attribute information x is embedded in a ciphertext, and the predicate information $f_v$ is embedded in a secret key. That is, in the PE scheme, a ciphertext c encrypted based on the attribute information x is decrypted by a secret key $SK_f$ generated based on the predicate information $f_v$. The PE scheme may be described as a cryptographic scheme in which, for example, the predicate information $f_v$ is a conditional expression and the attribute information x is information to be input to the conditional expression, and a ciphertext can be decrypted if the input information (attribute information x) satisfies the conditional expression (predicate information $f_v$) ($f_v(x)=1$).

The PE scheme is discussed in detail in Non-Patent Literature 19.

The PE scheme for inner-product predicates is a type of PE scheme in which $f_v(x)=1$ if the inner-product of attribute information x and predicate information $f_v$ is a predetermined value. That is, a ciphertext c encrypted by the attribute information x can be decrypted by a secret key $SK_f$ generated based on the predicate information $f_v$ if and only if the inner-product of the attribute information x and the predicate information $f_v$ is a predetermined value. In the following description, it is assumed that $f_v(x)=1$ if the inner-product of the attribute information x and the predicate information $f_v$ is 0.

<1-3. HPE Scheme for Inner-Product Predicates>

The HPE (HPKEM) scheme for inner-product predicates is a type of "PE scheme for inner-product predicates" with the above-described notion of "hierarchical". That is, the HPE (HPKEM) scheme for inner-product predicates is a type of PE scheme for inner-product predicates with the delegation system.

In the HPE scheme for inner-product predicates, attribute information and predicate information have hierarchical structures, in order to add the delegation system to the PE scheme for inner-product predicates.

Figure 2:
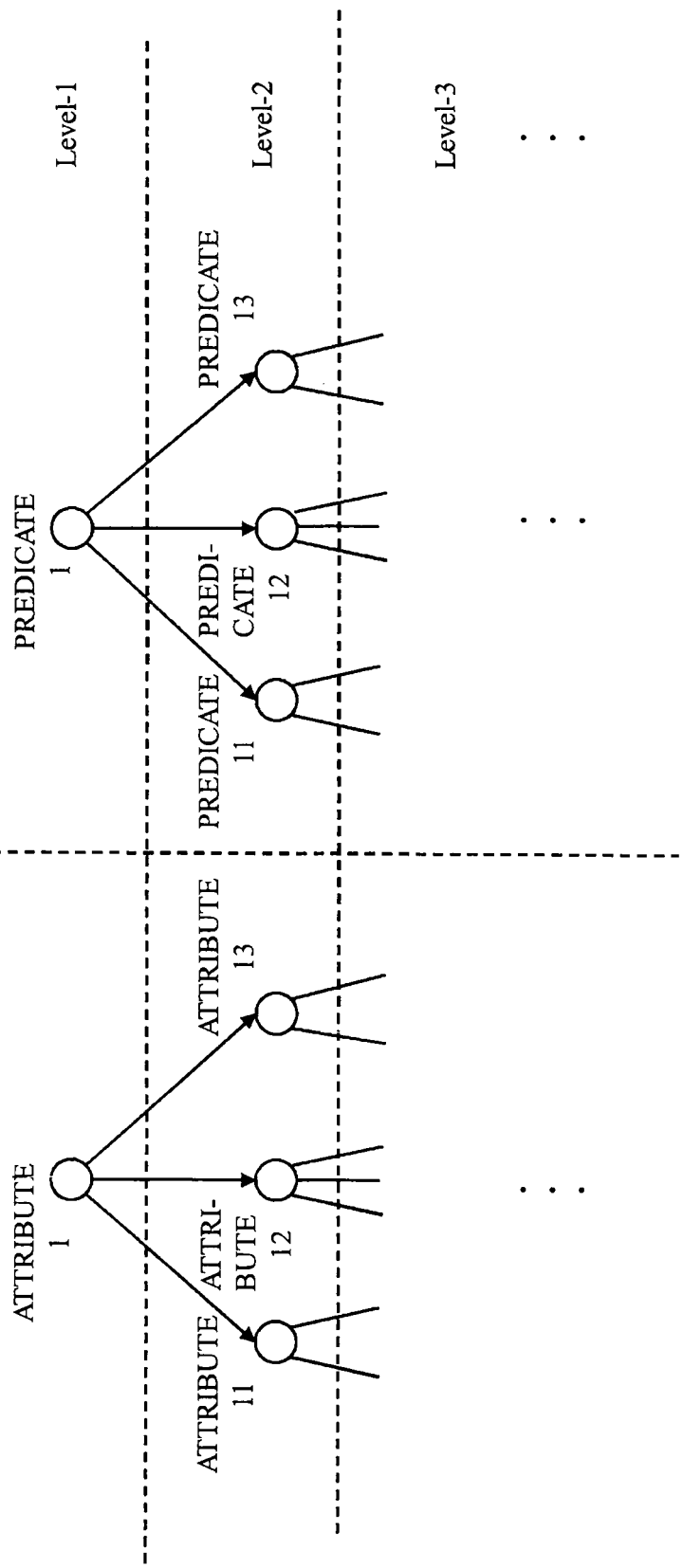
FIG. 2 is a diagram showing hierarchical structures of attribute information and predicate information.

FIG. 2 is a diagram showing hierarchical structures of attribute information and predicate information.

In FIG. 2, attribute information and predicate information with the same reference numerals correspond to each other (i.e., their inner-product is 0). That is, the inner-product of an attribute 1 and a predicate 1 is 0, the inner-product of an attribute 11 and a predicate 11 is 0, the inner-product of an attribute 12 and a predicate 12 is 0, and the inner-product of an attribute 13 and a predicate 13 is 0. This means that a ciphertext c1 encrypted by the attribute 1 can be decrypted by a secret key k1 generated based on the predicate 1. A ciphertext c11 encrypted by the attribute 11 can be decrypted by a secret key k11 generated based on the predicate 11. The same can be said of the attribute 12 and the predicate 12 as well as the attribute 13 and the predicate 13.

As described above, the HPE scheme for inner-product predicates has the delegation system. Thus, the secret key k11 can be generated based on the predicate 11 and the secret key k1 generated based on the predicate 1. That is, a user having the higher level secret key k1 can generate its lower-level secret key k11 from the secret key k1 and the lower level predicate 11. Likewise, a secret key k12 can be generated from the secret key k1 and the predicate 12, and a secret key k13 can be generated from the secret key k1 and the predicate 13.

A ciphertext encrypted by a key (a public key) corresponding to a lower level secret key can be decrypted by a higher level secret key. On the other hand, a ciphertext encrypted by a key (a public key) corresponding to a higher level secret key cannot be decrypted by a lower level secret key. That is, the ciphertexts c11, c12, and c13 encrypted by the attributes 11, 12, and 13, respectively, can be decrypted by the secret key k1 generated based on the predicate 1. On the other hand, the ciphertext c1 encrypted by the attribute 1 cannot be decrypted by the secret keys k11, k12, and k13 generated based on the predicates 11, 12, and 13, respectively. That is, the inner-product of the attribute 11, 12, or 13 and the predicate 1 is 0. On the other hand, the inner-product of the attribute 1 and the predicate 11, 12, or 13 is not 0.

<1-4. An Application Example of the HPE Scheme for Inner-Product Predicates>

Figure 3:
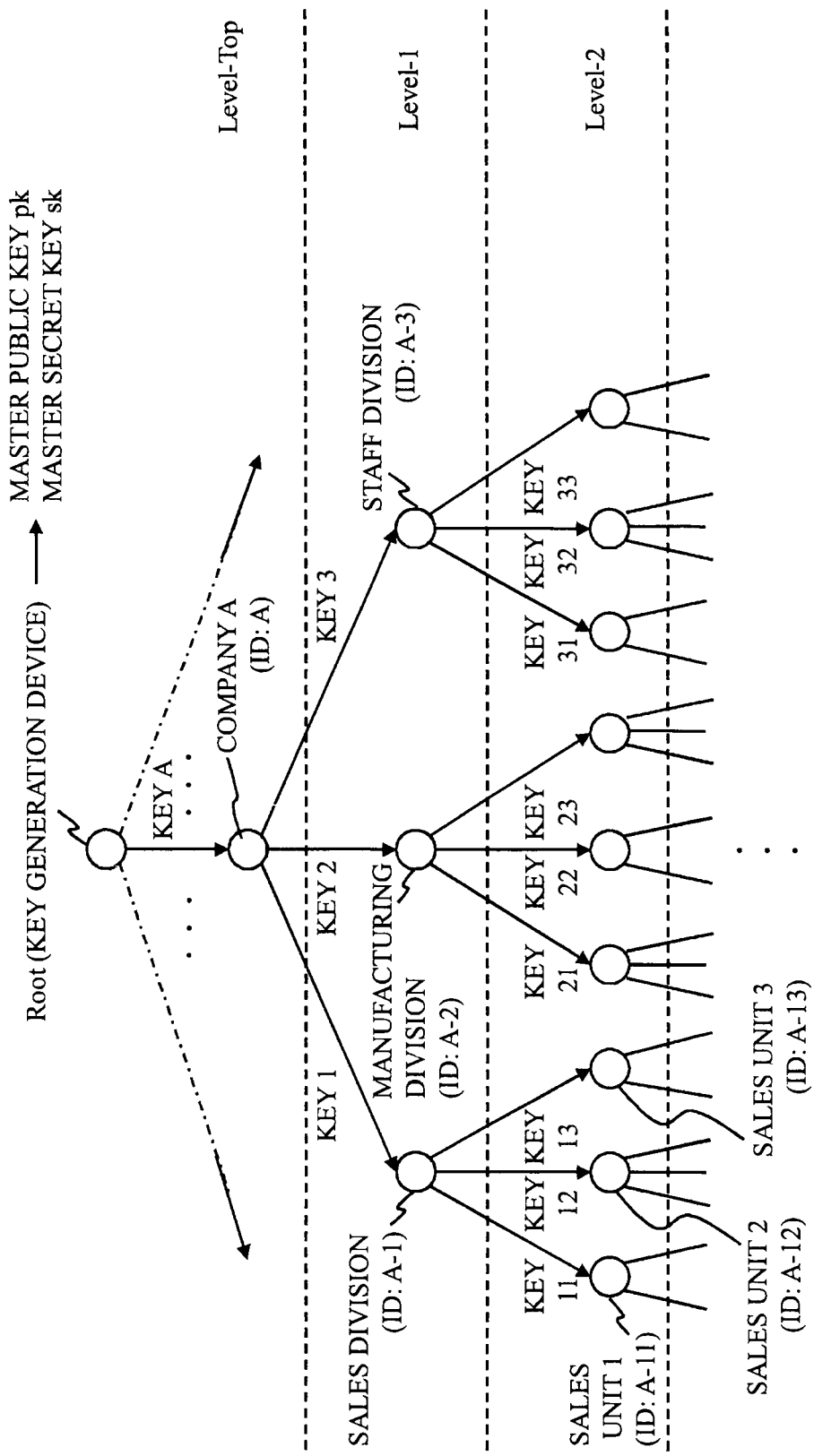
FIG. 3 is a diagram showing an example of a hierarchical identity-based encryption scheme.

FIG. 3 is a diagram showing an example of a hierarchical identity-based encryption (HIBE) scheme which is an application example of the HPE scheme for inner-product predicates to be described later. The HIBE scheme is a cryptographic process in which the notion of hierarchical is applied to an identity-based encryption (IBE) scheme. The IBE scheme is a type of PE scheme, namely, a matching PE scheme, which allows a ciphertext to be decrypted if an ID included in the ciphertext matches an ID included in a secret key.

In the example shown in FIG. 3, based on a master secret key sk and an ID "A" of Company A, a root (a key generation device) generates a secret key (a key A) corresponding to the ID "A". For example, based on the key A and the ID of each division, a security administrator of Company A generates a secret key corresponding to that ID. For example, the security administrator generates a secret key (a key 1) corresponding to an ID "A-1" of a sales division. Then, based on the secret key of each division and the ID of each unit belonging to that division, for example, an administrator of each division generates a secret key corresponding to that ID. For example, an administrator of the sales division generates a secret key (a key 11) corresponding to an ID "A-11" of a sales unit 1.

In this case, a ciphertext encrypted by the ID "A-11" of the sales unit 1 can be decrypted by the key 11 which is the secret key corresponding to the ID "A-11" of the sales unit 1. However, a ciphertext encrypted by the ID of a sales unit 2 or a sales unit 3 cannot be decrypted by the key 11. Also, a ciphertext encrypted by the ID of the sales division cannot be decrypted by the key 11.

A ciphertext encrypted by the ID "A-1" of the sales division can be decrypted by the key 1 which is the secret key corresponding to the ID "A-1" of the sales division. Also, a ciphertext encrypted by the ID of a unit belonging to the sales division can be decrypted by the key 1. That is, a ciphertext encrypted by the ID of the sales unit 1, 2, or 3 can be decrypted by the key 1. However, a ciphertext encrypted by the ID of a manufacturing division (ID: A-2) or a staff division (ID: A-3) cannot be decrypted by the key 1. Also, a ciphertext encrypted by the ID of Company A cannot be decrypted by the key 1.

A ciphertext encrypted by the ID "A" of Company A can be decrypted by the key A which is the secret key corresponding to the ID "A" of Company A. Also, a ciphertext encrypted by the ID of each division belonging to Company A or the ID of a unit belonging to each division can be decrypted by the key A.

Various applications other than the IBE scheme are possible. In particular, the cryptographic processes to be described later are not limited to a class of equality tests, so that they can be applied to a vast number of applications. For example, the cryptographic processes can also be adapted for other types of PE scheme for inner-product predicates such as a searchable encryption scheme, making it possible to implement applications that are not possible with a prior art PE scheme with the delegation system, such as limiting a searchable range at each level by using a conditional expression such as AND or OR.

That is, the HPKEM and HPE schemes to be described in the subsequent embodiments can be applied to a wide variety of applications such as the IBE and searchable encryption schemes.

<2. HPE Scheme for Inner-Product Predicates in a Vector Space>

The HPKEM and HPE schemes are implemented in high-dimensional vector spaces, called dual distortion vector spaces (DDVS), to be described later. Thus, an HPE scheme for inner-product predicates in a vector space will be described.

First, a "basis" and a "basis vector" to be used for explaining a vector space will be briefly explained.

Figure 4:
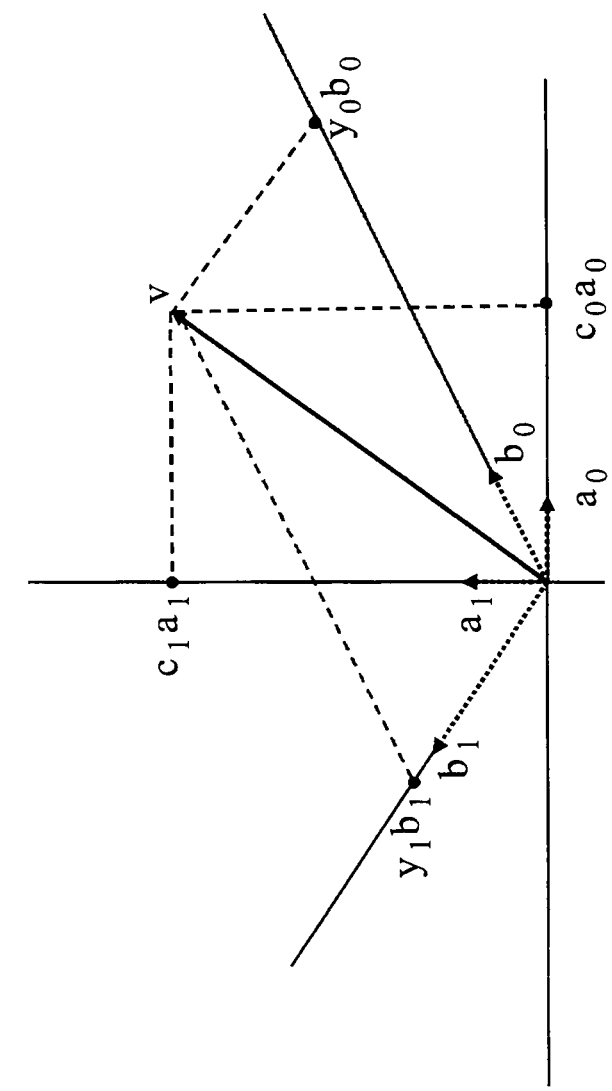
FIG. 4 is a diagram for explaining a basis and a basis vector.

FIG. 4 is a diagram for explaining the basis and the basis vector.

FIG. 4 shows a vector v of a 2-dimensional vector space. The vector v is $c_0 a_0 + c_1 a_1$. Further, the vector v is $y_0 b_0 + y_1 b_1$. Here, $a_0$ and $a_1$ are called basis vectors in a basis A, and are represented as basis A:=$(a_0, a_1)$. $b_0$ and $b_1$ are called basis vectors in a basis B, and are represented as basis B:=$(b_0, b_1)$. $c_0$, $c_1$, $y_0$, and $y_1$ are coefficients of respective basis vectors. FIG. 4 shows a 2-dimensional vector space, so that there are two basis vectors in each basis. In an N-dimensional vector space, there are an N number of basis vectors in each basis.

APE scheme for inner-product predicates in a vector space will now be described.

As described above, the PE scheme for inner-product predicates is a type of PE scheme in which $f_v(x)=1$ if the inner-product of the attribute information x and the predicate information $f_v$ is a predetermined value (0 in this case). When the attribute information x and the predicate information $f_v$ are vectors, namely, an attribute vector $\vec{x}$ and a predicate vector $\vec{v}$, their inner-product predicate is defined as shown in Formula 52.

$$\text{If } \vec{x} \cdot \vec{v} = \sum_{i=0}^{n-1} x_i v_i = 0, \text{ then } f_{\vec{v}}(\vec{x}) = 1, \text{ and}$$

$$\text{if } \vec{x} \cdot \vec{v} = \sum_{i=0}^{n-1} x_i v_i \neq 0, \text{ then } f_{\vec{v}}(\vec{x}) = 0,$$

[Formula 52]

where $\vec{x} = (x_0, \ldots, x_{n-1})$ $\vec{v} = (v_0, \ldots, v_{n-1})$.

That is, it is a type of PE scheme in which a result of inputting the attribute information x to the predicate information $f_v$ is 1 (true) if the inner-product of the attribute vector $\vec{x}$ and the predicate vector $\vec{v}$ (i.e., the sum of element-wise inner-products) is 0, and a result of inputting the attribute information x to the predicate information $f_v$ is 0 (false) if the inner-product of the attribute vector $\vec{x}$ and the predicate vector $\vec{v}$ is not 0.

A method for implementing a hierarchical structure in a vector space will now be described.

Figure 5:
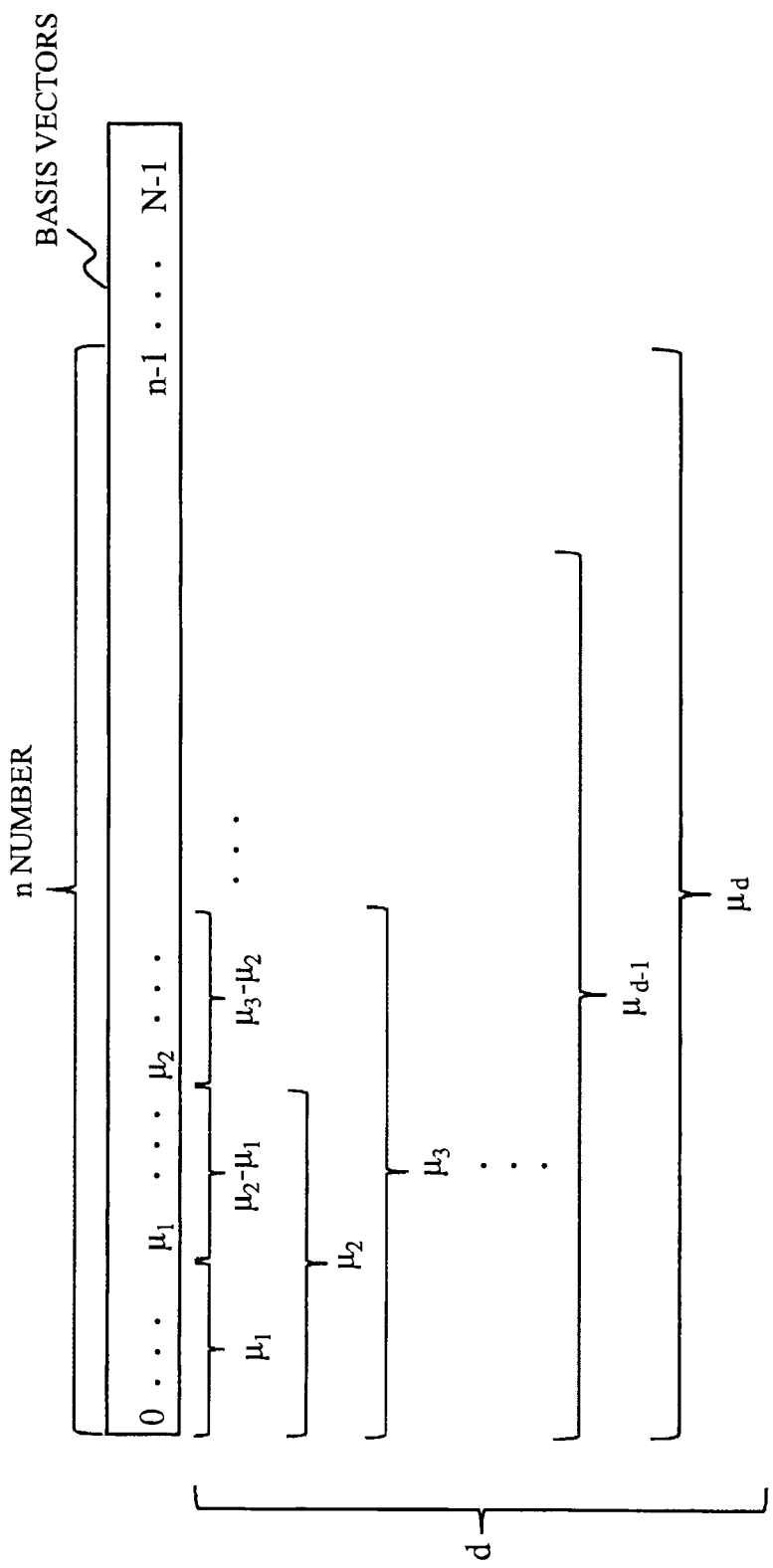
FIG. 5 is a diagram for explaining a method for implementing a hierarchical structure in a vector space.

FIG. 5 is a diagram for explaining this method for implementing a hierarchical structure in a vector space.

The vector space here is assumed to be a high-dimensional (N-dimensional) vector space. That is, there exist an N number of basis vectors $c_i$ (i=0, . . . , N−1) in a predetermined basis C of the vector space.

An n number of basis vectors (basis vectors $c_i$ (i=0, . . . , n−1) out of the N number of basis vectors are used to represent the hierarchical structure. The basis vectors $c_i$ (i=0, . . . , n−1) are divided into a d number of groups, namely, basis vectors $c_i$ (i=0, . . . , $\mu_1$−1), basis vectors $c_i$ (i=$\mu_1$, . . . , $\mu_2$−1), . . . , and basis vectors $c_i$ (i=$\mu_{d-1}$, . . . , n−1), where d denotes a depth of hierarchy.

Then, a $\mu_1$ number of basis vectors $c_1$ (i=0, . . . , $\mu_1$−1) are assigned to represent attribute information and predicate information of the first level. A ($\mu_2 - \mu_1$) number of basis vectors $c_i$ (i=$\mu_1$, . . . , $\mu_2$−1) are assigned to represent attribute information and predicate information of the second level. Likewise, a ($\mu_d - \mu_{d-1}$) number of basis vectors $c_i$ (i=$\mu_{d-1}$, . . . , $\mu_d$−1(=n−1)) are assigned to represent attribute information and predicate information of the d-th level.

To generate a ciphertext by L-th level attribute information, not only L-th level but first to L-th level attribute information is used to generate a ciphertext. Likewise, to generate a secret key by L-th level predicate information, not only L-th level but first to L-th level predicate information is used to generate a secret key. That is, to generate a ciphertext by the L-th level attribute information, or to generate a secret key by the L-th level predicate information, a $\mu_L$ number of basis vectors $c_i$ (i=0, . . . , $\mu_L$−1) assigned to the first to L-th levels are used. For example, to generate a ciphertext by third level attribute information, a $\mu_3$ number of basis vectors $c_i$ (i=0, . . . , $\mu_3$−1) assigned to the first to third levels are used to generate a ciphertext, such that first to third level attribute information is reflected. Likewise, to generate a secret key by third level predicate information, the $\mu_3$ number of basis vectors $c_i$ (i=0, . . . , $\mu_3$−1) assigned to the first to third levels are used to generate a secret key, such that first to third level predicate information is reflected. That is, attribute information or predicate information to be used at a lower level includes attribute information or predicate information to be used at a higher level. In this way, attribute information and predicate information each have a hierarchical structure. Then, by using the hierarchical structures of attribute information and predicate information, a delegation system is incorporated in the PE scheme for inner-product predicates.

In the following description, a format of hierarchy $\vec{\mu}$ is used to denote a hierarchical structure of a vector space. The format of hierarchy $\vec{\mu}$ is shown in Formula 53.

$$\vec{\mu} := (n, d; \mu_1, \ldots \mu_d)$$

[Formula 53]

where $\mu_0 = 0 < \mu_1 < \mu_2 < \ldots < \mu_d = n$.

That is, the format of hierarchy $\vec{u}$ has information n which denotes the number of basis vectors (the number of dimensions) assigned to represent the hierarchical structure, information d which denotes the depth of hierarchy, and information $\mu_1, \ldots, \mu_d$ which denote basis vectors assigned to each level.

The HPE scheme for inner-product predicates in a vector space will now be described.

An inner-product predicate of a space at each level will be described first. A space at each level is a space assigned to represent attribute information and predicate information of each level. That is, a space at the j-th level is a space represented by basis vectors $c_i$ (i=$\mu_j$−1, . . . , $\mu_j$).

Let an attribute space $\Sigma_i$ (i=1, . . . , d) be a space assigned to represent i-th level attribute information. Likewise, let a predicate space $F_i$ (i=1, . . . , d) be a space assigned to represent i-th level predicate information. That is, the attribute space $\Sigma_i$ is a space of attribute information represented by basis vectors $\sigma_j$ (j=$\mu_i$−1, . . . , $\mu_i$) in a predetermined basis E. Likewise, the predicate space $F_i$ is a space of predicate information represented by basis vectors $f_j$ (j=$\mu_i$−1, . . . , $\mu_i$) in a predetermined basis F. In other words, the attribute space $\Sigma_1$ is a space of attribute information represented by basis vectors $\sigma_j$ (j=0, . . . , $\mu_1$−1), and an attribute space $\Sigma_2$ is a space of attribute information represented by basis vectors $\sigma_j$ (j=$\mu_1$, ..., $\mu_2$−1). The same can be said of the predicate space $F_i$.

In other words, the attribute space $\Sigma_i$ (i=1, ..., d) and the predicate space $F_i$ (i=1, ..., d) are respectively a set of attribute information and a set of predicate information shown in Formula 54.

$$\sum_i := F_q^{\mu_i - \mu_{i-1}} \setminus \{\vec{0}\} \quad (i=1, \ldots, d), \quad \text{[Formula 54]}$$

$$\mathcal{F}_i := \{f_{\vec{v}_i} \mid \vec{v}_i \in F_q^{\mu_i - \mu_{i-1}} \setminus \{\vec{0}\}\} \quad (i=1, \ldots, d)$$

Then, the inner-product predicate is defined for each attribute space $\Sigma_i$ (i=1, ..., d) as shown in Formula 55.

$$\text{If } \vec{v}_i \cdot \vec{x}_i = \sum_{i=\mu_{i-1}}^{\mu_i} x_i v_i = 0 \text{ holds, } f_{\vec{v}_i}(\vec{x}_i) = 1, \text{ and} \quad \text{[Formula 55]}$$

$$\text{If } \vec{v}_i \cdot \vec{x}_i = \sum_{i=\mu_i}^{\mu_i-1} x_i v_i = 0 \text{ does not hold, } f_{\vec{v}_i}(\vec{x}_i) = 0,$$

where $$\vec{v}_i, \vec{x}_i \in F_q^{\mu_i - \mu_{i-1}} \setminus \{\vec{0}\}.$$

That is, in a space at each level, a result of inputting the attribute information x to the predicate information $f_v$ is 1 (true) if the inner-product of the attribute vector $\vec{x}$ and the predicate vector $\vec{v}$ is 0. In other words, a result of inputting the attribute information x to the predicate information $f_v$ is 1 (true) if the inner-product of the attribute vector $\vec{x}$ of a given level and the predicate vector $\vec{v}$ of the same level is 0.

An inner-product predicate in a hierarchical space will now be described. A hierarchical space is a space that also includes spaces assigned to represent attribute information and predicate information of higher levels. In other words, a j-th level hierarchical space is a space represented by basis vectors $c_i$ (i=0, ..., $\mu_j$).

That is, a hierarchical attribute space $\Sigma$ and a hierarchical predicate space F are spaces respectively shown in Formula 56.

$$\Sigma := \cup_{L=1}^{d} (\Sigma_1 \times \ldots \times \Sigma_L),$$

$$\mathcal{F} := \cup_{L=1}^{d} (\mathcal{F}_1 \times \ldots \times \mathcal{F}_L) \quad \text{[Formula 56]}$$

Here, unions of the hierarchical attribute space $\Sigma$ and the hierarchical predicate space F shown in Formula 56 are disjoint unions. Hierarchical predicate information shown in Formula 58 corresponding to hierarchical attribute information shown in Formula 57 is defined as shown in Formula 59.

$$(\vec{x}_1, \ldots, \vec{x}_{L_x}) \quad \text{[Formula 57]}$$

$$f(\vec{v}_1, \ldots, \vec{v}_{L_v}) \quad \text{[Formula 58]}$$

If and only if $L_v \leq L_x$ and [Formula 59]

$$f_{(\vec{v}_i)}(\vec{x}_i) = 1 \text{ for all } i(i=1, \ldots, L_v),$$

(i.e., $\vec{x}_i \cdot \vec{v}_i = 0$ for all $i(i=1, \ldots, L_v)$, then $f_{(\vec{v}_1, \ldots, \vec{v}_{L_v})}(\vec{x}_1, \ldots, \vec{x}_{L_x}) = 1$.

That is, the HPE scheme for inner-product predicates in a vector space is a type of PE scheme in which a result of inputting the hierarchical attribute information shown in Formula 57 to the hierarchical predicate information shown in Formula 58 is 1 (true) if the following two conditions are satisfied: (1) the level $L_v$ of the hierarchical predicate vector $\vec{v}$ is the same as or higher than the level $L_x$ of the hierarchical attribute vector $\vec{x}$, and (2) the inner-product of the attribute vector $\vec{x}$ of the attribute space $\Sigma_i$ (i=1, ..., $L_v$) and the predicate vector $\vec{v}$ of each predicate space $F_i$ (i=1, ..., $L_v$) is 0.

<3. Constructions of HPKEM and HPE Schemes>
<3-1. HPKEM Scheme>

A construction of the HPKEM scheme will be briefly described.

The HPKEM scheme includes five probabilistic polynomial-time algorithms: Setup, GenKey, Enc, Dec, and Delegate$_L$ (L=1, ..., d−1).

(Setup)

The Setup algorithm takes as input a security parameter $1^\lambda$ and a format of hierarchy $\mu_\rightarrow$ and outputs a master public key pk and a master secret key sk. The master secret key sk is a top level key.

(GenKey)

The GenKey algorithm takes as input the master public key pk, the master secret key sk, and a predicate vector $\vec{v}_1$ (the predicate vector $\vec{v}_1$ may simply be denoted as $\vec{v}_1$) shown in Formula 60, and outputs a first level secret key shown in Formula 61.

$$f_{\vec{v}_1} \in \mathcal{F}_1 \quad \text{[Formula 60]}$$

$$sk_{\vec{v}_1} \quad \text{[Formula 61]}$$

(Enc)

The Enc algorithm takes as input the master public key pk and attribute vectors $\vec{x}_i$ (i=1, ..., $L_x$) ($1 \leq L_x \leq d$), and outputs a ciphertext c and a session key K. That is, the Enc algorithm outputs the ciphertext c encrypted by the attribute vectors $\vec{x}_i$ (i=1, ..., $L_x$) ($1 \leq L_x \leq d$) by embedding predetermined information ($\rho$), and the session key K generated from the predetermined information ($\rho$).

(Dec)

The Dec algorithm takes as input the master public key pk, an $L_v$-th level secret key ($1 \leq L_v \leq d$) shown in Formula 62, and the ciphertext c, and outputs either the session key K or a distinguished symbol $\perp$. The distinguished symbol $\perp$ is information indicating decryption failure. That is, the Dec algorithm decrypts the ciphertext c by the $L_v$-th level secret key, extracts the information on the predetermined information ($\rho$), and generates the session key K. In case of decryption failure, the Dec algorithm outputs the distinguished symbol $\perp$.

$$sk_{(\vec{v}_1, \ldots, \vec{v}_{L_v})} \quad \text{[Formula 62]}$$

(Delegate$_L$)

The Delegate$_L$ algorithm takes as input the master public key pk, an L-th level secret key shown in Formula 63, and an (L+1)-th level predicate vector $\vec{v}_{L+1}$ (the predicate vector $\vec{v}_{L+1}$ may simply be denoted as $\vec{v}_{L+1}$) shown in Formula 64, and outputs an (L+1)-th level secret key shown in Formula 65. That is, the Delegate$_L$ algorithm outputs a lower level secret key.

$$sk_{(\vec{v}_1, \ldots, \vec{v}_L)} \quad \text{[Formula 63]}$$

$$f_{\vec{v}_{L+1}} \in \mathcal{F}_L \quad \text{[Formula 64]}$$

$$sk_{(\vec{v}_1, \ldots, \vec{v}_{L+1})} \quad \text{[Formula 65]}$$

That is, the $L_v$-th level secret key is computed by a $Derive_{Lv}$ algorithm, shown in Formula 66, which uses the GenKey Delegate$_L$ algorithms.

$$Derive_{Lv}(pk, sk(\vec{v}_1, \ldots, \vec{v}_{L_v})):$$ [Formula 66]

$$sk_{\vec{v}_1} \xleftarrow{R} GenKey(pk, sk, \vec{v}_1)$$

For $i = 1, \ldots, L_v - 1$, $$sk_{(\vec{v}_1, \ldots, \vec{v}_{i+1})} \xleftarrow{R} Delegate_i(pk, sk_{(\vec{v}_1, \ldots, \vec{v}_i)}, \vec{v}_{i+1}),$$

return $sk_{(\vec{v}_1, \ldots, \vec{v}_{L_v})}$

<3-2. HPE Scheme>

An outline of the HPE scheme will be described

As with the HPKEM scheme, the HPE scheme includes five probabilistic polynomial-time algorithms: Setup, GenKey, Enc, Dec, and Delegate$_L$ (L=1, ..., d–1).

(Setup)

As with the HPKEM scheme, the Setup algorithm takes as input a security parameter $1^\lambda$ and a format of hierarchy $\vec{\mu}$, and outputs a master public key pk and a master secret key sk.

(GenKey)

As with the HPKEM scheme, the GenKey algorithm takes as input the master public key pk, the master secret key sk, and a predicate vector $\vec{v}_1$ shown in Formula 67, and outputs a first level secret key shown in Formula 68.

$$f_{\vec{v}_1} \in \mathcal{F}$$ [Formula 67]

$$sk_{\vec{v}_1}$$ [Formula 68]

(Enc)

The Enc algorithm takes as input the master public key pk, attribute vectors $\vec{x}_i$ (i=1, ..., $L_x$) ($1 \leq L_x \leq d$), and a message m, and outputs a ciphertext c. That is, the Enc algorithm outputs the ciphertext c encrypted by the attribute vectors $\vec{x}_i$ (i=1, ..., $L_x$) ($1 \leq L_x \leq d$) by embedding the message m.

(Dec)

The Dec algorithm takes as input the master public key pk, an $L_v$-th level secret key ($1 \leq L_v \leq d$) shown in Formula 69, and the ciphertext c, and outputs either the message m or a distinguished symbol $\perp$. The distinguished symbol $\perp$ is information indicating decryption failure. That is, the Dec algorithm decrypts the ciphertext c by the $L_v$-th level secret key, and extracts the message m. In case of decryption failure, the Dec algorithm outputs the distinguished symbol $\perp$.

$$sk_{(\vec{v}_1, \ldots, \vec{v}_{L_v})}$$ [Formula 69]

(Delegate$_L$)

As with the HPKEM scheme, Delegate$_L$ takes as input the master public key pk, an L-th level secret key shown in Formula 70, and an (L+1)-th level predicate vector $\vec{v}_{L+1}$ shown in Formula 71, and outputs an (L+1)-th level secret key shown in Formula 72. That is, the Delegate$_L$ algorithm outputs a lower level secret key.

$$sk_{(\vec{v}_1, \ldots, \vec{v}_L)}$$ [Formula 70]

$$f_{\vec{v}_{L+1}} \in \mathcal{F}_L$$ [Formula 71]

$$sk_{(\vec{v}_1, \ldots, \vec{v}_{L+1})}$$ [Formula 72]

The $L_v$-th level secret key is calculated by the above Derive$_{L_v}$ algorithm shown in Formula 66, as with the HPKEM scheme.

<3-3. Cryptographic Processing System 10>

The cryptographic processing system 10 will be described. The cryptographic processing system 10 executes the above-described algorithms of the HPKEM and HPE schemes.

Figure 6:
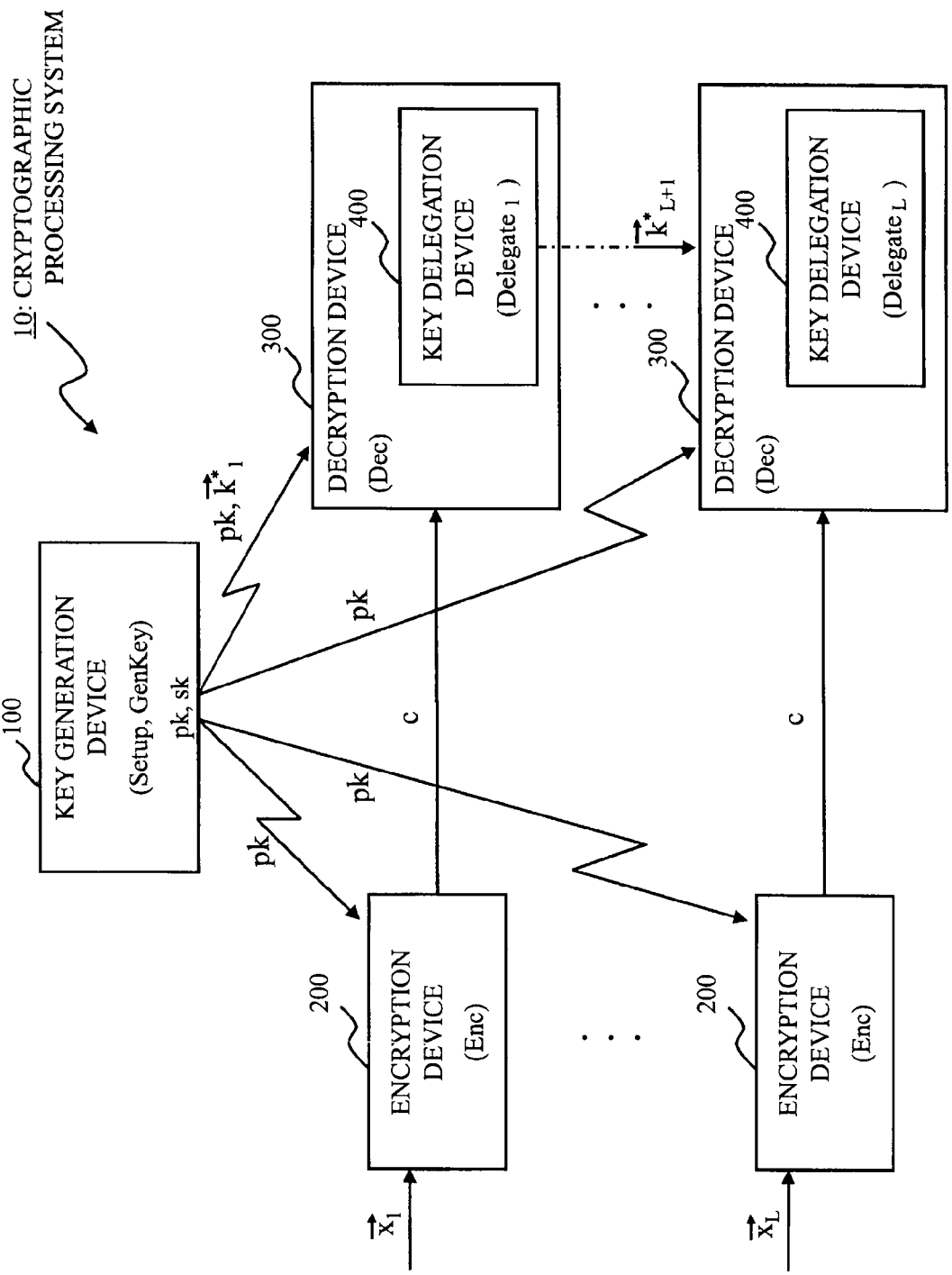
FIG. 6 is a configuration diagram of a cryptographic processing system 10.

FIG. 6 is a configuration diagram of the cryptographic processing system 10.

The cryptographic processing system 10 includes a key generation device 100, an encryption device 200, a decryption device 300, and a key delegation device 400. Here, the decryption device 300 includes the key delegation device 400. As described above, the cryptographic processing system 10 implements hierarchical cryptographic processes, so that it includes a plurality of the encryption devices 200, a plurality of the decryption devices 300, and a plurality of the key delegation devices 400.

The key generation device 100 executes the Setup and GenKey algorithms of the HPKEM and HPE schemes.

The encryption device 200 executes the Enc algorithm of the HPKEM and HPE schemes.

The decryption device 300 executes the Dec algorithm of the HPKEM and HPE schemes.

The key delegation device 400 executes the Delegate$_L$ algorithm of the HPKEM and HPE schemes.

Figure 7:
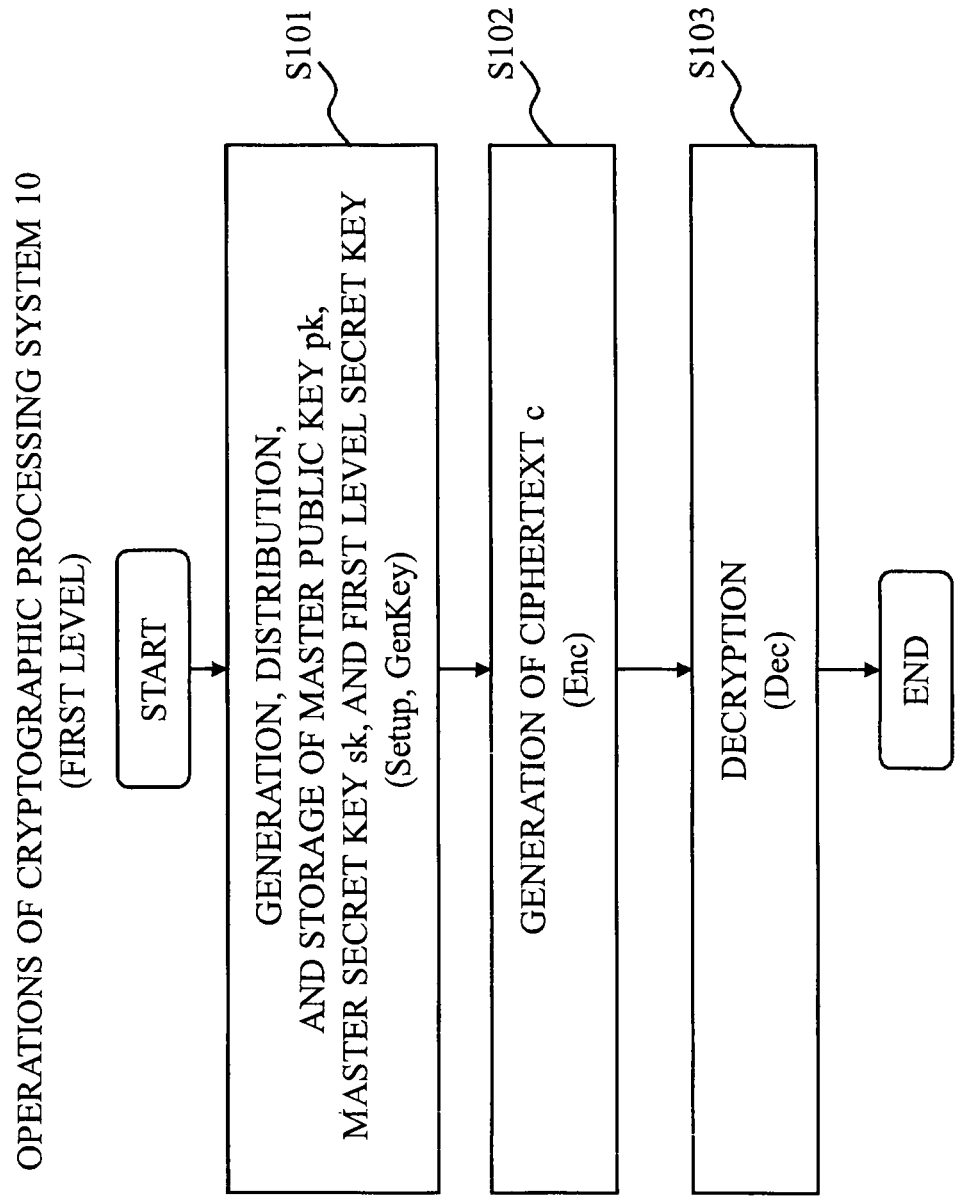
FIG. 7 is a flowchart showing operations of a key generation device 100, a first level encryption device 200, and a first level decryption device 300 of the cryptographic processing system 10.

FIG. 7 is a flowchart showing operations of the key generation device 100, a first level encryption device 200, and a first level decryption device 300 of the cryptographic processing system 10. That is, FIG. 7 is a flowchart showing operations from the generation of master keys (a master public key and a master secret key) and the generation of a first level secret key to the encryption and decryption at the first level.

(S101: Key Generation Step)

The key generation device 100 executes the Setup algorithm to generate a master public key pk and a master secret key sk. Based on the generated master public key pk, the generated master secret key sk, and a predicate vector $\vec{v}_1$ ($\vec{v}_1 = (v_0, \ldots, v_i)$ (i=$\mu_L$–1)) corresponding to a predetermined decryption device 300 (the first level decryption device 300), the key generation device 100 executes the GenKey algorithm to generate a first level secret key. Then, the key generation device 100 publishes (distributes) the generated master public key pk, and also secretly provides the first level secret key to the predetermined decryption device 300 The key generation device 100 secretly keeps the master secret key.

(S102: Encryption Step)

Based on the master public key pk distributed by key generation device 100 in (S101) and an attribute vector $\vec{x}_1$ ($\vec{x}_1 = (x_0, \ldots, x_i)$ (i=$\mu_L$–1)) of the decryption device 300, the encryption device 200 executes the Enc algorithm to generate a ciphertext c. In the case of the HPKEM scheme, the encryption device 200 also generates a session key K. Then, the encryption device 200 transmits the generated ciphertext c to the decryption device 300 through a network or the like. The attribute vector $\vec{x}_1$ may be public, or may be obtained by the encryption device 200 from the key generation device 100 or the decryption device 300.

(S103: Decryption Step)

Based on the master public key pk and the first level secret key provided by the key generation device 100 in (S101), the decryption device 300 executes the Dec algorithm to decrypt the ciphertext c received from the encryption device 200. As a result of decrypting the ciphertext c, the decryption device 300 obtains the session key K in the case of the HPKEM scheme, or obtains a message m in the case of the HPE scheme. If the decryption device 300 fails to decrypt the ciphertext c, it outputs a distinguished symbol ⊥.

Figure 8:
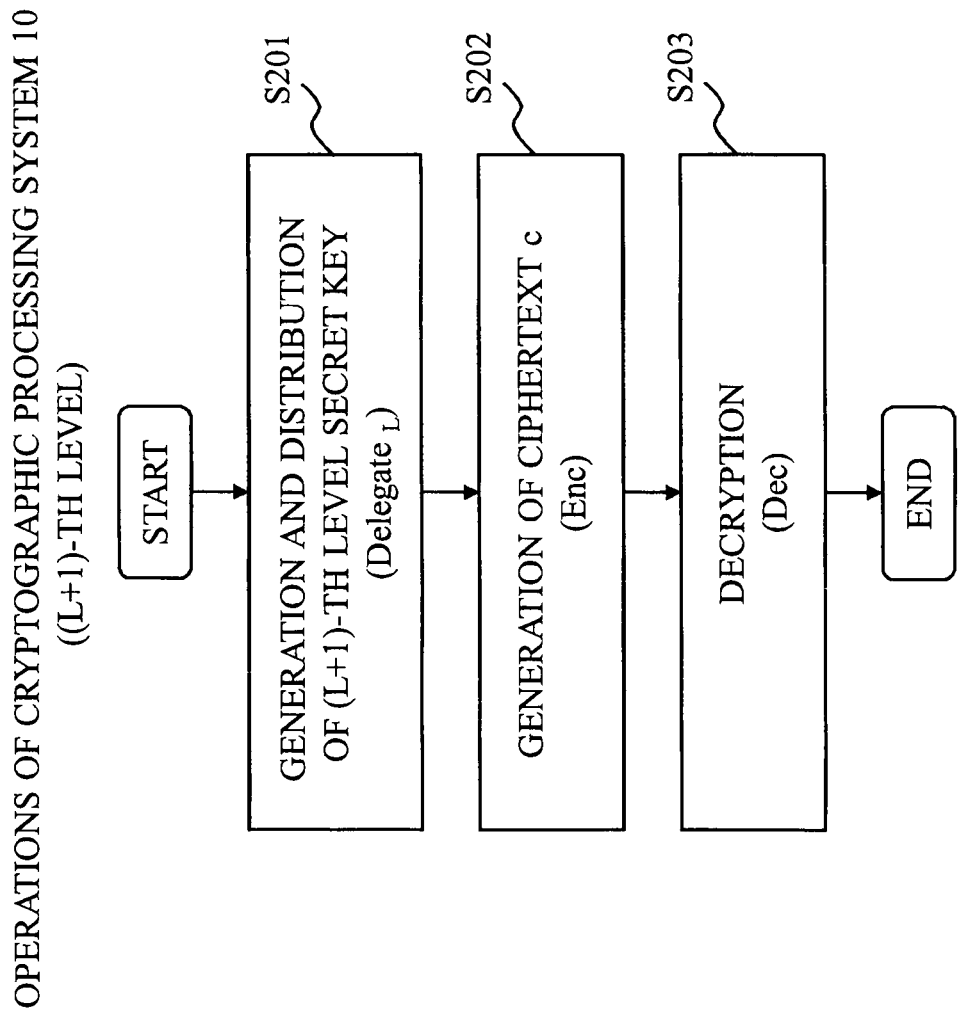
FIG. 8 is a flowchart showing operations of an L-th level key delegation device 400, an (L+1)-th level encryption device 200, and an (L+1)-th level decryption device 300 of the cryptographic processing system 10.

FIG. 8 shows a flowchart showing operations of an L-th level key delegation device 400, an (L+1)-th level encryption device 200 and an (L+1)-th level decryption device 300 of the cryptographic processing system 10. That is, FIG. 8 is a flowchart showing operations from the generation of an (L+1)-th level secret key to the encryption and decryption at the (L+1)-th level.

(S201: Key Delegation Step)

Based on the master public key pk distributed by the key generation device 100 in (S101), an L-th level secret key provided by the key generation device 100 or an (L−1)-th level key delegation device 400, and a predicate vector $\vec{v}_{L+1}$ ($\vec{v}_{L+1} = (v_i, \ldots, v_j)$ ($i = \mu_L$, $j = \mu_{L+1} - 1$)) corresponding to the (L+1)-th level decryption device 300, the L-th level delegation device 400 (the key delegation device 400 included in the L-th level decryption device 300) executes the Delegate$_L$ algorithm to generate the (L+1)-th level secret key. Then, the L-th level key delegation device 400 secretly provides the generated secret key to the (L+1)-th level decryption device 300.

(S202: Encryption Step)

Based on the master public key pk distributed by the key generation device 100 in (S101) and attribute vectors $\vec{x}_1$ to $\vec{x}_{L+1}$ ($\vec{x}_i$ ($i = 1, \ldots, L+1$) ($= (x_0, \ldots, x_i)$ ($i = \mu_{L+1} - 1$))) of the first to (L+1)-th level decryption devices 300, the encryption device 200 executes the Enc algorithm to generate a ciphertext c. In the case of the HPKEM scheme, the encryption device 200 also generates a session key K. Then, the encryption device 200 transmits the generated ciphertext c to the decryption device 300 through a network or the like. The attribute vectors $\vec{x}_1$ to $\vec{x}_{L+1}$ ($\vec{x}_i$ ($i = 1, \ldots, L+1$)) may be public, or may be obtained by the encryption device 200 from the key generation device 100 or the decryption device 300.

(S203: Decryption Step)

Based on the master public key pk distributed by the key generation device 100 in (S101) and the secret key provided by the L-th level key delegation device 400 in (S201), the decryption device 300 executes the Dec algorithm to decrypt the ciphertext c received from the encryption device 200. As a result of decrypting the ciphertext c, the decryption device 300 obtains the session key K in the case of the HPKEM scheme, or obtains a message m in the case of the HPE scheme.

<4. Concepts for Implementing the HPKEM and HPE Schemes>

Concepts required for implementing each algorithm of the HPKEM and HPE schemes will now be described.

<4-1. Bilinear Pairing Groups>

Bilinear pairing groups ($\mathbb{G}_1$, $\mathbb{G}_2$, $\mathbb{G}_T$, $g_1$, $g_2$, q) will be described.

The bilinear pairing groups ($\mathbb{G}_1$, $\mathbb{G}_2$, $\mathbb{G}_T$, $g_1$, $g_2$, q) are a tuple of three cyclic groups $\mathbb{G}_1$, $\mathbb{G}_2$ and $\mathbb{G}_T$ of order q. $g_1$ is a generator of $\mathbb{G}_1$, and $g_2$ is a generator of $\mathbb{G}_2$. The bilinear pairing groups ($\mathbb{G}_1$, $\mathbb{G}_2$, $\mathbb{G}_T$, $g_1$, $g_2$, q) satisfy the following condition of nondegenerate bilinear pairing:

(Condition: Nondegenerate Bilinear Pairing)

There exists a polynomial-time computable nondegenerate bilinear pairing shown in Formula 73.

$$e: \mathbb{G}_1 \times \mathbb{G}_2 \to \mathbb{G}_T \quad \text{[Formula 73]}$$

That is, for any $\xi \in \mathbb{G}_1$, $\eta \in \mathbb{G}_2$,
$e(s\xi, t\eta) = e(\xi, \eta)^{st}$ and
$e(g_1, g_2) \neq 1$.

This is called symmetric bilinear pairing when $\mathbb{G}_1 = \mathbb{G}_2$ (=: $\mathbb{G}$), and asymmetric bilinear pairing when $\mathbb{G}_1 \neq \mathbb{G}_2$. Symmetric bilinear pairing can be constructed using supersingular (hyper) elliptic curves, and asymmetric bilinear pairing can be constructed using any (hyper) elliptic curves. Asymmetric bilinear pairing can be constructed using, for example, ordinary elliptic curves.

Asymmetric bilinear pairing will be used for discussion here. That is, the bilinear pairing groups ($\mathbb{G}_1$, $\mathbb{G}_2$, $\mathbb{G}_T$, $g_1$, $g_2$, q) are assumed to be asymmetric bilinear pairing groups. A case will be discussed in which dual distortion vector spaces (DDVS) to be described later are constructed by using direct products of asymmetric bilinear pairing groups. As will be discussed in the following embodiments, DDVS may be constructed by other methods, not limited to the direct products of asymmetric bilinear pairing groups.

<4-2. (1) Extension of Spaces V and V* of 1-Dimensional Pairing "$\mathbb{G}_1 \times \mathbb{G}_2 \to \mathbb{G}_T$" to Higher-Dimensional Spaces>

A cyclic group (1-dimensional space) is extended to a higher-dimensional (vector) space. That is, as shown in Formula 74, N-dimensional vector spaces V and V* are constructed by direct products of $\mathbb{G}_1$ and $\mathbb{G}_2$.

$$\mathbb{V} := \overbrace{\mathbb{G}_1 \times \ldots \times \mathbb{G}_1}^{N}, \quad \text{[Formula 74]}$$

$$\mathbb{V}^* := \overbrace{\mathbb{G}_2 \times \ldots \times \mathbb{G}_2}^{N}$$

where an element x in the space $\mathbb{V}$ is represented by an N-dimensional vector as shown below.

$$x := (x_0 g_1, \ldots, x_{N-1} g_1)$$

Likewise, an element y in the space $\mathbb{V}^*$ is represented by an N-dimensional vector as shown below.

$$y := (y_0 g_2, \ldots, y_{N-1} g_2)$$

Note that $x_i, y_i \in \mathbb{F}_q$ for $i = 0, \ldots, N-1$.

A pairing operation e on the N-dimensional vector spaces V and V* is defined as shown in Formula 75.

$$e(x, y) := \prod_{i=0}^{N-1} e(x_i g_1, y_i g_2) \quad \text{[Formula 75]}$$

That is, the pairing operation $e(x, y)$ on a vector $x := (x_0 g_1, x_1 g_1, x_{N-1} g_1)$ of the N-dimensional vector space V and a vector $y := (y_0 g_2, y_1 g_2, y_{N-1} g_2)$ of the N-dimensional vector space V* is defined as the product of pairing operations on respective elements of the vectors x and y. Then, based on the above-described condition of nondegenerate bilinear pairing, the pairing operation $e(x, y)$ can be expressed as shown in Formula 76.

$$e(x, y) := \prod_{i=0}^{N-1} e(x_i g_1, y_i g_2) = e(g_1, g_2)^{\sum_{i=0}^{N-1} x_i y_i} \quad \text{[Formula 76]}$$

The notation e in the pairing operation e is used for both ($\mathbb{G}_1$, $\mathbb{G}_2$) and (V, V*).

<4-3. (2) Canonical Dual Bases A and A*>

Canonical bases A and A* of the N-dimensional vector space V and V* will be described.

Formula 77 shows the canonical basis A.

$$\mathbb{A} := (a_0, \ldots, a_{N-1}) \quad \text{[Formula 77]}$$

where
$a_0:=(g_1, 0, \ldots, 0)$, $a_1:=(0, g_1, 0, \ldots, 0)$, $\ldots$, $a_{N-1}:=(0, \ldots, 0, g_1)$.

Here, any element x: $(x_0 g_1, \ldots, x_{N-1} g_1)$ in the N-dimensional vector space V can be expressed by a linear combination of the canonical basis A. That is, any element x:= $(x_0 g_1, \ldots, x_{N-1} g_1)$ in the N-dimensional vector space V can be expressed as shown in Formula 78.

$$x = x_0 a_0 + x_1 a_1 + \ldots + x_{N-1} a_{N-1} \qquad [\text{Formula 78}]$$

Formula 79 shows the canonical basis A*. As with the canonical basis A, any element y:=$(y_0 g_2, \ldots, y_{N-1} g_2)$ in the N-dimensional vector space V* can be expressed by a linear combination of the canonical basis A*.

$$\mathbb{A}^* := (a^*_0, \ldots, a^*_{N-1}) \qquad [\text{Formula 79}]$$

where
$a^*_0:=(g_2, 0, \ldots, 0)$, $a^*_1:=(0, g_2, 0, \ldots 0)$, $\ldots$, $a^*_{N-1}:=(0, \ldots, 0, g_2)$.

The canonical bases A and A* satisfy the conditions shown in Formula 80.

$$e(a_i, a^*_j) = u^{\delta_{i,j}} \quad i,j \in \{0, \ldots, N-1\} \qquad [\text{Formula 80}]$$

where
$\delta$: Kronecker $\delta$ (i.e., $\delta_{i,j}=1$ if $i=j$ and $\delta_{i,j}=0$ if $i \neq j$) and $u:=e(g_1, g_2) \neq 1$ That is, the canonical bases A and A* are dual orthonormal bases, and the spaces V and V* are dual vector spaces paired through the pairing operation e.

The statement that the canonical bases A and A* satisfy the conditions shown in Formula 80 will be further explained.

First, the equation $e(a_i, a^*_i) = u$ will be explained. To take an example, $e(a_0, a^*_0)$ will be computed. Based on $a_0=(g_1, 0, \ldots, 0)$ and $a^*_0=(g_2, 0, \ldots, 0)$ as described above, it follows that: $e(a_0, a^*_0) = e(g_1, g_2) \times e(0, 0) \times, \ldots, \times e(0, 0)$. Here, as described above, the equation $e(g_1, g_2) = u$ holds. Also, based on $e(0, 0) = e(0 \cdot g_1, 0 \cdot g_2) = e(g_1, g_2)^0$, it follows that: $e(0, 0) = 1$. Thus, the equation $e(a_0, a^*_0) = u$ holds. The same computations also hold for other $e(a_i, a^*_i)$, so that the equation $e(a_i, a^*_i) = u$ holds.

Next, the equation $e(a_i, a^*_j) = 1$ ($i \neq j$) will be described. To take an example, $e(a_0, a^*_1)$ will be computed. Based on $a_0 = (g_1, 0, \ldots, 0)$ and $a^*_1 = (0, g_2, 0, \ldots, 0)$ as described above, it follows that: $e(a_0, a^*_1) = e(g_1, 0) \times e(0, g_2) \times e(0, 0) \times, \ldots, \times e(0, 0)$. Based on $e(g_1, 0) = e(g_1, 0 \cdot g_2) = e(g_1, g_2)^0$, the equation $e(g_1, 0) = 1$ holds. Likewise, the equation $e(0, g_2) = 1$ holds. Also, as described above, the equation $e(0, 0) = 1$ holds. Thus, the equation $e(a_i, a^*_j) = 1$ holds. The same computations also hold for other $e(a_i, a^*_j)$, so that the equation $e(a_i, a^*_j) = 1$ holds.

Thus, the equations $e(a_i, a^*_i) = u$ and $e(a_i, a^*_j) = 1$ ($i \neq j$) hold over the canonical bases A and A*.

<4-4. (3) Efficient Linear Mapping Using Distortion Maps>

A linear transformation, called a distortion map, for a generator x in the space V over the canonical basis A will be described.

A distortion map $\phi_{i,j}$ on the canonical basis A of the space V is a map shown in Formula 81.

If $\phi_{i,j}(a_j) = a_i$ and $k \neq j$, then $\phi_{i,j}(a_k) = 0$. $\qquad [\text{Formula 81}]$ Since Formula 82 holds, the distortion map $\phi_{i,j}$ can achieve the transformation shown in Formula 83.

$$\begin{aligned}\phi_{i,j}(x) &= \phi_{i,j}(x_0 a_0 + x_1 a_1 + \ldots + x_{N-1} a_{N-1}) \\ &= \phi_{i,j}(x_j a_j) \\ &= x_j \phi_{i,j}(a_j) = x_j a_i\end{aligned} \qquad [\text{Formula 82}]$$

For $x := (x_0 g_1, \ldots, x_j g_1, \ldots, x_{N-1} g_1)$, $\qquad [\text{Formula 83}]$ $$\phi_{i,j}(x) := (\underbrace{0, \ldots, 0}_{i-1}, x_j g_1, \underbrace{0, \ldots, 0}_{N-i}).$$

That is, an element, namely a basis vector j, in the canonical basis A of the vector x can be transformed into another element, namely a basis vector i, in the canonical basis A. At this time, elements other than the basis vector j that is transformed all become 0. That is, in the vector x, the basis vector j becomes the basis vector i and other elements become 0.

A distortion map $\phi^*_{i,j}$ on the canonical basis A* of the space V* can be represented in the same manner as the distortion map $\phi_{i,j}$ on the canonical basis A of the space V.

By using the distortion map $\phi_{i,j}$ ($\phi^*_{i,j}$), any linear transformation W, expressed as an N×N-matrix shown in Formula 84, for $x \in V$ can be efficiently computed by Formula 85.

$$(\gamma_{i,j}) \in \mathbb{F}_q^{N \times N} \qquad [\text{Formula 84}]$$

$$W(x) := \sum_{i=0, j=0}^{N-1, N-1} \gamma_{i,j} \phi_{i,j}(x) \qquad [\text{Formula 85}]$$

<4-5. (4) A Method for Generating Key Pair (B, B*) Through a Base Change>

Figure 9:
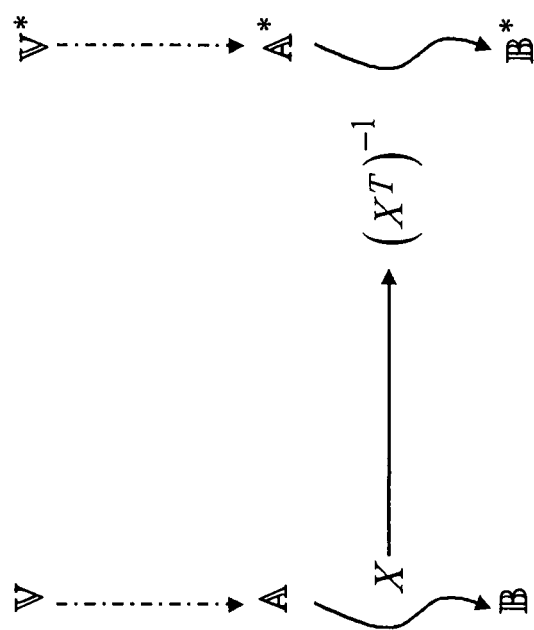
FIG. 9 is a diagram for explaining a base change method.

A base change method for changing the canonical bases A and A* to other bases B and B* will be described. FIG. 9 is a diagram for explaining the base change method.

The canonical basis A of the space V is changed to another basis B:=$(b_0, \ldots, b_{N-1})$ of the space V. Using a uniformly chosen linear transformation X shown in Formula 86, the canonical basis A of the space V is changed to another basis B of the space V as shown in Formula 87.

$$X := (x_{i,j}) \xleftarrow{U} GL(N, \mathbb{F}_q) \qquad [\text{Formula 86}]$$

$$b_i = \sum_{j=0}^{N-1} x_{i,j} a_j \qquad [\text{Formula 87}]$$

$i = 0, \ldots, N-1$ where
$\mathbb{B} := (b_0, \ldots, b_{N-1})$.

Here, GL stands for general linear. That is, GL is a general linear group, a set of square matrices with nonzero determinants, and a group under multiplication.

In the cryptographic processes to be described below, the basis B is used as a public parameter (a public key), and X is used as trapdoor information (a secret key).

By using X, the basis $B^* := (b^*_0, \ldots, b^*_{N-1})$ of the space V* can be efficiently computed from the canonical basis A* of the space V. The basis B* of the space V* is computed by using X as shown in Formula 88.

$$b_i^* = \sum_{j=0}^{N-1} v_{i,j} a_j^* \quad i = 0, \ldots, N-1 \qquad \text{[Formula 88]}$$

where
$(v_{i,j}):=(X^T)^{-1}$ and
$\mathbb{B}^*:=(b^*_0, \ldots, b^*_{N-1})$.

Here, Formula 89 holds.

$$e(b_i, b_j^*) = u^{\delta_{i,j}} \quad i,j \in \{0, \ldots, N-1\} \qquad \text{[Formula 89]}$$

where
$\delta$: Kronecker $\delta$ (i.e., $\delta_{i,j}=1$ if i=j and $\delta_{i,j}=0$ if i≠j) and
$u:=e(g_1, g_2) \neq 1$ That is, the bases B and B* are dual orthonormal bases of dual spaces V and V. This means that even when the canonical bases A and A* are changed by using X, dual orthonormal bases are preserved.

In the cryptographic processes to be described below, the basis B* can be used as a secret key (in place of X). Although details will be described later, this makes it possible to make various levels or types of secret keys to meet the requirements of secret keys in the cryptographic processes to be described later. That is, by configuring X as a top level secret key and partial information of the basis B* as a lower level secret key, hierarchical secret keys from the top to lower levels can be generated.

<4-6. (5) Computationally Intractable Problems Over (V, B) and (V, B*) for Cryptographic Applications>

Computationally intractable problems over (V, B) and (V, B*) suitable for cryptographic applications will be defined and established. That is, the computationally intractable problems will be described, which form the basis of the security of the cryptographic processes to be described later. As described above, the basis $B:=(b_0, \ldots, b_{N-1})$ is a basis of the space V, and the basis $B^*=(b^*_0, \ldots, b^*_{N-1})$ is a basis of the space V*.

Non-Patent Literature 21 discusses computational and decisional problems over (V, B) and investigation results for the relations among these problems.

The computational vector decomposition problem (CVDP) and the decisional subspace problem (DSP) discussed in Non-Patent Literature 21 will be briefly explained.

One of the most natural (computational) problems is the CVDP. The CVDP is a higher-dimensional space analogue of a subgroup decomposition problem.

The $(N_1, N_2)$ CVDP assumption is as follows: "given v shown in Formula 90, it is hard to compute u shown in Formula 91".

$$v :=\qquad \text{[Formula 90]}$$
$$(v_0 b_0 + \ldots + v_{N_2-1} b_{N_2-1}) + (v_{N_2} b_{N_2} + \ldots + v_{N_1-1} b_{N_1-1})$$
where
$$(v_0, \ldots, v_{N_1-1}) \xleftarrow{U} \mathbb{F}_q^{N_1}.$$

$$u := v_0 b_0 + \ldots + v_{N_2-1} b_{N_2-1} \qquad \text{[Formula 91]}$$

To explain the above problem simply, given the vector v in FIG. 4, it is hard (impossible) to extract, from the vector v, element $y_0 b_0$ (or $y_1 b_1$) of the vector v of the basis B. That is, it is hard (impossible) to decompose the vector v into elements $y_0 b_0$ and $y_1 b_1$ of the vector v of the basis B.

Even if the CVDP assumption is true, the CVDP can be efficiently computed by using the distortion map $\phi_{i,j}$ described above, a trapdoor X (the linear transformation X in the base change method described above), and the algorithm Deco discussed in Non-Patent Literature 21. On the other hand, if the CVDP assumption is true and the trapdoor X is not given, the CVDP cannot be efficiently solved. That is, by configuring the linear transformation X in the base change method described above as a top level secret key, the CVDP cannot be efficiently solved at a lower level where the linear transformation X is unknown.

One of the most natural decisional problems is the DSP. The $(N_1, N_2)$ DSP assumption is as follows: "it is hard to determine v shown in Formula 93 from u shown in Formula 92".

$$u := v_0 b_0 + \ldots + v_{N_1-1} b_{N_1-1} \qquad \text{[Formula 92]}$$
where
$$(v_0, \ldots, v_{N_1-1}) \xleftarrow{U} \mathbb{F}_q^{N_1}.$$

$$v := v_{N_2} b_{N_2} + \ldots + v_{N_1-1} b_{N_1-1} \qquad \text{[Formula 93]}$$

To explain the above problem simply, given the vector v in FIG. 4, it is hard to determine that $y_0 b_0$ (or $y_1 b_1$) is an element of the vector v.

Based on the above two problems, it can be stated that, given the vector v ($=c_0 b_0 + \ldots + c_{N-1} b_{N-1}$) of the N-dimensional space, it is impossible to extract element $c_n b_n$ of the basis vector $b_n$ of the vector v, and it is impossible to determine that $c_n b_n$ is an element of the vector v.

<4-7. (6) PE Scheme for Inner-Product Predicates Using Key Pair (B, B*)>

The PE scheme for inner-product predicates is implemented by applying the dual orthonormal bases (B, B*) to the computation of the inner-product of two vectors.

Appling the dual orthonormal bases (B, B*) to the computation of the inner-product of two vectors means computing Formula 94.

$$e(x, v^*) = u^{\vec{x} \cdot \vec{v}} \qquad \text{[Formula 94]}$$

where
$x := x_0 b_0 + \ldots + x_{n-1} b_{n-1}$,
$v^* := v_0 b^*_0 P^* + \ldots + v_{n-1} b_{n-1}$,
$\vec{x} \cdot \vec{v}$: inner-product of $\vec{x}$ and $\vec{v}$, $\vec{x} := (x_0, \ldots, x_{n-1}) \in \mathbb{F}_q^n$, and $\vec{v} := (v_0, \ldots, v_{n-1}) \in \mathbb{F}_q^n$.

The PE scheme for inner-product predicates is implemented as described below. A key encapsulation mechanism scheme will be discussed here, but it is naturally to be understood that an encryption scheme can likewise be implemented.

A ciphertext c is constructed as shown in Formula 95.

$$c := \delta(x_0 b_0 + \ldots + x_{n-1} b_{n-1}) + \rho b_n \qquad \text{[Formula 95]}$$

where $\rho, \delta \xleftarrow{U} \mathbb{F}_q$, and $x_i$: attribute vector ($I = 0, \ldots, n-1$).

A secret key k* is constructed as shown in Formula 96.

$$k^* := \sigma(v_0 b_0^* + \ldots + v_{n-1} b_{n-1}^*) + b_n^* \quad \text{[Formula 96]}$$

where $\sigma \xleftarrow{U} \mathbb{F}_q$, and $v_i$: predicate vector $(i = 0, \ldots, n-1)$.

Here, Formula 97 holds.

$$e(c, k^*) = u^{\sigma\delta(\vec{x}\cdot\vec{v})+\rho} \quad \text{[Formula 97]}$$

That is, Formula 98 holds if the inner-product of the attribute vector $\vec{x}$ and the predicate vector $\vec{v}$ is 0.

$$K := u^\rho \quad \text{[Formula 98]}$$

This is because of Formula 99, as described above.

$$\begin{aligned}
e(x, v^*) &= e(x_0 b_0, v_0 b_0^*) \times \ldots \times e(x_{N-1} b_{N-1}, v_{N-1} b_{N-1}^*) \quad \text{[Formula 99]} \\
&= u^{x_0 v_0 + \ldots + x_{N-1} v_{N-1}} \\
&= u^{\vec{x}\cdot\vec{v}}
\end{aligned}$$

That is, a receiving side can obtain common information K (a session key) from a ciphertext c by setting the attribute vector $\vec{x}$ and the predicate vector $\vec{v}$ such that the inner-product of the attribute vector $\vec{x}$ and the predicate vector $\vec{v}$ is 0.

The session key K is hidden. That is, an adversary who does not have the secret key k* cannot obtain, from the ciphertext c, information on the session key K. This is because, according to the CVDP assumption described above, the adversary cannot extract $\rho b_n$ which is an element of the ciphertext c.

Not only the session key K but also the attribute vector $\vec{x}$ is hidden. That is, the adversary who does not have the secret key k* cannot obtain, from the ciphertext c, information not only on the session key K but also on the attribute vector $\vec{x}$. Here, the DSP assumption described above plays a central role in explaining the hiding of attribute vector information $\vec{x}$, since the DSP assumption implies that Formula 100 is indistinguishable from Formula 101.

$$\begin{aligned}
c &:= \delta(x_0 b_0 + \ldots + x_{n-1} b_{n-1}) + \rho b_n \quad \text{[Formula 100]} \\
&= \delta \tilde{b}_0 + \rho b_n \xleftarrow{U} \{\tilde{b}_0, b_n\} \subset \langle b_0, b_1, \ldots, b_n \rangle
\end{aligned}$$

where $\tilde{b}_0 := x_0 b_0 + \ldots + x_{n-1} b_{n-1}$, and $\rho \xleftarrow{U} \mathbb{F}_q$.

$$(\xi_0 b_0 + \ldots + \xi_{n-1} b_{n-1}) + \rho b_n \xleftarrow{U} \langle b_0, b_1, \ldots, b_n \rangle \quad \text{[Formula 101]}$$

where $\xi_0, \ldots, \xi_{n-1}, \rho \xleftarrow{U} \mathbb{F}_q$.

<5. Dual Distortion Vector Spaces>

Based on the concepts described in the above 4, dual distortion vector spaces (DDVS) will be described. As described above, the HPKEM and HPE schemes to be described later are implemented in DDVS.

DDVS (V, V*, $G_T$, A, A*, q) are a tuple of two N-dimensional vector spaces V and V* over $\mathbb{F}_q$, a cyclic group $G_T$ of order q, the canonical basis $A := (a_0, \ldots, a_{N-1})$ of the space V, and the canonical basis $A^* := (a^*_0, \ldots, a^*_{N-1})$ of the space V* that satisfy the following three conditions: (1) there exist distortion maps, (2) there exists a nondegenerate bilinear pairing, and (3) the canonical bases of the two spaces are dual orthonormal bases.

(1) Distortion Maps (See the Above 4-4.)

There exist polynomial-time computable distortion maps $\phi_{i,j}$ and $\phi^*_{i,j}$.

That is, the first condition is that endomorphisms $\phi_{i,j}$ of the space V and endomorphisms $\phi^*_{i,j}$ of the space V* shown in Formula 102 are polynomial-time computable.

If $\phi_{i,j}(a_j) = a_i$ and $k \neq j$, then $\phi_{i,j}(a_k) = 0$.

If $\phi^*_{i,j}(a^*_j) = a^*_i$ and $k \neq j$, then $\phi_{i,j}(a^*_k) = 0$. [Formula 102]

(2) Nondegenerate Bilinear Pairing (See the Above 4-1.)

There exists a polynomial-time computable nondegenerate bilinear pairing e.

That is, the second condition is that there exists a nondegenerate bilinear pairing e shown in Formula 103.

$$e: \mathbf{V} \times \mathbf{V}^* \to \mathbf{G}_T \quad \text{[Formula 103]}$$

where $\mathbf{G}_T$: cyclic group of order q.

That is, if $e(sx, ty) = e(x, y)^{st}$ and $e(x, y) = 1$ for all $y \in \mathbf{V}$, then $X = 0$.

(3) Dual Orthonormal Bases (See the Above 4-2.)

The canonical bases A and A* of the spaces V and V* are dual orthonormal bases.

That is, the third condition is that the canonical bases A and A* of the spaces V and V* satisfy the condition shown in Formula 104.

$$e(a_i, a^*_j) = u^{\delta_{i,j}} \quad \text{[Formula 104]}$$

for all i and j, where $\delta$: Kronecker $\delta$ (i.e., $\delta_{i,j} = 1$ if $i = j$ and $\delta_{i,j} = 0$ if $i \neq j$), and $u \neq 1 \in \mathbf{G}_T$.

By satisfying the third condition, it can also be stated that the spaces V and V* are dual spaces paired through the pairing operation e (see the above 4-2).

Let $\text{End}_{F_q}(V)$ be the $F_q$-vector space of endomorphisms of the space V over $F_q$. Likewise, let $\text{End}_{F_q}(V^*)$ be the $F_q$-vector space of endomorphisms of the space V* over $F_q$. Then, the distortion maps $\phi_{i,j}$ (resp. $\phi^*_{i,j}$) form a basis of $N^2$-dimensional $F_q$-vector space $\text{End}_{F_q}(V)$ (resp. $\text{End}_{F_q}(V^*)$).

A random polynomial-time computable endomorphism of $V/F_q$ (resp. $V^*/F_q$) shown in Formula 106 can be efficiently sampled by using random coefficients shown in Formula 105.

$$\{\gamma_{i,j}\}_{i,j \in [0,\ldots,N-1]} \xleftarrow{U} \mathbb{F}_q^{N^2} \quad \text{[Formula 105]}$$

$$W := \sum_{i=0, j=0}^{N-1, N-1} \gamma_{i,j} \phi_{i,j} \quad \text{[Formula 106]}$$

$$\left( resp. W^* := \sum_{i=0, j=0}^{N-1, N-1} \gamma_{i,j} \phi^*_{i,j} \right)$$

Examples of DDVS will be discussed in a subsequent embodiment.

<6. An Outline of a Method for Implementing the HPKEM and HPE Schemes>

Based on the concepts (see the above 4) and DDVS (see the above 5) described above, a method will be briefly described by which the above-mentioned cryptographic processing system 10 (see the above 3) implements the HPKEM and HPE schemes.

The cryptographic processing system 10 implements the HPKEM and HPE schemes in DDVS. That is, the cryptographic processing system 10 implements the HPKEM and HPE schemes in high-dimensional dual vector spaces which are high-dimensional vector spaces having distortion maps, nondegenerate bilinear pairing, and dual orthonormal bases, and being paired through the pairing operation e. The pairing operation e that pairs two spaces (the pairing operation in the high-dimensional vector spaces) is the pairing operation defined in the above 4-2.

According to the above 4-5, the cryptographic processing system 10 implements the HPKEM and HPE schemes by using, as a key pair (a public key and a secret key), the dual orthonormal bases B and B* generated from the canonical bases A and A* of the spaces V and V* through a predetermined transformation. According to the above 4-7, the key generation device 100 of the cryptographic processing system 10 uses either one of the dual orthonormal bases B and B* (hereafter, the basis B) as a master public key, and the other one of the dual orthonormal bases B and B* (hereafter, the basis B*) as a master secret key.

That is, in (S101) of FIG. 7, the key generation device 100 generates, as the master public key, information including the basis B of DDVS which are high-dimensional vector spaces. Based on a predicate vector $\vec{v}_1$ ($\vec{v}_1=(v_0,\ldots,v_i)$ ($i=\mu_1-1$)), the key generation device 100 also generates a vector of the basis B* as a first level secret key. In (S102) of FIG. 7, based on $\vec{x}_1$ ($\vec{x}_1=(x_0,\ldots,x_i)$ ($i=\mu_1-1$)), the encryption device 200 generates a ciphertext c by embedding information ρ for generating a session key K or embedding a message m in the vector of the basis B that is the master public key. In (S103) of FIG. 7, the decryption device 300 performs the pairing operation e on the ciphertext c which is a vector of the basis B, and the first level secret key which is a vector of the basis B*, and extracts the session key K or the message m embedded in the ciphertext c. The pairing operation e on the high-dimensional vectors executed by the decryption device 300 is the pairing operation defined in the above 4-2.

In (S201) of FIG. 8, based on a predicate vector $\vec{v}_{L+1}$ ($\vec{v}_{L+1}=(v_i,\ldots,v_j)$ ($i=\mu L, j=\mu_{L+1}-1$)), the key delegation device 400 generates a vector of the basis B* as an (L+1)-th level secret key. In (S202) of FIG. 8, based on attribute vectors $\vec{x}_1$ to $\vec{x}_{L+1}$ ($\vec{x}_i$ ($i=1,\ldots,L+1$) ($=(x_0,x_i)(i=\mu_{L+1}-1)$)), the encryption device 200 generates a ciphertext c by embedding information p for generating a session key K or embedding a message m in the vector of the basis B that is the master public key. In (S203) of FIG. 8, the decryption device 300 performs the pairing operation e on the ciphertext c which is a vector of the basis B and the (L+1)-th level secret key which is a vector of the basis B*, and extracts the session key K or the message m embedded in the ciphertext c.

Based on the computationally intractable problems described in the above 4-6, the security of this cryptographic process (the secrecy of the session key K or the message m and the attribute vectors) is secured.

Second Embodiment

In this embodiment, based on the concepts described in the first embodiment, the cryptographic processing system 10 that implements the HPKEM scheme will be described.

Referring to FIGS. 10 to 15, functions and operations of the cryptographic processing system 10 will be described.

Figure 10:
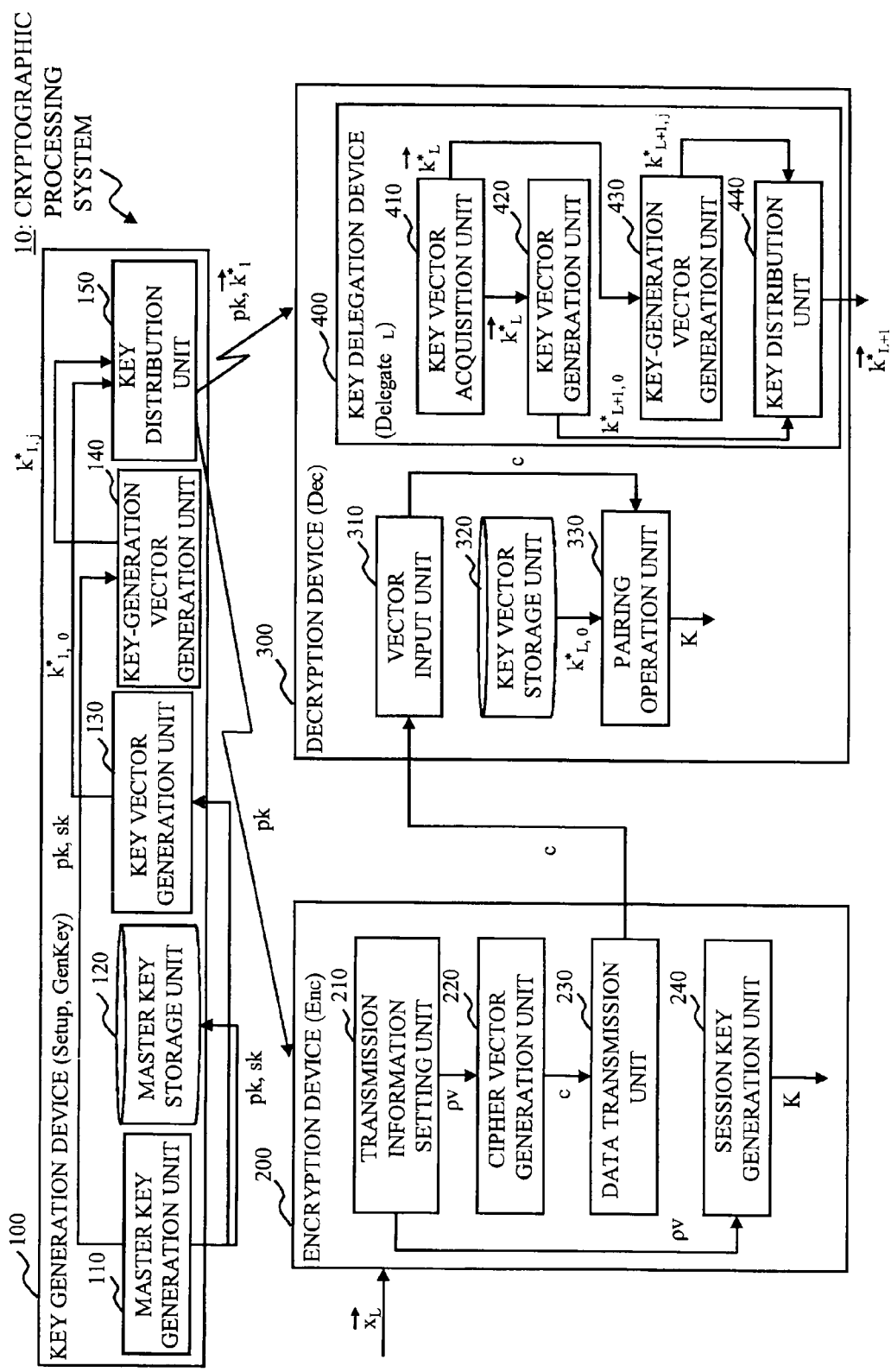
FIG. 10 is a functional block diagram showing functions of the cryptographic processing system 10 according to a second embodiment.

FIG. 10 is a functional block diagram showing the functions of the cryptographic processing system 10 according to this embodiment. As described above, the cryptographic processing system 10 includes the key generation device 100, the encryption device 200, the decryption device 300, and the key delegation device 400. It is also assumed in this embodiment that the decryption device 300 includes the key delegation device 400.

Figure 11:
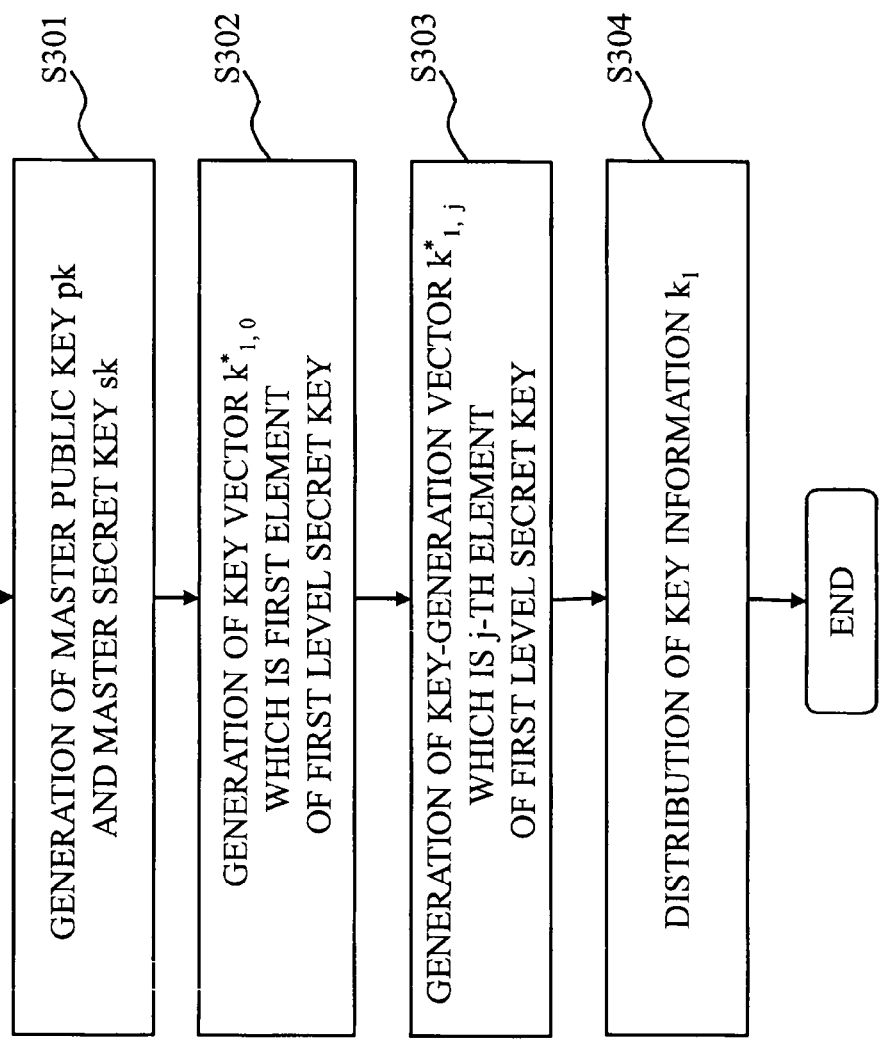
FIG. 11 is a flowchart showing operations of the key generation device 100.
Figure 12:
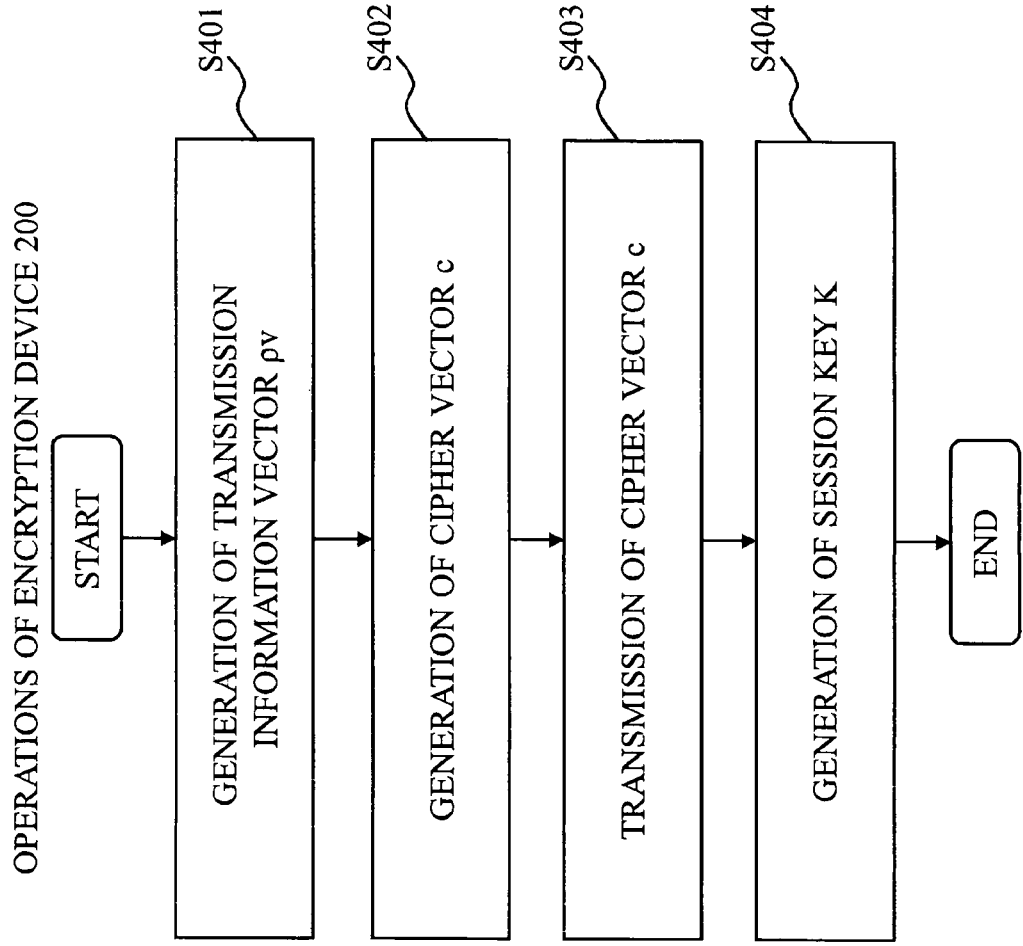
FIG. 12 is a flowchart showing operations of the encryption device 200.
Figure 13:
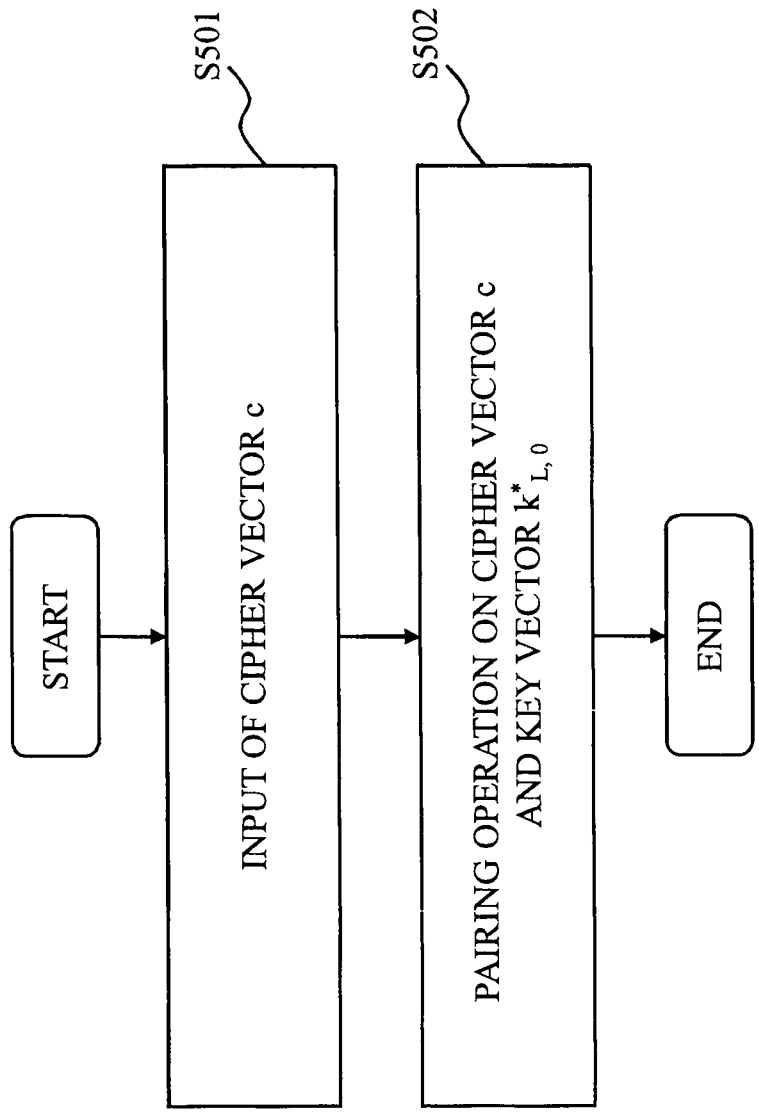
FIG. 13 is a flowchart showing operations of the decryption device 300.
Figure 14:
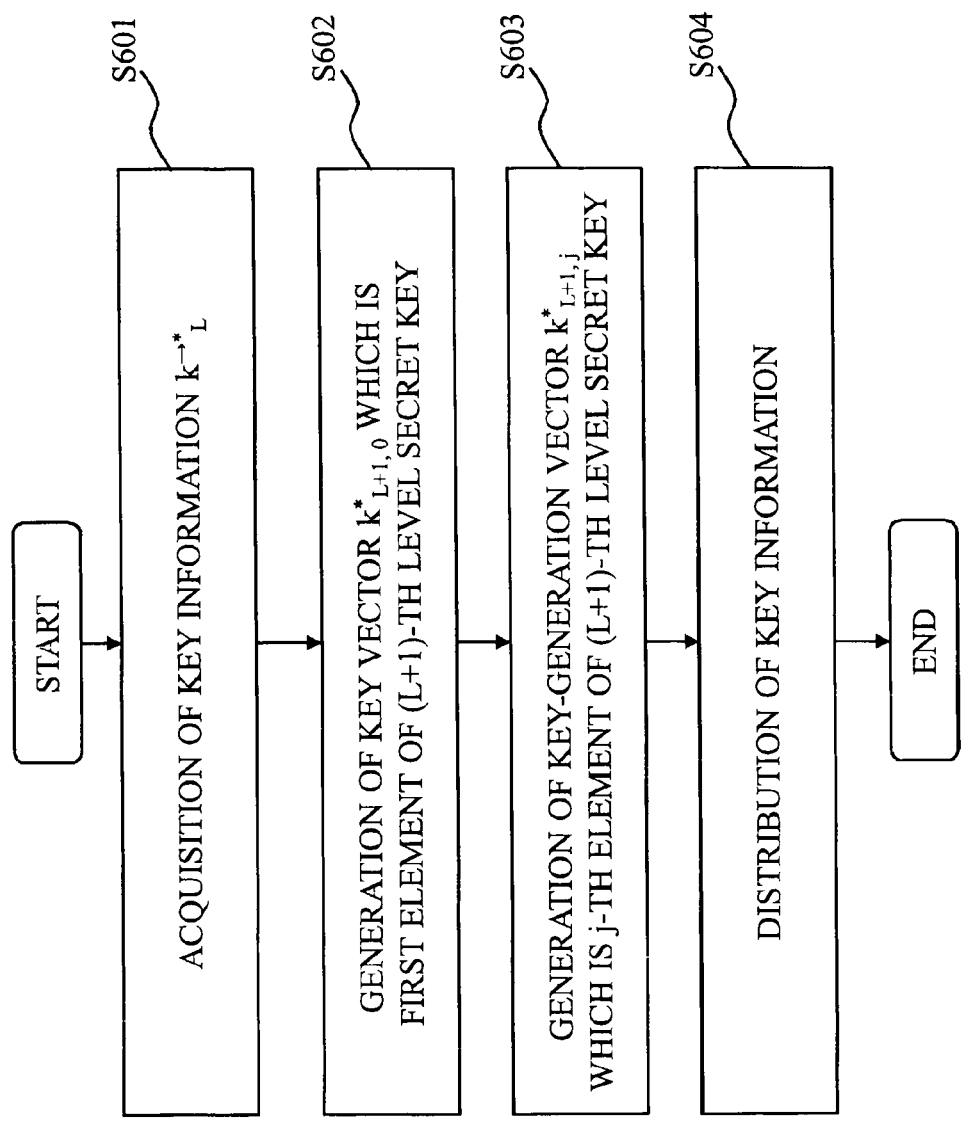
FIG. 14 is a flowchart showing operations of the key delegation device 400.

FIG. 11 is a flowchart showing operations of the key generation device 100. FIG. 12 is a flowchart showing operations of the encryption device 200. FIG. 13 is a flowchart showing operations of the decryption device 300. FIG. 14 is a flowchart showing operations of the key delegation device 400.

Figure 15:
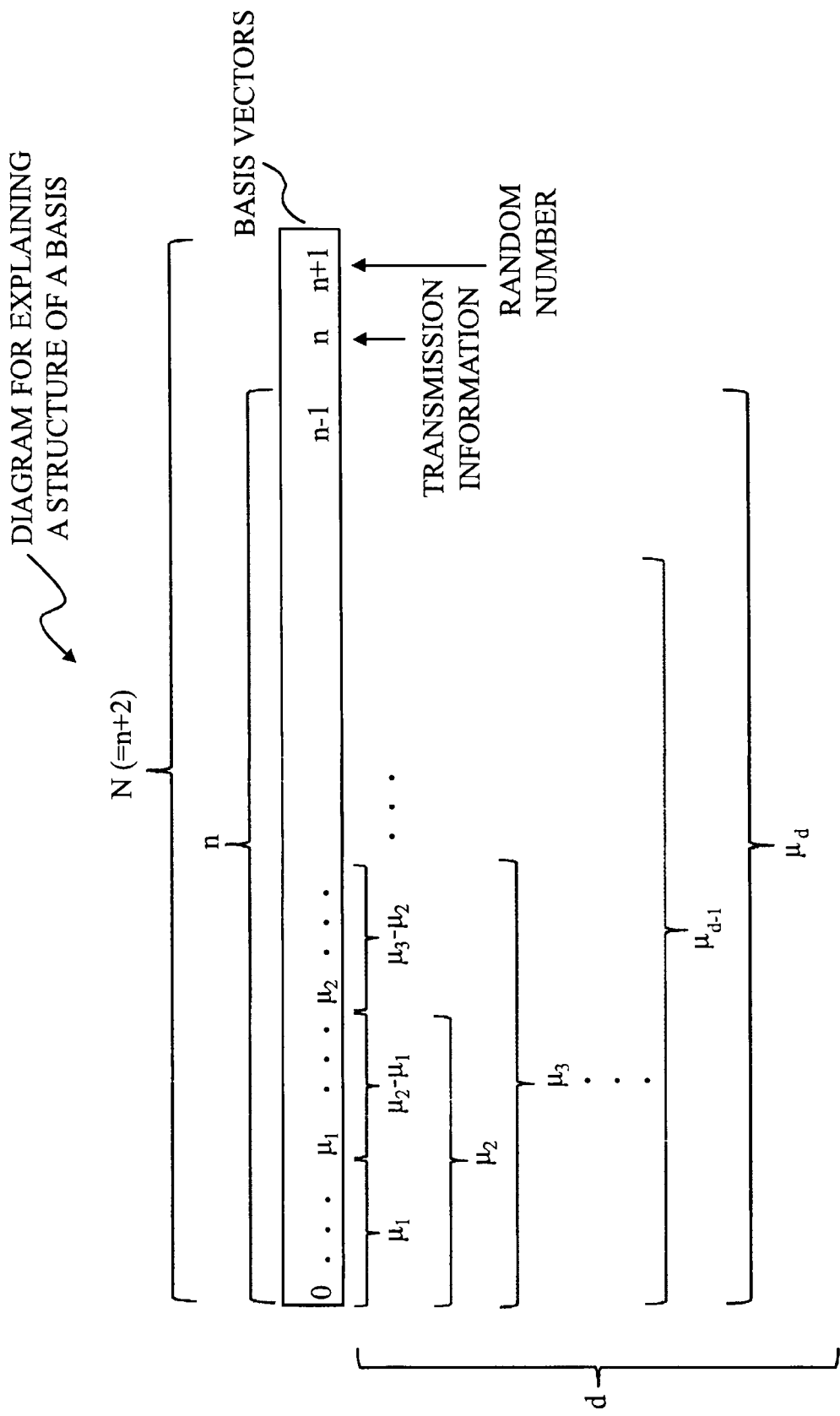
FIG. 15 is a conceptual diagram showing a structure of a basis of dual distortion vector spaces according to the second embodiment.

FIG. 15 is a conceptual diagram showing a structure of a basis of dual distortion vector spaces (DDVS).

The functions and operations of the key generation device 100 will be described. The key generation device 100 includes a master key generation unit 110, a master key storage unit 120, a key vector generation unit 130, a key-generation vector generation unit 140, and a key distribution unit 150.

(S301: Master Key Generation Step)

Using the processing device, the master key generation unit 110 computes Formula 107 to generate a master public key pk and a master secret key sk, and stores the generated keys in the master key storage unit 120.

[Formula 107]

$$N := n+2, \quad (1)$$

$$(V, V^*, G_T, A, A^*, q) \xleftarrow{R} \mathcal{G}_{ddvs}(1^\lambda, N)$$

$$X := (x_{i,j}) \xleftarrow{U} GL(N, \mathbb{F}_q) \quad (2)$$

$$b_i = \sum_{j=0}^{N-1} x_{i,j} a_j, \quad (3)$$

$$\mathbb{B} := (b_0, \ldots, b_{N-1})$$

$$(v_{i,j}) := (X^T)^{-1} \quad (4)$$

$$b_1^* = \sum_{j=0}^{N-1} v_{i,j} a_j^*, \quad (5)$$

$$\mathbb{B}^* = (b_0^*, \ldots, b_{N-1}^*)$$

$$sk := \mathbb{B}^*, pk := (1^\lambda, \vec{\mu}, V, V^*, G_T, A, A^*, q, \mathbb{B}) \quad (6)$$

return $sk, pk$

That is: (1) using the processing device, the master key generation unit 110 generates N(=n+2)-dimensional DDVS (V, V*, $G_T$, A, A*, q) with a security parameter $1^\lambda$. $G_{ddvs}$ is a DDVS generation algorithm that takes as input $1^\lambda$ and N, and outputs (V, V*, $G_T$, A, A*, q) with the security parameter $1^\lambda$ and the N-dimensional space V.

(2) Using the processing device, the master key generation unit 110 randomly selects a linear transformation X in order to generate a basis B from a canonical basis A.

(3) Using the processing device and based on the selected linear transformation X, the master key generation unit 110 generates the basis B:=($b_0, \ldots, b_{n-1}$) from the basis A: =($a_0, \ldots, a_{n-1}$).

(4) Using the processing device, the master key generation unit 110 generates a linear transformation $(X^T)^{-1}$ from the linear transformation X in order to generate a basis $B^* := (b^*_0, \ldots, b^*_{n-1})$ from a basis $A^* := (a^*_0, a^*_{n-1})$.

(5) Using the processing device and based on the generated linear transformation $(X^T)^{-1}$, the master key generation unit 110 generates the basis $B^*$ from the basis A.

(6) The master key generation unit 110 designates the generated basis $B^*$ as the master secret key sk, and $(1^\lambda, \mu^\rightarrow, V, V^*, G_T, A, A^*, q, B)$ including the generated basis B as the master public key pk. The master key storage unit 120 stores in a storage device the master public key pk and the master secret key sk generated by the master key generation unit 110.

It is assumed that there are an N (=n+2) number of dimensions in the DDVS, where n denotes the number of basis vectors assigned to represent the hierarchical structure of a format of hierarchy $\mu^\rightarrow$. That is, in addition to the n number of basis vectors assigned to represent the hierarchical structure, two basis vectors are provided. The number of basis vectors may, of course, be increased further.

As shown in FIG. 15, the n number of basis vectors out of the N (=n+2) number of basis vectors are assigned to represent the hierarchical structure. The structure of the basis vectors assigned to represent the hierarchical structure is the same as the structure shown in FIG. 5. One of the two remaining basis vectors (the n-th basis vector) is used for information for generating a session key (transmission information $\rho$). The other of the two remaining basis vectors (the (n+1)-th basis vector) is used for randomizing a ciphertext c.

To summarize, in (S301), the master key generation unit 110 executes the Setup algorithm shown in Formula 108 to generate the master public key pk and the master secret key sk.

[Formula 108]

$$\text{Setup}(1^\lambda, \vec{\mu} := (n, d; \mu_1, \ldots, \mu_d)):$$

$$N := n + 2,$$

$$(\mathbb{V}, \mathbb{V}^*, G_T, \mathbb{A}, \mathbb{A}^*, q) \xleftarrow{R} \mathcal{G}_{ddvs}(1^\lambda, N),$$

$$X := (x_{i,j}) \xleftarrow{U} GL(N, \mathbb{F}_q),$$

$$b_i = \sum_{j=0}^{N-1} x_{i,j} a_j, \mathbb{B} := (b_0, \ldots, b_{N-1}).$$

$$(v_{i,j}) := (X^T)^{-1}, b_1^* = \sum_{j=0}^{N-1} v_{i,j} a_j^*,$$

$$\mathbb{B}^* := (b_0^*, \ldots, b_{N-1}^*),$$

$$sk := \mathbb{B}^*,$$

$$pk := (1^\lambda, \mu, \mathbb{V}, \mathbb{V}^*, G_T, \mathbb{A}, \mathbb{A}^*, q, \mathbb{B}).$$

$$\text{return } sk, pk.$$

(S302: Key Vector $k^*_{1,0}$ Generation Step)

Using the processing device and based on the master public key pk, the master secret key sk, and a predicate vector $v^\rightarrow_1$ ($v^\rightarrow_1 = (v_0, \ldots, v_i)$ ($i = \mu_1 - 1$)), the key vector generation unit 130 computes Formula 109 to generate a key vector $k^*_{1,0}$ which is the first element of a first level (level 1) secret key.

[Formula 109]

$$\sigma_{1,0} \xleftarrow{U} \mathbb{F}_q^{n-\mu_1+1} \quad (1)$$

-continued $$k^*_{1,0} := \sigma_{1,0}\left(\sum_{i=0}^{\mu_1-1} v_i b^*_i\right) + b^*_n, \quad (2)$$

where
$k^*_{1,0}$: first element of the first level secret key, and
$v_i$ ($i=0, \ldots, \mu_1-1$): predicate vector.

That is: (1) using the processing device, the key vector generation unit 130 generates a random number $\sigma_{1,0}$.

(2) Using the processing device, the key vector generation unit 130 generates the key vector $k^*_{1,0}$ by setting a predetermined value (1 in this case) as the coefficient of the basis vector $b^*_n$ in the basis $B^*$ of the space $V^{**}$, and also setting each element of the predicate vector $v^\rightarrow_1$ randomized by the generated random number $\sigma_{1,0}$ as the coefficient of each basis vector $b^*_i$ ($i=0, \ldots, \mu_1-1$).

(S303: Key-Generation Vector $k^*_{1,j}$ Generation Step)

Using the processing device and based on the master public key pk, the master secret key sk, and the predicate vector $v^\rightarrow_1$, the key-generation vector generation unit 140 computes Formula 110 to generate each key-generation vector $k^*_{1,j}$ for generating a lower level secret key (a lower level key vector). The key-generation vector $k^*_{1,j}$ is the j-th element of the first level secret key.

[Formula 110]

$$(\sigma_{1,\mu_1}, \ldots, \sigma_{1,n-1}) \xleftarrow{U} \mathbb{F}_q^{n-\mu_1+1} \quad (1)$$

$$k^*_{1,j} := \sigma_{1,j}\left(\sum_{i=0}^{\mu_1-1} v_i b^*_i\right) + b^*_j, \quad (2)$$

$$j = \mu_1, \mu_1 + 1, \ldots, n-1$$

where
$k^*_{1,j}$: j-th element of the first level secret key.

That is: (1) using the processing device, the key-generation vector generation unit 140 generates random numbers $\sigma_{1,j}$ ($j = \mu_1, \ldots, n-1$).

(2) Using the processing device, the key-generation vector generation unit 140 generates the key-generation vector $k^*_{1,j}$, for each j ($j = \mu_1, \ldots, n-1$), by setting a predetermined value (1 in this case) as the coefficient of the basis vector $b^*_j$ in the basis $B^*$ of the space $V^*$, and also setting each element of the predicate vector $v^\rightarrow_1$ randomized by the generated random numbers $\sigma_{1,j}$ as the coefficient of each basis vector $b^*_i$ ($i=0, \ldots, \mu_1-1$).

To summarize, in (S302) and (S303), using the processing device, the key vector generation unit 130 and the key-generation vector generation unit 140 execute the GenKey algorithm shown in Formula 111 to generate the first level secret key (key information $k^{\rightarrow*}_1$) including the key vector $k^*_{1,0}$ and the key-generation vectors $k^*_{1,j}$.

[Formula 111]

$$\text{GenKey}(pk, sk, \vec{v}_1 := (v_0, \ldots, v_{\mu_1-1})):$$

$$(\sigma_{1,0}, \sigma_{1,\mu_1}, \ldots, \sigma_{1,n-1}) \xleftarrow{U} \mathbb{F}_q^{n-\mu_1+1}$$

$$k^*_{1,0} := \sigma_{1,0}\left(\sum_{i=0}^{\mu_1-1} v_i b^*_i\right) + b^*_n,$$

-continued $$k_{1,j}^* := \sigma_{1,j}\left(\sum_{i=0}^{\mu_1-1} v_i b_i^*\right) + b_j^*,$$

$$j = \mu_1, \mu_1+1, \ldots, n-1$$

$$\vec{k}_1^* := (k_{1,0}^*, k_{1,\mu_1}^*, \ldots, k_{1,n-1}^*).$$

return $\vec{k}_1^*$.

where $\vec{k}_1^*$: first level secret key.

(S304: Key Distribution Step)

The key distribution unit 150 transmits the master public key generated by the master key generation unit 110 and the key information $\vec{k}_1^*$ generated by the key vector generation unit 130 and the key-generation vector generation unit 140 to the decryption device 300 through the communication device. The key distribution unit 150 also transmits the master public key to the encryption device 200 through the communication device. The key information $\vec{k}_1^*$ is secretly transmitted to the decryption device 300. Any method may be used to secretly transmit the key information $\vec{k}_1^*$ to the decryption device 300. For example, the key information $\vec{k}_1^*$ may be transmitted using a prior art cryptographic process.

The functions and operations of the encryption device 200 will be described. The encryption device 200 includes a transmission information setting unit 210, a cipher vector generation unit 220, a data transmission unit 230, and a session key generation unit 240.

(S401: Transmission Information Setting Step)

Using the processing device and based on the master public key pk, the transmission information setting unit 210 computes Formula 112 to generate a transmission information vector ρv.

[Formula 112]

$$\rho \xleftarrow{U} \mathbb{F}_q^{d+2},$$

$$\rho v := \rho b_n$$

That is, using the processing device, the transmission information setting unit 210 generates the transmission information vector ρv by setting transmission information ρ (a random number in this case) as the coefficient of the basis vector $b_n$ in the basis B included in the master public key pk.

(S402: Cipher Vector Generation Step)

Using the processing device and based on the master public key pk and attribute vectors $\vec{x}_1$ to $\vec{x}_L$ ($\vec{x}_i$ (i=1, ..., L) (=($x_0, \ldots, x_i$) (i=$\mu_L$-1))), the cipher vector generation unit 220 computes Formula 113 to generate a cipher vector c, where L denotes the depth of hierarchy.

[Formula 113]

$$(\vec{x}_{L+1}, \ldots, \vec{x}_d) \xleftarrow{U} \mathbb{F}_q^{\mu_{L+1}-\mu_L} \times \ldots \times \mathbb{F}_q^{n-\mu_{d-1}}, \quad (1)$$

$$(\delta_1, \ldots, \delta_d, \delta_{n+1}) \xleftarrow{U} \mathbb{F}_q^{d+2}$$

$$xv := \delta_1\left(\sum_{i=0}^{\mu_1-1} x_i b_i\right) + \ldots + \delta_d\left(\sum_{i=\mu_{d-1}}^{n-1} x_i b_i\right) \quad (2)$$

where $$(\vec{x}_1, \ldots, \vec{x}_L) := \begin{pmatrix} (x_0, \ldots, x_{\mu_1-1}), \ldots, \\ (x_{\mu_{L-1}}, \ldots, x_{\mu_L-1}) \end{pmatrix} : \text{attribute vector.}$$

$$rv := \delta_{n+1} b_{n+1} \quad (3)$$

$$c := xv + \rho v + rv \quad (4)$$

$$:= \delta_1\left(\sum_{i=0}^{\mu_1-1} x_i b_i\right) + \ldots + \delta_d\left(\sum_{i=\mu_{d-1}}^{n-1} x_i b_i\right) + \rho b_n + \delta_{n+1} b_{n+1}$$

That is: (1) using the processing device, the cipher vector generation unit 220 generates random numbers $\vec{x}_i$ (i=L+1, d) and $\delta_i$ (i=1, d, n+1).

(2) Using the processing device, the cipher vector generation unit 220 generates an attribute information vector xv by setting each element of the attribute vectors as the coefficient of each basis vector $b_i$ (i=0, ..., $\mu_L$-1) in the basis B included in the master public key pk, and also setting each random number as the coefficient of each basis vector $b_i$ (i=$\mu_L$, ..., n-1), as described below.

The cipher vector generation unit 220 sets the attribute vector $\vec{x}_1$ randomized by the random number $\delta_1$ as the coefficient of each basis vector $b_i$ (i=0, ..., $\mu_L$-1). The cipher vector generation unit 220 sets the attribute vector $\vec{x}_2$ ($\vec{x}_2 = (x_i, \ldots, x_j)$ (i=$\mu_1$, j=$\mu_2$-1)) randomized by the random number $\delta_2$ as the coefficient of each basis vector $b_i$ (i=$\mu_1$, ..., $\mu_2$-1). Likewise, the cipher vector generation unit 220 sets the attribute vector $\vec{x}_k$ ($\vec{x}_k = (x_i, \ldots, x_j)$ (i=$\mu_{k-1}$, j=$\mu_k$-1)) randomized by the random number $\delta_k$ as the coefficient of each basis vector $b_i$ (i=$\mu_{k-1}$, ..., $\mu_k$-1) (k=3, ..., L), and so on.

Further, the cipher vector generation unit 220 sets a random number value computed from the random numbers $\vec{x}_i$ (i=L+1, ..., d) and $\delta_i$ (i=L+1, ..., d) as the coefficient of each basis vector $b_i$ (i=$\mu_L$, ..., n-1).

(3) Using the processing device, the cipher vector generation unit 220 generates a random number vector rv by setting the random number $\in_{n+1}$ as the coefficient of the basis vector $b_{n+1}$ in the basis B included in the master public key pk.

(4) Using the processing device, the cipher vector generation unit 220 generates the cipher vector c by adding the generated attribute information vector xv and the generated random number vector rv to the transmission information vector ρv generated by the transmission information setting unit 210.

(S403: Data Transmission Step)

The data transmission unit 230 transmits the cipher vector c generated by the cipher vector generation unit 220 to the decryption device 300 through the communication device.

(S404: Session Key Generation Step)

Using the processing device, the session key generation unit 240 computes Formula 114 to generate a session key K.

$$K := u^\rho \quad \text{[Formula 114]}$$

where u:=e($g_1, g_2$)≠1.

To summarize, the encryption device 200 executes the Enc algorithm shown in Formula 115 to generate the cipher vector c and the session key K.

[Formula 115]

$$Enc(pk,$$

$$\vec{x} := (\vec{x}_1, \ldots, \vec{x}_L) := ((x_0, \ldots, x_{\mu_1-1}), \ldots, (x_{\mu_{L-1}}, \ldots, x_{\mu_L-1}))):$$

$$(\vec{x}_{L+1}, \ldots, \vec{x}_d) \xleftarrow{U} \mathbb{F}_q^{\mu_{L+1}-\mu_L} \times \ldots \times \mathbb{F}_q^{n-\mu_{d-1}}$$

$$(\rho, \delta_1, \ldots, \delta_d, \delta_{n+1}) \xleftarrow{U} \mathbb{F}_q^{d+2},$$

-continued $$c := \delta_1 \left( \sum_{i=0}^{\mu_1-1} x_i b_i \right) + \ldots + \delta_d \left( \sum_{i=\mu_{d-1}}^{n-1} x_i b_i \right) + \rho b_n + \delta_{n+1} b_{n+1},$$

$K := u\rho.$ return $(c, K)$.

The functions and operations of the decryption device 300 will be described. The decryption device 300 includes a vector input unit 310, a key vector storage unit 320, and a pairing operation unit 330.

(S501: Vector Input Step)

The vector input unit 310 receives through the communication device and inputs the cipher vector c transmitted by the data transmission unit 230 of the encryption device 200.

(S502: Pairing Operation Step)

Using the processing device and based on the master public key pk and the key vector $k^*_{L,0}$ which is the first element of the L-th level secret key, the pairing operation unit 330 computes Formula 116 to generate a session key K' (=K).

$K':=e(c,k^*_{L,0})$ [Formula 116]

where c: cipher vector, and $k^*_{L,0}$: first element of the L-th level secret key.

That is, using the processing device, the pairing operation unit 330 computes the session key K' by performing the pairing operation e, which pairs the spaces V and V* included in the master public key pk, on the cipher vector c input by the vector input unit 310 and the key vector $k^*_{L,0}$ stored in the storage device by the key vector storage unit 320. When the key vector $k^*_{L,0}$ is provided by the key generation device 100 or the key delegation device 400 of a higher level, the key vector storage unit 320 stores the key vector $k^*_{L,0}$ in the storage device.

The capability of the pairing operation to compute the session key K will be described in detail later.

To summarize, the decryption device 300 executes the Dec algorithm shown in Formula 117 to generate the session key K'.

$Dec(pk,k^*_{L,0},c):$ $K':=e(c,k^*_{L,0}),$ return $K'$. [Formula 117]

The functions and operations of the key delegation device 400 will be described. The key delegation device 400 includes a key vector acquisition unit 410, a key vector generation unit 420, a key-generation vector generation unit 430, and a key distribution unit 440.

(S601: Key Vector $k^*_{L,0}$ Acquisition Step)

The key vector acquisition unit 410 acquires, through the communication device, the L-th level secret key (key information $\vec{k}^*_L$) including the key vector $k^*_{L,0}$ which is the first element of the L-th level secret key and the key-generation vectors $k^*_{L,j}$ which are the j-th ($j=\mu_1, \ldots, n-1$) elements of the L-th level secret key. That is, the key vector acquisition unit 410 acquires, through the communication device, the key information $\vec{k}^*_1$ including the key vector $k^*_{1,0}$ and the key-generation vectors $k^*_{1,j}$ provided by the key generation device 100, or the key information $\vec{k}^*_L$ including the key vector $k^*_{L,0}$ and the key-generation vectors $k^*_{L,j}$ provided by the higher level key delegation device 400.

(S602: Key Vector $k^*_{L+1,0}$ Generation Step)

Using the processing device and based on the master public key pk, the key information $\vec{k}^*_L$, and a predicate vector $\vec{v}^+_{L+1}$ ($v^+_{L+1}=(v_i, \ldots, v_j)$ ($i=\mu_L, j=\mu_{L+1}-1$)), the key vector generation unit 420 computes Formula 118 to generate a key vector $k^*_{L+1,0}$ which is the first element of an (L+1)-th level secret key.

[Formula 118]

$$\sigma_{L+1,0} \xleftarrow{U} \mathbb{F}_q^{n-\mu_{L+1}+1} \quad (1)$$

$$k^*_{L+1,0} := k^*_{L,0} + \sigma_{L+1,0} \left( \sum_{i=\mu_L}^{\mu_{L+1}-1} v_i k^*_{L,i} \right) \quad (2)$$

where $k^*_{L+1,0}$: first element of the (L+1)-th level secret key, $k^*_{L,0}$: first element of L-th level secret key, $k^*_{L,i}$: i-th element of the L-th level secret key, and $v_i$ ($i=\mu_L, \ldots, \mu_{L+1}-1$): predicate vector L+1.

That is: (1) using the processing device, the key vector generation unit 420 generates a random number $\sigma_{L+1,0}$.

(2) Using the processing device, the key vector generation unit 420 generates the key vector $k^*_{L+1,0}$ by adding, to the key vector $k^*_{L,0}$, vectors $v_i$ ($i \ldots, \mu_L, \ldots, \mu_{L+1}-1$) in which each element of the predicate vector $\vec{v}_{L+1}$ randomized by the random number $\sigma_{L+1,0}$ is set as the coefficient of each key-generation vector $k^*_{L,i}$ ($i=\mu_L, \ldots, \mu_{L+1}-1$).

(S603: Key-Generation Vector $k^*_{L+1,j}$ Generation Step)

Using the processing device and based on the master public key pk, the key information $\vec{k}^*_L$, and the predicate vector $\vec{v}_{L+1}$, the key-generation vector generation unit 430 computes Formula 119 to generate each key-generation vector $k^*_{L+1,j}$ ($j=\mu_{L+1}, \ldots, n-1$) for generating a lower level key (a lower level key vector). The key-generation vector $k^*_{L+1,j}$ is the j-th element of the (L+1)-th level secret key.

[Formula 119]

$$(\sigma_{L+1,\mu_{L+1}}, \ldots, \sigma_{L+1,n-1}) \xleftarrow{U} \mathbb{F}_q^{n-\mu_1+1} \quad (1)$$

$$k^*_{L+1,j} := k^*_{L,j} + \sigma_{L+1,j} \left( \sum_{i=\mu_L}^{\mu_{L+1}-1} v_i k^*_{L,i} \right) \quad (2)$$

$j = \mu_{L+1}, \mu_{L+1}+1, \ldots, n-1$ where $k^*_{L+1,j}$: j-th element of the (L+1)-th level secret key, $k^*_{L,j}$: j-th element of the L-th level secret key, and $v_i$ ($i=\mu_L, \ldots, \mu_{L+1}-1$): predicate information.

That is: (1) using the processing device, the key-generation vector generation unit 430 generates random numbers $\sigma_{L+1,j}$ ($j=\mu_{L+1}, \ldots, n-1$).

(2) Using the processing device, the key-generation vector generation unit 430 generates the key-generation vector $k^*_{L+1,j}$ for generating a lower level key vector of the key vector $k^*_{L+1,0}$, for each j ($j=\mu_{L+1}, \ldots, n-1$), by adding, to the key-generation vector $k^*_{L,j}$, vectors in which each element of the predicate vector $\vec{v}_{L+1}$ randomized by the random numbers $\sigma_{L+1,j}$ is set as the coefficient of each key-generation vector $k^*_{L,i}$ ($i=\mu_L, \ldots, \mu_{L+1}-1$).

To summarize, in (S602) and (S603), using the processing device, the key vector generation unit 420 and the key-generation vector generation unit 430 execute the Delegate$_L$ algorithm shown in Formula 120 to generate the (L+1)-th level secret key (key information $\vec{k}^*_{L+1}$) including the key vector $k^*_{L+1,0}$ and the key-generation vectors $k^*_{L+1,j}$.

[Formula 120]

$$Delegate_L(pk, \vec{k}^*_{L,v_{L+1}} := (v_{\mu_L}, \ldots, v_{\mu_{L+1}} - 1)):$$

$$(\sigma_{L+1,0}, \sigma_{L+1,\mu_{L+1}}, \ldots, \sigma_{L+1,n-1}) \xleftarrow{U} \mathbb{F}_q^{n-\mu_{L+1}+1}$$

$$k^*_{L+1,j} := k^*_{L,j} + \delta_{L+1,j}\left(\sum_{i=\mu_L}^{\mu_{L+1}-1} v_i k^*_{L,i}\right),$$

$$j = 0, \mu_{L+1}, \mu_{L+1} + 1, \ldots, n-1,$$

$$\vec{k}^*_{L+1} := (k^*_{L+1,0}, k^*_{L+1,\mu_{L+1}}, \ldots, k^*_{L+1,n-1}).$$

$$\text{return } k^*_{L+1}.$$

where $k^*_{L+1}$: (L+1)-th level secret key.

That is, in the key information $\vec{k}^*_{L+1}$ shown in Formula 120, the top (first) element $k^*_{L,0}$ is the key vector $k^*_{L+1,0}$ to be used as a decryption key L+1. In the key information $\vec{k}^*_{L+1}$ shown in Formula 120, the second and subsequent elements are tags for key delegation.

(S604: Key Distribution Step)

The key distribution unit 440 transmits the key information $\vec{k}^*_{L+1}$ generated by the key vector generation unit 420 and the key-generation vector generation unit 430 to the decryption device 300 of a lower level through the communication device. The key information $\vec{k}^*_{L+1}$ is secretly transmitted to the decryption device 300. Any method may be used to secretly transmit the key information $\vec{k}^*_{L+1}$ to the decryption device 300. For example, the key information $\vec{k}^*_{L+1}$ may be transmitted using a prior art cryptographic process.

Figure 16:
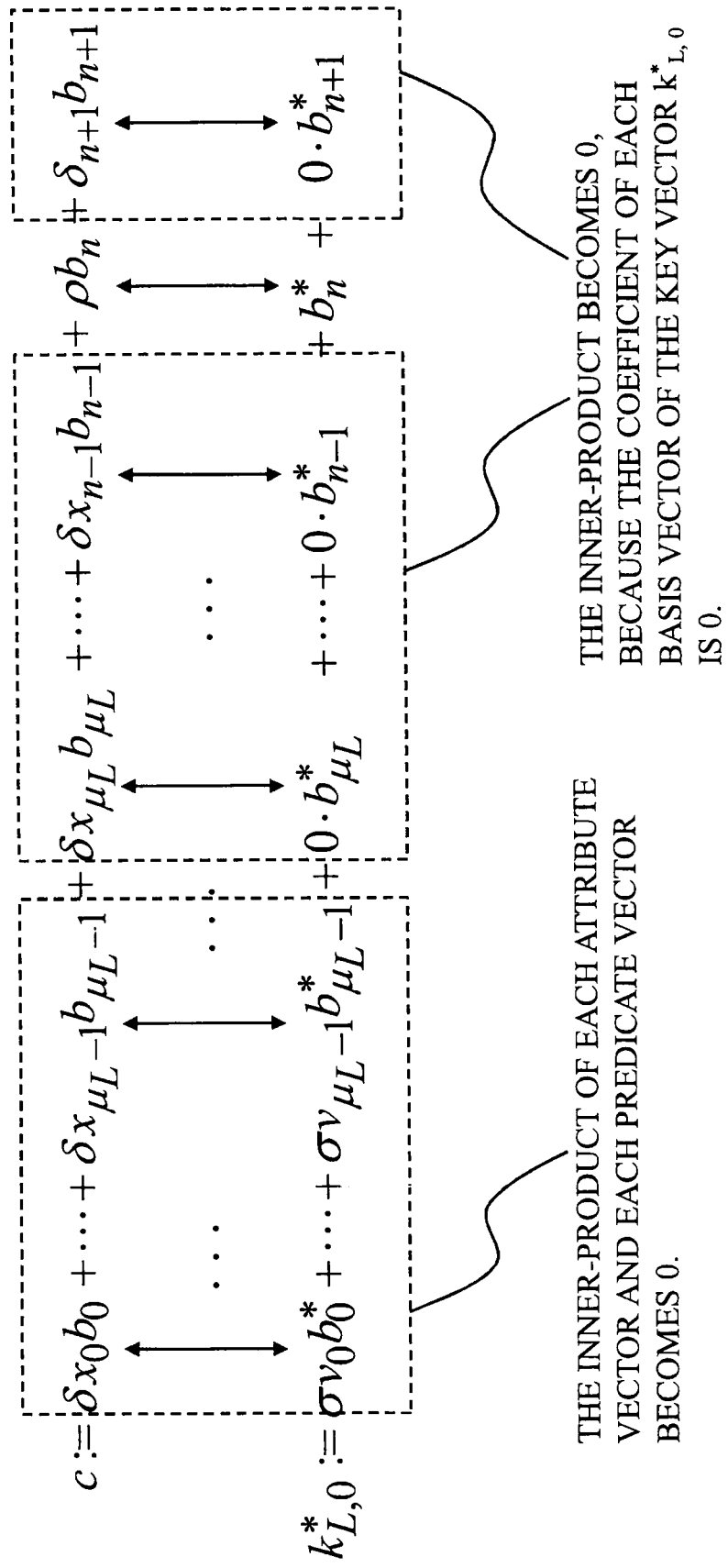
FIG. 16 is a diagram for explaining a pairing operation in (S502)

FIG. 16 is a diagram for explaining the pairing operation in (S502).

Referring to FIG. 16, it will be explained that in (S502) the pairing operation unit 330 can extract the session key K (=K') by the pairing operation shown in Formula 116. In FIG. 16, the indices of the random numbers σ and δ are omitted for simplicity.

As described above, in an L-th level ciphertext c, the randomized attribute vector is set as the coefficient of each basis vector $b_i$ (i=0, ..., $\mu_L$-1). In the ciphertext c, the random number $\vec{x}$ is set as the coefficient of each basis vector $b_i$ (i=$\mu_L$, ..., n-1). In the ciphertext c, ρ is set as the coefficient of the basis vector $b_n$. Further, in the ciphertext c, the random number δ is set as the coefficient of the basis vector $b_{n+1}$.

On the other hand, in an L-th level key vector $k^*_{L,0}$, the randomized predicate vector is set as the coefficient of each basis vector $b^*_i$ (i=0, ..., $\mu_L$-1). In the key vector $k^*_{L,0}$, the coefficient of the each basis vector $b^*_i$ (i=$\mu_L$, ..., n-1) is not set. That is, 0 is set as the coefficient. In the key vector $k^*_{L,0}$, 1 is set as the coefficient of the basis vector $b^*_n$. Further, in the key vector $k^*_{L,0}$, 0 is set as the coefficient of the basis vector $b_{n+1}$.

When the pairing operation shown in Formula 116 is performed, the inner-product becomes 0 between each basis vector $b^*_i$ (i=$\mu_L$, ..., n-1, n+1) in which 0 is set as the coefficient in the key vector $k^*_{L,0}$ and each corresponding basis vector $b_i$ (i=$\mu_L$, ..., n-1, n+1) in the ciphertext c.

The inner-product also becomes 0 between each basis vector $b_i$ (i=0, ..., $\mu_L$-1) in which the attribute vector is set as the coefficient in the ciphertext c and each basis vector $b^*_i$ (i=0, ..., $\mu_L$-1) in which the predicate vector is set as the coefficient in the key vector $k^*_{L,0}$. This is because the attribute vector and the predicate vector are set such that their inner-product becomes 0.

Thus, as a result of the pairing operation shown in Formula 116, only $e(\rho b_n, b^*_n)$ remains as a pair whose inner-product is not 0. Hence, the equation $e(\rho b_n, b^*_n)=u^\rho=K$ holds, so that the session key K can be computed by computing the pairing operation shown in Formula 116.

Figure 17:
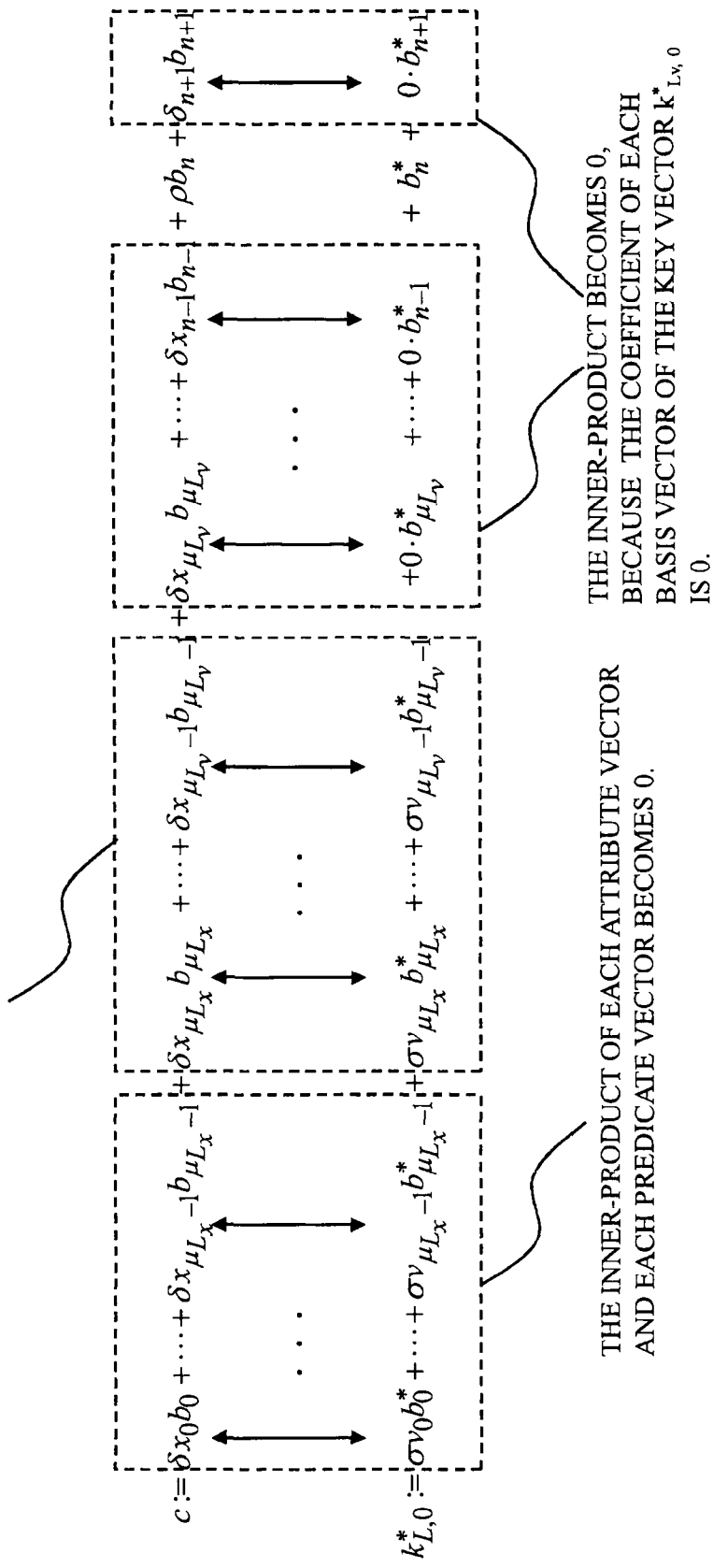
FIG. 17 is a diagram for explaining that a session key K cannot be computed by a lower level key.

FIG. 17 is a diagram for explaining that the session key K cannot be computed by a lower level key.

Referring to FIG. 17, it will be explained that in (S502) the pairing operation unit 330 cannot extract the session key K by performing the pairing operation shown in Formula 116 on the ciphertext c encrypted based on a higher level attribute vector and a lower level key vector $k^*_{Lv,0}$. In FIG. 17, the indices of the random numbers σ and δ are omitted for simplicity. In the explanation of FIG. 17, it is assumed that Lx (=$L_x$)<Lv (=$L_v$).

In an $L_x$-th level ciphertext c, the randomized attribute vector is set as the coefficient of each basis vector $b_i$ (i=0, ..., $\mu_{Lx}$-1). In the ciphertext c, the random number $\vec{x}$ is set as the coefficient of each basis vector $b_i$ (i=$\mu_{Lx}$, ..., n-1). In the ciphertext c, ρ is set as the coefficient of the basis vector $b_n$. Further, in the ciphertext c, the random number δ is set as the coefficient of the basis vector $b_{n+1}$.

On the other hand, in an $L_v$-th level key vector $k^*_{Lv,0}$, the randomized predicate vector is set as the coefficient of each basis vector $b^*_i$ (i=0, ..., $\mu_{Lv}$-1). In the key vector $k^*_{Lv,0}$, the coefficient of each basis vector $b^*_i$ (i=$\mu_{Lv}$, ..., n-1) is not set. That is, 0 is set as the coefficient. In the key vector $k^*_{Lv,0}$, 1 is set as the coefficient of the basis vector $b^*_n$. Further, in the key vector $k^*_{Lv,0}$, 0 is set as the coefficient of the basis vector $b_{n+1}$.

When the pairing operation shown in Formula 116 is performed, the inner-product becomes 0 between each basis vector $b^*_i$ (i=$\mu_{Lv}$, ..., n-1, n+1) in which 0 is set as the coefficient in the key vector $k^*_{L,0}$ and each corresponding basis vector $b_i$ (i=$\mu_{Lv}$, ..., n-1, n+1) in the ciphertext c.

The inner-product also becomes 0 between each basis vector h (i=0, ..., $\mu_{Lx}$-1) in which the attribute vector is set as the coefficient in the ciphertext c and each basis vector $b^*_i$ (i=0, ..., $\mu_{Lx}$-1) in which the predicate vector is set as the coefficient in the key vector $k^*_{L,0}$.

However, the inner-product does not become 0 between each basis vector $b_i$ (i=$\mu_{Lx}$, ..., $\mu_{Lv}$-1) in which the random number is set as the coefficient in the ciphertext c and each basis vector $b^*_i$ (i=$\mu_{Lx}$, ..., $\mu Lv$-1) in which the predicate vector is set as the coefficient in the key vector $k^*_{L,0}$.

Thus, values other than $e(\rho b_n, b^*_n)$ remain, so that the session key K cannot be computed.

Figure 18:
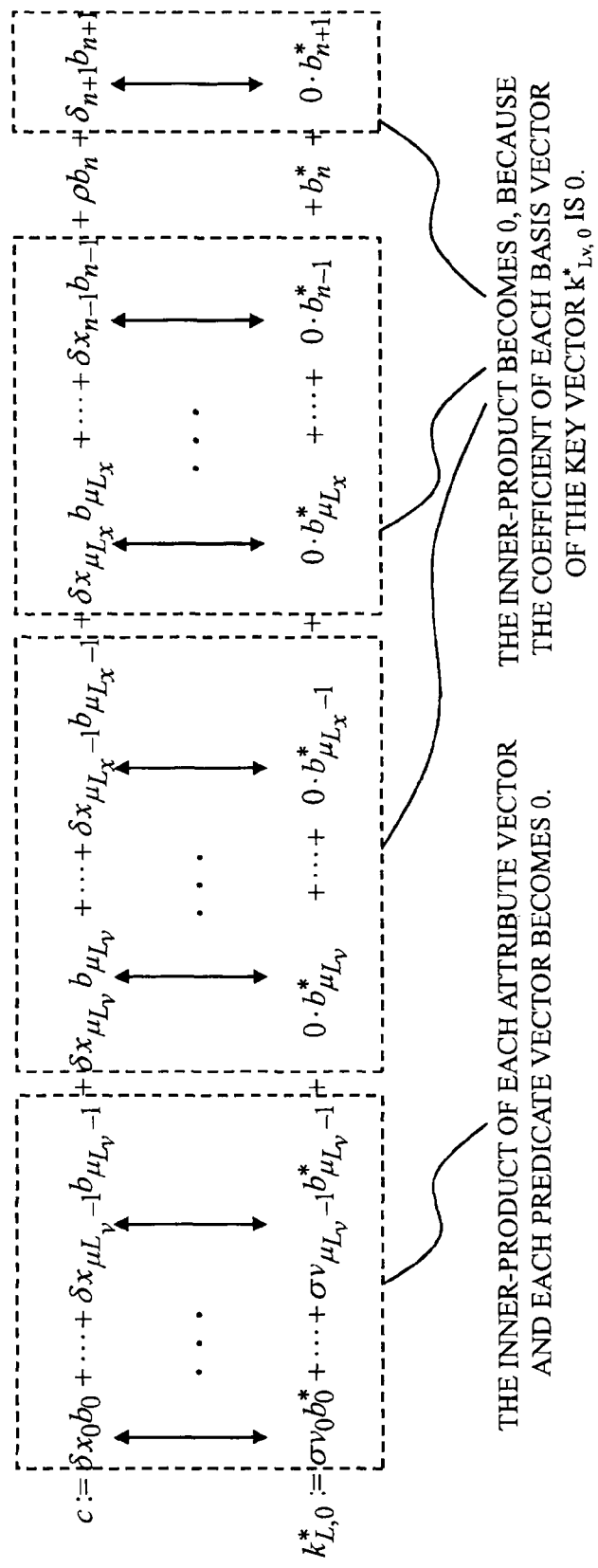
FIG. 18 is a diagram for explaining that the session key K can be computed by a higher level key.

FIG. 18 is a diagram for explaining that the session key K can be computed by a higher level key.

Figure 20:
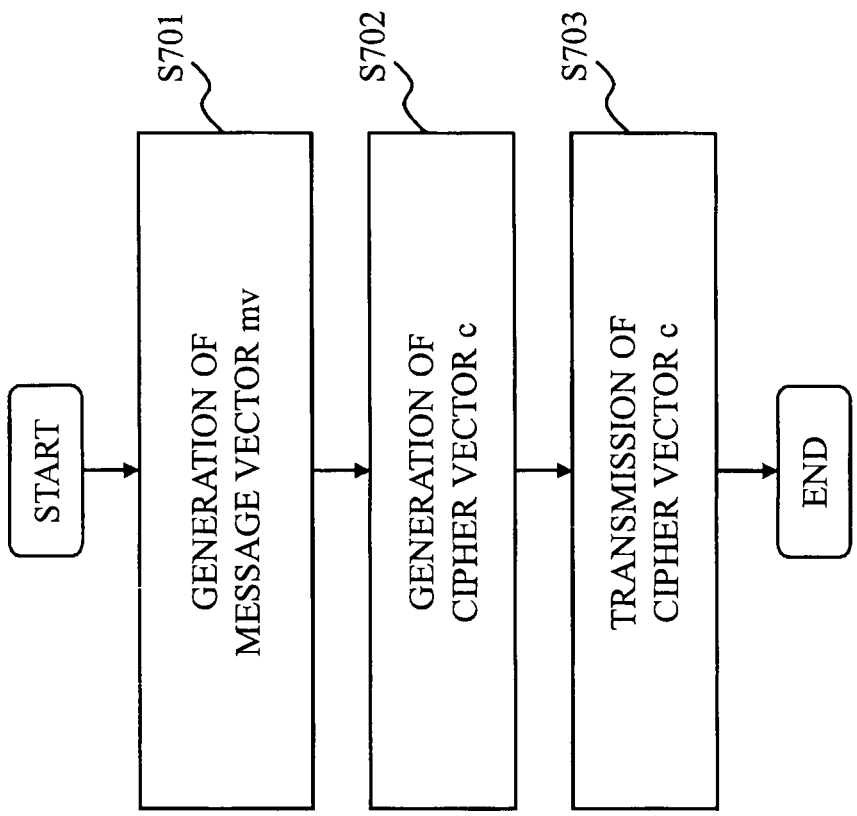
FIG. 20 is a flowchart showing operations of the encryption device 200 shown in FIG. 19.

Referring to FIG. 18, it will be explained that in (S502) the pairing operation unit 330 can extract the session key K by performing the pairing operation shown in Formula 116 on the ciphertext c encrypted based on a lower level attribute vector and a higher level key vector $k^*_{Lv,0}$. In FIG. 18, the indices of the random numbers σ and δ are omitted for simplicity. In the explanation of FIG. 20, it is assumed that Lx (=$L_x$)>Lv (=$L_v$).

The coefficients of basis vectors in the ciphertext c and the key vector $k^*_{Lv,0}$ are set in the same manner as in FIG. 17. As stated above, however, note that Lx (=$L_x$)>Lv (=$L_v$).

When the pairing operation shown in Formula 116 is performed, the inner-product becomes 0 between each basis vector $b^*_i$ ($i=\mu_{Lv},\ldots,n-1,n+1$) in which 0 is set as the coefficient in the key vector $k^*_{L,0}$ and each corresponding basis vector $b_i$ ($i=\mu_{Lv},\ldots,n-1,n+1$) in the ciphertext c.

The inner-product also becomes 0 between each basis vector $b_i$ ($i=0,\ldots$, in which the attribute vector is set as the coefficient in the ciphertext c and each basis vector $b^*_i$ ($i=0,\ldots,\mu_{Lv}-1$) in which the predicate vector is set as the coefficient in the key vector $k^*_{L,0}$.

Thus, as a result of the pairing operation shown in Formula 116, only $e(\rho b_n, b^*_n)$ remains as a pair whose inner-product is not 0. Hence, the equation $e(\rho b_n, b^*_n)=u^\rho=K$ holds, so that the session key K can be computed by computing the pairing operation shown in Formula 116.

As is obvious from the above explanation, the reason for setting a randomized random number as the coefficient of each basis vector $b_i$ ($i=\mu_j,\ldots,\mu_{j+1}-1$) ($j=L+1,\ldots,d$) in (2) of (S402) above is to ensure superiority over a lower level key vector. That is, it is to ensure that the cipher vector c can be decrypted by the key vector $k^*_{L,0}$, but cannot be decrypted by a key vector of a lower level than the key vector $k^*_{L,0}$.

As has been described, the cryptographic processing system 10 according to this embodiment can implement the HPKEM scheme based on the concepts described in the first embodiment.

In the above description, the key generation device 100 generates first level secret keys. That is, the key generation device 100 generates $k^*_{1,0}$ in (S302) and $k^*_{1,j}$ ($j=\mu_1,\ldots,n-1$) in (S303).

However, the key generation device 100 may generate L-th level (L≥2) keys in place of the first level keys. That is, the key generation device 100 may generate $k^*_{L,0}$ in (S302) and $k^*_{L,j}$ ($j=\mu_L,\ldots,n-1$) in (S303).

That is, in (S302), using the processing device and based on the master public key pk, the master secret key sk, and the predicate vectors ($\vec{v}_1,\ldots,\vec{v}_L$) shown in Formula 121, the key vector generation unit 130 may compute Formula 122 to generate the key vector $k^*_{L,0}$ which is the first element of the L-th level (level L) secret key.

[Formula 121]

$$(\vec{v}_1,\ldots,\vec{v}_L):=((v_0,\ldots,v_{\mu_1-1}),\ldots,(v_{\mu_{L-1}},\ldots,v_{\mu_L-1})).$$

[Formula 122]

$$(\sigma_{L,0},\sigma_{L,L-1}) \xleftarrow{U} \mathbb{F}_q^{L(n-\mu_L+1)} \quad (1)$$

$$k^*_{L,0} := \sigma_{L,0}\left(\sum_{i=0}^{\mu_1-1} v_i b^*_i\right) + \ldots + \sigma_{L,L-1}\left(\sum_{i=\mu_{L-1}}^{\mu_L-1} v_i b^*_i\right) + b^*_n \quad (2)$$

Using the processing device and based on the master public key pk, the master secret key sk, and the predicate vectors ($\vec{v}_1,\ldots,\vec{v}_L$) shown in Formula 121, the key-generation vector generation unit 140 may compute Formula 123 to generate each key-generation vector $k^*_{L,j}$ for generating a lower level secret key.

[Formula 123]

$$(\sigma_{L,\mu_L,0},\ldots,\sigma_{L,\mu_L,L-1},\ldots,\sigma_{L,n-1,0},\ldots,\sigma_{L,n-1,L-1}) \xleftarrow{U} \mathbb{F}_q^{L(n-\mu_L+1)} \quad (1)$$

$$k^*_{L,j} := \sigma_{L,j,1}\left(\sum_{i=0}^{\mu_1-1} v_i b^*_i\right) + \ldots + \sigma_{L,j,L-1}\left(\sum_{i=\mu_{L-1}}^{\mu_L-1} v_i b^*_i\right) + b^*_j \quad (2)$$

$$j = \mu_L,\ldots,n-1$$

To summarize, in (S302) and (S303), using the processing device, the key vector generation unit 130 and the key-generation vector generation unit 140 may execute the GenKey algorithm shown in Formula 124 to generate the L-th level secret key (key information $\vec{k}^*_L$) including the key vector $k^*_{L,0}$ and the key-generation vectors $k^*_{L,j}$.

[Formula 124]

$GenKey(pk, sk,$ $$(\vec{v}_1,\ldots,\vec{v}_L):=((v_0,\ldots,v_{\mu_1-1}),\ldots,(v_{\mu_{L-1}},\ldots,v_{\mu_L-1}))):$$

$$(\sigma_{L,0},\ldots,\sigma_{L,L-1},\sigma_{L,\mu_L,0},\ldots,\sigma_{L,\mu_L,L-1},\ldots,$$

$$\sigma_{L,n-1,0},\ldots,\sigma_{L,n-1,L-1}) \xleftarrow{U} \mathbb{F}_q^{L(n-\mu_L+1)},$$

$$k^*_{L,0} := \sigma_{L,0}\left(\sum_{i=0}^{\mu_1-1} v_i b^*_i\right) + \ldots + \sigma_{L,L-1}\left(\sum_{i=\mu_{L-1}}^{\mu_L-1} v_i b^*_i\right) + b^*_n,$$

$$k^*_{L,j} := \sigma_{L,j,1}\left(\sum_{i=0}^{\mu_1-1} v_i b^*_i\right) + \ldots + \sigma_{L,j,L-1}\left(\sum_{i=\mu_{L-1}}^{\mu_L-1} v_i b^*_i\right) + b^*_j,$$

for $j = \mu_L,\ldots,n-1$, $$\vec{k}^*_L := (k^*_{L,0}, k^*_{L,\mu_L},\ldots,k^*_{L,n-1}).$$

return $\vec{k}^*_L$.

In the following description, it will also be assumed that the key generation device 100 generates the first level secret keys by the GenKey algorithm. However, in the following description, the key generation device 100 may generate the L-th level secret keys.

The cryptographic processing system 10 according to this embodiment may be modified so as to implement an HPE scheme, as described below.

Figure 19:
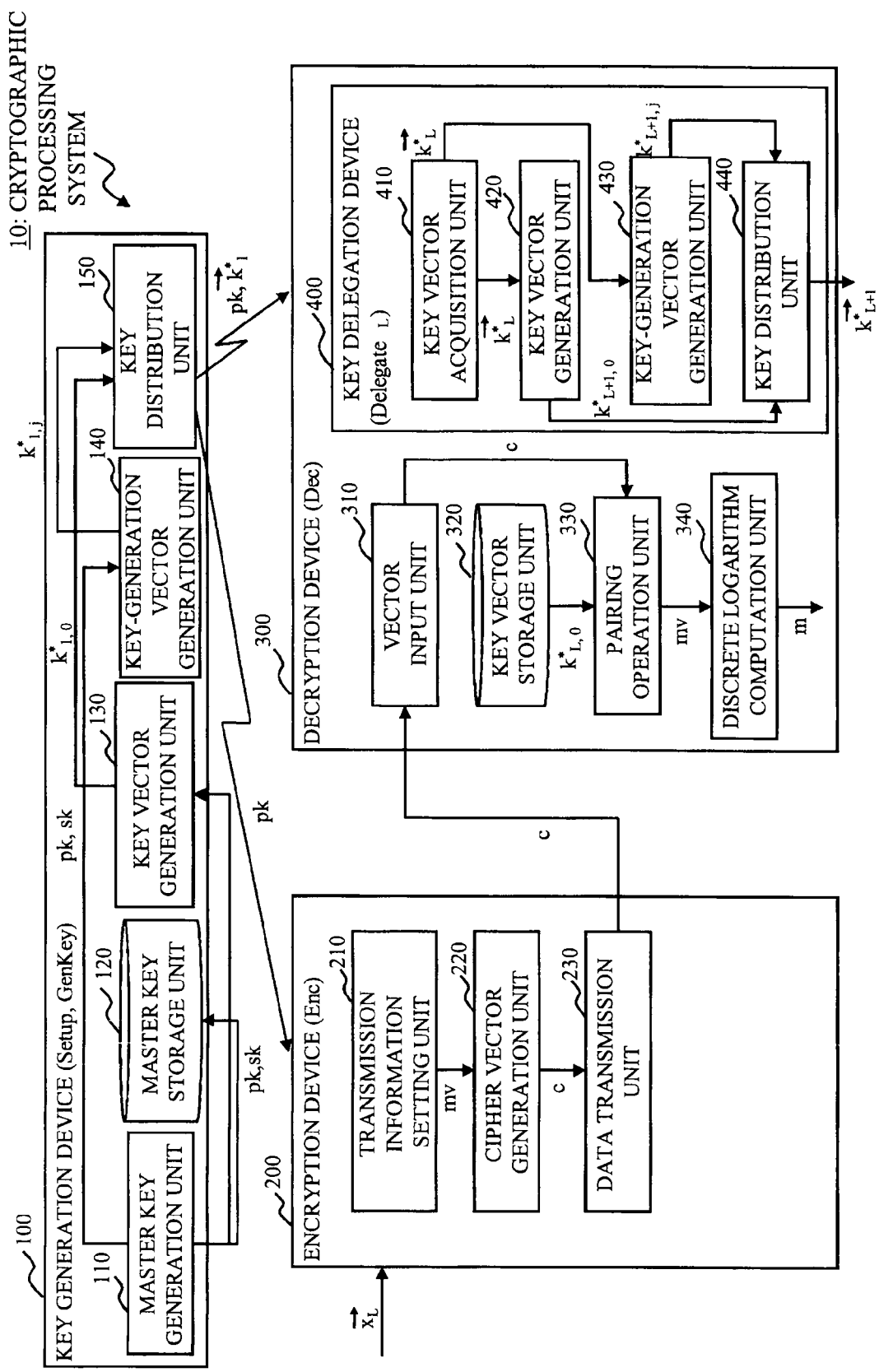
FIG. 19 is a functional block diagram showing functions of the cryptographic processing system 10 that implements hierarchical predicate encryption.

FIG. 19 is a functional block diagram showing functions of the cryptographic processing system 10 that implements the HPE scheme. The key generation device 100 and the key delegation device 400 of the cryptographic processing system 10 shown in FIG. 19 are the same as the key generation device 100 and the key delegation device 400 of the cryptographic processing system 10 shown in FIG. 10. The encryption device 200 of the cryptographic processing system 10 shown in FIG. 19 does not include the session key generation unit 240 included in the encryption device 200 of the cryptographic processing system 10 shown in FIG. 10. The decryption device 300 of the cryptographic processing system 10 shown in FIG. 19 includes a discrete logarithm computation unit 340, in addition to the functions included in the decryption device 300 of the cryptographic processing system 10 shown in FIG. 10.

Figure 21:
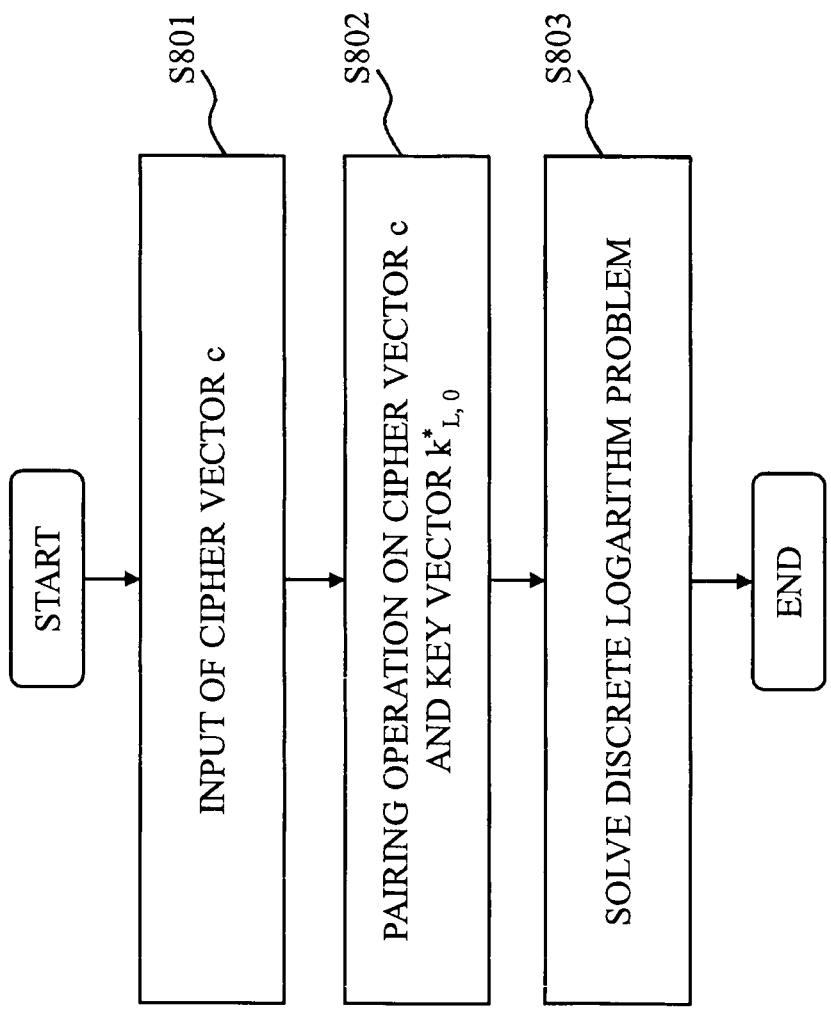
FIG. 21 is a flowchart showing operations of the decryption device 300 shown in FIG. 19.

FIG. 20 is a flowchart showing operations of the encryption device 200 shown in FIG. 19. FIG. 21 is a flowchart showing operations of the decryption device 300 shown in FIG. 19. Operations of the key generation device 100 and the key delegation device 400 are the same as those of the key generation device 100 and the key delegation device 400 of the cryptographic processing system 10 shown in FIG. 10, so that their description will be omitted.

In (S701), using the processing device, the transmission information setting unit 210 of the encryption device 200 generates a message vector mv by setting a message m as the coefficient of the basis vector $b_n$, in place of the transmission information ρ of (S401). In (S702), the cipher vector generation unit 220 generates an attribute information vector xv and a random number vector rv, as in (S402). Then, using the processing device, the cipher vector generation unit 220 generates a cipher vector c by adding the generated attribute information vector xv and the generated random number vector rv to the message vector mv. In (S703), the data transmission unit 230 transmits the generated cipher vector c to the decryption device 300 through the communication device, as in (S402).

In (S801), the vector input unit 310 of the decryption device 300 receives through the communication device and inputs the cipher vector c, as in (S501). In (S802), using the processing device, the pairing operation unit 330 performs the pairing operation e, which pairs the spaces V and V* included in the master public key pk, on the cipher vector c and the key vector $k^*_{L,0}$, as in (S502). Then, the key vector storage unit 320 obtains information $f (=u^m)$ concerning the message m. In (S803), the discrete logarithm computation unit 340 solves a discrete logarithm problem to base u on f to compute the message m. That is, the discrete logarithm computation unit 340 computes Formula 125.

$$m' = D \log_g(f) \quad \text{[Formula 125]}$$

where
$f := e(c, k^*_{L,0})$,
$g := e(b_n, k^*_{L,0})$, and
$Dlog_x (y)$ denotes solving a discrete logarithm problem to base x on y.

The message m to be input here shall be a value smaller than a predetermined small integer τ such that 0≤m<τ. This is because, as described above, the decryption device 300 needs to solve the discrete logarithm problem in computing the message m. That is, if the message m can be set freely, the decryption device 300 will require a large amount of time to compute the message m. Accordingly, by limiting the message m to values smaller than the predetermined small integer τ, the message m can be computed in a short period of time even when all possible values that the message m can take are searched and investigated.

It is generally known that various applications are possible even when the message m is limited to small values in this way.

In the example described above, the message m is set only in one basis vector $b_n$. Based on the above description, however, the message m can readily be set in a plurality of basis vectors.

In the HPKEM and HPE schemes described above, distortion maps which have been described as one of the conditions of DDVS are not used. Distortion maps are used not in the algorithms for implementing the cryptographic processes, but for proving the security of the cryptographic processes. Thus, the HPKEM and HPE schemes described above can be established in a space without distortion maps. That is, it is not essential that there exist distortion maps in a space for implementing the HPKEM and HPE schemes described above.

Third Embodiment

In this embodiment, security of the HPKEM scheme described in the second embodiment will be described.

In this embodiment, a correctness property of an HPKEM scheme will be described first. It will then be described that the HPKEM described in the second embodiment satisfies this correctness property. Then, "attribute hiding security" in the HPKEM scheme will be described. Then, as a criterion of safety, a property of adaptively attribute-hiding against chosen-plaintext attacks (CPA) will be defined. The HPKEM scheme described in the second embodiment is adaptively attribute-hiding against CPA.

<Correctness Property of an HPKEM Scheme>

An HPKEM scheme is required to satisfy a condition shown in Formula 126.

$$(sk, pk) \xleftarrow{R} \text{Setup}(1^\lambda),$$
$$sk_{(\vec{v}_1, \ldots, \vec{v}_{L_V})} \xleftarrow{R} \text{Derive}_{L_V}(pk, sk(\vec{v}_1, \ldots, \vec{v}_{L_V}))$$
$$(c, K) \xleftarrow{R} \text{Enc}(pk, (\vec{x}_1, \ldots, \vec{x}_{L_X})),$$
$$K' := \text{Dec}(pk, sk_{(\vec{v}_1, \ldots, \vec{v}_{L_V})}, c)$$

If $f_{(\vec{v}_1, \ldots, \vec{v}_{L_V})}(\vec{x}_1, \ldots, \vec{x}_{L_X}) = 1$, then $K' = K$.

If $f_{(\vec{v}_1, \ldots, \vec{v}_{L_V})}(\vec{x}_1, \ldots, \vec{x}_{L_X}) \neq 1$, then $K' \neq K$

[Formula 126]

except for negligible probability.

<Correctness Property of the HPKEM Scheme Described in the Second Embodiment>

It will be described that the HPKEM scheme described in the second embodiment satisfies the above-described correctness property.

In the following description, a notation shown in Formula 127 will be used.

$$v^*_j := \sum_{i=\mu_{j-1}}^{\mu_j - 1} v_i b^*_i \text{ for } j \geq 1 \quad \text{[Formula 127]}$$

First, it will be described that Lemma 1 shown below holds.
(Lemma 1)
Let L be 1≤L≤d. An L-th level secret key shown in Formula 128 is given by a linear combination with coefficients $\phi_{L,i,j} \in F_q$ of equations shown in Formula 129.

$$(k^*_{L,0}, k^*_{L,\mu_L}, \ldots, k^*_{L,n-1}) \quad \text{[Formula 128]}$$

$$k^*_{L,0} = \sum_{j=1}^{L} \varphi_{L,0,j} v^*_j + b^*_n,$$
$$k^*_{L,i} = \sum_{j=1}^{L} \varphi_{L,i,j} v^*_j + b^*_n$$
$$i = \mu_L, \ldots, n-1$$

[Formula 129]

(Explanation for Showing that Lemma 1 Holds)
Induction on L will be used for explaining that Lemma 1 holds.
For L=1, Formula 130 holds. Hence, Lemma 1 holds.

$$k^*_{1,0} = \sigma_{1,0} v^*_1 + b^*_n,$$
$$k^*_{1,i} = \sigma_{i,\mu_1} v^*_1 + b^*_i$$
$$i = \mu_1, \ldots, n-1 \quad \text{[Formula 130]}$$

It is assumed that Lemma 1 holds in the case of L−1. That is, Formula 131 holds.

$$k^*_{L-1,0} = \sum_{j=1}^{L-1} \varphi_{L-1,0,j} v^*_j + b^*_n,$$ [Formula 131]

$$k^*_{L-1,i} = \sum_{j=1}^{L-1} \varphi_{L-1,i,j} v^*_j + b^*_i$$

$$i = \mu_{L-1}, \ldots, n-1$$

Then, Formula 132 holds.

[Formula 132]

$$\begin{aligned} k^*_{L,0} &= k^*_{L-1,0} + \sigma_{L,0}\left(\sum_{i=\mu_{L-1}}^{\mu_L-1} v_i k^*_{L-1,i}\right) \\ &= \sum_{j=1}^{L-1} \varphi_{L-1,0,j} v^*_j + b^*_n + \sigma_{L,0}\left(\sum_{i=\mu_{L-1}}^{\mu_L-1} v_i \left(\sum_{j=1}^{L-1} \varphi_{L-1,i,j} v^*_j + b^*_i\right)\right) \\ &= \sum_{j=1}^{L-1}\left(\varphi_{L-1,0,j} + \sigma_{L,0}\sum_{i=\mu_{L-1}}^{\mu_L-1} v_i \varphi_{L-1,i,j}\right) v^*_j + \sigma_{L,0}\left(\sum_{i=\mu_{L-1}}^{\mu_L-1} v_i b^*_i\right) + b^*_n \\ &= \sum_{j=1}^{L-1} \varphi_{L,0,j} v^*_j + \varphi_{L,0,L} v^*_L + b^*_n \end{aligned}$$

where $$\varphi_{L,0,j} = \varphi_{L-1,0,j} + \sigma_{L,0} \sum_{i=\mu_{L-1}}^{\mu_L-1} v_i \varphi_{L-1,i,j}, \text{ and}$$

$$\varphi_{L,0,L} = \sigma_{L,0}.$$

This shows that Formula 129 holds for $k^*_{L,0}$. Similar arguments show that Formula 129 holds for $k^*_{L,i}$ ($i = \mu_L, \ldots, n-1$).

(Lemma 2)

The HPKEM scheme described in the second embodiment satisfies the above-described correctness property.

(Explanation for Showing that Lemma 2 Holds)

Let c be an encapsulated session key corresponding to an attribute vector $\vec{x}_{Lx}$ shown in Formula 133. By the orthonormality of bases B and B*, i.e., Formula 134 and Lemma 1, a decapsulated session key K' is expressed as shown in Formula 135.

$$(\vec{x}_1, \ldots, \vec{x}_{L_X})$$ [Formula 133]

$$e(b_i, b^*_j) = u^{\delta_{i,j}}$$ [Formula 134]

$$\begin{aligned} K' &= e(c, k^*_{L_v,0}) \\ &= \mu^{\sum_{j=1}^{L_v} \varphi_{L_v,0,j} \delta_j \left(\sum_{i=\mu_{j-1}}^{\mu_j-1} x_i v_i\right) + \rho} \\ &= \mu^{\sum_{j=1}^{L_v} \varphi_{L_v,0,j} \delta_j (\vec{x}_j \cdot \vec{v}_j) + \rho} \end{aligned}$$ [Formula 135]

for the $L_v$-th level key $k^*_{L_v,0}$.

Hence, Formula 136 holds.

If $f_{(\vec{v}_1, \ldots, \vec{v}_{L_V})}(\vec{x}_1, \ldots, \vec{x}_{L_X}) = 1$, [Formula 136]

then $K' = K$.

Here, if Formula 137 holds, then Formula 138 holds.

$$f_{(\vec{v}_1, \ldots, \vec{v}_{L_V})}(\vec{x}_1, \ldots, \vec{x}_{L_X}) = 0$$ [Formula 137]

$$\vec{x}_j \cdot \vec{v}_j \neq 0$$ [Formula 138]

for some j such that $1 \leq j \leq L_V$ except for negligible probability.

This is because, in Formula 135, Formula 139 is uniformly random in $F_q$ and K' is uniformly random in $G_T$.

$$\varphi_{L_V,0,j} \delta_j (\vec{x}_j \cdot \vec{v}_j)$$ [Formula 139]

If Formula 140 holds, there exists j as shown in Formula 141 by definition.

$$f(\vec{v}_1, \ldots, \vec{v}_{L_V})(\vec{x}_1, \ldots, \vec{x}_{L_X}) = 0$$ [Formula 140]

where $L_V \leq L_X$.

$$\vec{x}_j \cdot \vec{v}_j \neq 0$$ [Formula 141]

where $1 \leq j \leq L_V$.

Thus, only the case that $L_v > L_x$ is considered. If $L_v > L_x$, the vector (not attribute) used in c shown in Formula 142 is uniformly random.

$$\vec{x}_{L_V}$$ [Formula 142]

In addition, a predicate shown in Formula 143 is nonzero.

$$\vec{v}_{L_V}$$ [Formula 143]

Hence, Formula 144 holds except for negligible probability.

$$\vec{x}_{L_V} \cdot \vec{v}_{L_V} \neq 0$$ [Formula 144]

<Attribute-Hiding Security>

Attribute-hiding security for an HPKEM scheme means that an attribute vector used to generate a ciphertext (a cipher vector) remains concealed. That is, in an HPKEM scheme with attribute-hiding security, even if an adversary A obtains the ciphertext, the attribute vector used to generate the ciphertext cannot be known, as well as information concerning the transmission information ρ (session key K).

The precise definition of attribute-hiding security for a predicate key encapsulation mechanism scheme is discussed in Non-Patent Literature 19. Non-Patent Literature 19 does not take into account the notion of "hierarchical". Thus, in order to take into account the notion of "hierarchical", i.e., a key delegation process, the definition of attribute-hiding security for the predicate key encapsulation mechanism scheme discussed in Non-Patent Literature 19 will be generalized to cover an HPKEM scheme by dealing with two cases (1) and (2) shown in Formula 145. In the following description, a bit τ will be used for switching between the two cases.

[Formula 145]

(1)
For all k, $$f_{\vec{v}(k)}(\vec{x}^{(0)}) = f_{\vec{v}(k)}(\vec{x}^{(1)}) = 0.$$

(2)
For k in some nonempty set T, $$f_{\vec{v}(k)}(\vec{x}^{(0)}) = f_{\vec{v}(k)}(\vec{x}^{(1)}) = 1.$$

For $k \notin T$, $$f_{\vec{v}(k)}(\vec{x}^{(0)}) = f_{\vec{v}(k)}(\vec{x}^{(1)}) = 0, \text{ and } m^{(0)} = m^{(1)}.$$

<Definition of Adaptively Attribute-Hiding Against CPA>

An HPKEM scheme for hierarchical predicates F over hierarchical attributes Σ is adaptively attribute-hiding against CPA if for all probabilistic polynomial-time adversaries A, the advantage of A in the following experiment (adaptively attribute-hiding game against CPA) is negligible in a security parameter.

(Experiment: Adaptively Attribute-Hiding Game Against CPA)

1. The Setup algorithm is run to generate a master public key pk and a master secret key sk. The master public key pk is given to an adversary A.

2. The adversary A may adaptively request keys corresponding to vectors shown in Formula 146.

$$\left(\vec{v}_1^{(k)}, \ldots, \vec{v}_{L_V^{(k)}}^{(k)}\right) \quad \text{[Formula 146]}$$
$$k=1,\ldots,v_1, 1 \le L_V^{(k)} \le d$$

In response to this request, the adversary A is given corresponding keys shown in Formula 147.

[Formula 147]

$$sk_{\left(\vec{v}_1^{(k)},\ldots,\vec{v}_{L_V^{(k)}}^{(k)}\right)} \xleftarrow{R} Derive_{L_V}^{(k)}\left(pk, sk\left(\vec{v}_1^{(k)},\ldots,\vec{v}_{L_V^{(k)}}^{(k)}\right)\right)$$

3. The adversary A outputs Formula 149, subject to restrictions shown in Formula 148.

If $\tau = 0$, for all $k$, [Formula 148]

$$f_{\left(\vec{v}_1^{(k)},\ldots,\vec{v}_{L_V}^{(k)}\right)}\left(\vec{x}_1^{(0)},\ldots,\vec{x}_{L_X}^{(0)}\right) =$$
$$f_{\left(\vec{v}_1^{(k)},\ldots,\vec{v}_{L_V}^{(k)}\right)}\left(\vec{x}_1^{(1)},\ldots,\vec{x}_{L_X}^{(1)}\right) = 0$$

If $\tau=1$, there exists a nonempty set $T \subset \{1,\ldots,v\}$,
For any $k \in T$, $$f_{\left(\vec{v}_1^{(k)},\ldots,\vec{v}_{L_V}^{(k)}\right)}\left(\vec{x}_1^{(0)},\ldots,\vec{x}_{L_X}^{(0)}\right) = f_{\left(\vec{v}_1^{(k)},\ldots,\vec{v}_{L_V}^{(k)}\right)}\left(\vec{x}_1^{(1)},\ldots,\vec{x}_{L_X}^{(1)}\right) = 1,$$

and $\vec{x}_i^{(0)} = \vec{x}_i^{(1)}$ for all $i$ such that $L_V^{(k)} < i < L_X^{(0)} = L_X^{(1)}$.
For any $k \notin T$, $$f_{\left(\vec{v}_1^{(k)},\ldots,\vec{v}_{L_V}^{(k)}\right)}\left(\vec{x}_1^{(0)},\ldots,\vec{x}_{L_X}^{(0)}\right) = f_{\left(\vec{v}_1^{(k)},\ldots,\vec{v}_{L_V}^{(k)}\right)}\left(\vec{x}_1^{(1)},\ldots,\vec{x}_{L_X}^{(1)}\right) = 0.$$

[Formula 149]

$$\left(\vec{x}_1^{(0)},\ldots,\vec{x}_{L_X}^{(0)}\right), \left(\vec{x}_1^{(1)},\ldots,\vec{x}_{L_X}^{(1)}\right), \tau$$

4. A random bit $\theta$ is chosen, and Formula 150 is computed.

[Formula 150]

$$(c_\theta, K_\theta) \xleftarrow{R} Enc\left(pk, \left(\vec{x}_1^{(\theta)},\ldots,\vec{x}_{L_X}^{(\theta)}\right)\right)$$

Then, a key K' is randomly chosen from a space of associated session keys, as shown in Formula 151.

If $\mathcal{T}=0$, $\mathcal{A}$ is then given the following:

if $\theta=0$, $(c_0, K_0)$, if $\theta=1$, $(c_1, K')$.

If $\mathcal{T}1$, $\mathcal{A}$ is then given the following:

if $\theta=0$, $(c_0, K_0)$, if $\theta=1$, $(c_1, K_1)$.  [Formula 151]

5. The adversary A may continue to request keys for vectors shown in Formula 152, subject to the restrictions given above.

[Formula 152]

$$\left(\vec{v}_1^{(k)},\ldots,\vec{v}_{L_V^{(k)}}^{(k)}\right)$$
$$k = v_1+1,\ldots,v, \le L_V^{(k)} \le d$$

6. The adversary A outputs a bit $\theta'$, and succeeds if $\theta'=\theta$. The advantage of the adversary A is defined as shown in Formula 153.

$$Adv\mathcal{A}^{HPKEM,CPA}(\lambda) := |Pr[\theta'=\theta] - \tfrac{1}{2}| \quad \text{[Formula 153]}$$

The HPKEM scheme described in the second embodiment is adaptively attribute-hiding against CPA.

Fourth Embodiment

In this embodiment, a high security HPE scheme adapted from the HPKEM scheme described in the second embodiment will be described. The high security here means adaptively attribute-hiding against chosen ciphertext attacks (CCA), which will be described in a subsequent embodiment.

First, the following four concepts will be described for implementing an HPE scheme that is adaptively attribute-hiding against CCA: (1) secure message authentication, (2) secure encapsulation scheme, (3) secure symmetric key encryption, and (4) secure key derivation function. As will be described below, the concepts of (1) to (4) are discussed in prior art literature. Thus, they will be briefly described.

Then, using the above four concepts, the cryptographic processing system 10 for implementing the HPE scheme that is adaptively attribute-hiding against CCA will be described.

<(1) Secure Message Authentication>

Let (Mac, Vrfy) be a message authentication code secure against one-time chosen-message attacks. The definition of the message authentication code secure against one-time chosen-message attacks is discussed in Non-Patent Literature 7.

(Mac, Vrfy) are a pair of processes, each of which operates as described below.

Mac is a process that encrypts data and generates authentication information. $Mac_{key}(x)$ encrypts data x by a key. That is, when $y=Mac_{key}(x)$, data y is data (authentication information) generated by encrypting the data x by the key.

Vrfy is a process that verifies the authentication information generated by Mac. When $y=Mac_{key}(x)$, $Vrfy_{key'}(x', y')$ returns 1 if x=x', y=y', and key=key', and returns 0 if any one of x=x', y=y', and key=key' does not hold.

<(2) Secure Encapsulation Scheme>

Let ($Setup_{enc}$, $S_{enc}$, $R_{enc}$) be a secure encapsulation scheme. First verification information com, second verification information dec, and third verification information r will be used together with (Setup$_{enc}$, S$_{enc}$, R$_{enc}$). The definition of the secure encapsulation scheme is discussed in Non-Patent Literature 7.

(Setup$_{enc}$, S$_{enc}$, R$_{enc}$) are a set of processes, each of which operates as described below.

Setup$_{enc}$ takes as input a security parameter $1^k$, and randomly selects and outputs a string pub.

S$_{enc}$ takes as input $1^k$ and the string pub, and randomly selects and outputs first verification information com, second verification information dec, and third verification information r∈{0, 1}$^k$.

R$_{enc}$ takes as input the string pub, the first verification information com, and the second verification information dec, and outputs third verification information r∈{0, 1}$^k$∪{⊥}. R$_{enc}$ outputs third verification information r∈{0, 1}$^k$ if the input is the string pub output by Setup$_{enc}$ and the first verification information com and second verification information dec output by S$_{enc}$ based on this pub. R$_{enc}$ outputs third verification information r∈{⊥} if the input is any other information.

<(3) Secure Symmetric Key Encryption>

Let (SE, SD) be a secure symmetric key encryption scheme. The definition of the secure symmetric key encryption scheme is discussed in Non-Patent Literature 1.

(SE, SD) are a pair of processes, each of which operates as described below.

SE is an encryption process using a symmetric key. SE$_{key}$(x) encrypts data x by the symmetric key. When y=SE$_{key}$(x), data y is data generated by encrypting the data x by the symmetric key.

SD is a decryption process using the symmetric key. SD$_{key}$(y) decrypts the data y by the symmetric key. That is, when y=SE$_{key}$(x), x=SD$_{key}$(y) holds.

<(4) Secure Key Derivation Function>

Let KDF be a secure key derivation function. The definition of the secure key derivation function is discussed in Non-Patent Literature 1.

KDF(x) is a process that generates a key based on data x. When key=KDF(x), the key is generated based on the data x.

<HPE Scheme that is Adaptively Attribute-Hiding Against CCA>

Referring to FIGS. 22 to 25, 11, and 14, functions and operations of the cryptographic processing system 10 will be described.

Figure 22:
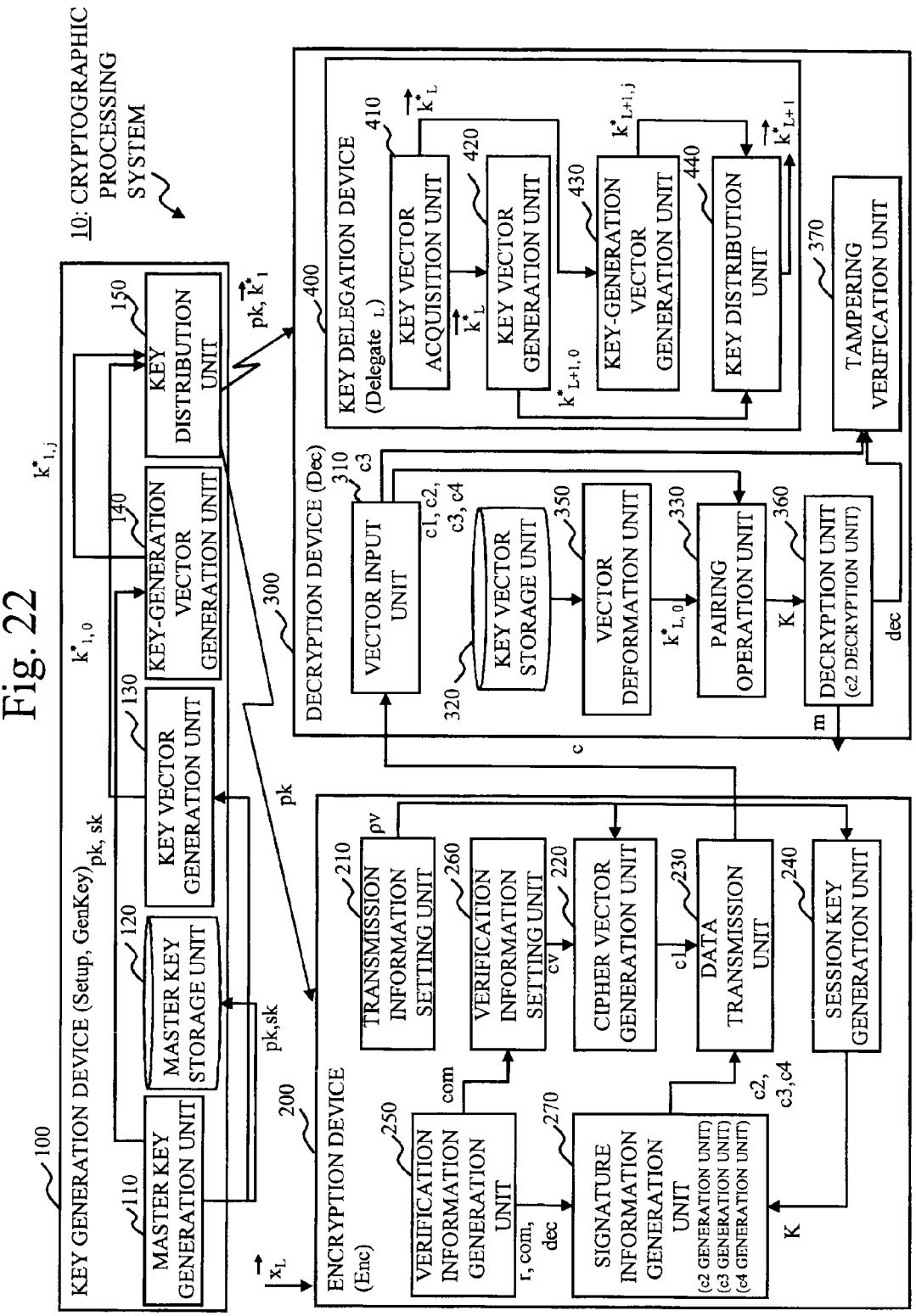
FIG. 22 is a functional block diagram showing functions of the cryptographic processing system 10 according to a fourth embodiment.

FIG. 22 is a functional block diagram showing the functions of the cryptographic processing system 10 according to this embodiment. The cryptographic processing system 10 includes the key generation device 100, the encryption device 200, the decryption device 300, and the key delegation device 400, as with the cryptographic processing system 10 according to the second embodiment. It is also assumed in this embodiment that the decryption device 300 includes the key delegation device 400.

Figure 23:
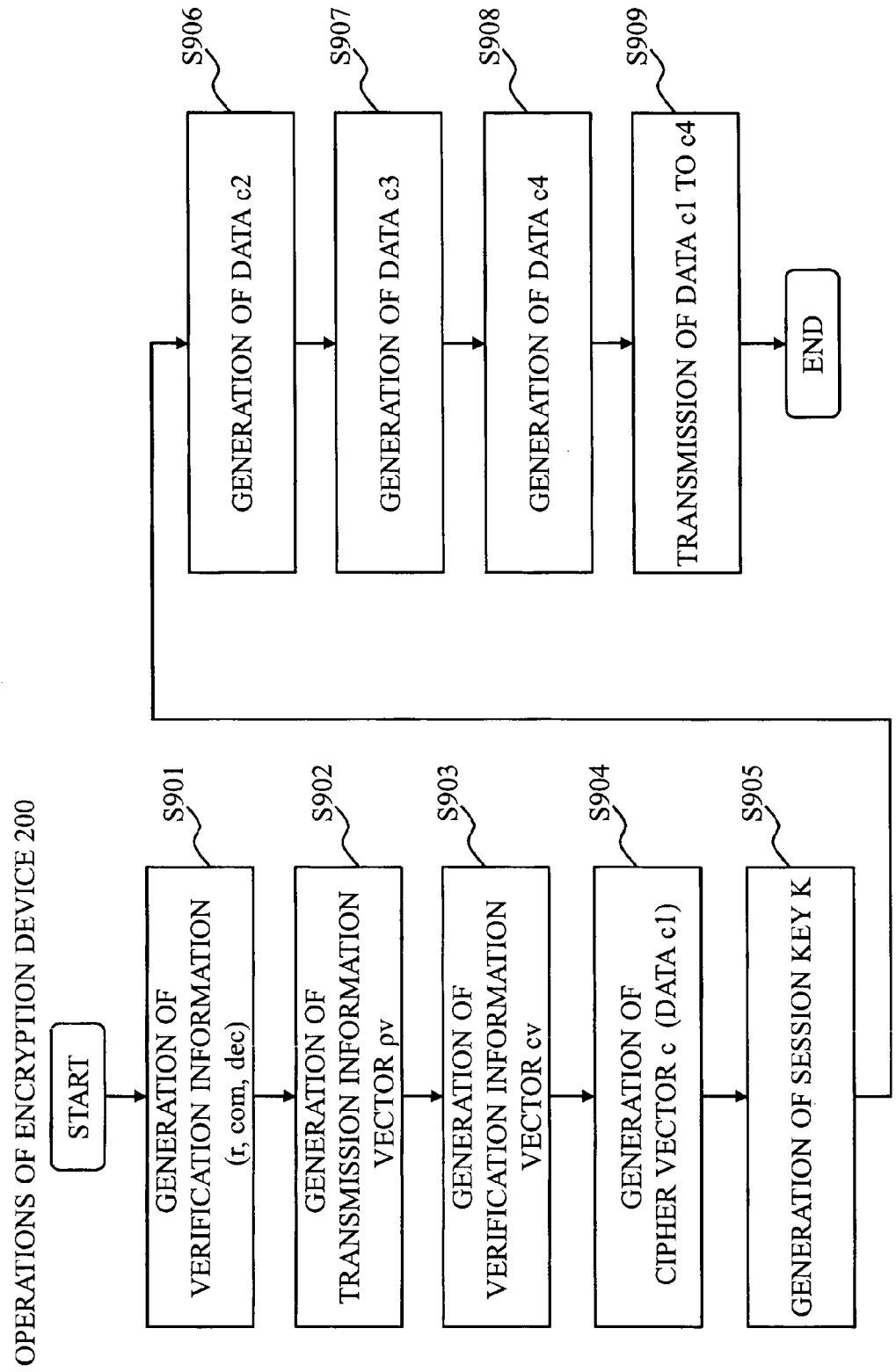
FIG. 23 is a flowchart showing operations of the encryption device 200.
Figure 24:
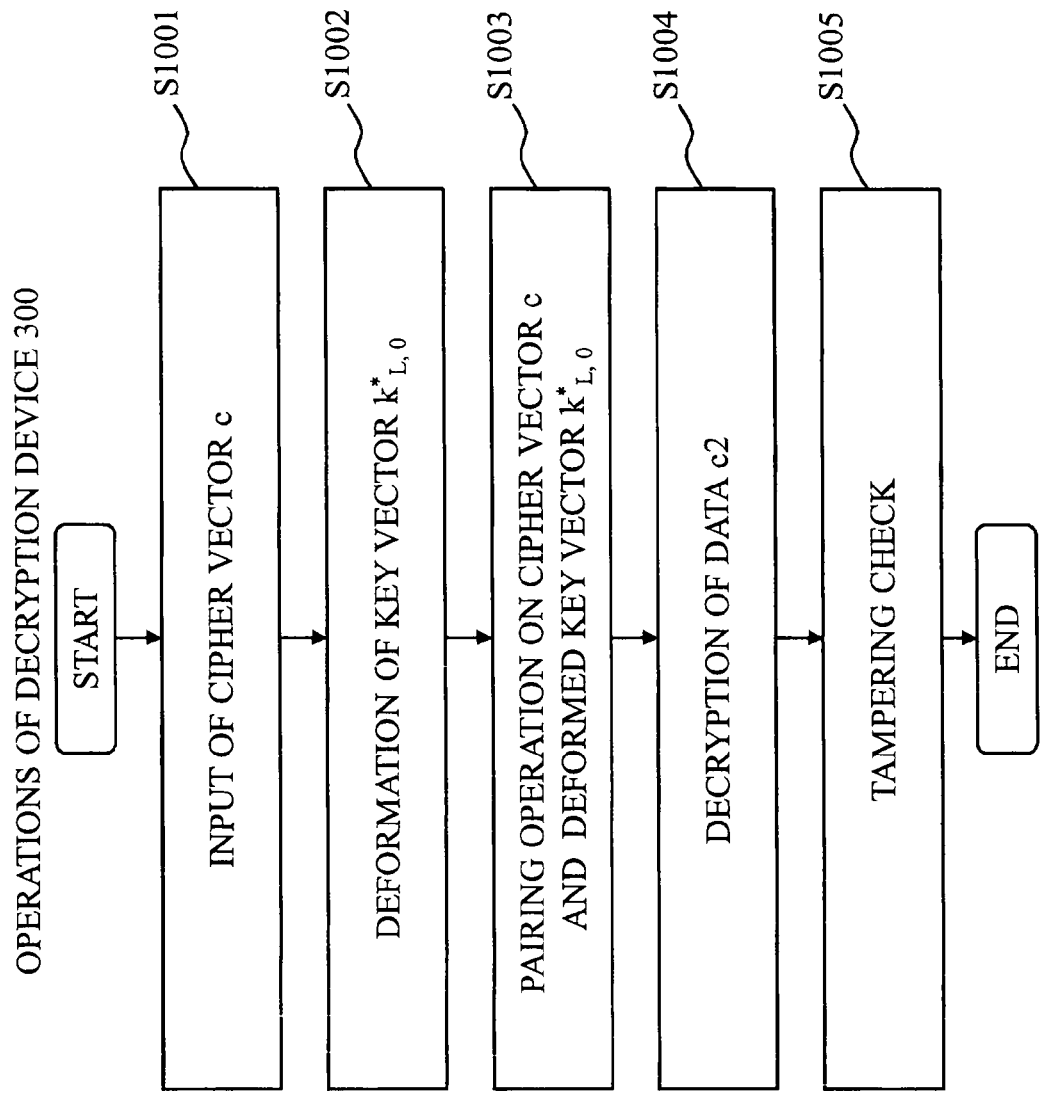
FIG. 24 is a flowchart showing operations of the decryption device 300.

FIG. 23 is a flowchart showing operations of the encryption device 200. FIG. 24 is a flowchart showing operations of the decryption device 300. Flows of operations of the key generation device 100 and the key delegation device 400 are the same as those of the key generation device 100 and the key delegation device 400 according to the second embodiment. Thus, the operations of the key generation device 100 will be described with reference to FIG. 11. The operations of the key delegation device 400 will be described with reference to FIG. 14.

Figure 25:
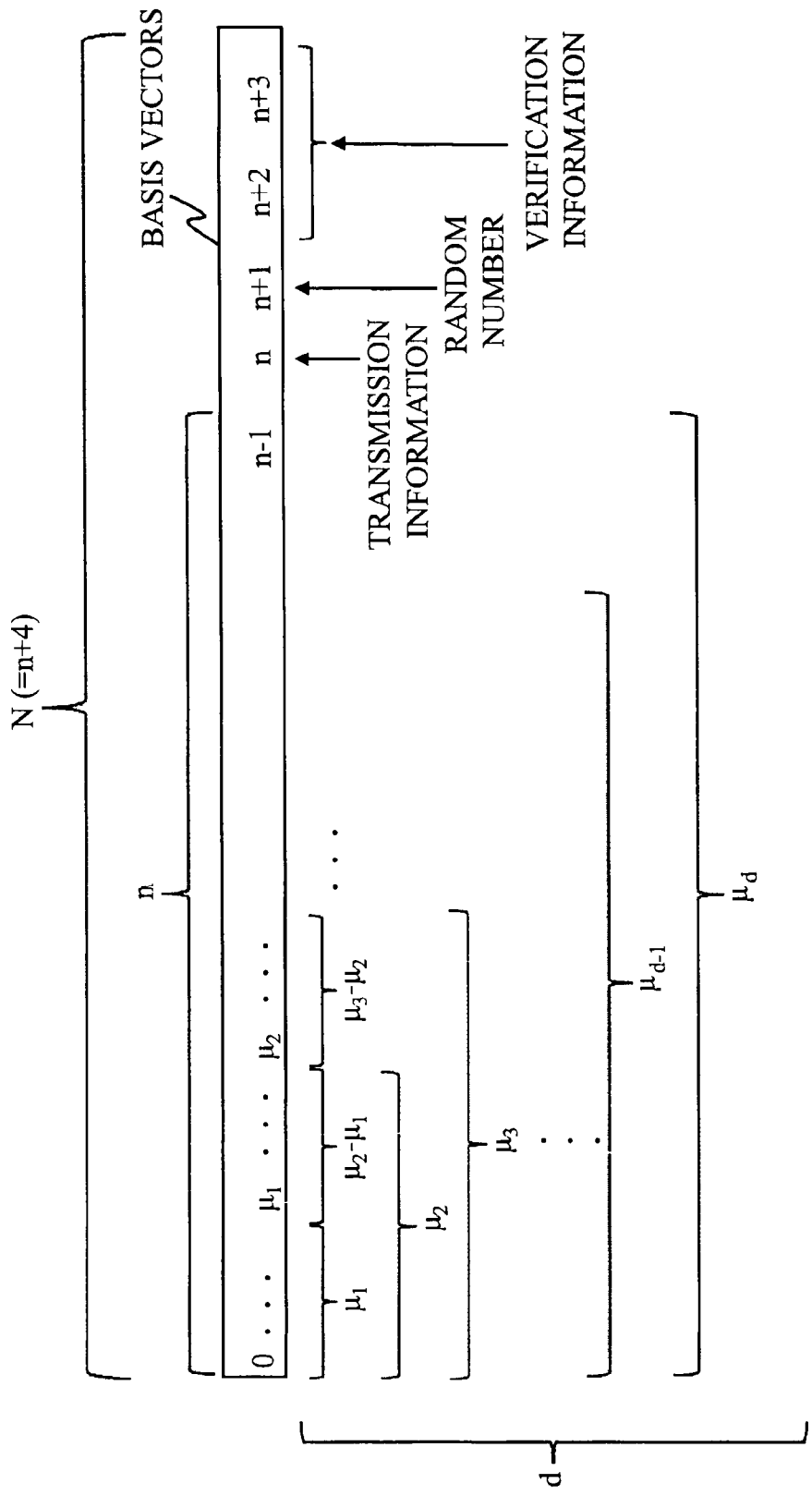
FIG. 25 is a conceptual diagram showing a structure of a basis of dual distortion vector spaces according to the fourth embodiment.

FIG. 25 is a conceptual diagram showing a structure of a basis of DDVS. The functions and operations of the key generation device 100 will be described. The configuration of the functions of the key generation device 100 is the same as that of the key generation device 100 according to the second embodiment shown in FIG. 10. The flow of the operations of the key generation device 100 is the same as that of the key generation device 100 according to the second embodiment shown in FIG. 11. Thus, the functions and operations of the key generation device 100 will be described with reference to FIG. 11.

(S301: Master Key Generation Step)

Using the processing device, the master key generation unit 110 computes Formula 154 to generate a master public key pk and a master secret key sk, and stores the generated keys in the master key storage unit 120.

[Formula 154]

$$N := n + 4 \quad (1)$$

$$(\mathbb{V}, \mathbb{V}^*, G_t, A, A^*, q) \xleftarrow{R} \mathcal{G}_{ddvs}(1^\lambda, N) $$

$$X := (x_{i,j}) \xleftarrow{U} GL(N, \mathbb{F}_q) \quad (2)$$

$$b_i = \sum_{j=0}^{N-1} x_{i,j} a_j, \quad (3)$$

$$\mathbb{B} := (b_0, \ldots, b_{N-1})$$

$$(v_{i,j}) := (x^T)^{-1} \quad (4)$$

$$b_i^* = \sum_{j=0}^{N-1} v_{i,j} a_j^*, \quad (5)$$

$$\mathbb{B}^* := (b_0^*, \ldots, b_{N-1}^*)$$

$$\text{pub} \xleftarrow{R} Setup_{enc}(1^\lambda) \quad (6)$$

$$sk := \mathbb{B}^*, pk := (1^\lambda, \vec{\mu}, \mathbb{V}, \mathbb{V}^*, G_t, A, A^*, q, \mathbb{B}, \text{pub}) \quad (7)$$

return $sk, pk$ (1) to (5) shown in Formula 154 are the same as (1) to (5) shown in Formula 107, except that N=n+4, as will be described later. (6) Using the processing device, the master key generation unit 110 executes Setup$_{enc}$ to generate a string pub. (7) The master key generation unit 110 designates the generated basis B* as the master secret key sk, and (1$^\lambda$, μ$^→$, V, V*, G$_T$, A, A*, q, B, pub) including the generated basis B as the master public key pk. That is, the master public key is different from the master public key pk generated by the master key generation unit 110 according to the second embodiment in that the string pub is included. The master key storage unit 120 stores in the storage device the master public key pk and the master secret key sk generated by the master key generation unit 110.

It is assumed that there are the N (=n+4) number of dimensions in DDVS, where n denotes the number of basis vectors assigned to represent the hierarchical structure of a format of hierarchy μ$^→$. That is, in addition to the n number of basis vectors assigned to represent the hierarchical structure, four basis vectors are provided. The number of basis vectors may, of course, be increased further.

As shown in FIG. 25, out of the N (=n+4) number of basis vectors, the n number of basis vectors are assigned to represent the hierarchical structure. The structure of the basis vectors assigned to represent the hierarchical structure is the same as the structure shown in FIG. 5. One of the four remaining basis vectors (the n-th basis vector) is used for a message m. Another one of the four remaining basis vectors (the (n+1)- th basis vector) is used for randomizing a ciphertext c. Other two basis vectors of the four remaining basis vectors (the (n+2)-th and (n+3)-th basis vectors) are used for verification information (first verification information com).

To summarize, in (S301), the master key generation unit 110 executes the Setup algorithm shown in Formula 155 to generate the master public key pk and the master secret key sk.

[Formula 155]

$$\text{Setup}(1^\lambda, \vec{\mu} := (n, d; \mu_1 \ldots, \mu_d)):$$

$$N := n + 4, (\mathbb{V}, \mathbb{V}^*, \mathbb{G}_T, A, A^*, q) \xleftarrow{R} \mathcal{G}_{ddvs}(1^\lambda, N),$$

$$X := (x_{i,j}) \xleftarrow{U} GL(N, \mathbb{F}_q),$$

$$b_i = \sum_{j=0}^{N-1} v_{i,j} a_j^*, \mathbb{B} := (b_0, \ldots, b_{N-1}).$$

$$(v_{i,j}) := (x^T)^{-1}, b_i = \sum_{j=0}^{N-1} v_i, f^2 j, \mathbb{B} := (b_0^*, \ldots, b_{N-1}^*),$$

$$\text{pub} \xleftarrow{R} \text{Setup}_{enc}(1^\lambda)$$

$$sk := \mathbb{B}^*, pk := (1^\lambda, \vec{\mu}, \mathbb{V}, \mathbb{V}^*, \mathbb{G}_T, A, A^*, q, \mathbb{B}, \text{pub}).$$

return sk, pk.

(S302: Key Vector $k^*_{1,0}$ Generation Step)

As with the second embodiment, using the processing device, the key vector generation unit 130 computes Formula 156 to generate a key vector $k^*_{1,0}$.

[Formula 156]

$$\sigma_{1,0} \xleftarrow{U} \mathbb{F}_q^{n-\mu_1+1},$$

$$k^*_{1,0} := \sigma_{1,0}\left(\sum_{i=0}^{\mu_1-1} v_i b_i^*\right) + b_n^*$$

(S303: Key-Generation Vector $k^*_{1,j}$ Generation Step)

As with the second embodiment, using the processing device, the key-generation vector generation unit 140 computes Formula 157 to generate each key-generation vector $k^*_{1,j}$.

[Formula 157]

$$(\sigma_{1,\mu_1}, \ldots, \sigma_{1,n-1}, \sigma_{1,n+2}, \sigma_{1,n+3}) \xleftarrow{U} \mathbb{F}_q^{n-\mu_1+1},$$

$$k^*_{1,j} := \sigma_{1,j}\left(\sum_{i=0}^{\mu_1-1} v_i b_i^*\right) + b_j^*$$

$$j = \mu_1, \mu_1 + 1, \ldots, n-1, n+2, n+3$$

where
$k^*_{1,j}$: j-th element of the first level secret key.

Note that the key-generation vector generation unit 140 generates the key-generation vectors $k^*_{1,j}$ (j=$\mu_1$, ..., n−1, n+2, n+3). That is, the key-generation vector generation unit 140 differs from the key-generation vector generation unit 140 shown in FIG. 10 in that it generates the key-generation vectors $k^*_{1,n+2}$ and $k^*_{1,n+3}$.

To summarize, in (S302) and (S303), using the processing device, the key vector generation unit 130 and the key-generation vector generation unit 140 execute the GenKey algorithm shown in Formula 158 to generate a first level secret key (key information $\vec{k}^*_1$) including the key vector $k^*_{1,0}$ and the key-generation vectors $k^*_{1,j}$.

[Formula 158]

$$\text{GenKey}(pk, sk, (v_0, \ldots, v_{\mu_1-1})):$$

$$(\sigma_{1,0}, \sigma_{1,\mu_1}, \ldots, \sigma_{1,n-1}, \sigma_{1,n+2}, \sigma_{1,n+3}) \xleftarrow{U} \mathbb{F}_q^{n-\mu_1+1}$$

$$k^*_{1,0} := \sigma_{1,0}\left(\sum_{i=0}^{\mu_1-1} v_i b_i^*\right) + b_n^*,$$

$$k^*_{1,j} := \sigma_{1,j}\left(\sum_{i=0}^{\mu_1-1} v_i b_i^*\right) + b_j^*,$$

$$j = \mu_1, \mu_1 + 1, \ldots, n-1, n+2, n+3,$$

$$\vec{k}^*_1 := (k^*_{1,0}, k^*_{1,\mu_1}, \ldots, k^*_{1,n-1}, k^*_{1,n+2}, k^*_{1,n+3}).$$

return $\vec{k}^*_1$ (S304: Key Distribution Step)

As with the key distribution unit 150 of the second embodiment, the key distribution unit 150 transmits the master public key generated by the master key generation unit 110 and the key information $\vec{k}^*_1$ generated by the key vector generation unit 130 and the key-generation vector generation unit 140 to the decryption device 300 through the communication device. The key distribution unit 150 also transmits the master public key to the encryption device 200 through the communication device.

The functions and operations of the encryption device 200 will be described. The encryption device 200 includes a verification information generation unit 250, a verification information setting unit 260, and a signature information generation unit 270 (a c2 generation unit, a c3 generation unit, and a c4 generation unit), in addition to the functions included in the encryption device 200 according to the second embodiment shown in FIG. 10.

(S901: Verification Information Generation Step)

Using the processing device, the verification information generation unit 250 computes Formula 159 to generate first verification information com, second verification information dec, and third verification information r.

[Formula 159]

$$(r, com, dec) \xleftarrow{R} S_{enc}(1^\lambda, \text{pub})$$

That is, using the processing device, the verification information generation unit 250 executes $S_{enc}(1^\lambda, \text{pub})$ on input of the string pub included in the master public key, to generate the first verification information com, the second verification information dec, and the third verification information r.

(S902: Transmission Information Setting Step)

As with the second embodiment, using the processing device, the transmission information setting unit 210 computes Formula 160 to generate a transmission information vector ρv.

[Formula 160]

$$\rho \xleftarrow{U} \mathbb{F}_q^{d+3},$$

$$\rho v := \rho b_n$$

(S903: Verification Information Setting Step)

Using the processing device and based on the master public key pk, the verification information setting unit 260 computes Formula 161 to generate a verification information vector cv.

[Formula 161]

$$\delta_{n+2} \xleftarrow{U} \mathbb{F}_q^{d+3} \quad (1)$$

$$cv := \delta_{n+2}(b_{n+2} + com\, b_{n+3}) \quad (2)$$

That is: (1) using the processing device, the verification information setting unit 260 generates a random number $\delta_{n+2}$.

(2) Using the processing device, the verification information setting unit 260 generates the verification information vector cv by setting a predetermined value (1 in this case) randomized by the random number $\delta_{n+2}$ as the coefficient of the basis vector $b_{n+2}$ in the basis B included in the master public key pk, and also setting the first verification information com randomized by the random number $\delta_{n+2}$ as the coefficient of the basis vector $b_{n+3}$.

(S904: Cipher Vector (Data c1) Generation Step)

Using the processing device and based on the master public key pk and attribute vectors $\vec{x}_1$ to $\vec{x}_L$ ($\vec{x}_i$ (i=1, ..., L) (=($x_0$, ..., $x_i$) (i=$\mu_L$−1))) (where L denotes the depth of hierarchy), the cipher vector generation unit 220 computes Formula 162 to generate a cipher vector c.

[Formula 162]

$$(\vec{x}_{L+1}, \ldots, \vec{x}_d) \xleftarrow{U} \mathbb{F}_q^{\mu_{L+1}-\mu_L} \times \ldots \times \mathbb{F}_q^{n-\mu_{d-1}} \quad (1)$$

$$(\delta_1, \ldots, \delta_d, \delta_{n+1}) \xleftarrow{U} \mathbb{F}_q^{d+3}$$

$$xv := \delta_1 \left( \sum_{i=0}^{\mu_1 - 1} x_i b_i^* \right) + \ldots + \delta_d \left( \sum_{i=\mu_{d-1}}^{n-1} x_i b_i \right) \quad (2)$$

where $$\vec{x} := (\vec{x}_1, \ldots, \vec{x}_L)$$

$$:= \begin{pmatrix} (x_0, \ldots, x_{\mu_1 - 1}), \ldots, \\ (x_{\mu_{L-1}}, \ldots, x_{\mu_L - 1}) \end{pmatrix} : \text{attribute vector.}$$

$$rv := \delta_{n+1} b_{n+1} \quad (3)$$

$$c_1 := xv + \rho v + rv + cv \quad (4)$$

$$:= \delta_1 \left( \sum_{i=0}^{\mu_1 - 1} x_i b_i^* \right) + \ldots + \delta_d \left( \sum_{i=\mu_{d-1}}^{n-1} x_i b_i \right) + \rho b_n + \delta_{n+1} b_{n+1} +$$

$$\delta_{n+2}(b_{n+2} + com\, b_{n+3})$$

where
$c_1$: data c1 (cipher vector c).

That is: (1) as with the second embodiment, using the processing device, the cipher vector generation unit 220 generates random numbers $\vec{x}_i$ (i=L+1, ..., d) and $\delta_i$ (i=1, ..., d, n+1).

(2) As with the second embodiment, the cipher vector generation unit 220 generates an attribute information vector xv by setting each element of the attribute vectors as the coefficient of each basis vector $b_i$ (i=0, ..., $\mu_L$−1) in the basis B included in the master public key pk, and also setting each random number as the coefficient of each basis vector $b_i$ (i=$\mu_L$, ..., n−1).

(3) As with the second embodiment, using the processing device, the cipher vector generation unit 220 generates a random number vector rv by setting a random number as the coefficient of the basis vector $b_{n+1}$ in the basis B included in the master public key pk.

(4) Using the processing device, the cipher vector generation unit 220 generates the cipher vector c (data c1) by adding the generated attribute information vector xv, the generated random number vector rv, the transmission information vector ρv generated by the transmission information setting unit 210, and the verification information vector cv generated by the verification information setting unit 260.

(S905: Session Key Generation Step)

Using the processing device, the session key generation unit 240 computes Formula 163 to generate a session key K.

$$K := u^\rho \quad \text{[Formula 163]}$$

where $u := e(g_1, g_2) \neq 1$.

(S906: Data c2 Generation Step)

Using the processing device, the signature information generation unit 270 computes Formula 164 to generate data c2.

$$c_2 := SE_{KDF(K)}(m, dec) \quad \text{[Formula 164]}$$

where m: message.

That is, using the processing device, the signature information generation unit 270 executes KDF by the session key K to generate a symmetric key. Using the processing device, the signature information generation unit 270 executes SE by the generated symmetric key to generate data c2 by encrypting a message m and the second verification information dec.

(S907: Data c3 Generation Step)

The signature information generation unit 270 designates the first verification information com as data c3.

(S908: Data c4 Generation Step)

Using the processing device, the signature information generation unit 270 computes Formula 165 to generate data c4.

$$c_4 := Mac_r(c_1, c_2) \quad \text{[Formula 165]}$$

That is, using the processing device and based on the third verification information r, the signature information generation unit 270 encrypts the data c1 generated by the cipher vector generation unit 220 and the data c2 generated by the signature information generation unit 270.

(S909: Data Transmission Step)

The data transmission unit 230 transmits the data c1 generated by the cipher vector generation unit 220 and the data c2, c3, and c4 generated by the signature information generation unit 270 to the decryption device 300 through the communication device.

To summarize, the encryption device 200 computes the Enc algorithm shown in Formula 166 to generate the data c1, c2, c3, and c4.

[Formula 166]

$Enc(pk, m,$ $\vec{x} := (\vec{x}_1, \ldots, \vec{x}_L) := ((x_0, \ldots, x_{\mu_1-1}), \ldots, (x_{\mu_{L-1}}, \ldots, x_{\mu_L-1})):$ $(\vec{x}_{L+1}, \ldots, \vec{x}_d) \xleftarrow{U} \mathbb{F}_q^{\mu_{L+1}-\mu_L} \times \ldots \times \mathbb{F}_q^{n-\mu_{d-1}},$ $(\rho, \delta_1, \ldots, \delta_d, \delta_{n+1}, \delta_{n+2}) \xleftarrow{U} \mathbb{F}_q^{d+3}, (r, com, dec) \xleftarrow{R} S_{enc}(1^\lambda, pub)$ $c_1 := \delta_1 \left( \sum_{i=0}^{\mu_1-1} x_i b_i \right) + \ldots + \delta_d \left( \sum_{i=\mu_{d-1}}^{n-1} x_i b_i \right) +$ $\rho b_n + \delta_{n+1} b_{n+1} + \delta_{n+2}(b_{n+2} + com b_{n+3}),$ $K := u\rho.$ $c_2 := SE_{KDF(K)}(m, dec), c_3 := com, c_4 := Mac_r(c_1, c_2),$ return $(c_1, c_2, c_3, c_4).$ The functions and operations of the decryption device 300 will be described. The decryption device 300 includes a vector deformation unit 350, a decryption unit 360 (a c2 decryption unit), and a tampering verification unit 370, in addition to the functions included in the decryption device 300 according to the second embodiment shown in FIG. 10.

(S1001: Vector Input Step)

As with the second embodiment, the vector input unit 310 receives through the communication device and inputs the data c1, c2, c3, and c4 transmitted by the data transmission unit 230 of the encryption device 200.

(S1002: Key Vector Deformation Step)

Using the processing device, the vector deformation unit 350 computes Formula 167 to deform the key vector $k^*_{L, 0}$.

[Formula 167]

$\tilde{\sigma} \xleftarrow{U} \mathbb{F}_q,$ $\tilde{k}^*_{L,0} := k^*_{L,0} + \tilde{\sigma}(c_3 k^*_{L,n+2} - k^*_{L,n+3})$ where $\tilde{k}^*_{L, 0}$: first element of the L-th level secret key after being deformed, $k^*_{L,0}$: first element of the L-th level secret key before being deformed, $k^*_{L,n+2}$: (n+2)-th element of the L-th level secret key, and $k^*_{L,n+3}$: (n+3)-th element of the L-th level secret key.

That is, the vector deformation unit 350 deforms the key vector $k^*_{L, 0}$ which is the first element of the L-th level secret key by using the data c3 (verification information com), such that the verification information com set by the verification information generation unit 250 of the encryption device 200 disappears by the pairing operation to be performed in a subsequent step (such that the inner-product becomes 0 between the basis vectors $b_{n+2}, b_{n+3}$ and the basis vectors $b^*_{n+2}, b^*_{n+3}$ in which information including the verification information com is set).

(S1003: Pairing Operation Step)

Using the processing device and based on the master public key pk and the deformed key vector $k^*_{L, 0}$, the pairing operation unit 330 computes Formula 168 to generate a session key K' (=K).

$K':=e(c_1, \tilde{k}^*_{L,0})$ [Formula 168]

That is, using the processing device, the pairing operation unit 330 computes the session key K' by performing the pairing operation e, which pairs the spaces V and V* included in the master public key pk, on the data c1 (cipher vector c) input by the vector input unit 310 and the key vector $k^*_{L, 0}$ deformed in (S1002).

If the data c1 has not been tampered with, the information including the verification information com set in the data c1 (information set in the basis vectors $b_{n+2}, b_{n+3}$) disappears as a result of the pairing operation, because the vector deformation unit 350 has deformed the key vector. Thus, if the data c1 has not been tampered with, the pairing operation unit 330 can generate the session key K that is identical with the session key K generated by the encryption device 200.

(S1004: c2 Decryption Step)

Using the processing device, the decryption unit 360 computes Formula 169 to decrypt the data c2.

$(m', dec') := SD_{KDF(K')}(c_2)$ [Formula 169]

That is, using the processing device, the decryption unit 360 executes KDF by the session key K to generate a symmetric key. Using the processing device, the decryption unit 360 executes SD by the generated symmetric key to generate a message m' (=m) and second verification information dec' (=dec). That is, if the data c1 has not been tampered with, the session key K has been generated correctly, and the data c2 has not been tampered with, the message m and the second verification information dec embedded in the data c2 by the encryption device 200 are generated.

(S1005: Tampering Verification Step)

Using the processing device, the tampering verification unit 370 determines whether or not Formula 170 and Formula 171 hold to verify that the data c1, c2, c3, and c4 have not been tampered with. That is, the tampering verification unit 370 verifies that the message m has not been tampered with.

$r' := \mathcal{R}_{enc}(pub, c_3, dec')$ $r' \neq \bot$ [Formula 170]

$Vrfy_{r'}((c_1, c_2), c_4) = 1$ [Formula 171]

That is: (1) using the processing device and based on the string pub included in the master public key pk, the data c3 (first verification information com) received from the encryption device 200, and the generated second verification information dec', the tampering verification unit 370 executes $R_{enc}$ to generate third verification information r' (=r), as shown in Formula 170. If the data c3 has not been tampered with and the second verification information dec' is valid, the third verification information r generated by the encryption device 200 by executing $S_{enc}$ is generated. On the other hand, if the data c3 has been tampered with, or the second verification information dec' is invalid, a distinguished symbol $\bot$ is generated, instead of the third verification information r. That is, if data other than the distinguished symbol $\bot$ is generated, the tampering verification unit 370 can determine that this data is the valid third verification information r generated by the encryption device 200 by executing $S_{enc}$.

(2) Using the processing device and based on the generated third verification information r' and the data c1, c2, and c4 received from the encryption device 200, the tampering verification unit 370 executes Vrfy as shown in Formula 171. If the third verification information r' is valid and the data c1, c2, and c4 have not been tampered with, the result of executing Vrfy becomes 1. On the other hand, if the third verification information r' is invalid, or any one of the data c1, c2, or c4 has been tampered with, the result of executing Vrfy becomes 0.

If the valid third verification information r is generated and the result of executing Vrfy is 1, the tampering verification unit 370 determines that the generated message m' is identical with the message m transmitted by the encryption device 200. If the tampering verification unit 370 determines that the message m' is identical with the message m, it outputs the message m'. On the other hand, if the tampering verification unit 370 determines that the message m' is different from the message m, it outputs the distinguished symbol $\perp$.

To summarize, the decryption device 300 executes the Dec algorithm shown in Formula 172 to generate the message m' or the distinguished symbol $\perp$.

[Formula 172]

$$Dec(pk, k^*_{L,0}, k^*_{L,n+2}, k^*_{L,n+3}, (c_1, c_2, c_3, c_4)) : \tilde{\sigma} \xleftarrow{U} \mathbb{F}_q,$$

$$\tilde{k}^*_{L,0} := k^*_{L,0} + \tilde{\sigma}(c_3 k^*_{L,n+2} - k^*_{L,n+3}), K' := e(c_1, \tilde{k}^*_{L,0}),$$

$$(m', dec') := SE_{KDF(K')}(c_2), r' := \mathcal{R}_{enc}(pub, c_3 dec')$$

Check $r' \neq \perp ? \wedge Vrfy_{r'}((c_1, c_2), c_4) = 1 ?$ return $m'$ if both checks are passed; $\perp$ otherwise.

The functions and operations of the key delegation device 400 will be described. The configuration of the functions of the key delegation device 400 is the same as that of the key delegation device 400 according to the second embodiment shown in FIG. 10. The flow of the operations of the key delegation device 400 is the same as that of the key delegation device 400 according to the second embodiment shown in FIG. 14. Thus, the functions and operations of the key delegation device 400 will be described with reference to FIG. 14.

(S601: Key Vector $k^*_{L,0}$ Acquisition Step)

As with the second embodiment, the key vector acquisition unit 410 acquires, through the communication device, the L-th level secret key (key information $\vec{k}^*_L$) including the key vector $k^*_{L,0}$ which is the first element of the L-th level secret key and the key-generation vectors $k^*_{L,j}$ which are the j-th ($j=\mu_1, \ldots, n-1$) elements of the L-th level secret key.

(S602: Key Vector $k^*_{L+1,0}$ Generation Step)

As with the second embodiment, using the processing device, the key vector generation unit 420 computes Formula 173 to generate a key vector $k^{*L+1,0}$ which is the first element of an (L+1)-th level secret key.

[Formula 173]

$$\sigma_{L+1,0} \xleftarrow{U} \mathbb{F}_q^{n-\mu_{L+1}+1} \quad (1)$$

$$k^*_{L+1,0} := k^*_{L,0}\sigma_{L+1,0}\left(\sum_{i=\mu_L}^{\mu_{L+1}-1} v_i k^*_{L,i}\right) \quad (2)$$

where $k^*_{L+1,0}$: first element of the (L+1)-th level secret key,
$k^*_{L,0}$: first element of the L-th level secret key,
$k^*_{L,i}$: j-th element of the L-th level secret key, and
$v_i(i=\mu_L, \ldots, \mu_{L+1}-1)$: predicate vector.

(S603: Key-Generation Vector $k^*_{L,j}$ Generation Step)

As with the second embodiment, using the processing device, the key-generation vector generation unit 430 computes Formula 174 to generate each key-generation vector $k^*_{L+1,j}$. The key-generation vector $k^*_{L+1,j}$ is the j-th element of the (L+1)-th level secret key.

[Formula 174]

$$(\sigma_{L+1,\mu_{L+1}}, \ldots, \sigma_{L+1,n-1}, \sigma_{L+1,n+2}, \sigma_{L+1,n+3}) \xleftarrow{U} \mathbb{F}_q^{n-\mu_{L+1}+1} \quad (1)$$

$$k^*_{L+1,j} := k^*_{L,j} + \sigma_{L+1,j}\left(\sum_{i=\mu_L}^{\mu_{L+1}-1} v_i k^*_{L,i}\right) \quad (2)$$

$$j = \mu_{L+1}, \mu_{L+1}+1, \ldots, n-1, n+2, n+3$$

where $k^*_{L+1,j}$: j-th element of the (L+1)-th level secret key,
$k^*_{L,j}$: j-th element of the L-th level secret key, and
$v_i(i=\mu_L, \ldots, \mu_{L+1}-1)$: predicate vector L-1.

Note that the key-generation vector generation unit 430 generates the key-generation vectors $k^*_{L+1,j}$ ($j=\mu_{L+1}, \ldots, n-1, n+2, n+3$). That is, the key-generation vector generation unit 140 differs from the key-generation vector generation unit 140 shown in FIG. 10 in that it generates the key-generation vectors $k^*_{L+1,n+2}$ and $k^*_{L+1,n+3}$.

To summarize, in (S602) and (S603), the key vector generation unit 420 and the key-generation vector generation unit 430 execute the Delegate$_L$ algorithm shown in Formula 175 to generate the (L+1)-th level secret key (key information $\vec{k}^*_{L+1}$) including the key vector $k^*_{L+1,0}$ and the key-generation vectors $k^*_{L+1,j}$.

[Formula 175]

$$\text{Delegate}_L(pk, \vec{k}^*_L, \vec{v}_{L+1} := (v_{\mu_L}, \ldots, v_{\mu_{L+1}-1})):$$

$$(\sigma_{L+1,0}, \sigma_{L+1,\mu_{L+1}}, \ldots, \sigma_{L+1,n-1}, \sigma_{L+1,n+2}, \sigma_{L+1,n+3}) \xleftarrow{U} \mathbb{F}_q^{n-\mu_{L+1}+1}$$

$$k^*_{L+1,j} := k^*_{L,j} + \sigma_{L+1,j}\left(\sum_{i=\mu_L}^{\mu_{L+1}-1} v_i k^*_{L,i}\right),$$

$$j = 0, \mu_{L+1}, \mu_{L+1}+1, \ldots, n-1, n+2, n+3$$

$$\vec{k}^*_{L+1} := (k^*_{L+1,0}, k^*_{L+1,\mu_{L+1}}, \ldots, k^*_{L+1,n-1}, k^*_{L+1,n+2}, k^*_{L+1,n+3}).$$

return $\vec{k}^*_{L+1}$.

(S604: Key Distribution Step)

As with the second embodiment, the key distribution unit 440 transmits the key information $\vec{k}^*_{L+1}$ generated by the key vector generation unit 420 and the key-generation vector generation unit 430 to the decryption device 300 of a lower level through the communication device.

As has been described, the cryptographic processing system 10 according to this embodiment implements the HPE scheme adapted from the HPKEM scheme described in the second embodiment. The HPE scheme described in this embodiment is a high security cryptographic scheme that is adaptively attribute-hiding against CCA.

The HPE scheme described above is constructed from the HPKEM scheme described in the second embodiment by applying the scheme discussed in Non-Patent Literature 7. A high security HPE scheme (that is adaptively attribute-hiding against CCA) may also be constructed from the HPKEM scheme described in the second embodiment by applying the scheme discussed in Non-Patent Literature 11. The Setup, GenKey, Enc, Dec, and Delegate$_L$ algorithms will be briefly described.

In the cryptographic processing system 10 in which the scheme discussed in Non-Patent Literature 11 is applied to the HPKEM scheme described in the second embodiment, the HPE scheme is implemented by using a secure one-time signature scheme. The term "secure" here means unforgeable. The definition of the secure one-time signature scheme is discussed in Non-Patent Literature 11. Thus, a brief explanation will be given here.

Let Sig:=($G_{sig}$, Sign, Vrfy) be a secure one-time signature scheme. Each of ($G_{sig}$, Sign, Vrfy) operates as described below.

$G_{sig}(1^\lambda)$ is a process that outputs keys (a verification key vk and a signature key sk) for authentication of $F_q$.

$\Sigma = \text{Sign}_{sk}(x)$ is a process that generates signature information $\Sigma$ for data x by the signature key sk.

$\text{Vrfy}_{vk}(x, \Sigma)$ is a process that returns 1 if the signature information $\Sigma$ is the valid signature information generated for the data x by the signature key sk, and returns 0 if the signature information $\Sigma$ is not the valid signature information.

Formula 176 shows the Setup algorithm.

[Formula 176]

$$\text{Setup}(1^\lambda, \vec{\mu} := (n, d; \mu_1, \ldots, \mu_d)):$$

$$N := n+4, (V, V^*, G_T, A, A^*, q) \xleftarrow{R} G_{ddvs}(1^\lambda, N),$$

$$X := (x_{i,j}) \xleftarrow{U} GL(N, F_q), b_i = \sum_{j=0}^{N-1} x_{i,j} a_j, B := (b_0, \ldots, b_{N-1}).$$

$$(v_{i,j}) := (x^T)^{-1}, b_i^* = \sum_{j=0}^{N-1} v_{i,j} a_j^*, B^* := (b_0^*, \ldots, b_{N-1}^*),$$

$$sk := B^*, pk := (1^\lambda, \vec{\mu}, V, V^*, G_T, A, A^*, q, B).$$

return sk, pk.

Formula 177 shows the GenKey algorithm.

[Formula 177]

$$\text{GenKey}(pk, sk, \vec{v}_1 := (v_0, \ldots, v_{\mu_1-1})):$$

$$(\sigma_{1,0}, \sigma_{1,\mu_1}, \ldots, \sigma_{1,n-1}, \sigma_{1,n+2}, \sigma_{1,n+3}) \xleftarrow{U} F_q^{n-\mu_1+1}$$

$$k_{1,0}^* := \sigma_{1,0}\left(\sum_{i=0}^{\mu_1-1} v_i b_i^*\right) + b_n^*,$$

$$k_{1,j}^* := \sigma_{1,j}\left(\sum_{i=0}^{\mu_1-1} v_i b_i^*\right) + b_j^*,$$

$$j = \mu_1, \mu_1+1, \ldots, n-1, n+2, n+3,$$

$$\vec{k}_1^* := (k_{1,0}^*, k_{1,\mu_1}^*, \ldots, k_{1,n-1}^*, k_{1,n+2}^*, k_{1,n+3}^*).$$

return $\vec{k}_1^*$.

Formula 178 shows the Enc algorithm.

[Formula 178]

$$\text{Enc}(pk, m, \vec{x} :=$$

$$(\vec{x}_1, \ldots, \vec{x}_L) := ((x_0, \ldots, x_{\mu_1-1}), \ldots, (x_{\mu_{L-1}}, \ldots, x_{\mu_L-1})):$$

$$(vk, sk) := G_{Sig}(1^\lambda)(vk \in F_q),$$

$$(\vec{x}_{L+1}, \ldots, \vec{x}_d) \xleftarrow{U} F_q^{\mu_{L+1}-\mu_L} \times \ldots \times F_q^{n-\mu_{d-1}},$$

$$(\rho, \delta_1, \ldots, \delta_d, \delta_{n+1}, \delta_{n+2}) \xleftarrow{U} F_q^{d+3},$$

-continued $$c := \delta_1\left(\sum_{i=0}^{\mu_1-1} x_i b_i\right) + \ldots + \delta_d\left(\sum_{i=\mu_{d-1}}^{n-1} x_i b_i\right) +$$

$$mb_n + \delta_{n+1} b_{n+1} + \delta_{n+2}(b_{n+2} + vk \cdot b_{n+3}).$$

$$\Sigma := \text{Sign}_{sk}(c)$$

return $(c, vk, \Sigma)$.

Formula 179 shows the Dec algorithm.

[Formula 179]

$$\text{Dec}(pk, k_{L,0}^*, k_{L,n+2}^*, k_{L,n+3}^*, (c, vk, \Sigma)):$$

$$\text{Vrfy}_{vk}(c, \Sigma) = 1?$$

$$\tilde{\sigma} \xleftarrow{U} F_q, \tilde{k}_{L,0}^* := k_{L,0}^* + \tilde{\sigma}(vk \cdot k_{L,n+2}^* - k_{L,n+3}^*),$$

$$g := e(b_n, \tilde{k}_{L,0}^*), f := e(c, \tilde{k}_{L,0}^*),$$

$$D\log_g(f) \in msg?$$

$m' := D\log_g(f)$ if both checks are passed;

$m' := \bot$ otherwise, return $m'$.

Formula 180 shows the Delegate$_L$ algorithm.

[Formula 180]

$$\text{Delegate}_L(pk, \vec{k}_L^*, \vec{v}_{L+1} := (v_{\mu_L}, \ldots, v_{\mu_{L+1}-1})):$$

$$(\sigma_{L+1,0}, \sigma_{L+1,\mu_{L+1}}, \ldots, \sigma_{L+1,n-1}, \sigma_{L+1,n+2}, \sigma_{L+1,n+3}) \xleftarrow{U} F_q^{n-\mu_{L+1}+1}$$

$$k_{L+1,j}^* := k_{L,j}^* + \sigma_{L+1,j}\left(\sum_{i=\mu_L}^{\mu_{L+1}-1} v_i k_{L,i}^*\right),$$

$$j = 0, \mu_{L+1}, \mu_{L+1}+1, \ldots, n-1, n+2, n+3$$

$$\vec{k}_{L+1}^* := (k_{L+1,0}^*, k_{L+1,\mu_{L+1}}^*, \ldots, k_{L+1,n-1}^*, k_{L+1,n+2}^*, k_{L+1,n+3}^*).$$

return $\vec{k}_{L+1}^*$.

The above-described HPE scheme that is adaptively attribute-hiding against CCA may be modified to an HPKEM scheme by replacing the message m in the Enc algorithm with a random number rn and changing the output of the Dec algorithm to K'.

For example, the HPE scheme constructed from the HPKEM scheme described in the second embodiment by applying the scheme discussed in Non-Patent Literature 7 may be modified to an HPKEM scheme by constructing the Enc and Dec algorithms as shown in Formulas 181 and 182.

[Formula 181]

$$\text{Enc}(pk, \vec{x} :=$$

$$(\vec{x}_1, \ldots, \vec{x}_L) := ((x_0, \ldots, x_{\mu_1-1}), \ldots, (x_{\mu_{L-1}}, \ldots, x_{\mu_L-1})):$$

$$(\vec{x}_{L+1}, \ldots, \vec{x}_d) \xleftarrow{U} F_q^{\mu_{L+1}-\mu_L} \times \ldots \times F_q^{n-\mu_{d-1}},$$

$$(\rho, \delta_1, \ldots, \delta_d, \delta_{n+1}, \delta_{n+2}) \xleftarrow{U} F_q^{d+3},$$

$$(r, com, dec) \xleftarrow{R} S_{enc}(1^\lambda, pub)$$

-continued $$c_1 := \delta_1 \left( \sum_{i=0}^{\mu_1-1} x_i b_i \right) + \ldots +$$

$$\delta_d \left( \sum_{i=\mu_{d-1}}^{n-1} x_i b_i \right) + \rho b_n + \delta_{n+1} b_{n+1} + \delta_{n+2} (b_{n+2} + comb_{n+3}),$$

$K := u\rho.$ $c_2 := SE_{KDF(K)}(rn, dec), c_3 := com, c_4 := Mac_r(c_1, c_2),$ return $(c_1, c_2, c_3, c_4)$.

[Formula 182]

$Dec(pk, k_{L,0}^*, k_{L,n+2}^*, k_{L,n+3}^*, (c_1, c_2, c_3, c_4)):$ $\tilde{\sigma} \xleftarrow{U} \mathbb{F}_q, \tilde{k}_{L,0}^* := k_{L,0}^* + \tilde{\sigma}(c_3 k_{L,n+2}^* - k_{L,n+3}^*),$ $K' := e(c_1, \tilde{k}_{L,0}^*), (rn, dec') := SD_{KDF(K')}(c_2),$ $r' := \mathcal{R}_{enc}(pub, c_3, dec')$ Check $r' \neq \perp ? \land Vrfy_{r'}((c_1, c_2), c_4) = 1?$ return $K'$ if both checks are passed; $\perp$ otherwise.

There is no need to modify the Setup, GenKey, and Delegate$_L$ algorithms. In the above description, the random number rn is used in place of the message m. The HPE scheme can also be modified to an HPKEM scheme by simply eliminating the message m in the Enc algorithm, that is, by not using m in the computation of data c2.

The HPE scheme constructed from the HPKEM scheme described in the second embodiment by applying the scheme discussed in Non-Patent Literature 11 can be readily modified to an HPKEM scheme simply by constructing the Enc algorithm such that it generates the cipher vector c by embedding transmission information ρ in place of the message m, and constructing the Dec algorithm such that it extracts information $u^\rho$ concerning the transmission information ρ.

Fifth Embodiment

In this embodiment, security of the HPE scheme described in the fourth embodiment will be described.

In this embodiment, a correctness property of the HPE scheme will be described first. Then, as a criterion of safety, a definition of adaptively attribute-hiding against chosen ciphertext attacks (CCA) will be given. Then, it will be described that the HPE scheme described in the fourth embodiment is adaptively attribute-hiding against CCA.

<Correctness Property of an HPE Scheme>

An HPE scheme is required to satisfy a condition shown in Formula 183.

[Formula 183]

$(sk, pk) \xleftarrow{R} Setup(1^\lambda),$ $sk_{(\vec{v}_1, \ldots, \vec{v}_{L_v})} \xleftarrow{R} Derive_{L_v}(pk, sk, (\vec{v}_1, \ldots, \vec{v}_{L_v})),$ $c \xleftarrow{R} Enc(pk, m, (\vec{x}_1, \ldots, \vec{x}_{L_x})), m' := Dec\left(pk, sk_{(\vec{v}_1, \ldots, \vec{v}_{L_v})}, c\right)$ If $f_{(\vec{v}_1, \ldots, \vec{v}_{L_v})}(\vec{x}_1, \ldots, \vec{x}_{L_v}) = 1,$ then $m' = m.$ If $f_{(\vec{v}_1, \ldots, \vec{v}_{L_v})}(\vec{x}_1, \ldots, \vec{x}_{L_v}) \neq 1,$ then $m' \neq m$ for negligible probability.

Derive$_{L_v}$ (where Lv=L$_v$) is defined, as described above, by using GenKey and Delegate$_i$.

<Definition of Adaptively Attribute-Hiding Against CCA>

An HPE scheme for hierarchical predicates F over hierarchical attributes E is adaptively attribute-hiding against CCA if for all probabilistic polynomial-time adversaries A, the advantage of A in the following experiment (adaptively attribute-hiding game against CCA) is negligible in a security parameter.

(Experiment: Adaptively Attribute-Hiding Game Against CCA)

1. The Setup algorithm is run to generate a master public key pk and a master secret key sk. The master public key pk is given to an adversary A.

2. The adversary A may adaptively request keys corresponding to vectors shown in Formula 184.

[Formula 184]

$\left(\vec{v}_1^{(k)}, \ldots, \vec{v}_{L_v^{(k)}}^{(k)}\right) k = 1, \ldots, v_1, 1 \leq L_v^{(k)} \leq d$ In response to this request, the adversary A is given corresponding keys shown in Formula 185.

[Formula 185]

$sk_{\left(\vec{v}_1^{(k)}, \ldots, \vec{v}_{L_v^{(k)}}^{(k)}\right)} \xleftarrow{R} Derive_{L_v^{(k)}}^{(k)}\left(pk, sk, \left(\vec{v}_1^{(k)}, \ldots, \vec{v}_{L_v^{(k)}}^{(k)}\right)\right)$ 3. The adversary may query a ciphertext c and attribute vectors shown in Formula 186 to adaptively request to decrypt the ciphertext c associated with the attribute vectors.

$(\vec{x}_1, \ldots \vec{x}_{L_X})$ [Formula 186]

In response to this request, the adversary A is given a message m' shown in Formula 187.

[Formula 187]

$m' \xleftarrow{R} Dec\left(pk, sk_{(\vec{v}_1, \ldots, \vec{v}_{L_v})}, c\right)$ where $(\vec{v}_1, \ldots \vec{v}_{L_v})$ denotes the predicate such that $f_{(\vec{v}_1, \ldots, \vec{v}_{L_v})}(\vec{x}_1, \ldots, \vec{x}_{L_X}) = 1.$ 4. The adversary A outputs Formula 189, subject to restrictions shown in Formula 188.

[Formula 188]

If $\tau = 0$, for all $k$, $f_{\left(\vec{v}_1^{(k)}, \ldots, \vec{v}_{L_v}^{(k)}\right)}\left(\vec{x}_1^{(0)}, \ldots, \vec{x}_{L_x}^{(0)}\right) = f_{\left(\vec{v}_1^{(k)}, \ldots, \vec{v}_{L_v}^{(k)}\right)}\left(\vec{x}_1^{(1)}, \ldots, \vec{x}_{L_x}^{(1)}\right) = 0$ If $\tau=1$, there exists a nonempty set $T \subset \{1, \ldots, v\}$,
For any $k \in T$, $f_{\left(\vec{v}_1^{(k)}, \ldots, \vec{v}_{L_v}^{(k)}\right)}\left(\vec{x}_1^{(0)}, \ldots, \vec{x}_{L_x}^{(0)}\right) = f_{\left(\vec{v}_1^{(k)}, \ldots, \vec{v}_{L_v}^{(k)}\right)}\left(\vec{x}_1^{(1)}, \ldots, \vec{x}_{L_x}^{(1)}\right) = 1,$ For any $k \notin T$, $$f_{(\vec{v}_1^{(k)},\ldots,\vec{v}_{L_V}^{(k)})}(\vec{x}_1^{(0)},\ldots,\vec{x}_{L_x}^{(0)}) = f_{(\vec{v}_1^{(k)},\ldots,\vec{v}_{L_V}^{(k)})}(\vec{x}_1^{(1)},\ldots,\vec{x}_{L_x}^{(1)}) = 0$$

$$\bullet m^{(0)} = m^{(1)}$$

[Formula 189]

$$m^{(0)}, m^{(1)}, (\vec{x}_1^{(0)},\ldots,\vec{x}_{L_{(0)}^x}^{(0)}), (\vec{x}_1^{(1)},\ldots,\vec{x}_{L_{(1)}^x}^{(1)}), \tau$$

5. A random bit $\theta$ is chosen, and the adversary A is given $c_\theta$ shown in Formula 190.

$$c_\theta \xleftarrow{R} Enc\left(pk, m^{(\theta)}, \left(\vec{x}_1^{(\theta)},\ldots,\vec{x}_{L_X^{(\theta)}}^{(\theta)}\right)\right)$$ [Formula 190]

6. The adversary A may continue to request keys for vectors shown in Formula 191, subject to the restrictions given above.

$$\left(\vec{v}_1^{(k)},\ldots,\vec{v}_{L_V^{(k)}}^{(k)}\right) k = v_1 + 1, \ldots, v, 1 \le L_V^{(k)} \le d$$ [Formula 191]

7. The adversary A may query a ciphertext c and attribute vectors shown in Formula 192 to adaptively request to decrypt the ciphertext c associated with the attribute vectors.

$$(\vec{x}_1,\ldots,\vec{x}_{L_X})$$ [Formula 192]

where $$(c, \vec{x}_1, \ldots \vec{x}_{L_X}) \ne (c, \vec{x}_1^{(0)},\ldots,\vec{x}_{L_{(0)}^x}^{(0)}) \text{ and }$$

$$(c, \vec{x}_1, \ldots \vec{x}_{L_X}) \ne (c, \vec{x}_1^{(1)},\ldots,\vec{x}_{L_{(1)}^x}^{(1)}).$$

8. The adversary A outputs a bit $\theta'$, and succeeds if $\theta'=\theta$.

Here, the advantage of the adversary A is defined as Formula 193.

$$Adv_A^{HPE,CPA}(\lambda):=|Pr[\theta'=\theta]-½|$$ [Formula 193]

<Safety of the HPE Scheme Described in the Fourth Embodiment>

It will be described that the HPE scheme described in the fourth embodiment using the scheme discussed in Non-Patent Literature 7 is adaptively attribute-hiding against CCA.

The description to be given here is based on the proof discussed in Non-Patent Literature 7. Thus, an outline of adaptively attribute-hiding against CCA will be described here.

Given an adversary A attacking the HPE scheme in the adaptively attribute-hiding game against CCA described above, an adversary A' is constructed, the adversary A' attacking the HPE scheme with (n+2)-dimensional inner-product predicates in the adaptively attribute-hiding game against CPA described above. The Setup, GenKey, and Delegate$_L$ algorithms are the same as those for the above HPE scheme (i.e., a (n+2)-dimensional subspace for inner-product predicates is $<b_0, \ldots, b_{n-1}, b_{n+2}, b_{n+3}>$) except for a format of hierarchy $\vec{\mu}_{HPKEM}$ for the HPKEM scheme. The format of hierarchy $\vec{\mu}_{HPKEM}$ for the HPKEM scheme is $\vec{\mu}_{HPKEM}:=$(n, d; $\mu_1, \ldots, \mu_d, \mu_d+2$) with d+1 levels, while a format of hierarchy $\vec{\mu}_{HPE}$ for the HPE scheme is $\vec{\mu}_{HPE}:=$(n, d; $\mu_1, \ldots, \mu_d$) with d levels.

The adversary A' is defined as follows:

1. A public key $pk_{HPKEM}:=(\vec{\mu}_{HPKEM}, V, V^*, GT, A, A^*, q, B)$ of the HPKEM scheme is given to the adversary A'. The adversary A'($1^\lambda$) runs Setup$_{enc}$($1^\lambda$) to generate pub, sets the public key pk:=($pk_{HPKEM}$, pub) of the HPE scheme and gives it to the adversary A.

2. If the adversary A submits vectors shown in Formula 194 to its key query oracle (see the definition of adaptively attribute-hiding against CCA), the adversary A' submits the vectors shown in Formula 194 to its key query oracle (see the definition of adaptively attribute-hiding against CPA). A reply is returned to the adversary A.

$$\left(\vec{v}_1^{(k)},\ldots,\vec{v}_{L_V^{(k)}}^{(k)}\right)$$ [Formula 194]

3. If the adversary A submits ciphertexts ($c_1, c_2, c_3, c_4$) along with attribute vectors ($\vec{x}_1, \ldots, \vec{x}_L$) to its decryption oracle, the adversary A' performs the following (1) to (3):

(1) The adversary A' computes predicate vectors shown in Formula 195.

Predicate vector $(\vec{v}_1,\ldots,\vec{v}_L)$ such that $\vec{v}_j \cdot \vec{x}_j = 0$ for $j=1,\ldots,L$ [Formula 195]

(2) The adversary A' submits vectors (with d+1 levels) shown in Formula 196 to its key query oracle (see the definition of adaptively attribute-hiding against CPA), and is replied with $k^*_{d+1, 0}$.

$$(\vec{v}_1,\ldots\vec{v}_L,\vec{0},\ldots,\vec{0},(c_3,-1))$$ [Formula 196]

(3) The adversary A' sets Formula 197.

$$\tilde{k}^*_{L,0}:=k^*_{d+1,0}$$ [Formula 197]

The adversary A' also computes Dec ($k^*_{L, 0}, k^*_{L, n+2}, k^*_{L, n+3}, (c_1, c_2, c_3, c_4)$), where Dec ($k^*_{L, 0}, k^*_{L, n+2}, k^*_{L, n+3}, (c_1, c_2, c_3, c_4)$) is the Dec algorithm of the HPE scheme. In the computation of Dec ($k^*_{L, 0}, k^*_{L, n+2}, k^*_{L, n+3}, (c_1, c_2, c_3, c_4)$), a value of Formula 198 is directly used in place of a value computed from $k^*_{L, 0}, k^*_{L, n+2}, k^*_{L, n+3}$. A result is returned to the adversary A.

$$\tilde{k}^*_{L,0}$$ [Formula 198]

4. If the adversary A outputs Formula 199, the adversary A' selects B as shown in Formula 200.

$$m^{(0)}, m^{(1)}, (\vec{x}_1^{(0)},\ldots,\vec{x}_{L_X^{(0)}}^{(0)}), (\vec{x}_1^{(1)},\ldots,\vec{x}_{L_X^{(1)}}^{(1)}), \tau$$ [Formula 199]

$$\theta \xleftarrow{U} \{0, 1\}$$ [Formula 200]

The adversary A' computes Formula 201. The Enc algorithm shown in Formula 201 is the Enc algorithm of the HPE scheme. The adversary A' returns ($c^{(\theta)}_1, c^{(\theta)}_2, c^{(\theta)}_3, c^{(\theta)}_4$) to the adversary A.

$$(c_1^{(\theta)}, c_2^{(\theta)}, c_3^{(\theta)}, c_4^{(\theta)}) := Enc\left(pk, m^{(\theta)}, \left(\vec{x}_1^{(\theta)},\ldots,\vec{x}_{L_X^{(\theta)}}^{(\theta)}\right)\right)$$ [Formula 201]

5. If the adversary A submits vectors shown in Formula 202 to its key query oracle (see the definition of adaptively attribute-hiding against CCA), the adversary A' executes the same process as step 2.

$$\left(\vec{v}_1^{(k)}, \ldots, \vec{v}_{L_V^{(k)}}^{(k)}\right)$$ [Formula 202]

6. If the adversary A submits the ciphertexts $(c_1, c_2, c_3, c_4)$ along with the attribute vectors $(\vec{x}_1, \ldots, \vec{x}_L)$ to its decryption oracle, the adversary A' performs the following (1) or (2):
   (1) If $c_3 = c^{(\theta)}_3$, the adversary A' returns a distinguished symbol $\perp$.
   (2) If $c_3 \ne c^{(\theta)}_3$, the adversary A' executes the same process as step 3.
7. Finally, the adversary A outputs a guess $\theta'$. The adversary A' outputs the same guess.

Formula 203 can be proved in the same manner as that discussed in Non-Patent Literature 7.

$$|\mathrm{Adv}\, \mathcal{A}^{HPKEM,CPA}(\lambda) - \mathrm{Adv}\, \mathcal{A}^{HPE,CCA}(\lambda)| < \epsilon(\lambda)$$ [Formula 203]

Sixth Embodiment

In this embodiment, a cryptographic process modified to provide a higher level of security than the cryptographic processes described in the above embodiments will be described. The cryptographic process to be described in this embodiment is adaptively attribute-hiding against CPA, as with the cryptographic process described in the second embodiment, and is modified to provide a higher level of security. A cryptographic process that is adaptively attribute-hiding against CCA, as with the fourth embodiment, and is modified to provide a higher level of security will be described in a subsequent embodiment.

First, a notion of "n copies of vector spaces" to be used for providing a higher level of security will be described. Then, based on the n copies of vector spaces, the cryptographic process modified to provide a higher level of security will be described. It is the HPE scheme that will be described here, but an HPKEM scheme can also be implemented.

In the HPE scheme according to this embodiment, the n copies of vector spaces are used as well as a plurality of random numbers which are not used in the HPE schemes according to the above embodiments.

<n Copies of Vector Spaces>

In the above embodiments, the cryptographic processes are implemented in one pair of dual orthonormal bases composed of the basis B generated from the canonical basis A of the space V and the basis B* generated from the canonical basis A* of the space V. The cryptographic process according to this embodiment is implemented in n pairs of dual orthonormal bases composed of bases $(B^{[0]}, \ldots, B^{[n-1]})$ and bases $(B^{[0]*}, \ldots, B^{[n-1]*})$.

Figure 26:
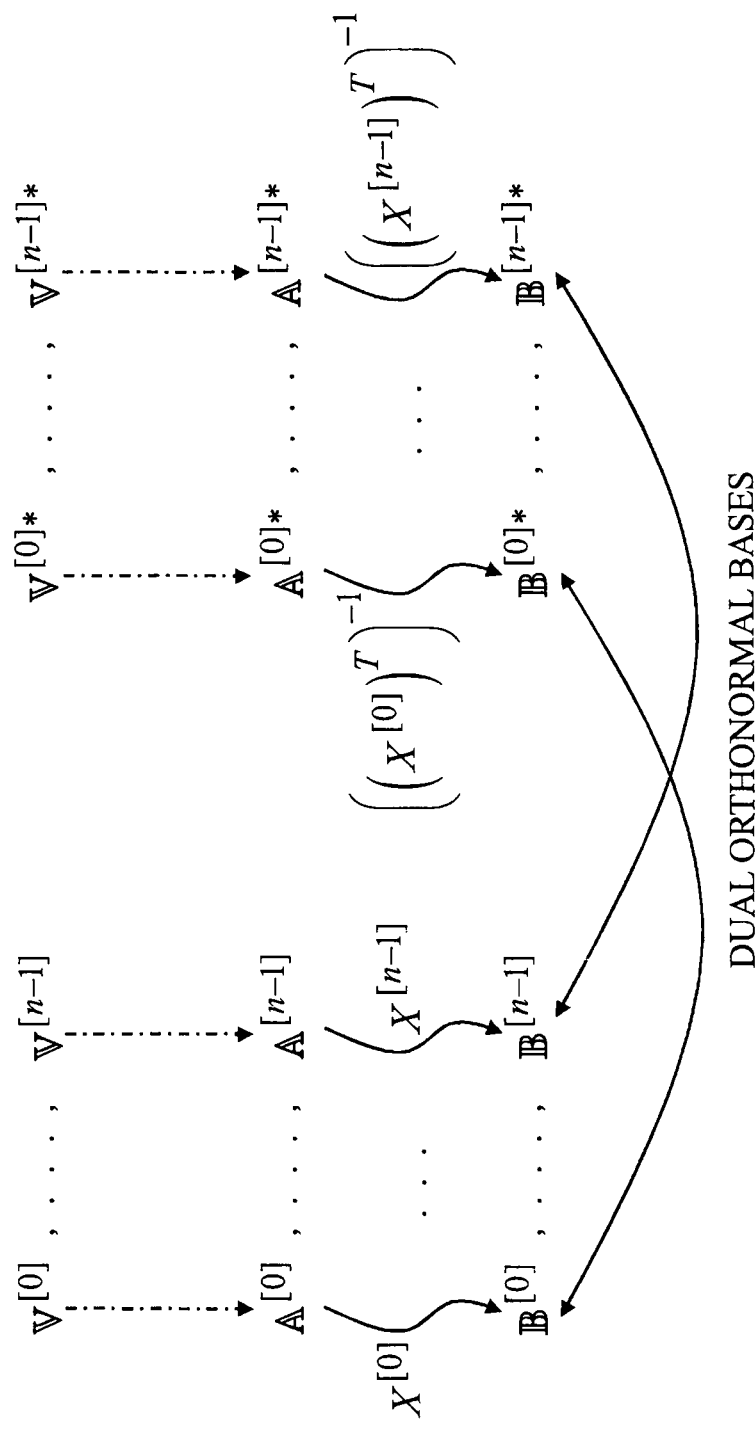
FIG. 26 is a diagram (1) for explaining n copies of vector spaces.
Figure 27:
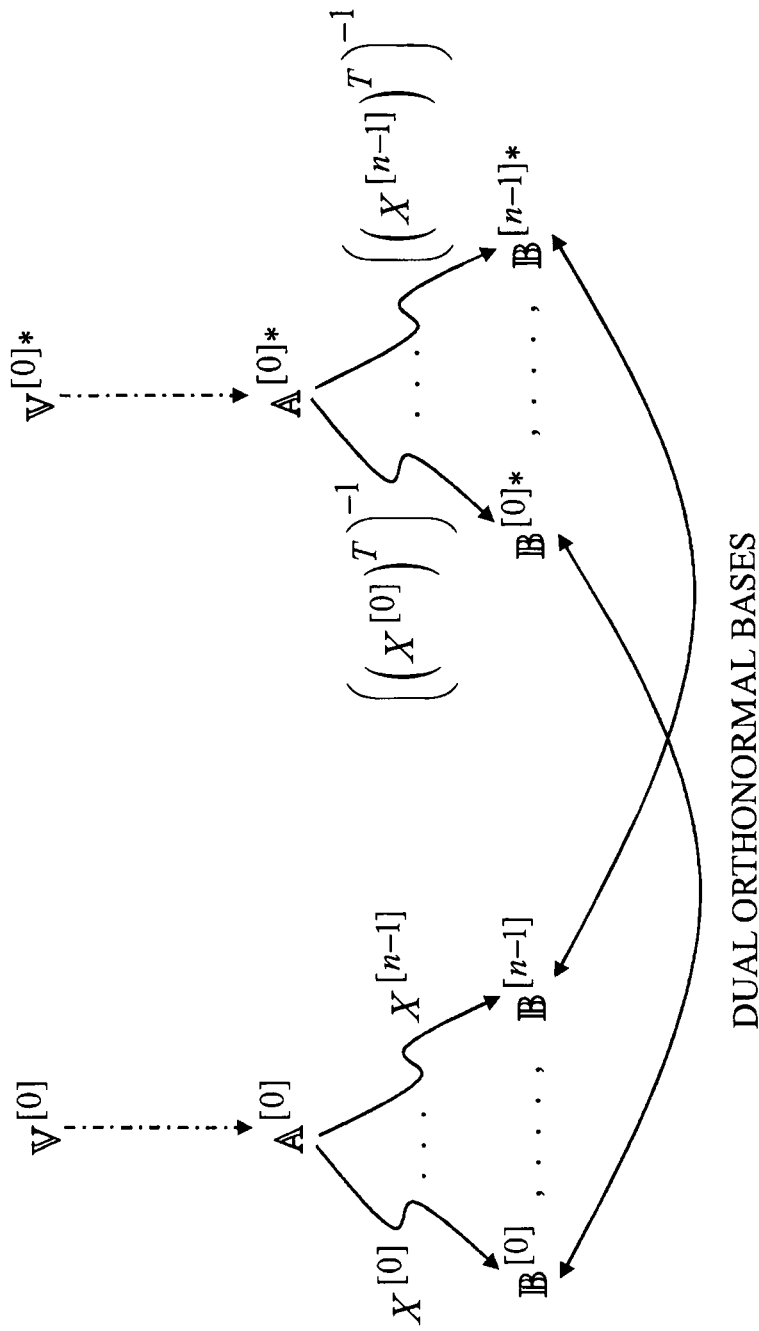
FIG. 27 is a diagram (2) for explaining n copies of vector spaces.

FIGS. 26 and 27 are diagrams for explaining the n copies of vector spaces.

As shown in FIG. 26, there exist n pairs of dual vector spaces $(V^{[0]}, \ldots, V^{[n-1]})$ and $(V^{[0]*}, \ldots, V^{[n-1]*})$. Then, there exist canonical bases $(A^{[0]}, \ldots, A^{[n-1]})$ and $(A^{[0]*}, \ldots, A^{[n-1]*})$ of the spaces $(V^{[0]}, \ldots, V^{[n-1]})$ and $(V^{[0]*}, \ldots, V^{[n-1]*})$. Each pair of the bases $A^{[t]}$ (t=0, ..., n-1) and $A^{[t]*}$(t=0, ..., n-1) constitutes dual orthonormal bases. That is, the bases $A^{[0]}$ and $A^{[0]*}$ are dual orthonormal bases, the bases $A^{[1]}$ and $A^{[1]*}$ are dual orthonormal bases, ..., and the bases $A^{[n-1]}$ and $A^{[n-1]*}$ are dual orthonormal bases. Bases $(B^{[0]}, \ldots, B^{[n-1]})$ and $(B^{[0]*}, \ldots, B^{[n-1]*})$ are generated from the canonical bases $(A^{[0]}, \ldots, A^{[n-1]})$ and $(A^{[0]*}, \ldots, A^{[n-1]*})$. To generate the bases $(B^{[0]}, \ldots, B^{[n-1]})$ from the canonical bases $(A^{[0]}, \ldots, A^{[n-1]})$, linear transformations) $X^{[t]}$ (t=0, ..., n-1) are used. On the other hand, to generate the bases $(B^{[0]*}, \ldots, B^{[n-1]*})$ from the canonical bases $(A^{[0]*}, \ldots, A^{[n-1]*})$, $((X^{[t]})^T)^{-1}$ (t=0, ..., n-1) generated from the linear transformations) $X^{[t]}$ (t=0, ..., n-1) are used. As a result, each pair of the bases $B^{[t]}$ (t=0, ..., n-1) and $B^{[t]*}$ (t=0, ..., n-1) constitutes dual orthonormal bases. That is, the bases $B^{[0]}$ and $B^{[0]*}$ are dual orthonormal bases, the bases $B^{[1]}$ and $B^{[1]*}$ are dual orthonormal bases, ..., and the bases $B^{[n-1]}$ and $B^{[n-1]*}$ are dual orthonormal bases.

The cryptographic process is implemented here, as shown in FIG. 27, by generating the n number of bases $(B^{[0]}, \ldots, B^{[n-1]})$ and $(B^{[0]*}, \ldots, B^{[n-1]*})$ respectively from the canonical bases A and A* of one pair of dual spaces V and V*. In this way, even when the n number of bases $(B^{[0]}, \ldots, B^{[n-1]})$ and $(B^{[0]*}, \ldots, B^{[n-1]*})$ are respectively generated, each basis $B^{[t]}$ (t=0, ..., n-1) and each basis $B^{[t]*}$ (t=0, ..., n-1) constitute dual orthonormal bases.

<Cryptographic Process>

The cryptographic processing system 10 that implements the HPE scheme with a higher level of security using the above-described n-copies of vector spaces will be described.

Referring to FIGS. 28 to 32, functions and operations of the cryptographic processing system 10 will be described.

Figure 28:
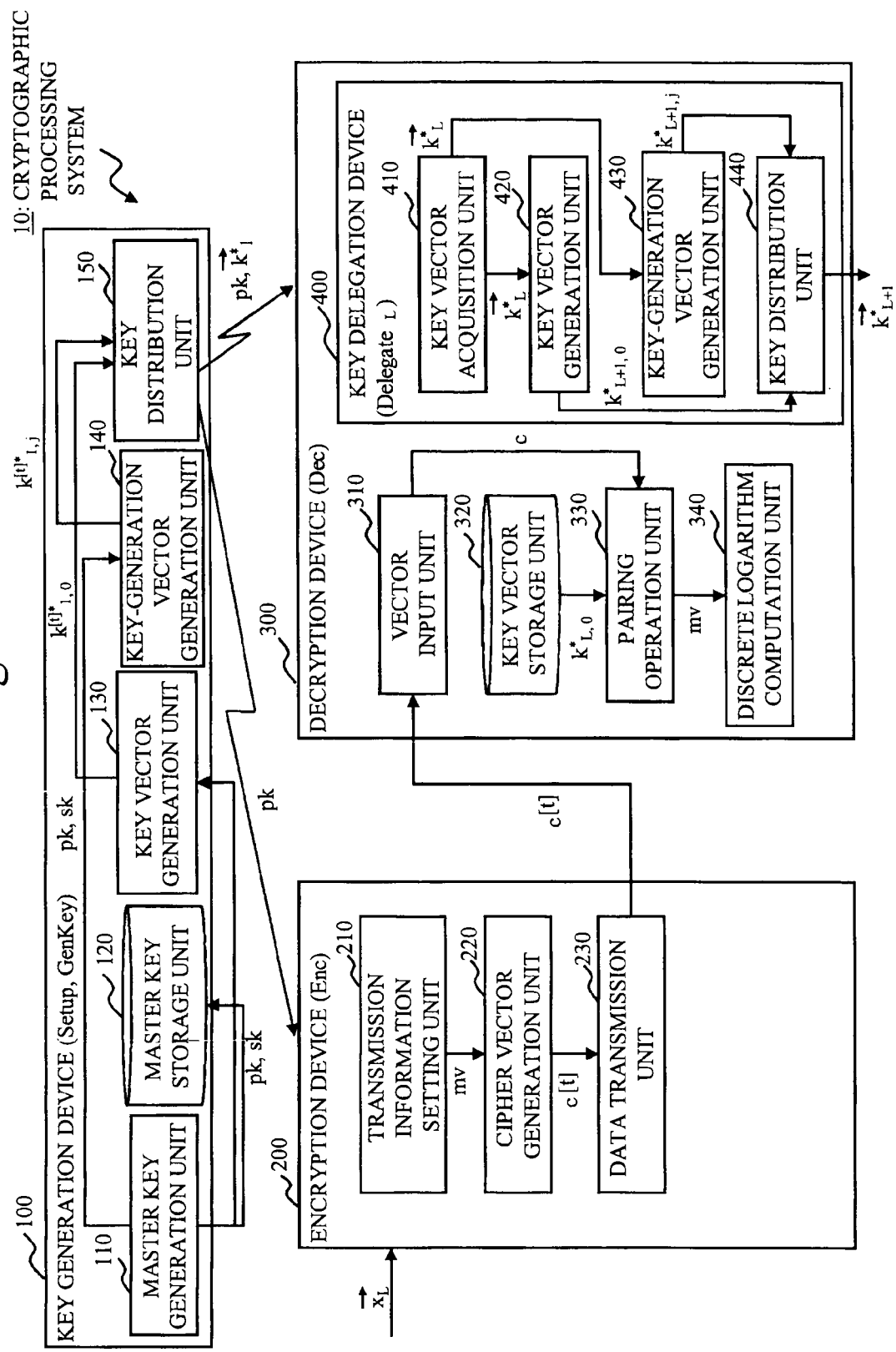
FIG. 28 is a functional block diagram showing functions of the cryptographic processing system 10 according to a sixth embodiment.

FIG. 28 is a functional block diagram showing the functions of the cryptographic processing system 10 that implements the HPE scheme with a higher level of security using the n copies of vector spaces. The cryptographic processing system 10 includes the key generation device 100, the encryption device 200, the decryption device 300, and the key delegation device 400, as with the cryptographic processing system 10 according to the second embodiment. It is also assumed in this embodiment that the decryption device 300 includes the key delegation device 400.

Figure 29:
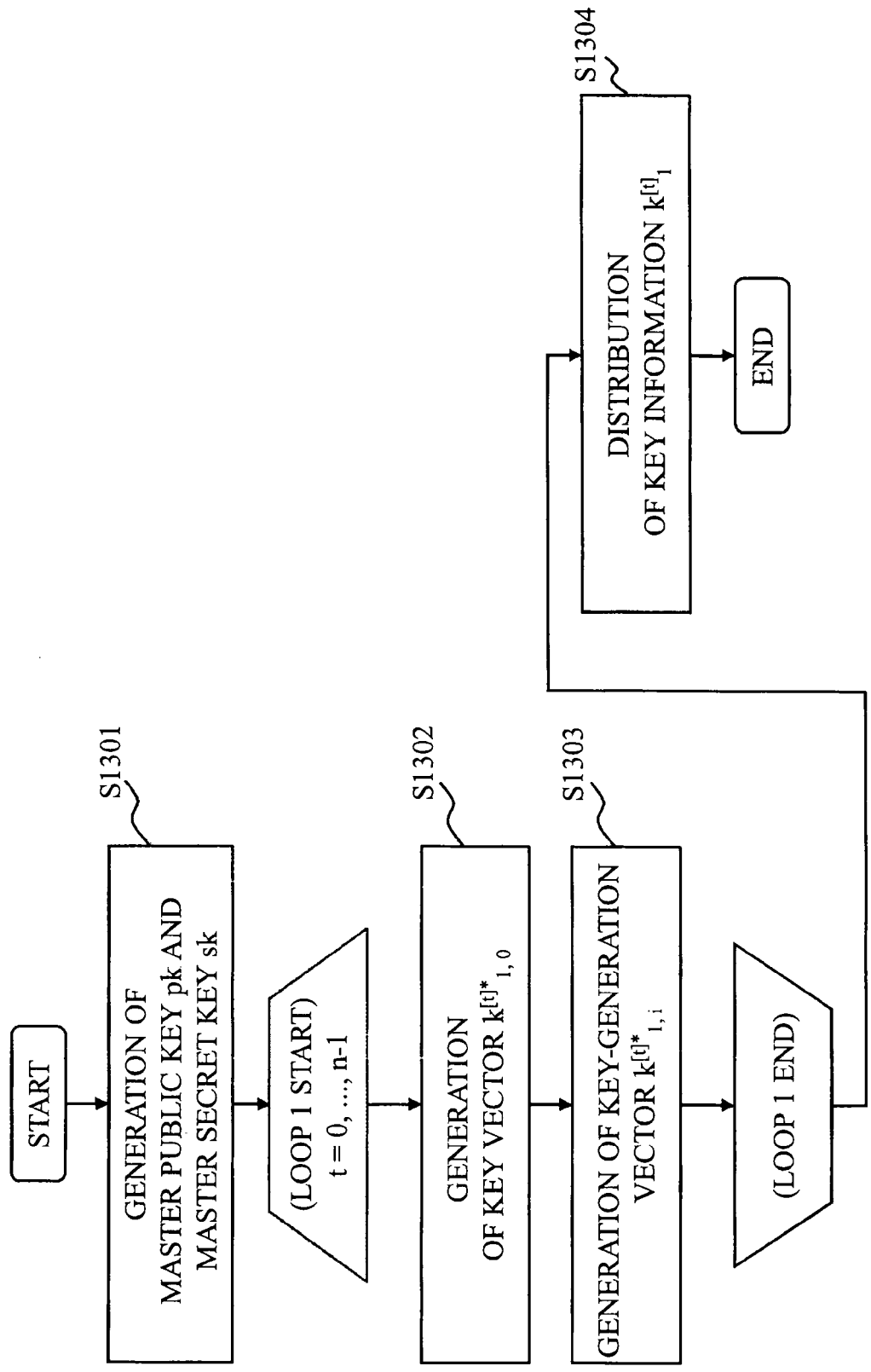
FIG. 29 is a flowchart showing operations of the key generation device 100.
Figure 30:
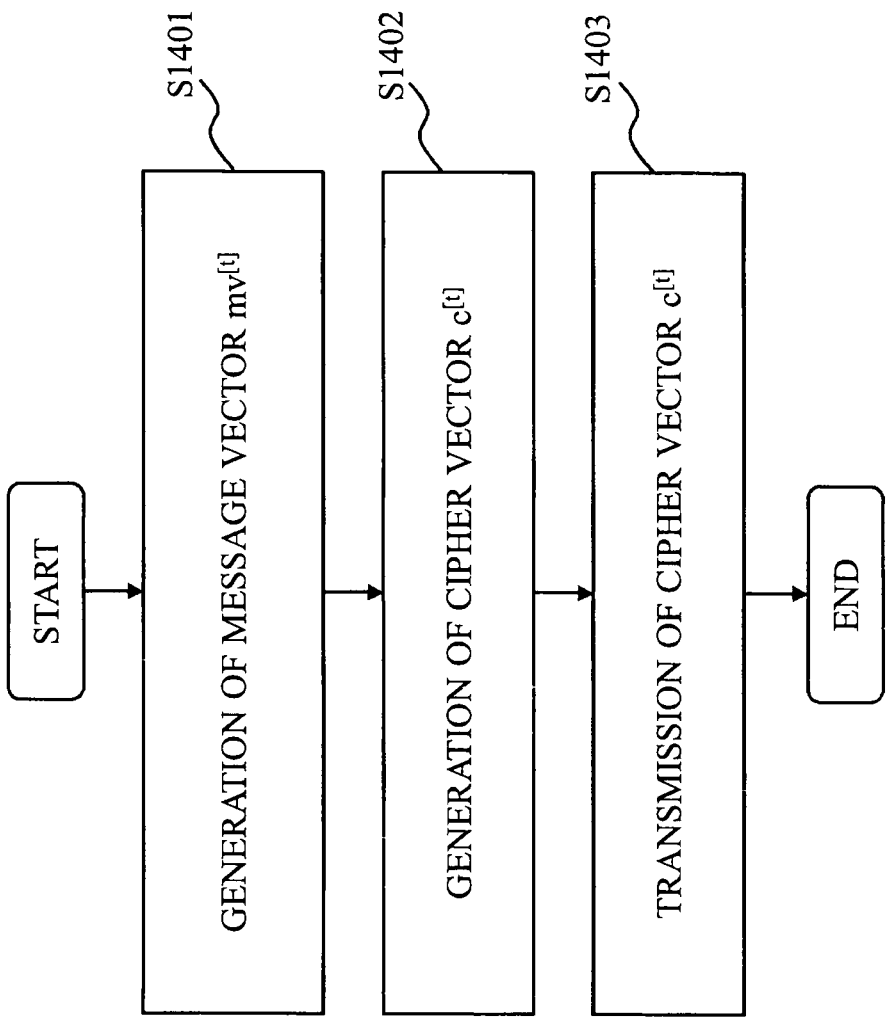
FIG. 30 is a flowchart showing operations of the encryption device 200.
Figure 31:
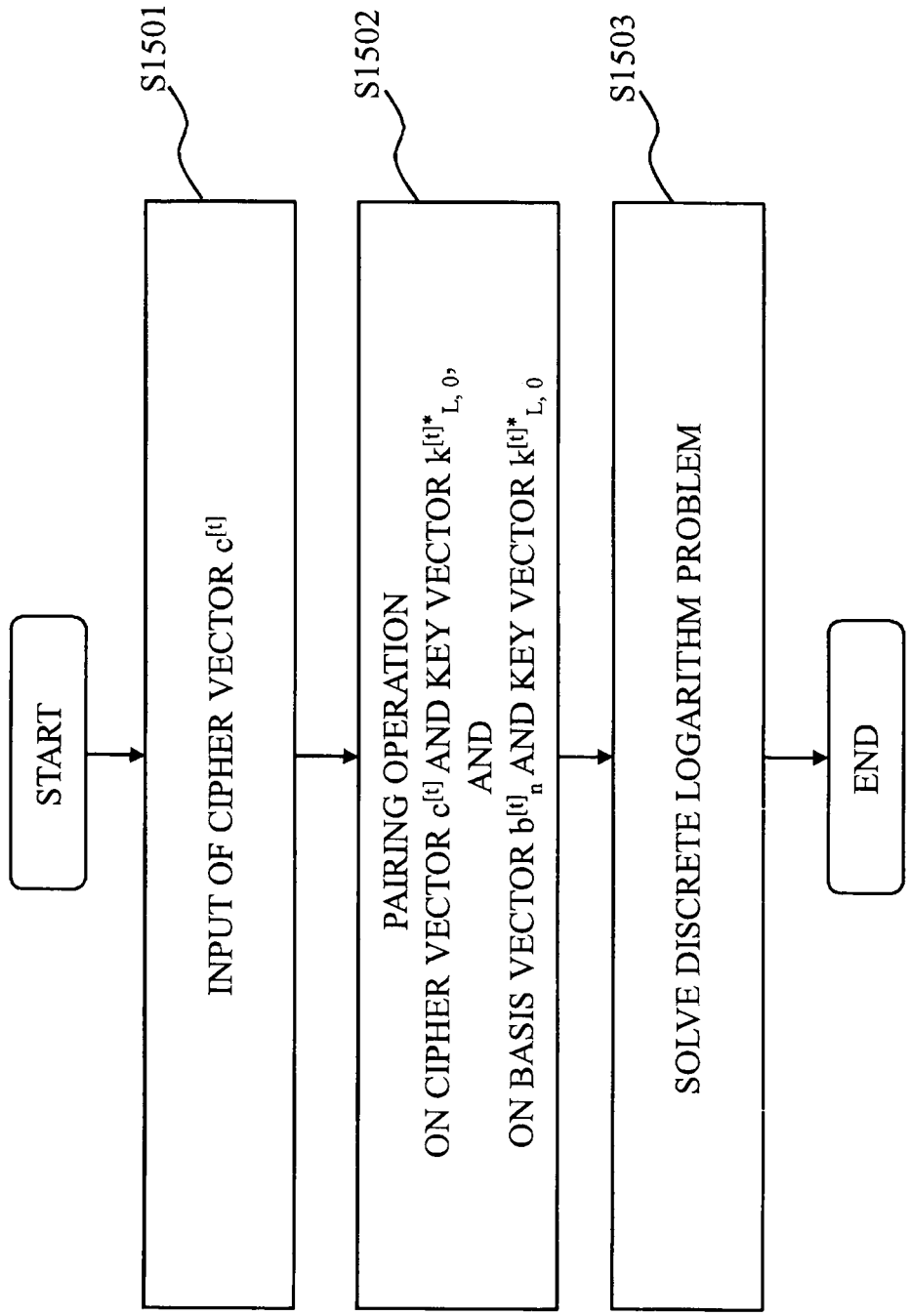
FIG. 31 is a flowchart showing operations of the decryption device 300.
Figure 32:
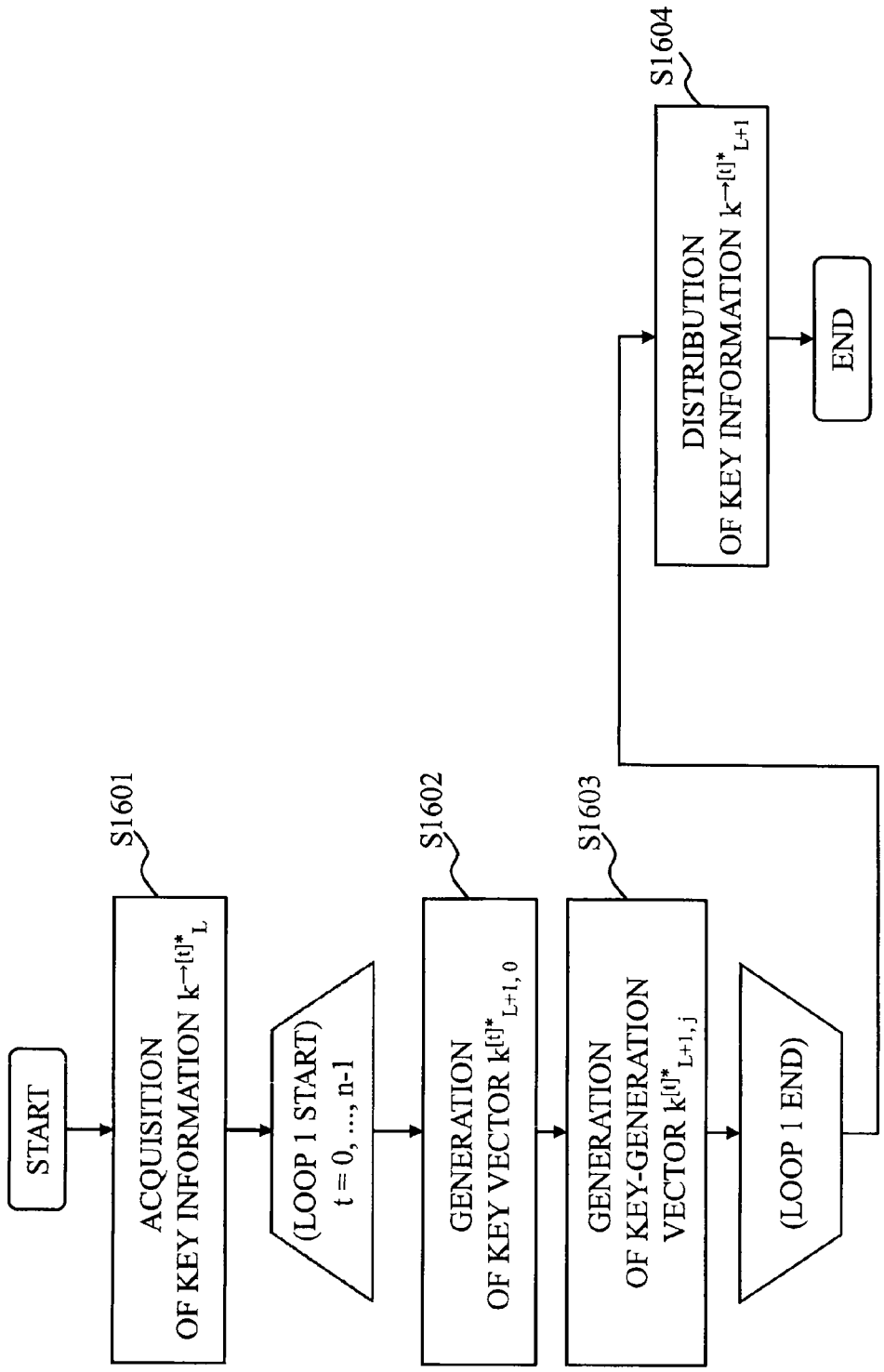
FIG. 32 is a flowchart showing operations of the key delegation device 400.

FIG. 29 is a flowchart showing operations of the key generation device 100. FIG. 30 is a flowchart showing operations of the encryption device 200. FIG. 31 is a flowchart showing operations of the decryption device 300. FIG. 32 is a flowchart showing operations of the key delegation device 400.

The functions and operations of the key generation device 100 will be described. The configuration of the functions of the key generation device 100 is the same as that of the key generation device 100 according to the second embodiment shown in FIG. 19.

(S1301: Master Key Generation Step)

Using the processing device, the master key generation unit 110 computes Formula 204 to generate a master public key pk and a master secret key sk, and stores the generated keys in the master key storage unit 120.

[Formula 204]

$$N := n + 2, \quad (1)$$

$$(\mathbb{V}, \mathbb{V}^*, \mathbb{G}_T, \mathbb{A}, \mathbb{A}^*, q) \xleftarrow{R} \mathcal{G}_{ddvs}(1^\lambda, N)$$

((2) to (5) are executed for $t = 0, \ldots, n-1$.)

$$X^{[t]} := (x_{i,j}^{[t]}) \xleftarrow{U} GL(N, \mathbb{F}_q) \quad (2)$$

$$b_i^{[t]} := \sum_{j=0}^{N-1} x_{i,j}^{[t]} a_j, \quad (3)$$

$$\mathbb{B}[t] := (b_0^{[t]}, \ldots, b_{N-1}^{[t]})$$

-continued $$(v_{i,j}^{[t]}) := (x^{[t]T})^{-1} \quad (4)$$

$$b_i^{[t]*} = \sum_{j=0}^{N-1} v_{i,j}^{[t]} a_j^*, \quad (5)$$

$$\mathbb{B}[t]^* := (b_0^{[t]*}, \ldots, b_{N-1}^{[t]*})$$

$$sk := (X^{[0]}, \ldots, X^{[n-1]}, \mathbb{B}^{[0]*}, \ldots, \mathbb{B}^{[n-1]*}), \quad (6)$$

$$pk := (1^\lambda, \vec{\mu}, \mathbb{V}, \mathbb{V}^*, G_T, A, A^*, q, \mathbb{B}^{[0]}, \ldots, \mathbb{B}^{[n-1]}),$$

return $sk$, $pk$

That is: (1) using the processing device, the master key generation unit 110 generates N(=n+2)-dimensional DDVS (V, V*, $G_T$, A, A*, q) with a security parameter $1^\lambda$. Then, the master key generation unit 110 performs the following (2) to (5) for each t (t=0, . . . , n−1).

(2) Using the processing device, the master key generation unit 110 randomly selects the linear transformation $x^{[t]}$ for generating a basis $B^{[t]}$:=($b^{[t]}_0$, . . . ,$b^{[t]}_{n-1}$) from the canonical basis A:=($a_0$, . . . , $a_{n-1}$).

(3) Using the processing device and based on the selected linear transformation) $X^{[t]}$, the master key generation unit 110 generates the basis $B^{[t]}$ from the basis A.

(4) Using the processing device, the master key generation unit 110 generates, from a linear transformation $X^{[t]}$, a linear transformation $((X^{[t]})^T)^{-1}$ for generating the basis $B^{[t]}*$:= ($b^{[t]*}_0$, . . . , $b^{[t]*}_{n-1}$) from the basis A*: =($a^*_0$, . . . , $a^*_{n-1}$).

(5) Using the processing device and based on the generated linear transformation $((X^{[t]})^T)^{-1}$, the master key generation unit 110 generates the basis $B^{[t]}*$ from the basis A*.

(6) The master key generation unit 110 designates the generated linear transformations) $X^{[t]}$ (t=0, . . . , n−1) and the generated bases $B^{[t]}*$ (t=0, . . . , n−1) as the master secret key sk, and ($1^\lambda$, $\vec{\mu}$, V, V*, $G_T$, A, A*, q, $B^{[0]}$, . . . , $B^{[n-1]}$) including the generated bases $B^{[t]}$ (t=0, . . . , n−1) as the master public key pk. The master key storage unit 120 stores in the storage device the master public key pk and the master secret key sk generated by the master key generation unit 110.

As with the cryptographic processing system 10 according to the second embodiment, it is assumed that there are the N (=n+2) number of dimensions in DDVS. That is, the basis vectors of the DDVS are structured as shown in FIG. 15.

To summarize, in (S1301), the master key generation unit 110 executes the Setup algorithm shown in Formula 205 to generate the master public key pk and the master secret key sk.

[Formula 205]

Setup($1^\lambda$, $\vec{\mu}$ := (n, d; $\mu_1$, . . . , $\mu_d$)):

$N := n + 2,$ $(\mathbb{V}, \mathbb{V}^*, G_T, A, A^*, q) \xleftarrow{R} \mathcal{G}_{ddvs}(1^\lambda, N);$ For $t = 0, \ldots, n - 1,$ $X^{[t]} := (x_{i,j}^{[t]}) \xleftarrow{U} GL(N, \mathbb{F}_q),$ $b_i^{[t]} = \sum_{j=0}^{N-1} x_{i,j}^{[t]} a_j, \quad \mathbb{B}^{[t]} := (b_0^{[t]}, \ldots, b_{N-1}^{[t]}).$ $(v_{i,j}^{[t]}) := (x^{[t]T})^{-1},$ $b_i^{[t]*} = \sum_{j=0}^{N-1} v_{i,j}^{[t]} a_j^*, \quad \mathbb{B}^{[t]*} := (b_0^{[t]*}, \ldots, b_{N-1}^{[t]*}),$ $sk := (X^{[0]}, \ldots, X^{[n-1]}, \mathbb{B}^{[0]*}, \ldots, \mathbb{B}^{[n-1]*}),$ $pk := (1^\lambda, \vec{\mu}, \mathbb{V}, \mathbb{V}^*, G_T, A, A^*, q, \mathbb{B}^{[0]}, \ldots, \mathbb{B}^{[n-1]}).$ return $sk$, $pk$.

Then, the key vector generation unit 130 and the key-generation vector generation unit 140 perform (S1302) and (S1303) for each t (t=0, . . . , n−1).

(S1302: Key Vector $k^{[t]*}_{1,0}$ Generation Step)

Using the processing device and based on the master public key pk, the master secret key sk, and a predicate vector $\vec{v}_1$, the key vector generation unit 130 computes Formula 206 to generate a key vector $k^{[t]*}_{1,0}$ which is the first element of a first level (level 1) secret key.

[Formula 206]

$$\tau_1, \sigma_{1,0}, \zeta_{1,0}^{[t]} \xleftarrow{U} \mathbb{F}_q \quad (1)$$

$$k_{1,0}^{[t]*} := \tau_1 \left( \sigma_{1,0} \left( \sum_{i=0}^{\mu_1 - 1} v_i b_i^{[t]*} \right) + \zeta_{1,0}^{[t]} b_n^{[t]*} \right) \quad (2)$$

where $k_{1,0}^{[t]*}$: first element of the first level secret key, and $v_i$ (i=0, . . . , $\mu_1$−1): predicate vector.

That is: (1) using the processing device, the key vector generation unit 130 generates random numbers $\tau_1$, $\sigma_{1,0}$, and $\zeta^{[t]}_{1,0}$.

(2) Using the processing device, the key vector generation unit 130 generates the key vector $k^{[t]*}_{1,0}$ by setting a predetermined value (1 in this case) randomized by the random number $\zeta^{[t]}_{1,0}$ as the coefficient of the basis vector $b^{[t]*}_n$ in the basis $B^{[t]}*$, also setting each element of the predicate vector $\vec{v}_1$ randomized by the random number $\sigma_{1,0}$ as the coefficient of each basis vector $b^{[t]*}_i$ (i=0, . . . ,$\mu_1$−1), and randomizing the entire key vector by the random number $\tau_1$.

(S1303: Key-Generation Vector $k^{[t]*}_{1,j}$ Generation Step)

Using the processing device and based on the master public key pk, the master secret key sk, and the predicate vector $\vec{v}_1$ ($\vec{v}_1$=($v_0$, . . . , $v_i$) (i=$\mu_1$−1)), the key-generation vector generation unit 140 computes Formula 207 to generate each key-generation vector $k^{[t]*}_{1,j}$ for generating a lower level secret key (a lower level key vector). The key-generation vector $k^{[t]*}_{1,j}$ is the j-th element of the first level secret key.

[Formula 207]

$$\tau_1, \sigma_{1,1}, \sigma_{1,\mu_1}, \ldots, \quad (1)$$

$$\sigma_{1,n-1}, \zeta_{1,1}^{[t]}, \zeta_{1,\mu_1}^{[t]}, \ldots, \zeta_{1,n-1}^{[t]} \xleftarrow{U} \mathbb{F}_q;$$

$$k_{1,1}^{[t]*} := \tau_1 \left( \sigma_{1,1} \left( \sum_{i=0}^{\mu_1 - 1} v_i b_i^{[t]*} \right) + \zeta_{1,1}^{[t]} b_n^{[t]*} \right) \quad (2)$$

$$k_{1,j}^{[t]*} := \tau_1 \left( \sigma_{1,j} \left( \sum_{i=0}^{\mu_1 - 1} v_i b_i^{[t]*} \right) + b_j^{[t]*} + \zeta_{1,j}^{[t]} b_n^{[t]*} \right) \quad (3)$$

$j = \mu_1, \ldots, n - 1$ where $k_{1,1}^{[t]*}$: first element of the first level secret key, and $k_{1,j}^{[t]*}$: j-th element of the first level secret key.

That is: (1) using the processing device, the key-generation vector generation unit 140 generates random numbers $\tau_1$, $\sigma_{1,j}$ (j=1, ..., n−1), and $\zeta^{[t]}_{1,j}$ (j=1, $\mu_1$, ..., n−1).

(2) Using the processing device, the key-generation vector generation unit 140 generates a key-generation vector $k^{[t]*}_{1,1}$ by setting a predetermined value (1 in this case) randomized by the random number $\zeta^{[t]}_{1,1}$ as the coefficient of the basis vector $b^{[t]*}_n$ in the basis $B^{[t]*}$, also setting each element of the predicate vector $\vec{v}_1$ randomized by the random number $\sigma_{1,1}$ as the coefficient of each basis vector $b^{[t]*}_i$ (i=0, ..., $\mu_1$−1), and randomizing the entire key vector by the random number $\tau_1$.

(3) Using the processing device, the key-generation vector generation unit 140 generates the key-generation vector $k^{[t]*}_{i,j}$, for each j (j=$\mu_1$, ..., n−1), by setting a predetermined value (1 in this case) as the coefficient of the basis vector $b^{[t]*}_j$ in the basis $B^{[t]*}$, setting each element of the predicate vector $\vec{v}_1$ randomized by the random number $\sigma_{1,i}$, as the coefficient of each basis vector $b^{[t]*}_i$ (i=0, ..., $\mu_1$−1), setting a predetermined value (1 in this case) randomized by the random number $\zeta^{[t]}_{1,j}$ as the coefficient of the basis vector $b^{[t]*}_n$, and randomizing the entire key vector by the random number $\tau_1$.

To summarize, in (S1302) and (S1303), using the processing device, the key vector generation unit 130 and the key-generation vector generation unit 140 execute the GenKey algorithm shown in Formula 208 to generate the first level secret key (key information $k^{\to[t]*}_1$) including the key vector $k^{[t]*}_{1,0}$ and the key-generation vectors $k^{[t]*}_{1,j}$.

$GenKey(sk, \vec{v}_1 := (v_0, \ldots, v_{\mu_1-1})): \tau_1, \sigma_{1,0}, \sigma_{1,1},$ [Formula 208]

$\sigma_{1,\mu_1}, \ldots, \sigma_{1,n-1}, \zeta^{[t]}_{1,0}, \zeta^{[t]}_{1,1}, \zeta^{[t]}_{1,\mu_1}, \ldots, \zeta^{[t]}_{1,n-1} \xleftarrow{U} \mathbb{F}_q;$ For $t = 0, \ldots, n-1$ $k^{[t]*}_{1,j} := \tau_1 \left( \sigma_{1,j} \left( \sum_{i=0}^{\mu_1-1} v_i b^{[t]*}_i \right) + \zeta^{[t]}_{1,j} b^{[t]*}_n \right)$, for $j = 0, 1$.

$k^{[t]*}_{1,j} := \tau_1 \left( \sigma_{1,j} \left( \sum_{i=0}^{\mu_1-1} v_i b^{[t]*}_i \right) + b^{[t]*}_j + \zeta^{[t]}_{1,j} b^{[t]*}_n \right),$ for $j = \mu_1, \ldots, n-1,$ $\vec{k}^{[t]*}_1 := (k^{[t]*}_{1,0}, k^{[t]*}_{1,1}, k^{[t]*}_{1,\mu_1}, \ldots, k^{[t]*}_{1,n-1})$ return $sk_{\vec{v}_1} := (\vec{k}^{[0]*}_1, \ldots, \vec{k}^{[n-1]*}_1).$ (S1304: Key Distribution Step)

The key distribution unit 150 transmits the master public key generated by the master key generation unit 110 and the key information $k^{\to[t]*}_1$ (t=0, ..., n−1) generated by the key vector generation unit 130 and the key-generation vector generation unit 140 to the decryption device 300 through the communication device. The key distribution unit 150 also transmits the master public key to the encryption device 200 through the communication device.

The functions and operations of the encryption device 200 will be described. The configuration of the functions of the encryption device 200 is the same as that of the encryption device 200 according to the second embodiment shown in FIG. 19.

(S1401: Message Setting Step)

Using the processing device and based on the master public key pk, the transmission information setting unit 210 computes Formula 209 to generate each message vector $mv^{[t]}$ (t=0, ..., n−1).

$mv^{[t]} := mb^{[t]}_n$ [Formula 209]

That is, using the processing device, the transmission information setting unit 210 generates the message vector $mv^{[t]}$, for each t (t=0, ..., n−1), by setting a message m as the coefficient of the basis vector $b^{[t]}_n$ in the basis $B^{[t]}$ included in the master public key pk.

(S1402: Cipher Vector Generation Step)

Using the processing device and based on the master public key pk and attribute vectors $\vec{x}_1$ to $\vec{x}_L (\vec{x}_i (i=1, \ldots, L)(=(x_0, \ldots, x_i)(i=\mu_L-1)))$ (where L denotes the depth of hierarchy), the cipher vector generation unit 220 computes Formula 210 to generate each cipher vector $c^{[t]}$ (t=0, ..., n−1).

[Formula 210]

$$(\vec{x}_{L+1}, \ldots, \vec{x}_d) \xleftarrow{U} \mathbb{F}_q^{\mu_{L+1} - \mu_L} \times \ldots \times \mathbb{F}_q^{n-\mu_{d-1}}, \quad (1)$$

$$(\delta_1, \ldots, \delta_d, \delta^{[0]}_{n+1}, \ldots, \delta^{[n-1]}_{n+1}) \xleftarrow{U} \mathbb{F}_q^{d+n}$$

$$\vec{s}^{[t]} := (s^{[t]}_0, \ldots, s^{[t]}_{n-1}) \xleftarrow{U} \mathbb{F}_q^n \text{ for } t = 0, \ldots, n-2,$$

$$\vec{s}^{[n-1]} := (\delta_1 \vec{x}_1, \ldots, \delta_d \vec{x}_d) - \left( \sum_{t=0}^{n-2} \vec{s}^{[t]} \right),$$

$$xv^{[t]} := \sum_{i=0}^{n-1} s^{[t]}_i b^{[t]}_i \quad t = 0, \ldots, n-1$$

$$rv^{[t]} := \delta^{[t]}_{n+1} b^{[t]}_{n+1} \quad t = 0, \ldots, n-1 \quad (3)$$

$$c^{[t]} := xv^{[t]} + mv^{[t]} + rv^{[t]} = \sum_{i=0}^{n-1} s^{[t]}_i b^{[t]}_i + mb^{[t]}_n + \delta^{[t]}_{n+1} b^{[t]}_{n+1} \quad (4)$$

$$t = 0, \ldots, n-1$$

That is: (1) using the processing device, the cipher vector generation unit 220 generates random numbers $\vec{x}_i$ (i=L+1, ..., d), $\delta_i$ (i=1, ..., d), and $\delta^{[t]}_{n+1}$ (t=0, ..., n−1).

(2) Using the processing device, the cipher vector generation unit 220 generates an attribute information vector $xv^{[t]}$, for each basis $B^{[t]}$ (t=0, ..., n−1) included in the master public key pk, by setting each element and so on of the attribute vectors.

For each i (i=0, ..., $\mu_1$−1), the coefficient of each basis vector $b^{[t]}_i$ (t=0, ..., n−1) is set such that the sum of the coefficients of the basis vectors $b^{[t]}_i$ (t=0, ..., n−1) constitutes the randomized attribute vector $\vec{x}_i$. This is realized here by setting random numbers $s^{[t]}_i$ as the coefficients of basis vectors $b^{[t]}_i$ (t=0, ..., n−2), and by setting the coefficient of the basis vector $b^{[t]}_i$ (t=n−1) such that the sum of the coefficients constitutes the randomized attribute vector $\vec{x}_i$.

A random number is set as the coefficient of each basis vector $b^{[t]}_i$ (t=0, ..., n−1) for i=$\mu_L$, ..., n−1.

(3) Using the processing device, the cipher vector generation unit 220 generates a random number vector $rv^{[t]}$, for each basis $B^{[t]}$ (t=0, ..., n−1), by setting the random number $\delta^{[t]}_{n+1}$ as the coefficient of the basis vector $b^{[t]}_{n+1}$ in the basis B included in the master public key pk.

(4) Using the processing device, the cipher vector generation unit 220 generates the cipher vector $c^{[t]}$, for each basis $B^{[t]}$ (t=0, ..., n−1), by adding the generated attribute information vector $xv^{[t]}$ and the generated random number vector $rv^{[t]}$ to the message vector $mv^{[t]}$ generated by the transmission information setting unit 210.

(S1403: Data Transmission Step)

The data transmission unit 230 transmits the cipher vectors $c^{[t]}$ generated by the cipher vector generation unit 220 to the decryption device 300 through the communication device.

To summarize, the encryption device 200 executes the Enc algorithm shown in Formula 211 to generate each cipher vector $c^{[t]}$.

$$Enc(pk, m \in msg, \vec{x} := (\vec{x}_1, \ldots, \vec{x}_L) :=$$ [Formula 211]
$$((x_0, \ldots, x_{\mu_1-1}), \ldots, (x_{\mu_{L-1}}, \ldots, x_{\mu_L-1})):$$

$$(\vec{x}_{L+1}, \ldots, \vec{x}_d) \xleftarrow{U} \mathbb{F}_q^{\mu_{L+1} - \mu_L} \times \ldots \times \mathbb{F}_q^{n-\mu_{d-1}},$$

$$(\delta_1, \ldots, \delta_d, \delta_{n+1}^{[0]}, \ldots, \delta_{n+1}^{[n-1]}) \xleftarrow{U} \mathbb{F}_q^{d+n},$$

$$\vec{s}^{[t]} := (s_0^{[t]}, \ldots, s_{n-1}^{[t]}) \xleftarrow{U} \mathbb{F}_q^n \text{ for } t = 0, \ldots, n-2,$$

$$\vec{s}^{[n-1]} := (\delta_1 \vec{x}_1, \ldots, \delta_d \vec{x}_d) - \left(\sum_{t=0}^{n-2} \vec{s}^{[t]}\right),$$

$$c^{[t]} := \sum_{i=0}^{n-1} s_i^{[t]} b_i^{[t]} + m b_n^{[t]} + \delta_{n+1}^{[t]} b_{n+1}^{[t]}, \text{ for } t = 0, \ldots, n-1,$$

return $(c^{[0]}, \ldots, c^{[n-1]})$.

The functions and operations of the decryption device 300 will be described. The configuration of the functions of the decryption device 300 is the same as that of the decryption device 300 according to the second embodiment shown in FIG. 19.

(S1501: Vector Input Step)

The vector input unit 310 receives through the communication device and inputs the cipher vectors $c^{[t]}$ (t=0, . . . , n−1) transmitted by the data transmission unit 230 of the encryption device 200.

(S1502: Pairing Operation Step)

Using the processing device and based on the master public key pk and each key vector $k^{[t]*}_{L,0}$ (t=0, . . . , n−1) which is the first element of the L-th level secret key, the pairing operation unit 330 computes Formula 212 to generate information f concerning the message m.

$$f := \prod_{t=0}^{n-1} e(c^{[t]}, k_{L,0}^{[t]*})$$ [Formula 212]

That is, using the processing device, the pairing operation unit 330 generates the information f by performing the pairing operation e, which pairs the spaces V and V* included in the master public key pk, on each cipher vector c input by the vector input unit 310 and each key vector $k^{[t]*}_{L,0}$ stored in the storage device by the key vector storage unit 320.

Using the processing device and based on the master public key pk and each key vector $k*^{[t]}_{L,0}$ (t=0, . . . , n−1), the pairing operation unit 330 computes Formula 213 to generate information g to be used for extracting the message m from the information f.

$$g := \prod_{t=0}^{n-1} e(b_n^{[t]}, k_{L,0}^{[t]*})$$ [Formula 213]

That is, using the processing device, the pairing operation unit 330 generates the information g by performing the pairing operation e, which pairs the spaces V and V* included in the master public key pk, on each basis $b_n^{[t]}$ in each basis $B^{[t]}$ included the master public key pk and each key vector $k^{[t]*}_{L,0}$ stored in the storage device by the key vector storage unit 320.

(S1503: Discrete Logarithm Computation Step)

The discrete logarithm computation unit 340 solves a discrete logarithm problem to the base information g on the information f to compute the message m. That is, the discrete logarithm computation unit 340 computes Formula 214.

$$m' := D\log_g(f)$$ [Formula 214]

where $Dlog_x(y)$ denotes solving a discrete logarithm problem to base x on y.

As with the cryptographic processing system 10 that implements the HPE scheme described in the second embodiment, the message m to be input here shall be a value smaller than a predetermined small integer τ. This is because, as described above, the decryption device 300 needs to solve the discrete logarithm problem in computing the message m. As with the cryptographic processing system 10 that implements the HPE scheme described in the second embodiment, the message m can be set in a plurality of basis vectors.

To summarize, the decryption device 300 executes the Dec algorithm shown in Formula 215 to generate a message m' or a distinguished symbol ⊥.

$$Dec((k_{L,0}^{[0]*}, \ldots, k_{L,0}^{[n-1]*}), (c^{[0]}, \ldots, c^{[n-1]})):$$ [Formula 215]

$$g := \prod_{t=0}^{n-1} e(b_n^{[t]}, k_{L,0}^{[t]*}), \ f := \prod_{t=0}^{n-1} e(c^{[t]}, k_{L,0}^{[t]*}),$$

$$m' := D\log_g(f) \text{ if } D\log_g(f) \in msg;$$

$$m' := \perp \text{ otherwise, return } m'.$$

The functions and operations of the key delegation device 400 will be described. The configuration of the functions of the key delegation device 400 is the same as that of the key delegation device 400 according to the second embodiment shown in FIG. 19.

(S1601: Key Vector $k^{[t]*}_{L,0}$ Acquisition Step)

The key vector acquisition unit 410 acquires, through the communication device, for each t (t=0, . . . , n−1), the L-th level secret key (key information $\vec{k}^{[t]*}_L$) including the key vector $k^{[t]*}_{L,0}$ which is the first element of the L-th level secret key and the key-generation vectors $k^{[t]*}_{L,j}$ which are the j-th (j=μ₁, . . . , n−1) elements of the L-th level secret key.

The key vector generation unit 420 and the key-generation vector generation unit 430 perform (S1602) and (S1603) for each t (t=0, . . . , n−1).

(S1602: Key Vector $k^{[t]*}_{L+1,0}$ Generation Step)

Using the processing device and based on the master public key pk, the key information $\vec{k}^{[t]*}_L$, and the predicate vector $\vec{v}_{L+1}$ ($\vec{v}_{L+1} = (v_i, \ldots, v_j)(i=\mu_L, j=\mu_{L+1}-1)$), the key vector generation unit 420 computes Formula 216 to generate a key vector $k^{[t]*}_{L+1,0}$ which is the first element of an (L+1)-th level secret key.

[Formula 216]

$$\tau_{L+1}, \psi_{L+1,0,0}, \ldots, \psi_{L+1,0,L}, \sigma_{L+1,0} \xleftarrow{U} \mathbb{F}_q \quad (1)$$

$$k_{L+1,0}^{[t]*} := \tau_{L+1}\left(\sum_{i=0}^{L} \psi_{L+1,0,i} k_{L,i}^{[t]*} + k_{L,0}^{[t]*} + \sigma_{L+1,0}\left(\sum_{i=\mu_L}^{\mu_{L+1}-1} v_i k_{L,i}^{[t]*}\right)\right) \quad (2)$$

$$t = 0, \ldots, n-1$$

That is: (1) using the processing device, the key vector generation unit 420 generates random numbers $\tau_{L+1,0}, \psi_{L+1,0,i}$ (i=0, . . . , L), and $\sigma_{L+1,0}$.

(2) Using the processing device, the key vector generation unit 420 generates the key vector $k^{[t]*}_{L+1,0}$ by adding, to the key vector $k^{[t]*}_{L,0}$, vectors $v_i$ ($i=\mu_L,\ldots,\mu_{L+1}-1$) in which each element of the predicate vector $\vec{v}_{L+1}$ randomized by the random number $\sigma_{L+1,0}$ is set as the coefficient of each key-generation vector $k^{[t]*}_{L,i}$ ($i=\mu_L,\ldots,\mu_{L+1}-1$), the key vector $k^{[t]*}_{L,0}$ randomized by the random number $\psi_{L+1,0,0}$, and the key-generation vectors $k^{[t]*}_{L,i}$ ($i=1,\ldots,L$) randomized by the random numbers $\psi_{L+1,0,i}$ ($i=1,\ldots,L$).

(S1603: Key-Generation Vector $k^{[t]*}_{L+1,j}$ Generation Step)

Using the processing device and based on the master public key pk, the key information $\vec{k}^{[t]*}_L$, and the predicate vector $\vec{v}_{L+1}$, the key-generation vector generation unit 430 computes Formula 217 to generate each key-generation vector $k^{[t]*}_{L+1,j}$ for generating a lower level secret key (a lower level key vector). The key-generation vector $k^{[t]*}_{L+1,j}$ is the j-th element of the (L+1)-th level secret key.

[Formula 217]

$$\tau_{L+1}, \psi_{L+1,1,0}, \ldots, \psi_{L+1,L+1,L}, \sigma_{L+1,\mu_{L+1}}, \ldots, \sigma_{L+1,n-1} \xleftarrow{U} \mathbb{F}_q \quad (1)$$

$$k^{[t]*}_{L+1,j} := \tau_{L+1}\left(\sum_{i=0}^{L}\psi_{L+1,j,i}k^{[t]*}_{L,i} + k^{[t]*}_{L,j} + \sigma_{L+1,j}\left(\sum_{i=\mu_L}^{\mu_{L+1}-1}v_i k^{[t]*}_{L,i}\right)\right) \quad (2)$$

$$t=0,\ldots,n-1,\ j=0,\ldots,L+1,\mu_{L+1},\ldots,n-1$$

That is: (1) using the processing device, the key-generation vector generation unit 430 generates random numbers $\tau_{L+1}$, $\psi_{L+1,j,i}$ ($i=0,\ldots,L$) ($j=1,\ldots,L+1,\mu_{L+1},\ldots,n-1$), and $\sigma_{L+1,j}$ ($j=\mu_{L+1},\ldots,n-1$).

(2) Using the processing device, the key-generation vector generation unit 140 generates the key-generation vector $k^{[t]*}_{L+1,j}$ for generating a lower level key vector of the key vector $k^{[t]*}_{L+1,0}$, for each j ($j=1,\ldots,L+1,\mu_{L+1},\ldots,n-1$), by adding vectors in which each element of the predicate vector $\vec{v}_{L+1}$ randomized by the random number $\sigma_{L+1,j}$ is set as the coefficient of each key-generation vector $k^{[t]*}_{L,i}$ ($i=\mu_L,\ldots,\mu_{L+1}-1$), the key vector $k^{[t]*}_{L,0}$ randomized by the random number $\psi_{L+1,j,0}$, and the key-generation vectors $k^{[t]*}_{L,i}$ randomized by the random numbers $\psi_{L+1,j,i}$ ($i=1,\ldots,L$).

To summarize, in (S1601) and (S1602), using the processing device, the key vector generation unit 420 and the key-generation vector generation unit 430 execute the Delegate$_L$ algorithm shown in Formula 218 to generate the (L+1)-th level secret key (key information $\vec{k}^{[t]*}_{L+1}$) including the key vector $k^{[t]*}_{L+1,0}$ and the key-generation vectors $k^{[t]*}_{L+1,j}$.

[Formula 218]

$$\text{Delegate}_L\left(\left(\vec{k}^{[0]*}_L,\ldots,\vec{k}^{[n-1]*}_L\right), \vec{v}_{L+1}:=(v_{\mu_L},\ldots,v_{\mu_{L+1}-1})\right):$$

$$\tau_{L+1}, \psi_{L+1,0,0}, \ldots, \psi_{L+1,L+1,L}, \sigma_{L+1,0}, \sigma_{L+1,\mu_{L+1}}, \ldots, \sigma_{L+1,n-1} \xleftarrow{U} \mathbb{F}_q,$$

For $t=0,\ldots,n-1,\ j=0,\ldots,L+1,\mu_{L+1},\ldots,n-1$, $$k^{[t]*}_{L+1,j} := \tau_{L+1}\left(\sum_{i=0}^{L}\psi_{L+1,j,i}k^{[t]*}_{L,i} + k^{[t]*}_{L,j} + \sigma_{L+1,j}\left(\sum_{i=\mu_L}^{\mu_{L+1}-1}v_i k^{[t]*}_{L,i}\right)\right),$$

$$\vec{k}^{[t]*}_{L+1} := \left(k^{[t]*}_{L+1,0},\ldots,k^{[t]*}_{L+1,L+1},k^{[t]*}_{L+1,\mu_{L+1}},\ldots,k^{[t]*}_{L+1,n-1}\right),$$

return $sk_{(\vec{v}_1,\ldots,\vec{v}_{L+1})} := \left(\vec{k}^{[0]*}_{L+1},\ldots,\vec{k}^{[n-1]*}_{L+1}\right).$ (S1604: Key Distribution Step)

The key distribution unit 440 transmits the key information $\vec{k}^{[t]*}_{L-1}$ generated by the key vector generation unit 420 and the key-generation vector generation unit 430 to the decryption device 300 of a lower level through the communication device.

The pairing operation computed in (S1502) will be further explained.

In the second embodiment, as has been described with reference to FIG. 16, a component concerning the basis vector $b_n$ is extracted by using the inner-product of 0 between the attribute vector and the predicate vector, that is, by performing the pairing operation such that all components other than the component concerning the basis vector $b_n$ in the ciphertext c become 0. Likewise, in this embodiment, the paring operation is performed in (S1502) such that the component concerning the basis vector $b_n$ is extracted from the ciphertext c by performing the pairing operation as shown in Formula 219. Formula 219 is an equation for explaining the pairing operation. In Formula 219, the indices of random numbers are simplified for simplicity.

[Formula 219]

$$f := \prod_{t=0}^{n-1} e\left(\hat{c}^{[t]}, \hat{k}^{[t]*}_{L,0}\right)$$

$$= \prod_{t=0}^{n-1} u^{\vec{s}^{[t]}} \cdot \left(n\tau_1 \vec{v}_1, \ldots, n\tau_d \vec{v}_d\right)$$

$$= u^{\sum_{t=0}^{n-1} \vec{s}^{[t]}} \cdot \left(n\tau_1 \vec{v}_1, \ldots, n\tau_d \vec{v}_d\right)$$

$$= u^{(\delta_1 \vec{x}_1, \ldots, \delta_d \vec{x}_d)\cdot(n\tau_1 \vec{v}_1, \ldots, n\tau_d \vec{v}_d)}$$

$$= u^{\sum_{i=1}^{d} n\delta_i \tau_i (\vec{x}_i \cdot \vec{v}_i)}$$

$$= 0$$

where $\hat{c}^{[t]}$: attribute vector portion of $c^{[t]}$, $\hat{k}^{[t]*}_{L,0}$: predicate vector portion of $k^{[t]*}_{L,0}$, $\delta_1,\ldots,\delta_d,\tau_1,\ldots,\tau_d$: random numbers, $\vec{v}_i$: predicate vector ($i=1,\ldots,L_v$), $\vec{v}_i$: 0 ($i=L_v+1,\ldots,d$), and $\vec{x}_i \cdot \vec{v}_i = 0$ $i=1,\ldots,d$.

As has been described, the cryptographic processing system 10 according to this embodiment implements the HPE scheme that is adaptively attribute-hiding against CPA, and is modified to provide a high level of security.

The cryptographic processing system 10 according to this embodiment can readily implement an HPKEM scheme, as with the cryptographic processing system 10 according to the above embodiments.

Seventh Embodiment

In this embodiment, a cryptographic process that is adaptively attribute-hiding against CCA will be described. The cryptographic process to be described in this embodiment is constructed based on the cryptographic process that is adaptively attribute-hiding against CPA described in the sixth embodiment.

The HPE scheme that is adaptively attribute-hiding against CCA is constructed from the HPE scheme using the n copies of vector spaces described in the sixth embodiment by applying the scheme described in Non-Patent Literature 11.

In the fourth embodiment, the HPE scheme using the scheme discussed in Non-Patent Literature 7 has been mainly described, and the HPE scheme using the scheme discussed in Non-Patent Literature 11 has been briefly described. In this embodiment, the HPE scheme using the scheme discussed in Non-Patent Literature 11 will be described.

Referring to FIGS. 33 to 35, 29, and 32, the functions and operations of the cryptographic processing system 10 will be described.

Figure 33:
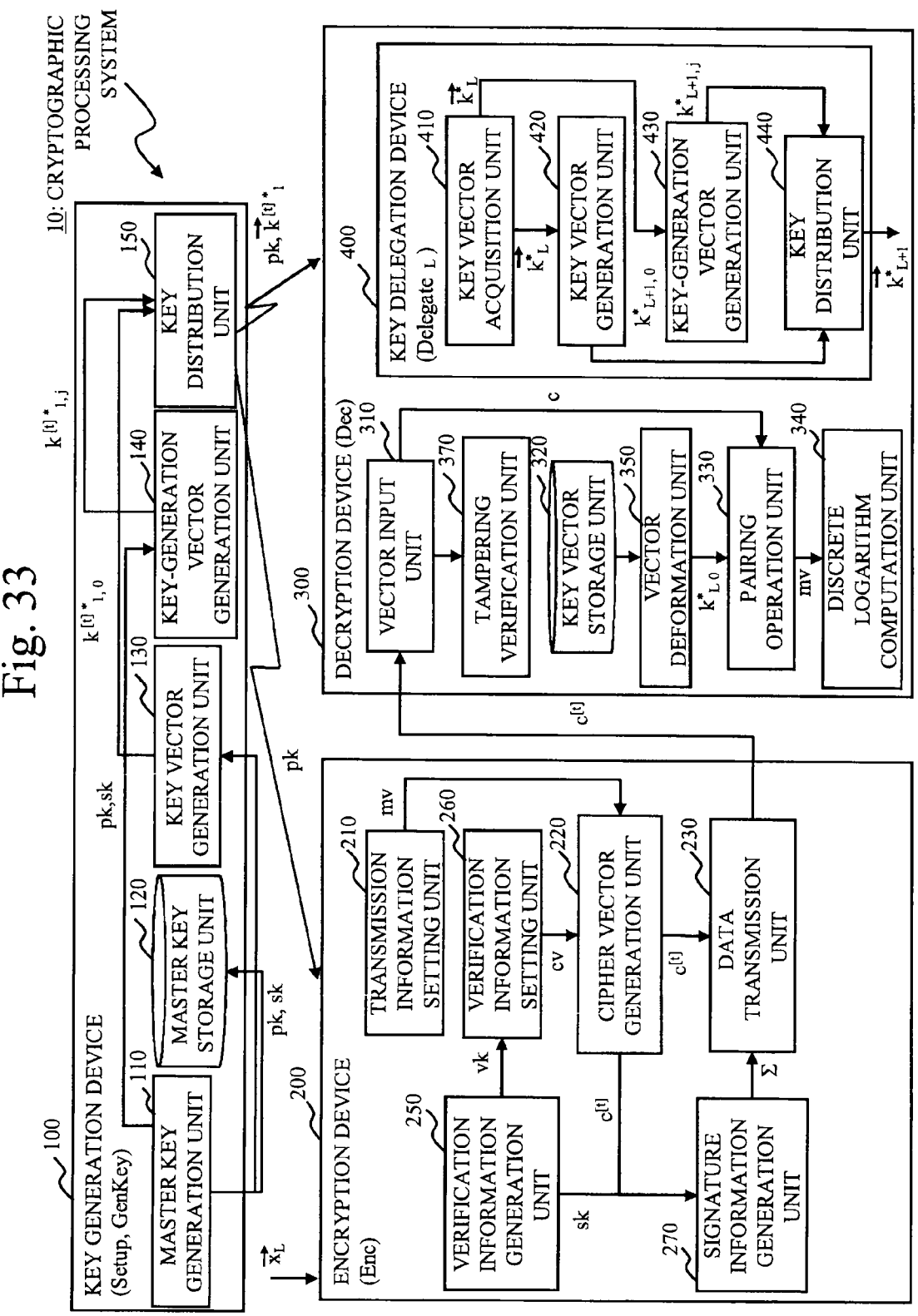
FIG. 33 is a functional block diagram showing functions of the cryptographic processing system 10 according to a seventh embodiment.

FIG. 33 is a functional block diagram showing functions of the cryptographic processing system 10 according to this embodiment. The cryptographic processing system 10 includes the key generation device 100, the encryption device 200, the decryption device 300, and the key delegation device 400, as with the cryptographic processing system 10 according to the second embodiment. It is also assumed in this embodiment that the decryption device 300 includes the key delegation device 400.

Figure 34:
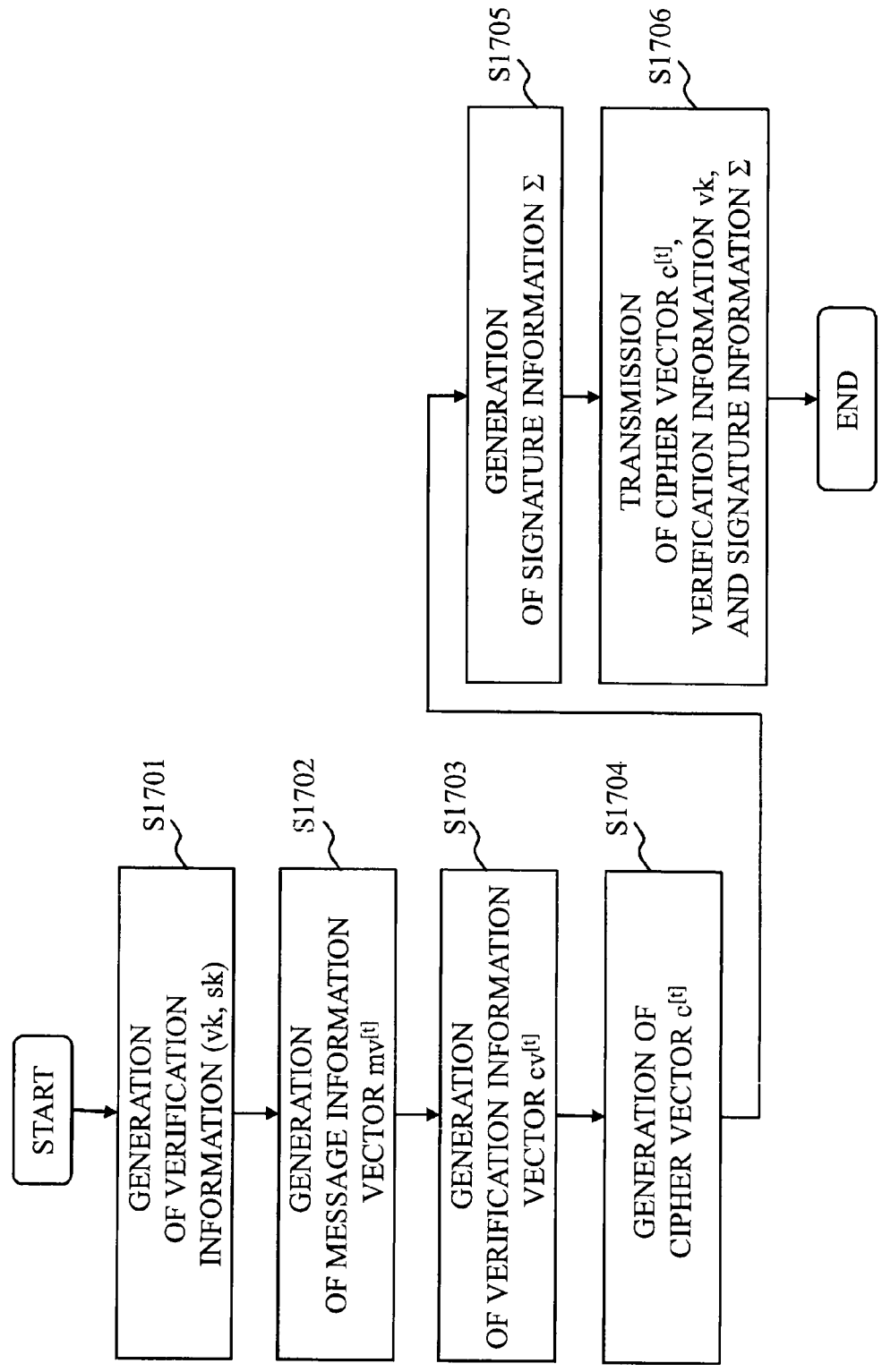
FIG. 34 is a flowchart showing operations of the encryption device 200.
Figure 35:
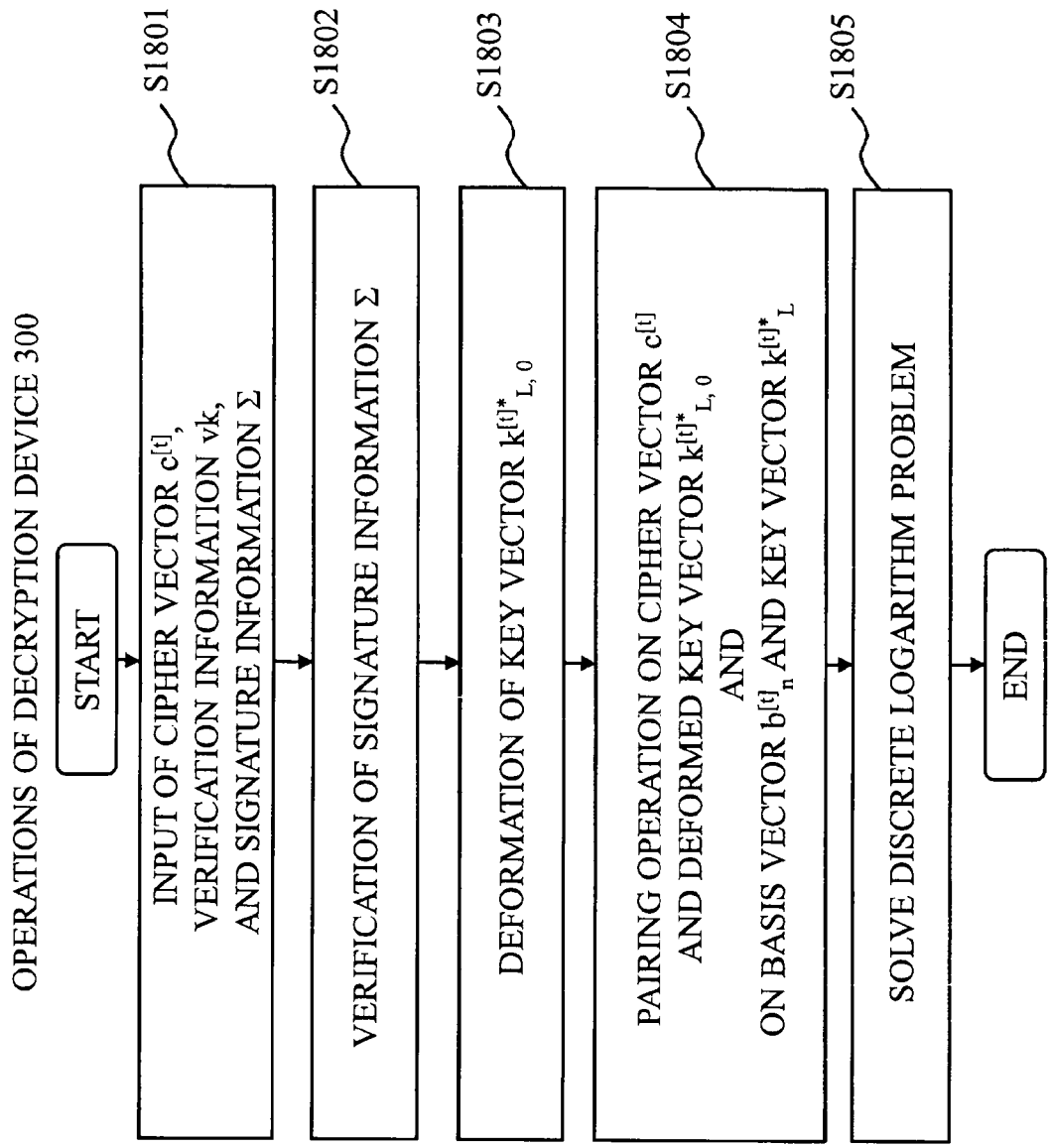
FIG. 35 is a flowchart showing operations of the decryption device 300.

FIG. 34 is a flowchart showing operations of the encryption device 200. FIG. 35 is a flowchart showing operations of the decryption device 300. Flows of operations of the key generation device 100 and the key delegation device 400 are the same as those of the key generation device 100 and the key delegation device 400 according to the sixth embodiment. Thus, the operations of the key generation device 100 will be described with reference to FIG. 29. The operations of the key delegation device 400 will be described with reference to FIG. 32.

In the following description, Sig:=($G_{sig}$, Sign, Vrfy) denotes the secure one-time signature scheme described in the fourth embodiment.

The functions and operations of the key generation device 100 will be described. The configuration of the functions of the key generation device 100 is the same as that of the key generation device 100 according to the sixth embodiment shown in FIG. 28. The flow of the operations of the key generation device 100 is the same as that of the key generation device 100 according to the sixth embodiment shown in FIG. 29. Thus, the functions and operations of the key generation device 100 will be described with reference to FIG. 29.

(S1301: Master Key Generation Step)

As with the sixth embodiment, using the processing device, the master key generation unit 110 generates a master public key pk and a master secret key sk, and stores the generated keys in the master key storage unit 120.

As with the fourth embodiment, it is assumed that there are the N (=n+4) number of dimensions in DDVS. That is, the basis vectors of the DDVS are structured as shown in FIG. 25.

To summarize, in (S1301), the master key generation unit 110 executes the Setup algorithm shown in Formula 220 to generate the master public key pk and the master secret key sk.

[Formula 220]

$$\text{Setup}(1^\lambda, \vec{\mu} := (n, d; \mu_1, \ldots, \mu_d)):$$

$$N := n + 4, (\mathbb{V}, \mathbb{V}^*, G_T, A, A^*, q) \xleftarrow{R} \mathcal{G}_{ddvs}(1^\lambda, N);$$

For $t = 0, \ldots, n-1,$ $$X^{[t]} := (x_{i,j}^{[t]}) \xleftarrow{U} GL(N, \mathbb{F}_q),$$

$$b_i^{[t]} = \sum_{j=0}^{N-1} x_{i,j}^{[t]} a_j, \mathbb{B}[t] := (b_0^{[t]}, \ldots, b_{N-1}^{[t]}).$$

$$(v_{i,j}^{[t]}) := (X^{[t]T})^{-1},$$

-continued $$b_i^{[t]*} = \sum_{j=0}^{N-1} v_{i,j} a_j^*, \mathbb{B}[t]* := (b_0^{[t]*}, \ldots, b_{N-1}^{[t]*}),$$

$$sk := (X^{[0]}, \ldots, X^{[n-1]}, \mathbb{B}^{[0]*}, \ldots, \mathbb{B}^{[n-1]*}),$$

$$pk := (1^\lambda, \vec{\mu}, \mathbb{V}, \mathbb{V}^*, G_T, A, A^*, q, \mathbb{B}^{[0]}, \ldots, \mathbb{B}^{[n-1]}).$$

return sk, pk.

Then, as with the sixth embodiment, the key vector generation unit 130 and the key-generation vector generation unit 140 perform (S1302) and (S1303) for each t (t=0, ..., n−1).

(S1302: Key Vector $k^{[t]*}_{1,0}$ Generation Step)

As with the sixth embodiment, using the processing device, the key vector generation unit 130 computes Formula 221 to generate a key vector $K^{[t]*}_{1,0}$ which is the first element of a first (level 1) secret key.

[Formula 221]

$$\tau_1, \sigma_{1,0}, \zeta_{1,0}^{[t]} \xleftarrow{U} \mathbb{F}_q \tag{1}$$

$$k_{1,0}^{[t]*} := \tau_1 \left( \sigma_{1,0} \left( \sum_{i=0}^{\mu_1 - 1} v_i b_i^{[t]*} \right) + \zeta_{1,0}^{[t]} b_n^{[t]*} \right) \tag{2}$$

where $k_{1,0}^{[t]*}$: first element of the first level secret key, and
$v_i(i=0, \ldots, \mu_1-1)$: predicate vector.

(S1303: Key-Generation Vector $k^{[t]*}_{1,j}$ Generation Step)

As with the sixth embodiment, using the processing device, the key-generation vector generation unit 140 computes Formula 222 to generate each key-generation vector $k^{[t]*}_{1,j}$. The key-generation vector $k^{[t]*}_{1,j}$ is the j-th element of the first level secret key.

[Formula 222]

$$\tau_1, \sigma_{1,1}, \sigma_{1,\mu_1}, \ldots, \sigma_{1,n-1}, \sigma_{1,n+2}, \tag{1}$$

$$\sigma_{1,n+3}, \zeta_{1,1}^{[t]}, \zeta_{1,\mu_1}^{[t]}, \ldots, \zeta_{1,n-1}^{[t]} \xleftarrow{U} \mathbb{F}_q;$$

$$k_{1,1}^{[t]*} := \tau_1 \left( \sigma_{1,1} \left( \sum_{i=0}^{\mu_1 - 1} v_i b_i^{[t]*} \right) + \zeta_{1,1}^{[t]} b_n^{[t]*} \right) \tag{2}$$

$$k_{1,j}^{[t]*} := \tau_1 \left( \sigma_{1,j} \left( \sum_{i=0}^{\mu_1 - 1} v_i b_i^{[t]*} \right) + b_j^{[t]*} + \zeta_{1,j}^{[t]} b_n^{[t]*} \right) \tag{3}$$

$$j = \mu_1, \ldots, n-1, n+2, n+3$$

where $k_{1,1}^{[t]*}$: first element of the first level secret key, and
$k_{1,j}^{[t]*}$: j-th element of the first level secret key.

Note that the key-generation vector generation unit 140 generates the key-generation vectors $k^{[t]*}_{1,j}$ (j=1, ..., $\mu_1$, ..., n−1, n+2, n+3). That is, the key-generation vector generation unit 140 differs from the key-generation vector generation unit 140 shown in FIG. 28 in that it generates the key-generation vectors $k^{[t]*}_{1,n+2}$ and $k^{[t]*}_{1,n+3}$.

To summarize, in (S1302) and (S1303), using the processing device, the key vector generation unit 130 and the key-generation vector generation unit 140 execute the GenKey algorithm shown in Formula 223 to generate the first level secret key (key information $\vec{k}^{[t]*}_1$) including the key vector $k^{[t]*}_{1,0}$ and the key-generation vectors $k^{[t]*}_{1,j}$.

[Formula 223]

$$GenKey(sk, \vec{v}_1 := (v_0, \ldots, v_{\mu-1})) : \tau_1, \sigma_{1,0}, \sigma_{1,1}, \sigma_{1,\mu_1}, \ldots,$$

$$\sigma_{1,n-1}, \sigma_{1,n+2}, \sigma_{1,n+3}, \zeta_{1,0}^{[t]}, \zeta_{1,1}^{[t]}, \zeta_{1,\mu_1}^{[t]}, \ldots, \zeta_{1,n-1}^{[t]} \xleftarrow{U} \mathbb{F}_q;$$

For $t = 0, \ldots n-1$ $$k_{1,j}^{[t]*} := \tau_1\left(\sigma_{1,j}\left(\sum_{i=0}^{\mu_1-1} v_i b_i^{[t]*}\right) + \zeta_{1,j}^{[t]} b_n^{[t]*}\right), \text{ for } j = 0, 1,$$

$$k_{1,j}^{[t]*} := \tau_1\left(\sigma_{1,j}\left(\sum_{i=0}^{\mu_1-1} v_i b_i^{[t]*}\right) + b_j^{[t]*} + \zeta_{1,j}^{[t]} b_n^{[t]*}\right),$$

for $j = \mu_1, \ldots, n-1, n+2, n+3,$ $$\vec{k}_1^{[t]*} := (k_{1,0}^{[t]*}, k_{1,1}^{[t]*}, k_{1,\mu_1}^{[t]*}, \ldots, k_{1,n-1}^{[t]*}, k_{1,n+2}^{[t]*}, k_{1,n+3}^{[t]*})$$

return $sk_{\vec{v}_1} := (\vec{k}_1^{[1]*}, \ldots, \vec{k}_1^{[n-1]*}).$ (S1304: Key Distribution Step)

As with the sixth embodiment, the key distribution unit 150 transmits the master public key generated by the master key generation unit 110 and the key information $\vec{k}^{[t]*}_1$ (t=0, ..., n−1) generated by the key vector generation unit 130 and the key-generation vector generation unit 140 to the decryption device 300 through the communication device. The key distribution unit 150 also transmits the master public key to the encryption device 200 through the communication device.

The functions and operations of the encryption device 200 will be described. The encryption device 200 includes the verification information generation unit 250, the verification information setting unit 260, and the signature information generation unit 270, in addition to the functions of the encryption device 200 according to the sixth embodiment shown in FIG. 28.

(S1701: Verification Information Generation Step)

Using the processing device, the verification information generation unit 250 computes Formula 224 to generate a verification key vk and a signature key sk.

$$(vk, sk) := \mathcal{G}_{Sig}(1^\lambda) \quad \text{[Formula 224]}$$

(S1702: Message Setting Step)

As with the sixth embodiment, using the processing device and based on the master public key pk, the transmission information setting unit 210 computes Formula 225 to generate each message vector $mv^{[t]}$ (t=0, ..., n−1).

$$mv^{[t]} := mb_n^{[t]} \quad \text{[Formula 225]}$$

(S1703: Verification Information Setting Step)

Using the processing device and based on the master public key pk, the verification information setting unit 260 computes Formula 226 to generate each verification information vector $cv^{[t]}$ (t=0, ..., n−1).

[Formula 226]

$$(\delta_{n+2}^{[0]}, \ldots, \delta_{n+2}^{[n-1]}) \xleftarrow{U} \mathbb{F}_q^{d+2n}, \quad (1)$$

$$cv^{[t]} := \delta_{n+2}^{[t]}(b_{n+2}^{[t]} + vk \cdot b_{n+3}^{[t]}) \ t = 0, \ldots, n-1 \quad (2)$$

That is: (1) using the processing device, the verification information setting unit 260 generates each random number $\delta^{[t]}_{n+2}$ (t=0, ..., n−1).

(2) Using the processing device, the verification information setting unit 260 generates the verification information vector $cv^{[t]}$ (t=0, ..., n−1), for each t (t=0, ..., n−1), by setting a predetermined value (1 in this case) randomized by the random number $\delta^{[t]}_{n+2}$ as the coefficient of the basis vector $b^{[t]}_{n+2}$ in the basis B included in the master public key pk, and also setting the verification key vk randomized by the random number $\delta^{[t]}_{n+2}$ as the coefficient of the basis vector $b^{[t]}_{n+3}$.

(S1704: Cipher Vector Generation Step)

Using the processing device and based on the master public key pk and attribute vectors $\vec{x}_1$ to $\vec{x}_L$ ($\vec{x}_i$(i=1, ..., L) (=$(x_0, \ldots, x_1)$ (i=$\mu_L$−1))) (where L denotes the depth of hierarchy), the cipher vector generation unit 220 computes Formula 227 to generate each cipher vector $c^{[t]}$ (t=0, ..., n−1).

[Formula 227]

$$(\vec{x}_{L+1}, \ldots, \vec{x}_d) \xleftarrow{U} \mathbb{F}_q^{\mu_{L+1}-\mu_L} \times \ldots \times \mathbb{F}_q^{n-\mu_{d-1}}, \quad (1)$$

$$(\delta_1, \ldots, \delta_d, \delta_{n+1}^{[0]}, \ldots, \delta_{n+1}^{[n-1]}) \xleftarrow{U} \mathbb{F}_q^{d+n}$$

$$\vec{s}^{[t]} := (s_0^{[t]}, \ldots, s_{n-1}^{[t]}) \xleftarrow{U} \mathbb{F}_q^n \text{ for } t = 0, \ldots, n-2, \quad (2)$$

$$\vec{s}^{[n-1]} := (\delta_1 \vec{x}_1, \ldots, \delta_d \vec{x}_d) - \left(\sum_{t=0}^{n-2} \vec{s}^{[t]}\right),$$

$$xv^{[t]} := \sum_{i=0}^{n-1} s_i^{[t]} b_i^{[t]} \ t = 0, \ldots, n-1$$

$$rv^{[t]} := \delta_{n+1}^{[t]} b_{n+1}^{[t]} \ t = 0, \ldots, n-1 \quad (3)$$

$$c^{[t]} := xv^{[t]} + mv^{[t]} + rv^{[t]} + cv^{[t]} = \quad (4)$$

$$\sum_{i=0}^{n-1} s_i^{[t]} b_i^{[t]} + mb_n^{[t]} + \delta_{n+1}^{[t]} b_{n+1}^{[t]} + \delta_{n+2}^{[t]}(b_{n+2}^{[t]} + vk \cdot b_{n+3}^{[t]})$$

$$t = 0, \ldots, n-1$$

(1) to (3) shown in Formula 227 are the same as (1) to (3) shown in Formula 210. (4) Using the processing device, the cipher vector generation unit 220 generates the cipher vector $c^{[t]}$, for each basis $B^{[t]}$ (t=0, ..., n−1), by adding the generated attribute information vector $xv^{[t]}$, the generated random number vector $rv^{[t]}$, the message vector $mv^{[t]}$ generated by the transmission information setting unit 210, and the verification information vector $cv^{[t]}$ generated by the verification information setting unit 260.

(S1705: Signature Information Generation Step)

Using the processing device, the signature information generation unit 270 computes Formula 228 to generate signature information Σ.

$$\Sigma := \text{Sign}_{sk}(c^{[0]}, \ldots, c^{[n-1]}) \quad \text{[Formula 228]}$$

That is, using the processing device and based on the signature key sk, the signature information generation unit 270 executes Sign to generate the signature information Σ.

(S1706: Data Transmission Step)

The data transmission unit 230 transmits the cipher vectors $c^{[t]}$ generated by the cipher vector generation unit 220, the verification key vk generated by the verification information generation unit 250, and the signature information Σ generated by the signature information generation unit 270 to the decryption device 300 through the communication device.

To summarize, the encryption device 200 executes the Enc algorithm shown in Formula 229 to generate the cipher vectors $c^{[t]}$ (t=0, ..., n−1), the verification key vk, and the signature information Σ.

[Formula 229]

$Enc(pk, m \in msg,$ $\vec{x} := (\vec{x}_1, \ldots, \vec{x}_L) := ((x_0, \ldots, x_{\mu_1-1}), \ldots, (x_{\mu_{L-1}}, \ldots, x_{\mu_L-1})):$ $(vk, sk) := \mathcal{G}_{Sig}(1^k)(vk \in \mathbb{F}_q),$ $(\vec{x}_{L+1}, \ldots, \vec{x}_d) \xleftarrow{U} \mathbb{F}_q^{\mu_{L+1}-\mu_L} \times \ldots \times \mathbb{F}_q^{n-\mu_{d-1}},$ $(\delta_1, \ldots, \delta_d, \delta_{n+1}^{[0]}, \ldots, \delta_{n+1}^{[n-1]}, \delta_{n+2}^{[0]}, \ldots, \delta_{n+2}^{[n-1]}) \xleftarrow{U} \mathbb{F}_q^{d+2n},$ $\vec{s}^{[t]} := (s_0^{[t]}, \ldots, s_{n-1}^{[t]}) \xleftarrow{U} \mathbb{F}_q^n$ for $t = 0, \ldots, n-2,$ $\vec{s}^{[n-1]} := (\delta_1 \vec{x}_1, \ldots, \delta_d \vec{x}_d) - \left( \sum_{t=0}^{n-2} \vec{s}^{[t]} \right),$ $c^{[t]} := \sum_{i=0}^{n-1} s_i^{[t]} b_i^{[t]} + m b_n^{[t]} + \delta_{n+1}^{[t]} b_{n+1}^{[t]} + \delta_{n+2}^{[t]} (b_{n+2}^{[t]} + vk \cdot b_{n+3}^{[t]}),$ for $t = 0, \ldots, n-1,$ $\Sigma := Sign_{sk}(c^{[0]}, \ldots, c^{[n-1]})$ return $(c^{[0]}, \ldots, c^{[n-1]}, vk, \Sigma).$ The functions and operations of the decryption device 300 will be described. The decryption device 300 includes the tampering verification unit 370, in addition to the functions included in the decryption device 300 according to the sixth embodiment shown in FIG. 28.

(S1801: Vector Input Step)

The vector input unit 310 receives through the communication device and inputs the cipher vectors $c^{[t]}$ (t=0, . . . , n−1), the verification key vk, and the signature information Σ transmitted by the data transmission unit 230 of the encryption device 200.

(S1802: Signature Verification Step)

Using the processing device, the tampering verification unit 370 determines whether or not Formula 230 holds.

$Vrfy_{vk}(c^{[0]}, \ldots, c^{[n-1]}, \Sigma) = 1$ [Formula 230]

That is, the tampering verification unit 370 verifies the signature information Σ by executing Vrfy by the verification key vk.

(S1803: Key Vector Deformation Step)

Using the processing device, the vector deformation unit 350 computes Formula 231 to deform the key vector $k^{[t]*}_{L,0}$.

$\tilde{k}_{L,0}^{[t]*} := k_{L,0}^{[t]*} + \tilde{\sigma}(vk \cdot k_{L,n+2}^{[t]*} - k_{L,n+3}^{[t]*})$ [Formula 231]

where $\tilde{k}_{L,0}^{[t]*}$: first element of the L-th level secret key after being deformed, $k_{L,0}^{[t]*}$: first element of the L-th level secret key before being deformed, $k_{L,n+2}^{[t]*}$: (n+2)-th element of the L-th level secret key, and $k_{L,n+3}^{[t]*}$: (n+3)-th element of the L-th level secret key.

That is, the vector deformation unit 350 deforms the key vector by the verification key vk, such that a pairing operation to be executed in a subsequent step will erase the verification key vk set by the verification information generation unit 250 of the encryption device 200 (such that 0 is set as the coefficient of the basis vector in which information including the verification key vk is set).

(S1804: Pairing Operation Step)

Based on the master public key pk and the deformed key vectors $k^{[t]*}_{L,0}$ (t=0, . . . , n−1), the pairing operation unit 330 computes Formula 232 to generate information f concerning the message m.

$f := \prod_{t=0}^{n-1} e(c^{[t]}, \tilde{k}_{L,0}^{[t]*})$ [Formula 232]

Based on the master public key pk and the deformed key vectors $k^{[t]*}_{L,0}$ (t=0, . . . , n−1), the pairing operation unit 330 computes Formula 233 to generate information g to be used for extracting the message m from the information f.

$g := \prod_{t=0}^{n-1} e(b_n^{[t]}, \tilde{k}_{L,0}^{[t]*})$ [Formula 233]

(S1805: Discrete Logarithm Computation Step)

As with the sixth embodiment, the discrete logarithm computation unit 340 solves a discrete logarithm problem on the information f to the base information g to compute the message m. That is, the discrete logarithm computation unit 340 computes Formula 234.

$m':=D\log_g(f)$ [Formula 234]

where $Dlog_x(y)$ denotes solving a discrete logarithm problem to base x on y.

As with the cryptographic processing system 10 that implements the HPE scheme described in the second embodiment, the message m to be input here shall be a value smaller than a predetermined small integer τ. This is because, as described above, the decryption device 300 needs to solve the discrete logarithm problem in computing the message m. As with the cryptographic processing system 10 that implements the HPE scheme described in the second embodiment, the message m may be set in a plurality of basis vectors.

To summarize, the decryption device 300 executes the Dec algorithm shown in Formula 235 to generate a message m' or a distinguished symbol ⊥.

[Formula 235]

$Dec((k_{L,0}^{[0]*}, \ldots, k_{L,0}^{[n-1]*}, k_{L,n+2}^{[0]*}, \ldots, k_{L,n+2}^{[n-1]*}, k_{L,n+3}^{[0]*}, \ldots, k_{L,n+3}^{[n-1]*}),$ $(c^{[0]}, \ldots, c^{[n-1]}, vk, \Sigma)):$ $Vrfy_{vk}(c^{[0]}, \ldots, c^{[n-1]}, \Sigma) = 1 ?$ $\tilde{\sigma} \xleftarrow{U} \mathbb{F}_q, \tilde{k}_{L,0}^{[t]*} + \tilde{\sigma}(vk \cdot k_{L,n+2}^{[t]*} - k_{L,n+3}^{[t]*})$ $g := \prod_{t=0}^{n-1} e(b_n^{[t]}, \tilde{k}_{L,0}^{[t]*}), f := \prod_{t=0}^{n-1} e(c^{[t]}, \tilde{k}_{L,0}^{[t]*}),$ $Dlog_g(f) \in msg ?$ $m' := Dlog_g(f)$ if both checks are passed;

$m' := \bot$ otherwise, return $m'$.

The functions and operations of the key delegation device 400 will be described. The configuration of the functions of the key delegation device 400 is the same as that of the key delegation device 400 according to the sixth embodiment shown in FIG. 28. The flow of the operations of the key delegation device 400 is the same as that of the key delegation device 400 according to the second embodiment shown in FIG. 32. Thus, the functions and operations of the key delegation device 400 will be described with reference to FIG. 32.

(S1601: Key Vector $k^{[t]*}_{L,0}$ Acquisition Step)

As with the sixth embodiment, the key vector acquisition unit 410 acquires, through the communication device, the L-th level secret key (key information $k^{[t]*}_L$) including the key vector $k^{[t]*}_{L,0}$ which is the first element of the L-th level secret key and the key-generation vectors $k^{[t]*}_{L,j}$ which are the j-th (j=$\mu_1$, ..., n−1) elements of the L-th level secret key.

As with the sixth embodiment, the key vector generation unit 420 and the key-generation vector generation unit 430 perform (S1602) and (S1603) for each t (t=0, ... ,n−1).

(S1602: Key Vector $k^{[t]*}_{L,0}$ Generation Step)

As with the sixth embodiment, using the processing device, the key vector generation unit 420 computes Formula 236 to generate a key vector $k^{[t]*}_{L+1,0}$ which is the first element of an (L+1)-th level secret key.

[Formula 236]

$$\tau_{L+1}, \psi_{L+1,0,0}, \ldots, \psi_{L+1,0,L}, \sigma_{L+1,0} \xleftarrow{U} \mathbb{F}_q \quad (1)$$

$$k^{[t]*}_{L+1,0} := \tau_{L+1}\left(\sum_{i=0}^{L} \psi_{L+1,0,i} k^{[t]*}_{L,i} + k^{[t]*}_{L,0} + \sigma_{L+1,0}\left(\sum_{i=\mu_L}^{\mu_{L+1}-1} v_i k^{[t]*}_{L,i}\right)\right) \quad (2)$$

$$t = 0, \ldots, n-1$$

(S1603: Key-Generation Vector $k^{[t]*}_{L,j}$ Generation Step)

As with the sixth embodiment, using the processing device, the key-generation vector generation unit 430 computes Formula 237 to generate each key-generation vector $k^{[t]*}_{L+1,j}$. The key-generation vector $k^{[t]*}_{L+1,j}$ is the j-th element of the (L+1)-th level secret key.

[Formula 237]

$$\tau_{L+1}, \psi_{L+1,1,0}, \ldots, \psi_{L+1,L+1,L}, \sigma_{L+1,\mu_{L+1}}, \ldots,$$
$$\sigma_{L+1,n-1}, \sigma_{L+1,n+2}, \sigma_{L+1,n+3} \xleftarrow{U} \mathbb{F}_q \quad (1)$$

$$k^{[t]*}_{L+1,j} := \tau_{L+1}\left(\sum_{i=0}^{L} \psi_{L+1,j,i} k^{[t]*}_{L,i} + k^{[t]*}_{L,j} + \sigma_{L+1,j}\left(\sum_{i=\mu_L}^{\mu_{L+1}-1} v_i k^{[t]*}_{L,i}\right)\right) \quad (2)$$

$$t = 0, \ldots, n-1, j = 0, \ldots, L+1,$$
$$\mu_{L+1}, \ldots, n-1, n+2, n+3$$

Note that the key-generation vector generation unit 430 generates the key-generation vectors $k^{[t]*}_{L+1,j}$ (j=0, ..., L+1, $\mu_{L+1}$, ..., n−1, n+2, n+3). That is, the key-generation vector generation unit 430 differs from the key-generation vector generation unit 140 shown in FIG. 10 in that it generates the key-generation vectors $k^{[t]*}_{L+1,n+2}$ and $k^{[t]*}_{L+1,n+3}$.

To summarize, in (S1602) and (S1603), using the processing device, the key vector generation unit 420 and the key-generation vector generation unit 430 execute the Delegate$_L$ algorithm shown in Formula 238 to generate the key information $\vec{k}^{[t]*}_{L+1}$ including the key vector $k^{[t]*}_{L+1,0}$ and the key-generation vectors $k^{[t]*}_{L+1,j}$.

[Formula 238]

$$\text{Delegate}_L\left(\left(\vec{k}^{[0]*}_L, \ldots, \vec{k}^{[n-1]*}_L\right), \vec{v}_{L+1} := (v_{\mu_L}, \ldots, v_{\mu_{L+1}-1})\right):$$

$$\tau_{L+1}, \psi_{L+1,0,0}, \ldots, \psi_{L+1,L+1,L}, \sigma_{L+1,0},$$
$$\sigma_{L+1,\mu_{L+1}}, \ldots, \sigma_{L+1,n-1}, \sigma_{L+1,n+2}, \sigma_{L+1,n+3} \xleftarrow{U} \mathbb{F}_q,$$

For $t = 0, \ldots, n-1, j = 0, \ldots,$
$L+1, \mu_{L+1}, \ldots, n-1, n+2, n+3$ $$k^{[t]*}_{L+1,j} := \tau_{L+1}\left(\sum_{i=0}^{L} \psi_{L+1,j,i} k^{[t]*}_{L,i} + k^{[t]*}_{L,j} + \sigma_{L+1,j}\left(\sum_{i=\mu_L}^{\mu_{L+1}-1} v_i k^{[t]*}_{L,i}\right)\right),$$

$$\vec{k}^{[t]*}_{L+1} := \left(k^{[t]*}_{L+1,0}, \ldots, k^{[t]*}_{L+1,L+1}, k^{[t]*}_{L+1,\mu_{L+1}}, \ldots, k^{[t]*}_{L+1,n-1}, k^{[t]*}_{L+1,n+2} k^{[t]*}_{L+1,n+3}\right),$$

$$\text{return } sk_{(\vec{v}_1, \ldots, \vec{v}_{L+1})} := \left(\vec{k}^{[0]*}_{L+1}, \ldots, \vec{k}^{[n-1]*}_{L+1}\right).$$

(S1604: Key Distribution Step)

As with the sixth embodiment, the key distribution unit 440 transmits the key information $\vec{k}^{[t]*}_{L+1}$ generated by the key vector generation unit 420 and the key-generation vector generation unit 430 to the decryption device 300 of a lower level through the communication device.

As has been described, the cryptographic processing system 10 according to this embodiment implements the HPE scheme that is adaptively attribute-hiding against CCA adapted from the HPE scheme that is adaptively attribute-hiding against CPA described in the sixth embodiment.

Eighth Embodiment

In this embodiment, methods for implementing dual distortion vector spaces (DDVS) will be described. First, an implementation method by a direct product of asymmetric bilinear pairing groups used as an example of DDVS in the above embodiments will be described. Next, an implementation method by a direct product of symmetric bilinear pairing groups will be described. Then, an implementation method by a Jacobian variety of a supersingular curve of genus ≥1 will be described.

<Implementation Method by a Direct Product of Asymmetric Bilinear Pairing Groups>

An asymmetric bilinear pairing group ($G_1$, $G_2$, $G_T$, $g_1$, $g_2$, q) and a pairing operation e on the asymmetric bilinear pairing group ($G_1$, $G_2$, $G_T$, $g_1$, $g_2$, q) are given. The asymmetric bilinear pairing group ($G_1$, $G_2$, $G_T$, $g_1$, $g_2$, q) and the pairing operation have been described in the first embodiment.

DDVS are implemented as shown below.

V, V*, $a_0$, ..., $a_{N-1}$, $a^*_0$, ..., $a^*_{N-1}$ are shown in Formula 239.

$$\mathbb{V} := G_1^N,$$

$$\mathbb{V}^* := G_2^N,$$

$$a_0 := (g_1, 1, \ldots, 1), \ldots, a_{N-1} := (1, \ldots, 1, g_1),$$

$$a^*_0 := (g_2, 1, \ldots, 1), \ldots, a^*_{N-1} := (1, \ldots, 1, g_2) \quad \text{[Formula 239]}$$

Vectors x and y are shown in Formula 240.

$$x := \sum_{i=0}^{N-1} x_i a_i \left(resp. y := \sum_{i=0}^{N-1} y_i a^*_i\right) \text{ is} \quad \text{[Formula 240]}$$

$$(x_0 g_1, \ldots, x_{N-1} g_1)(resp.(y_0 g_2, \ldots, y_{N-1} g_2)).$$

The pairing operation e on (V, V*) is defined as shown in Formula 241.

$$e(x, y) := \prod_{i=0}^{N-1} e(g_1 x_i, g_2 y_i) = e(g_1, g_2)^{\sum_{i=0}^{N-1} x_i y_i} \quad \text{[Formula 241]}$$

Here, the notation e of the pairing operation e is used for both $(G_1, G_2)$ and $(V, V^*)$. The non-degeneracy and bilinearity of the pairing operation e obviously hold. Here, Formula 242 holds.

$$e(a_i, a^*_j) = u^{\delta_{i,j}} \; i,j \in \{0,\ldots,N-1\} \quad \text{[Formula 242]}$$

where
δ: Kronecker δ (i.e., $\delta_{i,j}=1$ if i=j and $\delta_{i,j}=0$ if i≠j), and
$u:=e(g_1,g_2)\neq 1 \in \mathbb{G}_T$.

Distortion maps $\phi_{i,j}$ are simply defined as shown in Formula 243.

[Formula 243]

$$\phi_{i,j}(x) := (\overbrace{0,\ldots,0}^{i-1}, x_j g_1, \overbrace{0,\ldots,0}^{N-i})$$
$$\text{for } x := (g_1 x_0, \ldots, g_1 x_j, \ldots, g_1 x_{N-1})$$

<Implementation Method by a Direct Product of Symmetric Bilinear Pairing Groups>

Using a symmetric bilinear pairing group (G, $G_T$, g, q) described hereinabove, the same direct product construction can be made as in the case of using the asymmetric bilinear pairing group $(G_1, G_2, G_T, g_1, g_2, q)$. That is, V=V* and A=A* for that construction. Therefore, it is possible to check whether $c \notin F_q$ such that x=cx' exists for any pair of nonzero vectors x and x' in spaces V=V* by using the pairing operation e and a projection to a basis vector in the bases A=A*.

<Implementation Method by a Jacobian Variety of a Supersingular Curve of genus ≥1>

DDVS are realized by a q-rational points group of a Jacobian variety of some specific supersingular hyperelliptic curves C, i.e., $V=V^*:=Jac_c[q]$. The dimension N of the space V (and V*) is twice the supersingular hyperelliptic curves C. The canonical basis $A=(a_0,\ldots,a_{N-1})$ of the space V is given by eigenvectors of a Frobenius endomorphism. All values $\kappa_{i,j} \in F_q$ such as shown in Formula 244 are determined for the Weil pairing e discussed in Non-Patent Literature 27. Using such explicit values of $\kappa_{i,j}$, the dual orthonormal basis A* of the space V* can be constructed.

$$e(a_i, a^*_j) = u^{\delta_{i,j}} \; i,j \in \{0,\ldots,N-1\} \quad \text{[Formula 244]}$$

where
δ: Kronecker δ (i.e., $\delta_{i,j}=1$ if i=j and $\delta_{i,j}=0$ if i≠j), and
$u:=e(g_1,g_2)\neq 1 \in \mathbb{G}_T$.

Here, note that an endomorphism $\phi_{i,j}$ called a distortion map in Non-Patent Literature 21 does not necessarily satisfy the condition that $\phi_{i,j}(a_k)=0$ if k≠j. However, Non-Patent Literature 21 shows that a projection operator $Pr_j$ to $<a_j>$, i.e., $Pr_j(a_k)=\delta_{j,k}a_j$, is polynomial-time computable. Therefore, a composition $\phi_{i,j}Pr_j$ satisfies the condition $\phi_{i,j}Pr_j(a_k)=\delta_{j,k}a_i$, and this is polynomial-time computable. Here, $\phi_{i,j}Pr_j$ is called distortion maps.

Ninth Embodiment

In the above embodiments, the methods for implementing the cryptographic processes in dual vector spaces have been described. In this embodiment, a method for implementing the cryptographic processes in dual modules will be described.

That is, in the above embodiments, the cryptographic processes are implemented in cyclic groups of prime order q. However, when a ring R is expressed using a composite number M as shown in Formula 245, the cryptographic processes described in the above embodiments can be adapted to a module having the ring R as the coefficient.

$$\mathbb{R} := \mathbb{Z}/M\mathbb{Z} \quad \text{[Formula 245]}$$

where
$\mathbb{Z}$: integer, and
M: composite number.

For example, when the HPKEM scheme described in the second embodiment is implemented in the module having the ring R as the coefficient, it is expressed as shown in Formulas 246 to 250.

[Formula 246]

$$\text{Setup}(1^\lambda, \vec{\mu} := (n, d; \mu_1, \ldots, \mu_d)):$$

$$N := n+2, (\mathbb{V}, \mathbb{V}^*, \mathbb{G}_T, \mathbb{A}, \mathbb{A}^*, M) \xleftarrow{R} \mathcal{G}_{ddvs}(1^\lambda, N)$$

$$X := (x_{i,j}) \xleftarrow{U} GL(N, \mathbb{R}), \; b_i = \sum_{j=0}^{N-1} x_{i,j} a_j, \; \mathbb{B} := (b_0, \ldots, b_{N-1}).$$

$$(v_{i,j}) := (x^T)^{-1}, \; b_i^* = \sum_{j=0}^{N-1} v_{i,j} a_j^*, \; \mathbb{B}^* := (b_0^*, \ldots, b_{N-1}^*),$$

$$sk := \mathbb{B}^*, \; pk := (1^\lambda, \vec{\mu}, \mathbb{V}, \mathbb{V}^*, \mathbb{G}_T, \mathbb{A}, \mathbb{A}^*, M, \mathbb{B}).$$

return sk, pk.

[Formula 247]

$$\text{GenKey}(pk, sk, \vec{v}_1 := (v_0, \ldots, v_{\mu_1-1})):$$

$$(\sigma_{1,0}, \sigma_{1,\mu_1}, \ldots, \sigma_{1,n-1}) \xleftarrow{U} \mathbb{R}^{n-\mu_1+1}$$

$$k_{1,0}^* := \sigma_{1,0}\left(\sum_{i=0}^{\mu_1-1} v_i b_i^*\right) + b_n^*,$$

$$k_{1,j}^* := \sigma_{1,j}\left(\sum_{i=0}^{\mu_1-1} v_i b_i^*\right) + b_j^*, \; j = \mu_1, \mu_1+1, \ldots, n-1$$

$$\vec{k}_1^* := (k_{1,0}^*, k_{1,\mu_1}^*, \ldots, k_{1,n-1}^*).$$

return $\vec{k}_1^*$.

[Formula 248]

$$\text{Enc}(pk, \vec{x} := (\vec{x}_1, \ldots, \vec{x}_L)) :=$$

$$((x_0, \ldots, x_{\mu_1-1}), \ldots, (x_{\mu_{L-1}}, \ldots, x_{\mu_L-1}))):$$

$$(\vec{x}_{L+1}, \ldots, \vec{x}_d) \xleftarrow{U} \mathbb{R}^{\mu_{L+1}\mu_L} \times \ldots \times \mathbb{R}^{n-\mu_{d-1}}$$

$$(\rho, \delta_1, \ldots, \delta_d, \delta_{n+1}) \xleftarrow{U} \mathbb{R}^{d+2},$$

$$c := \delta_1\left(\sum_{i=0}^{\mu_1-1} x_i b_i\right) + \ldots + \delta_d\left(\sum_{i=\mu_{d-1}}^{n-1} x_i b_i\right) + \rho b_n + \delta_{n+1} b_{n+1},$$

$$K := u\rho.$$

return (c, K).

-continued

[Formula 249]

$$Dec(pk, k^*_{L,0}, c) : K' := e(c, k^*_{L,0}),$$

return $K'$.

[Formula 250]

$$Delegate_L(pk, \vec{k}^*_L, \vec{v}_{L+1} := (v_{\mu_L}, \ldots, v_{\mu_{L+1}-1})):$$

$$(\sigma_{L+1,0}, \sigma_{L+1,\mu_{L+1}}, \ldots, \sigma_{L+1,n-1}) \xleftarrow{U} \mathbb{R}^{n-\mu_{L+1}+1}$$

$$k^*_{L+1,j} := k^*_{L,j} + \sigma_{L+1,j}\left(\sum_{i=\mu_L}^{\mu_{L+1}-1} v_i k^*_{L,i}\right), j = 0,$$

$$\mu_{L+1}, \mu_{L+1}+1, \ldots, n-1,$$

$$\vec{k}^*_{L+1} := (k^*_{L+1,0} k^*_{L+1,\mu_{L+1}}, \ldots, k^*_{L+1,n-1}).$$

return $k^*_{L+1}$.

That is, in principle, the processes described for the field $F_q$ in the above embodiments can be implemented in the module having the ring R as the coefficient by replacing the field $F_q$ with the ring R.

A hardware configuration of the cryptographic processing system 10 (the key generation device 100, the encryption device 200, the decryption device 300, and the key delegation device 400) according to the embodiments will now be described.

Figure 36:
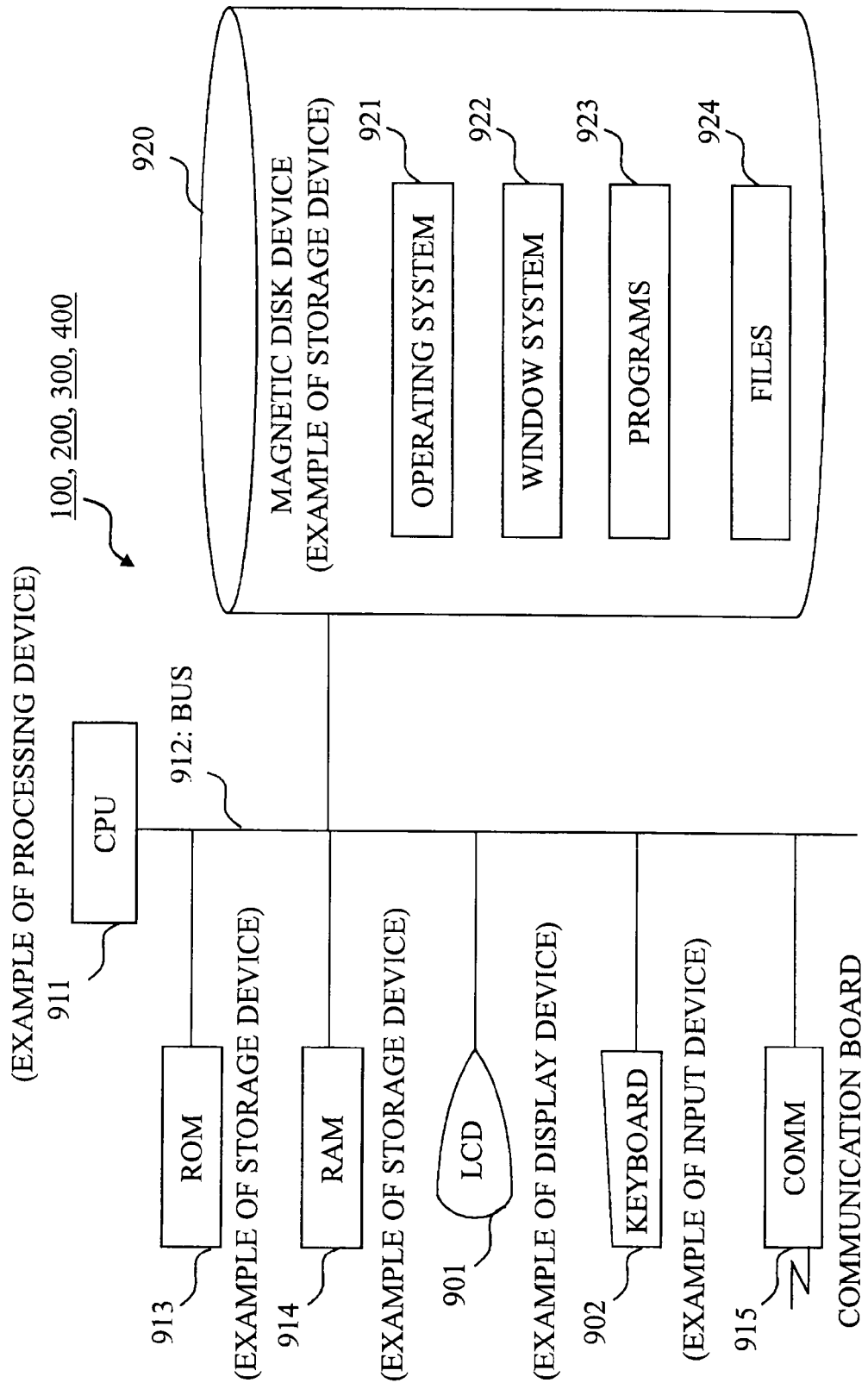
FIG. 36 is a diagram showing an example hardware configuration of the key generation device 100, the encryption device 200, the decryption device 300, and the key delegation device 400.

FIG. 36 is a diagram showing an example hardware configuration of the key generation device 100, the encryption device 200, the decryption device 300, and the key delegation device 400.

As shown in FIG. 36, the key generation device 100, the encryption device 200, the decryption device 300, and the key delegation device 400 each include the CPU 911 (central processing unit, also called a processing unit, an arithmetic unit, a microprocessor, a microcomputer, or a processor). The CPU 911 is connected through the bus 912 with the ROM 913, the RAM 914, the LCD 901 (liquid crystal display), the keyboard 902 (K/B), the communication board 915, and the magnetic disk device 920, and controls these hardware devices. The magnetic disk device 920 (a fixed disk device) may be replaced with a storage device such as an optical disk device or a memory card read/write device. The magnetic disk device 920 is connected through a predetermined fixed disk interface.

The ROM 913 and the magnetic disk device 920 are examples of a nonvolatile memory. The RAM 914 is an example of a volatile memory. The ROM 913, the RAM 914, and the magnetic disk device 920 are examples of a storage device (memory). The keyboard 902 and the communication board 915 are examples of an input device. The communication board 915 is an example of a communication device (a network interface). The LCD 901 is an example of a display device.

The magnetic disk device 920, the ROM 913, or the like stores an operating system 921 (OS), a window system 922, programs 923, and files 924. The programs 923 are executed by the CPU 911, the operating system 921, and the window system 922.

The programs 923 store software or programs for executing the functions described hereinabove as "the master key generation unit 110", "the master key storage unit 120", "the key vector generation unit 130", "the key-generation vector generation unit 140", "the key distribution unit 150", "the transmission information setting unit 210", "the cipher vector generation unit 220", "the data transmission unit 230", "the session key generation unit 240", "the verification information generation unit 250", "the verification information setting unit 260", "the signature information generation unit 270", "the vector input unit 310", "the key vector storage unit 320", "the pairing operation unit 330", "the discrete logarithm computation unit 340", "the vector deformation unit 350", "the decryption unit 360", "the tampering verification unit 370", "the key vector acquisition unit 410", "the key vector generation unit 420", "the key-generation vector generation unit 430", "the key distribution unit 440" and so on, and other programs. The programs are read and executed by the CPU 911.

The files 924 store information, data, signal values, variable values, and parameters, such as "the master public key pk", "the master secret key sk", "the cipher vector c", and "the key vector" described hereinabove, each of which is stored as an item of a "file" or a "database". The "file" or "database" is stored in a storage device such as a disk or memory. The information, data, signal values, variable values, and parameters stored in the storage device such as the disk or memory are read by the CPU 911 through a read/write circuit to a main memory or a cache memory, and are used for operations of the CPU 911 such as extraction, search, reference, comparison, calculation, computation, processing, output, printing, and display. The information, data, signal values, variable values, and parameters are temporarily stored in the main memory, the cache memory, or a buffer memory during the operations of the CPU 911 such as extraction, search, reference, comparison, calculation, computation, processing, output, printing, and display.

In the flowcharts described hereinabove, an arrow mainly represents an input/output of data or a signal, and each data or signal value is stored in the RAM 914, or other types of storage medium such as an optical disk, or an IC chip. The data or signal is transferred online through the bus 912, a signal line, a cable, other types of transfer medium, or a radio wave.

What is described hereinabove as "a . . . unit" may be "a . . . circuit", "a . . . device, "a . . . tool" "a . . . means", or "a . . . function", and may also be "a . . . step", "a . . . procedure", or "a . . . process". What is described as "a . . . device" may be "a . . . circuit", "a . . . device", "a . . . tool", "a . . . means", or "a . . . function", and may also be "a . . . step", "a . . . procedure", or "a . . . process". What is described as "a . . . process" may be "a . . . step". That is, what is described as "a . . . unit" may be implemented by firmware stored in the ROM 913. Alternatively, "the . . . unit" may be implemented solely by software, or solely by hardware such as elements, devices, boards, and wiring, or by a combination of software and hardware, or by a combination including firmware. Firmware or software is stored as a program in a storage medium such as the ROM 913. The program is read by the CPU 911 and executed by the CPU 911. That is, the program causes a computer or the like to function as "the . . . unit" described above. Alternatively, the program causes the computer or the like to execute a procedure or a method of "the . . . unit" described above.

REFERENCE SIGNS LIST

10: cryptographic processing system; 100: key generation device; 110: master key generation unit; 120: master key storage unit; 130: key vector generation unit; 140: key-generation vector generation unit; 150: key distribution unit; 200: encryption device; 210: transmission information setting unit; 220: cipher vector generation unit; 230: data transmission unit; 240: session key generation unit; 250: verification information generation unit; 260: verification information setting unit; 270: signature information generation unit; 300: decryption device; 310: vector input unit; 320: key vector storage unit; 330: pairing operation unit; 340: discrete logarithm computation unit; 350: vector deformation unit; 360: decryption unit; 370: tampering verification unit; 400: key delegation device; 410: key vector acquisition unit; 420: key vector generation unit; 430: key-generation vector generation unit; 440: key distribution unit.

The invention claimed is:

1. A cryptographic processing system that performs a cryptographic process using dual vector spaces of a space V and a space V* paired through a pairing operation, the cryptographic processing system comprising:
    an encryption device that, using a processing device, generates as a cipher vector a vector in the space V, the vector having predetermined information embedded therein; and
    a decryption device that, using the processing device and using a predetermined vector in the space V* as a key vector, performs the pairing operation on the cipher vector generated by the encryption device and the key vector, to decrypt the cipher vector and to extract information concerning the predetermined information.

2. The cryptographic processing system of claim 1,
    wherein the cryptographic processing system performs the cryptographic process in the space V and the space V* which are N-dimensional vector spaces,
    wherein the encryption device generates as the cipher vector an N-dimensional vector $\chi := (\chi_0 g_1, \ldots, \chi_{N-1} g_1)$ in the space V, and
    wherein the decryption device, using an N-dimensional vector $\eta := (\eta_0 g_2, \ldots, \eta_{N-1} g_2)$ in the space V* as the key vector, performs a pairing operation $e(\chi, \eta)$ shown in Formula 1 on the cipher vector $\chi := (\chi_0 g_1, \ldots, \chi_{N-1} g_1)$ and the key vector $\eta := (\eta_0 g_2, \ldots, \eta_{N-1} g_2)$ $$e(p, q) := \prod_{i=0}^{N-1} e(\chi_i g_1, \eta_i g_2). \quad [\text{Formula 1}]$$

3. The cryptographic processing system of claim 2,
    wherein the cryptographic processing system performs the cryptographic process in the space V and the space V* which have a canonical basis $A := (a_0, a_{N-1})$ and a canonical basis $A^* := (a^*_0, \ldots, a^*_{N-1})$ respectively, the canonical basis A and the canonical basis A* satisfying a condition for an orthonormal basis shown in Formula 2

$$e(a_i, a_j^*) = u \delta_{i,j} \quad [\text{Formula 2}]$$

where if $i = j$ for all $i$ and $j$, then $\delta_{i,j} = 1$, and if $i \neq j$, then $\delta_{i,j} = 0$, and $u \neq 1$.

4. The cryptographic processing system of claim 3,
    wherein the space V and the space V* have the canonical basis $A := (a_0, \ldots, a_{N-1})$ and the canonical basis $A^* := (a^*_0, \ldots, a^*_{N-1})$ having distortion maps $\phi_{i,j}$ and $\phi^*_{i,j}$ shown in Formula 3 and Formula 4 respectively If $\phi_{i,j}(a_j) = a_i$ and $\quad [\text{Formula 3}]$ $k \neq j$, then $\phi_{i,j}(a_k) = 0$ If $\phi^*_{i,j}(a_j^*) = a_i^*$ and $\quad [\text{Formula 4}]$ $k \neq j$, then $\phi^*_{i,j}(a_k^*) = 0$.

5. The cryptographic processing system of claim 3,
    wherein the encryption device generates as the cipher vector a vector of a basis B constructed from the canonical basis A of the space V by performing a predetermined operation, and
    wherein the decryption device uses as the key vector a vector of a basis B* constructed from the canonical basis A* of the space V* by performing an operation derived from the predetermined operation, the basis B* and the basis B being orthonormal bases.

6. The cryptographic processing system of claim 5,
    wherein the basis B is a basis $B := (b_0, \ldots, b_{N-1})$ constructed from the canonical basis A by performing an operation shown in Formula 5, and
    wherein the basis B* is a basis $B^* := (b^*_0, \ldots, b^*_{N-1})$ constructed from the canonical basis A* by performing an operation shown in Formula 6

$$b_i = \sum_{j=0}^{N-1} x_{i,j} a_j \quad [\text{Formula 5}]$$

$i = 0, \ldots, N-1$ where $X := (x_{i,j}) \xleftarrow{U} GL(N, F_q)$ $$b_i^* = \sum_{j=0}^{N-1} v_{i,j} a_j^* \quad [\text{Formula 6}]$$

$i = 0, \ldots, N-1$ where $(v_{i,j}) := (X^T)^{-1}$.

7. The cryptographic processing system of claim 5,
    wherein the encryption device includes
    a transmission information setting unit that, using the processing device, generates as a transmission information vector a vector in which $\rho$ is set as a coefficient of a basis vector $b_n$ of basis vectors $b_i$ ($i=0, \ldots, N-1$) in the basis B of the space V, and
    a cipher vector generation unit that, using the processing device, generates the cipher vector by adding a vector in which each of attribute information $x_i$ ($i=0, \ldots, \mu_{Lx}-1$) is set as a coefficient of each of basis vectors $b_i$ ($i=0, \ldots, \mu_{Lx}-1$) to the transmission information vector generated by the transmission information setting unit, and
    wherein the decryption device includes
    a key vector storage unit that stores, as the key vector and in a storage device, a vector in which a predetermined value is set as a coefficient of a predetermined basis vector $b^*_n$ of basis vectors $b^*_i$ ($i=0, \ldots, N-1$) in the basis B* of the space V*, and in which each of predicate information $v_i$ ($i=0, \ldots, \mu_{Lv}-1$) is set as a coefficient of each of basis vectors $b^*_i$ ($i=0, \ldots, \mu_{Lv}-1$) ($\mu_{Lx} \geq \mu_{Lv}$), and
    a pairing operation unit that, using the processing device, performs the pairing operation on the cipher vector generated by the cipher vector generation unit and the key vector stored by the key vector storage unit, and extracts from the cipher vector a value concerning the p set as the coefficient of the basis vector $b_n$.

8. The cryptographic processing system of claim 7, further comprising:
- a key generation device including a key vector generation unit that, using the processing device, generates as a key vector $k_{L,0}$ a vector in which a predetermined value is set as a coefficient of the predetermined basis vector $b^*_n$ of basis vectors $b^*_i$ (i=0, ..., n−1) in the basis B* of the space V*, and in which each of predicate information $v_i$ (i=0, ..., $\mu_L$−1) is set as a coefficient of each of basis vectors $b^*_i$ (i=0, ..., $\mu_L$−1).

9. The cryptographic processing system of claim 8,
wherein the key generation device further includes
a key-generation vector generation unit that, using the processing device, generates, as key-generation vectors $k_{L,i}$ (i=$\mu_L$, ..., n−1) for generating a lower level key vector of the key vector $k_{L,0}$, an ((n−1)−$\mu_L$−1) number of vectors in which a predetermined value is set as a coefficient of a basis vector $b^*_i$, for each i of i=$\mu_L$, ..., n−1.

10. The cryptographic processing system of claim 9, further comprising:
- a key delegation device including
  - a key vector generation unit that, using the processing device, generates a key vector $k_{L+1,0}$ which is the lower level key vector of the key vector $k_{L,0}$ by adding the key vector $_{L,0}$ and vectors $v_i$ (i=$\mu_L$, ..., $\mu_{L+1}$−1) in which each of predicate information $v_i$ (i=$\mu_L$, ..., $\mu_{L+1}$−1) is set as a coefficient of each of key-generation vectors $k_{L,i}$ (i=$\mu_L$, ..., $\mu_{L+1}$−1), and
  - a key-generation vector generation unit that, using the processing device, generates key-generation vectors $k_{L+1,i}$ (i=$\mu_{L+1}$, ..., n−1) for generating the lower level key vector of the key vector $k_{L+1,0}$ by making a predetermined change to the key-generation vectors $k_{L,i}$ (i=$\mu_{L+1}$, ..., n−1).

11. A key generation device that generates a key vector $k_{L,0}$ which is a secret key in a predicate encryption scheme, the key generation device comprising:
- a master key storage unit that, when a space V and a space V* are dual vector spaces paired through a pairing operation, stores in a storage device the space V* as a master secret key; and
- a key vector generation unit that, using a processing device, generates as the key vector $k_{L,0}$ a vector in which a predetermined value is set as a coefficient of a basis vector $b^*_n$ of basis vectors $b^*_i$ (i=0, ..., N−1) in a predetermined basis B* of the space V*, and in which each of predicate information $v_i$ (i=0, ..., $\mu_L$−1) is set as a coefficient of each of basis vectors $b^*_i$ (i=0, ..., $\mu_L$−1), the space V* being the master secret key stored by the master key storage unit.

12. The key generation device of claim 11,
wherein the key vector generation unit sets each of the predicate information $v_i$ (i=0, ..., $\mu_L$−1) as the coefficient of each of the basis vector $b^*_i$ (i=0, ..., $\mu_L$−1), such that an inner-product of each of the predicate information $v_i$ (i=0, ..., $\mu_L$−1) and each of attribute information $x_i$ (i=0, ..., $\mu_L$−1) becomes 0.

13. The key generation device of claim 11,
wherein the key vector generation unit generates the key vector $k_{L,0}$ as shown in Formula 7

$$k^*_{L,0} := \sigma_{L,0}\left(\sum_{i=0}^{\mu_1-1} v_i b^*_i\right) + \ldots + \sigma_{L,L-1}\left(\sum_{i=\mu_{L-1}}^{\mu_L-1} v_i b^*_i\right) + b^*_n, \quad [\text{Formula 7}]$$

where
$k^*_{L,0}$: first element of an L-th level secret key,
$\sigma_{L,0}, \ldots, \sigma_{L,L-1}$: predetermined values, and
$v_i$: predicate information.

14. The key generation device of claim 11, further comprising:
a key-generation vector generation unit that, using the processing device, generates, as key-generation vectors $k_{L,i}$ (i=$\mu_L$, ..., n−1) for generating a lower level key vector of the key vector $k_{L,0}$, an ((n−1)−$\mu_L$−1) number of vectors in which a predetermined value is set as a coefficient of a basis vector $b^*_i$, for each i of i=$\mu_L$, ..., n−1.

15. The key generation device of claim 14,
wherein the key vector generation unit generates the key vector $k_{L,0}$ as shown in Formula 8, and
wherein the key-generation vector generation unit generates the key-generation vectors $k_{L,i}$ (i=$\mu_L$, ..., n−1) as shown in Formula 8

$$k^*_{L,0} := \sigma_{L,0}\left(\sum_{i=0}^{\mu_1-1} v_i b^*_i\right) + \ldots + \sigma_{L,L-1}\left(\sum_{i=\mu_{L-1}}^{\mu_L-1} v_i b^*_i\right) + b^*_n, \quad [\text{Formula 8}]$$

$$k^*_{L,j} := \sigma_{L,j,1}\left(\sum_{i=0}^{\mu_1-1} v_i b^*_i\right) + \ldots + \sigma_{L,j,L-1}\left(\sum_{i=\mu_{L-1}}^{\mu_L-1} v_i b^*_i\right) + b^*_j$$

$$j = \mu_L, \ldots, n-1$$

where
$k^*_{L,0}$: first element of an L-th level secret key,
$k^*_{L,j}$: j-th element of the L-th level secret key,
$v_i$: predicate information, and
$\sigma_{L,0}, \ldots, \sigma_{L,L-1}, \sigma_{L,\mu_L}, 0, \ldots, \sigma_{L,\mu_L}, L-1, \ldots, \sigma_{L,n-1,0}, \ldots, \sigma_{L,n-1,L-1}$: predetermined values.

16. A key delegation device that generates a key vector which is a secret key in a predicate encryption scheme, the key delegation device comprising:
- a key vector acquisition unit that, when a space V and a space V* are dual vector spaces paired through a pairing operation, acquires a key vector in the space V* that can decrypt predetermined cipher vectors in the space V, and
- a key vector generation unit that, using a processing device, generates a new key vector in the space V* that can decrypt some cipher vectors of the predetermined cipher vectors that can be decrypted by the key vector.

17. The key delegation device of claim 16,
wherein the key vector acquisition unit acquires as the key vector a vector in which predicate information is set as a coefficient of a predetermined basis vector in a predetermined basis B* of the space V*, and
wherein the key vector generation unit generates the new key vector by adding, to the key vector acquired by the key vector acquisition unit, a vector in which the predicate information is set as a coefficient of a basis vector in the basis B* other than the predetermined basis vector.

18. The key delegation device of claim 16,
wherein the key vector acquisition unit acquires an L-th level key vector $k_{L,0}$ in which each of predicate information $v_i$ (i=0, ..., $\mu_L$−1) is set in each of basis vectors $b^*_i$ (i=0, ..., $\mu_L$−1) of basis vectors $b^*_i$ (i=0, ..., N−1) in the basis B*, and also acquires key-generation vectors $k_{L,i}$ (i=$\mu_L$, ..., $\mu_{L+1}$−1) in which a predetermined value is set as a coefficient of each of basis vectors $b^*_i$, and
wherein the key vector generation unit, using the processing device, generates an (L+1)-th level key vector $k_{L+1, 0}$ by adding, to the key vector $k_{L, 0}$, vectors $v_i$ ($i=\mu_L, \ldots, \mu_{L+1}-1$) in which, for each i of $i=\mu_L, \ldots, \mu_{L+1}-1$, the predicate information $v_i$ is set as a coefficient of the basis vector $b^*_i$ in the key-generation vector $k_{L, i}$ acquired by the key vector acquisition unit.

19. The key delegation device of claim 18,
wherein the key vector generation unit multiplies the coefficient of the basis vector $b^*_i$ of the key-generation vector $k_{L, i}$ by a factor of predicate information $v_i$ ($i=\mu_L, \ldots, \mu_{L+1}-1$) such that an inner-product of each of the predicate information $v_i$ ($i=\mu_L, \ldots, \mu_{L+1}-1$) and each of attribute information $x_i$ ($i=\mu_L, \ldots, \mu_{L+1}-1$) becomes 0.

20. The key delegation device of claim 18,
wherein the key vector generation unit generates the key vector $k_{L+1, 0}$ as4 shown in Formula 9, based on the key vector $k_{L, 0}$ and the key-generation vectors $k_{L, i}$ $$k^*_{L+1,0} := k^*_{L,0} + \sigma_{L+1,0}\left(\sum_{i=\mu_L}^{\mu_{L+1}-1} v_i k^*_{L,i}\right),\quad [\text{Formula 9}]$$

where
$k^*_{L+1,0}$: first element of an (L+1)-th level secret key,
$k^*_{L,0}$: first element of an L-th level secret key,
$k^*_{L,i}$: i-th element of the L-th level secret key,
$v_i$: predicate information, and
$\sigma_{L+1,0}$: predetermined value.

21. The key delegation device of claim 18, further comprising:
a key-generation vector generation unit that, using the processing device, generates key-generation vectors $k_{L+1,i}$ ($i=\mu_{L+1}, \ldots, n-1$) for generating a lower level key vector of the key vector $k_{L+1, 0}$ by making a predetermined change to the key-generation vectors $k_{L, i}$ ($i=\mu_L, \ldots, \mu L+1-1$).

22. The key delegation device of claim 21,
wherein the key vector acquisition unit acquires the key vector $k_{L, 0}$ and the key-generation vectors $k_{L, i}$ ($i=\mu_L, \ldots, n-1$) as shown in Formula 10,
wherein the key vector generation unit generates the key vector $k_{L+1, 0}$ as shown in Formula 10, based on the key vector $k_{L, 0}$ and the key-generation vectors $k_{L, i}$ acquired by the key vector acquisition unit, and
wherein the key-generation vector generation unit generates the key-generation vectors $k_{L+1, i}$ ($i=\mu_{L+1}, \ldots, n-1$) as shown in Formula 10, based on the key-generation vectors $k_{L, i}$ acquired by the key vector acquisition unit

[Formula 10]

$$k^*_{L+1,0} := k^*_{L,0} + \sigma_{L+1,0}\left(\sum_{i=\mu_L}^{\mu_{L+1}-1} v_i k^*_{L,i}\right),$$

$$k^*_{L+1,j} := k^*_{L,j} + \sigma_{L+1,j}\left(\sum_{i=\mu_L}^{\mu_{L+1}-1} v_i k^*_{L,i}\right) j = \mu_{L+1},$$

$$\mu_{L+1}+1, \ldots, n-1$$

where
$k^*_{L+1,0}$: first element of the (L+1)-th level secret key,
$k^*_{L+1,i}$: i-th element of the (L+1)-th level secret key,
$k^*_{L,0}$: first element of the L-th level secret key,
$k^*_{L,i}$: i-th element of the L-th level secret key,
$v_i$: predicate information,
$\sigma_{L+1,0}$: predetermined value,
$\sigma_{L+1,j}$: predetermined value, $$k^*_{1,0} := \sigma_{1,0}\left(\sum_{i=0}^{\mu_1-1} v_i b^*_i\right) + b^*_n,\ k^*_{1,j} := \sigma_{1,j}\left(\sum_{i=0}^{\mu_1-1} v_i b^*_i\right) + b^*_j,$$

$j = \mu_1, \mu_1+1, \ldots, n-1$, and $\sigma_{1,0}, \sigma_{1,\mu_1}, \ldots, \sigma_{1,n-1}$: predetermined values.

23. An encryption device comprising:
a transmission information setting unit that, when a space V and a space V* are dual vector spaces paired through a pairing operation, using a processing device, generates as a transmission information vector a vector in which p is set as a coefficient of a basis vector $b_n$ of basis vectors $b_i$ ($i=0, \ldots, N-1$) in a predetermined basis B of the space V; and
a cipher vector generation unit that, using the processing device, generates a cipher vector by adding an attribute vector in which each of attribute information $x_i$ ($i=0, \ldots, \mu_{Lx}-1$) is set as a coefficient of each of basis vectors $b_i$ ($i=0, \ldots, \mu_{Lx}-1$) to the transmission information vector generated by the transmission information setting unit.

24. The encryption device of claim 23,
wherein the transmission information setting unit generates a transmission information vector $\rho v$ shown in Formula 11, and
wherein the cipher vector generation unit generates a cipher vector c by adding an attribute information vector $xv$ shown in Formula 12 to the transmission information vector $\sigma v$ shown in Formula 11

$$xv := \delta_1\left(\sum_{i=0}^{\mu_1-1} x_i b_i\right) + \ldots + \delta_d\left(\sum_{i=\mu_{d-1}}^{n-1} x_i b_i\right) \quad [\text{Formula 12}]$$

25. A decryption device comprising:
a vector input unit that, when a space V and a space V* are dual vector spaces paired through a pairing operation, inputs as a cipher vector a vector in which $\rho$ is set as a coefficient of a basis vector $b_n$, of basis vectors $b_i$ ($i=0, \ldots, N-1$) of a predetermined basis B of the space V, and in which each of attribute information $x_i$ ($i=0, \ldots, \mu_{Lx}-1$) is set as a coefficient of each predetermined basis vector of basis vectors $b_i$ ($i=0, \ldots, \mu_{Lx}-1$);
a key vector storage unit that stores, as a key vector and in a storage device, a vector in which a predetermined value is set as a coefficient of a predetermined basis vector $b^*_n$ of basis vectors $b^*_i$ ($i=0, \ldots, N-1$) in a predetermined basis B* of the space V*, and in which each of predicate information $v_i$ ($i=0, \ldots, \mu_{Lv}-1$) is set as a coefficient of each of basis vectors $b^*_i$ ($i=0, \ldots, \mu_{Lv}-1$)($\mu_{Lx} \geq v_{Lv}$); and
a pairing operation unit that, using a processing device, performs the paring operation on the cipher vector input by the vector input unit and the key vector stored by the key vector storage unit, and extracts from the cipher vector a value concerning the $\rho$ set as the coefficient of the basis vector $b_n$.

26. The decryption device of claim 25,
wherein the vector input unit inputs a cipher vector c shown in Formula 13, wherein the key vector storage unit stores a key vector kv shown in Formula 14, and
wherein the pairing operation unit performs the pairing operation as shown in Formula 15, and extracts $u^\rho$.

$$c := \delta_1 \left( \sum_{i=0}^{\mu_1-1} x_i b_i \right) + \ldots + \delta_d \left( \sum_{i=\mu_{d-1}}^{n-1} x_i b_i \right) + \rho b_n \quad \text{[Formula 13]}$$

where
$\rho$: predetermined value,
$\delta_1, \ldots, \delta_d$: predetermined values,
$x_i$: attribute information (i=0, ..., $\mu_{Lx}-1$), and
$x_i$: predetermined value (i: predetermined value (i= $\mu_{Lx}, \ldots, n-1$).

$$kv := \sigma_{1,0} \left( \sum_{i=0}^{\mu_1-1} v_i b_i^* \right) + \ldots + \sigma_{Lv,0} \left( \sum_{i=\mu_{Lv-1}}^{\mu_{Lv}-1} v_i b_i^* \right) + b_n^* \quad \text{[Formula 14]}$$

where
$\sigma_{1,0}, \sigma_{2,0}, \ldots, \sigma_{Lv,0}$: predetermined values, and
$v_i$: predicate information.

$$e(c, kv) := \prod_{i=0}^{N-1} e(c_i b_i, kv_i b_i^*) \quad \text{[Formula 15]}$$

where
$e(b_i, b_j^*) = u^{\delta_{i,j}}$,
if i=j for all i; and j, then $\delta_{i,j}=1$, and if i≠j, then $\delta_{i,j}=0$, $u \neq 1$,
$c_i$: coefficient of the basis vector $b_i$ of the cipher vector c, and
$kv_i$: coefficient of the basis vector $b_i^*$ of the key vector kv.

27. The encryption device of claim 23, further comprising:
a verification information setting unit that, using the processing device, generates as a verification information vector a vector in which information including verification information is set as a coefficient of a predetermined basis vector other than the basis vector $b_n$ and the basis vectors $b_i$ (i=0, ..., $\mu_{Lx}-1$),
wherein the cipher vector generation unit generates the cipher vector by adding the attribute vector, the transmission information vector, and the verification information vector generated by the verification information setting unit, and
the encryption device, further comprising:
a signature information generation unit that, using the processing device, generates signature information to be verified based on the verification information set by the verification information setting unit; and
a data transmission unit that transmits to a decryption device the cipher vector generated by the cipher vector generation unit, the signature information generated by the signature information generation unit, and the verification information.

28. The encryption device of claim 27,
wherein the verification information setting unit generates as the verification information vector a vector in which information including first verification information corn is set as the coefficient of the predetermined basis vector,
wherein the cipher vector generation unit generates the cipher vector as data c1,
wherein the signature information generation unit includes
a c2 generation unit that generates data c2 by encrypting a message m and second verification information dec by a session key generated from the $\rho$ set as the coefficient of the basis vector $b_n$,
a c3 generation unit that generates the first verification information corn as data c3, and
a c4 generation unit that generates, as data c4, signature information generated by encrypting the data c1 and the data c2 by third verification information r which can be generated based on the first verification com and the second verification information dec, and
wherein the data transmission unit outputs the data c1 generated by the cipher vector generation unit, the data c2 generated by the c2 generation unit, the data c3 generated by the c3 generation unit, and the data c4 generated by the c4 generation unit.

29. The encryption device of claim 28,
wherein the transmission information setting unit generates a transmission information vector pv shown in Formula 16,
wherein the verification information setting unit generates a verification information vector cv shown in Formula 17,
wherein the cipher vector generation unit generates data c1 by adding an attribute information vector xv shown in Formula 18, the transmission information vector pv shown in Formula 16, and the verification information vector cv shown in Formula 17,
wherein the c2 generation unit generates the data c2 based on Formula 19, and
wherein the c4 generation unit generates the data c4 based on Formula 20

$$\rho v := \rho b_n \quad \text{[Formula 16]}$$

where
$\rho$: predetermined value $$cv := \delta_{n+2}(b_{n+2} + com b_{n+3}) \quad \text{[Formula 17]}$$

where
$\delta_{n+2}$: predetermined value, and
com: first verification information $$xv := \delta_1 \left( \sum_{i=0}^{\mu_1-1} x_i b_i \right) + \ldots + \delta_d \left( \sum_{i=\mu_{d-1}}^{n-1} x_i b_i \right) \quad \text{[Formula 18]}$$

where
$\delta_1, \ldots, \delta_d$: predetermined values,
$x_i$: attribute information (i=0, ..., $\mu_{Lx}-1$), and
$x_i$: predetermined value (i=$\mu_{Lx}, \ldots, n-1$)

$$c_2 := SE_{KDF(K)}(m, dec) \quad \text{[Formula 19]}$$

where
$c_2$: data c2,
$SE_{key}(x)$: process of encrypting data x by a symmetric key,
KDF(x): process of generating a key based on data x, K: $\mu^\rho$,
m: message, and
dec: second verification information $$c_4 := Mac_r(c_1, c_2) \quad \text{[Formula 20]}$$

where
$c_1$: data c1,
$c_2$: data c2,
$c_4$: data c4,
$MaC_{key}(X)$: process of encrypting data x by a key, and
r: third verification information.

30. The decryption device of claim 25,
wherein the vector input unit inputs the cipher vector in which the $\rho$ is set as the coefficient of the basis vector $b_n$, in which each of the attribute information $x_i$ (i=0, ..., $\mu_{Lx}-1$) is set as the coefficient of each of the basis vectors $b_i$ (i=0, ..., $\mu_{Lx}-1$), and in which information including verification information is set as a coefficient of a predetermined basis vector other than the basis vector $b_n$ and the basis vectors $b_i$ (i=0, ..., $\mu_{Lx}-1$), inputs signature information to be verified based on the verification information, and inputs the verification information,
the decryption device, further comprising:
a key vector deformation unit that, using the processing device, deforms the key vector stored by the key vector storage unit by adding the vector in which information including verification information is set as a coefficient of a predetermined basis vector,
wherein the pairing operation unit performs the pairing operation on the cipher vector input by the vector input unit and the key vector deformed by the key vector deformation unit, and extracts from the cipher vector a value concerning the $\rho$ set as the coefficient of the basis vector $b_n$, and
the decryption device, further comprising:
a tampering verification unit that, using the processing device and based on the verification information, verifies that the signature information has not been tampered with.

31. The decryption device of claim 30,
wherein the vector input unit inputs
data c1 which is the cipher vector in which information including first verification information corn is set as the verification information,
data c2 generated by encrypting a message m and second verification information dec by a session key generated based on the $\rho$ set as the coefficient of the basis vector $b_n$,
data c3 which is the first verification information corn, and
data c4 which is the signature information generated by encrypting the data c1 and the data c2 by third verification information r which can be generated based on the first verification information corn and the second verification information dec,
the decryption device, further comprising:
a c2 decryption unit that generates a session key from the value concerning the $\rho$ extracted by the pairing operation unit, decrypts the data c2 by the generated session key, and acquires the message m and the second verification information dec,
wherein the tampering verification unit generates the third verification information r from the second verification information acquired by the c2 decryption unit and the data c3, and verifies that the data c1 and the data c2 have not been tampered with based on the generated third verification information r and the data c4.

32. The decryption device of claim 31,
wherein the data input unit inputs the data c1, the data c2, the data c3, and the data c4 as shown in Formula 21,
wherein the key vector storage unit stores a key vector kv shown in Formula 22,
wherein the key vector deformation unit transforms the key vector kv based on Formula 23,
wherein the pairing operation unit performs the pairing operation as shown in Formula 24, and acquires a value K concerning the $\rho$,
wherein the c2 decryption unit generates a symmetric key from the value K concerning the $\rho$ based on Formula 25, decrypts the data c2 by the generated symmetric key, and acquires the message m and the second verification information dec, and
wherein the tampering verification unit generates the third verification information r based on Formula 26, and checks for tampering based on Formula 27

$$c_1 := \delta_1 \left( \sum_{i=0}^{\mu_1-1} x_i b_i \right) + \ldots + \delta_d \left( \sum_{i=\mu_{d-1}}^{n-1} x_i b_i \right) + \rho b_n, \quad \text{[Formula 21]}$$
$$+ \delta_{n+2}(b_{n+2} + com \, b_{n+3})$$

where
$\delta_1, \ldots, \delta_d, \delta_{n+2}$: predetermined values,
$x_i$: attribute information (i=0, ..., $\mu_{Lx}-1$),
$x_i$: predetermined value (i=$\mu_{Lx}-1$),
$\rho$: predetermined value,
com: first verification information,
dec: second verification information,
r: third verification information,
K: $u^\rho$,
$e(b_i, b^*_i) = u$,
m: message,
$SE_{key}(x)$: process of encrypting data x by a symmetric key
$KDF(x)$: process of generating a key based on data x, and
$Mac_{key}(x)$: process of encrypting data x by a key $$kv := \sigma_{1,0} \left( \sum_{i=0}^{\mu_1-1} v_i b^*_i \right) + \ldots + \sigma_{Lv,0} \left( \sum_{i=\mu_{Lv}-1}^{\mu_{Lv}-1} v_i b^*_i \right) + b^*_n \quad \text{[Formula 22]}$$

where
$\sigma_{1,0}, \sigma_{2,0}, \ldots, \sigma_{Lv,0}$: predetermined values, and
$v_i$: predicate information $$\tilde{kv} := kv + \tilde{\sigma}(c_3 k^*_{Lv,n+2} - k^*_{Lv,n+3}) \quad \text{[Formula 23]}$$

where
$\tilde{\sigma}$: predetermined value,
$c_3$: data c3,
$k^*_{Lv,n+2}$: vector in which a predetermined value is set as a coefficient of a basis vector $b^*_{n+2}$, and
$k^*_{Lv,n+3}$: vector in which a predetermined value is set as a coefficient of a basis vector $b^*_{n+3}$ $$K := e(c, \tilde{kv}) := \prod_{i=0}^{N-1} e(c_i b_i, \tilde{kv}_i b_i^*) \quad \text{[Formula 24]}$$

$c_i$: coefficient of the basis vector $b_i$ of the cipher vector c, and $\tilde{kv}_{i}$: coefficient of the basis vector $b^*_i$ of the key vector kv after being deformed $$(m, dec) := SD_{KDF(K)}(c_2) \quad \text{[Formula 25]}$$

where
m: message,
dec: second verification information,
$SD_{key}(x)$: process of decrypting data x by a symmetric key,
KDF(x): process of generating a key based on data x, and
$c_2$: data c2

$$r := R_{enc}(pub, c_3, dec) \quad \text{[Formula 26]}$$

where
r: third verification information,
$R_{enc}$(pub,com,dec): process of generating r from pub,com, dec, and
pub: public information $$r \neq \perp ? \wedge Vrfy_r((c_1, c_2), c_4) = 1 \quad \text{[Formula 27]}$$

where
r: third verification information,
$\perp$: distinguished symbol, and
$vrrY_{key}(x'_1, x'_2)$: $x_2$:=$MAC_{key}(x_1)$ is a process that returns 1 if $x_1$=$x'_1$, $x_2$=$x'_2$, and key=key'.

33. The encryption device of claim 23,
wherein the transmission information setting unit generates as a transmission information vector $mv^{[t]}$ a vector in which a message m is set as a coefficient of a basis vector $b^{[t]}_n$ of basis vectors $b^{[t]}_i$ (i=0, ..., N−1) in a basis $B^{[t]}$ of the space V, for each t of t=0, ..., n−1, and
wherein the cipher vector generation unit generates a cipher vector $c^{[t]}$ by adding, to the transmission information vector $mv^{[t]}$ generated by the transmission information setting unit, an attribute information vector $xv^{[t]}$ in which each of coefficient values $s^{[t]}_i$ shown in Formula 28 is set as a coefficient of each of basis vectors $b^{[t]}_i$ (i=0, ..., $\mu_{Lx}$−1), for each t of t=0, ..., n−1

$$\sum_{i=0}^{n-1} s_i^{[t]} = \delta_i x_i \quad \text{[Formula 28]}$$

$i = 0, \ldots, \mu_{Lx} - 1$ where
$s_i^{[t]}$: coefficient value,
$\delta_i$: predetermined value, and
$x_i$: attribute information.

34. The encryption device of claim 33,
wherein the transmission information setting unit generates the transmission information vector $mv^{[t]}$ as shown in Formula 29, and
wherein the cipher vector generation unit generates the cipher vector $c^{[t]}$ by adding the attribute information vector $xv^{[t]}$ as shown in Formula 30 to the transmission information vector $mv^{[t]}$ as shown in Formula 29

$$mv^{[t]} := mb_n^{[t]} \quad \text{[Formula 29]}$$

$t = 0, \ldots, n-1$ $$xv^{[t]} := \sum_{i=0}^{n-1} s_i^{[t]} b_i^{[t]} \quad \text{[Formula 30]}$$

$t = 0, \ldots, n-1$ where
$s_i^{[t]}$: predetermined value (i=0, ..., n−1, t=0, ..., n−2), $$s_i^{[n-1]} := \delta_i x_i - \left( \sum_{t=0}^{n-2} s_i^{[t]} \right) \quad i = 0, \ldots, n-1,$$

$\delta_i$: predetermined value (i=0, ..., n−1),
$x_i$: attribute information (i=0, ..., $\mu_{Lx}$−1), and
$x_i$: predetermined value (i=$\mu_{Lx}$, ..., n−1).

35. The decryption device of claim 25,
wherein the vector input unit inputs as a cipher vector $c^{[t]}$ a vector $v^{[t]}$ in which a message m is set as a coefficient of a basis vector $b^{[t]}_n$ of basis vectors $b^{[t]}_i$ (i=0, ..., N−1) in a basis $B^{[t]}$ of the space V, and in which each of coefficient values $s^{[t]}_i$ shown in Formula 31 is set as a coefficient of each of basis vectors $b^{[t]}_i$ (i=0, ..., $\mu_{Lx}$−1), for each t of t=0, ..., n−1,
wherein the key vector storage unit stores, as a key vector $kv^{[t]}$ and in the storage device, a vector $v^{[t]}$ in which a predetermined value is set as a coefficient of a basis vector $b^{[t]*}_n$ of basis vectors $b^{[t]*}_i$ (i=0, ..., N−1) in a basis $B^{[t]*}$ of the space V*, and in which each of predicate information $v_i$ (i=0, ..., $\mu_{Lv}$−1) is set as a coefficient of each of vectors $b^{[t]\&}_i$ (i=0, ..., $\mu_{Lv}$−1)($\mu^{Lx} \geq \mu_{Lv}$), for each t of t=0, ..., n−1, and
wherein the pairing operation unit performs the pairing operation on the cipher vector $c^{[t]}$ input by the vector input unit and the key vector $kv^{[t]}$ stored by the key vector storage unit, and generates, from the cipher vector, information f concerning the message m set as the coefficient of the basis vector $b^{[t]}_n$, for each t of t= 0, ..., n−1, and also performs the pairing operation on the basis vector $b^{[t]}_n$ and the key vector $kv^{[t]}$, and generates information g for extracting the message m from the information f, for each t of t=0, ..., n−1,
the decryption device, further comprising:
a discrete logarithm computation unit that computes a discrete logarithm problem to a base of the information g on the information f generated by the pairing operation unit, and computes the message m $$\sum_{t=0}^{n-1} s_i^{[t]} = \delta_i x_i \quad \text{[Formula 31]}$$

$i = 0, \ldots, \mu_{Lx} - 1$ where
$s_i^{[t]}$: coefficient value,
$\delta_i$: predetermined value, and
$x_i$: attribute information.

36. The decryption device of claim 35,
wherein the vector input unit inputs the cipher vector $c^{[t]}$ as shown in Formula 32,
wherein the key vector storage unit stores the key vector $kv^{[t]}$ as shown in Formula 33,
wherein the pairing operation unit performs the pairing operation as shown in Formula 34, and generates the information f and the information g, and
wherein the discrete logarithm computation unit solves the discrete logarithm problem as shown in Formula 35 to compute the message m $$c^{[t]} := \sum_{i=0}^{n-1} s_i^{[t]} b_i^{[t]} + m b_n^{[t]} \qquad \text{[Formula 32]}$$

$$t = 0, \ldots, n-1$$

where
$s_i^{[t]}$: predetermined value (i=0, . . . , n−1, t=0, . . . , n−2), $$s_i^{[n-1]} := \delta_i x_i - \left(\sum_{t=0}^{n-2} s_i^{[t]}\right) \quad i = 0, \ldots, n-1,$$

$\delta_i$: predetermined value (i=0, . . . , n−1),
$x_i$: attribute information (i=0, . . . , $\mu_{Lx}$−1),
$x_i$: predetermined value (i=$\mu_{Lx}$, n−1), and
m: message $$kv^{[t]} := \sigma_{1,0}^{[t]}\left(\sum_{i=0}^{\mu_j-1} v_i b_i^{[t]*}\right) + \ldots + \sigma_{Lv,0}^{[t]}\left(\sum_{i=\mu_{Lv}-1}^{\mu_{Lv}-1} v_i b_i^{[t]*}\right) + b_n^{[t]*} \qquad \text{[Formula 33]}$$

$$t = 0, \ldots, n-1$$

where
$\sigma_{1,0}, \sigma_{2,0}, \ldots, \sigma_{Lv,0}$: predetermined values, and
$v_i$: predicate information $$f := \prod_{t=0}^{n-1} e(c^{[t]}, kv^{[t]}) \qquad \text{[Formula 34]}$$

$$g := \prod_{t=0}^{n-1} e(b_n^{[t]}, kv^{[t]})$$

where $$e(c^{[t]}, kv^{[t]}) := \prod_{i=0}^{N-1} e(c^{[t]} b_i^{[t]}, kv^{[t]} b_i^{[t]*})$$

$$t = 0, \ldots, n-1,$$

$$e(b_n^{[t]}, kv^{[t]}) := \prod_{i=0}^{N-1} e(b_n^{[t]}, kv_i^{[t]} b_i^{[t]*})$$

$$t = 0, \ldots, n-1, e(b_i, b_j^*) = u^{\delta_{i,j}},$$

if i=j for all i and j, then $\delta_{i,j}$=1, and
if i≠j, then $\delta_{i,j}$=0,
$c_i^{[t]}$: coefficient of the basis vector $b_i^{[t]}$ of the cipher vector $c^{[t]}$, and
$kV_i^{[t]}$: coefficient of the basis vector $b_i^{[t]*}$ of the key vector $kv^{[t]}$ after being deformed $$m := D\log_g(f) \qquad \text{[Formula 35]}$$

where
$Dlog_x(y)$ denotes solving a discrete logarithm problem to base x on y.

37. The encryption device of claim 33, further comprising:
a verification information setting unit that generates as a verification information vector $ck^{[t]}$ a vector $v^{[t]}$ in which information including verification information vk is set as a coefficient of a predetermined basis vector $b^{[t]}_j$ other than the basis vector $b^{[t]}_n$ and the basis vectors $b^{[t]}_i$ (i=0, . . . , $\mu_{Lx}$−1), for each t of t=0, . . . , n−1,
wherein the cipher vector generation unit generates the cipher vector $c^{[t]}$ by adding the attribute information vector $xv^{[t]}$, the transmission information vector $mv^{[t]}$, and the verification information vector $ck^{[t]}$ generated by the verification information setting unit, for each t of t=0, . . . , n−1, and
the encryption device, further comprising:
a signature information generation unit that generates signature information $\Sigma$ to be verified based on the verification information vk set by the verification information setting unit, and
a data transmission unit that transmits to a decryption device the cipher vectors $c^{[t]}$ (t=0, . . . , n−1) generated by the cipher vector generation unit, the signature information $\Sigma$ generated by the signature information generation unit, and the verification information vk.

38. The encryption device of claim 37,
wherein the transmission information setting unit generates the transmission information vector $mv^{[t]}$ as shown in Formula 36,
wherein the verification information setting unit generates the verification information vector $ck^{[t]}$ as shown in Formula 37, and
wherein the cipher vector generation unit generates the cipher vector $c^{[t]}$ by adding the attribute information vector $xv^{[t]}$ as shown in Formula 38 to the transmission information vector $mv^{[t]}$ as shown in Formula 36 and the verification information vector $ck^{[t]}$ as shown in Formula 37

$$mv^{[t]} := m b_n^{[t]} \qquad \text{[Formula 36]}$$

$$t = 0, \ldots, n-1$$

$$ck^{[t]} := \delta_{n+2}(b_{n+2}^{[t]} + vk b_{n+3}^{[t]}) \qquad \text{[Formula 37]}$$

$$t = 0, \ldots, n-1$$

where
$\delta_{n+2}$: predetermined value, and
vk: verification information $$xv^{[t]} := \sum_{i=0}^{n-1} s_i^{[t]} b_i^{[t]} \qquad \text{[Formula 38]}$$

$$t = 0, \ldots, n-1$$

where
$s_i^{[t]}$: predetermined value (i=0, . . . , n−1, t=0, . . . , n−2), $$s_i^{[n-1]} := \delta_i x_i - \left(\sum_{t=0}^{n-2} s_i^{[t]}\right) \quad i = 0, \ldots, n-1,$$

$\delta_i$: predetermined value (i=0, . . . , n−1),
$x_i$: attribute information (i=0, . . . , $\mu_{Lx}$−1), and
$x_i$: predetermined value (i=$\mu_{Lx}$, . . . , n−1).

39. The decryption device of claim 35,
wherein the vector input unit inputs the cipher vector $c^{[t]}$ in which information including verification information vk is set as a coefficient of a predetermined basis vector $b^{[t]}_j$ other than the basis vector $b^{[t]}_n$ and the basis vectors $b^{[t]}_i$ (i=0, ..., $\mu_{Lx}$−1) for each t of t=0, ..., n−1, inputs signature information Σ to be verified based on the verification information vk, and inputs the verification information vk,
the decryption device, further comprising:
a key vector deformation unit that deforms the key vector $kv^{[t]}$ by adding, to the key vector stored by the key vector storage unit, the vector $v^{[t]}$ in which the information including the verification information vk is set as a coefficient of a predetermined basis vector $b^{[t]}_k$ for each t of t=0, ..., n−1,
wherein the pairing operation unit performs the pairing operation, for each t of t=0, ..., n−1, on the cipher vector $c^{[t]}$ input by the vector input unit and the key vector $kv^{[t]}$ deformed by the key vector deformation unit and generates the information f, and also performs the pairing operation, for each t of t=0, ..., n−1, on the basis vector $b^{[t]}_n$ and the deformed key vector $kv^{[t]}$ and generates the information g, and
the decryption device, further comprising:
a tampering verification unit that verifies that the signature information Σ has not been tampered with based on the verification information vk.

40. The decryption device of claim 39,
wherein the vector input unit inputs the cipher vector $c^{[t]}$ as shown in Formula 39, the signature information Σ to be verified based on the verification information vk, and the verification information vk,
wherein the key vector storage unit stores the key vector $kv^{[t]}$ as shown in Formula 40,
wherein the key vector deformation unit transforms the key vector $kv^{[t]}$ based on Formula 41, and
wherein the pairing operation unit performs the pairing operation as shown in Formula 42, and extracts the information f and the information g $$c^{[t]} := \sum_{i=0}^{n-1} s_i^{[t]} b_i^{[t]} + m b_n^{[t]} + \delta_{n+2}(b_{n+2}^{[t]} + vk b_{n+3}^{[t]})$$ [Formula 39]

$$t = 0, \ldots, n-1$$

where
$s_i^{[t]}$: predetermined value (i=0, ... n−1, t=0, ..., n−2), $$s_i^{[n-1]} := \delta_i x_i - \left(\sum_{t=0}^{n-2} s_i^{[t]}\right) \quad i = 0, \ldots, n-1,$$

$\delta_i$: predetermined value (i=0, ..., n−1),
$x_i$: attribute information (i=0, ..., $\mu_{Lx}$−1),
$x_i$: predetermined value (i=$\mu_{Lx}$, ..., n−1),
m: message,
$\delta_{n+2}$: predetermined value, and
vk: verification information $$kv^{[t]} := \sigma_{1,0}^{[t]}\left(\sum_{i=0}^{\mu_1-1} v_i b_i^{[t]*}\right) + \ldots + \sigma_{Lv,0}^{[t]}\left(\sum_{i=\mu_{Lv-1}}^{\mu_{Lv}-1} v_i b_i^{[t]*}\right) + b_n^{[t]*}$$ [Formula 40]

$$t = 0, \ldots, n-1$$

where
$\sigma_{1,0}, \sigma_{2,0}, \ldots, \sigma_{Lv,0}$: predetermined values, and
$v_i$: predicate information $$\tilde{kv} := kv^{[t]} + \tilde{\sigma}(vk k_{Lv,n+2}^{[t]} - k_{Lv,n+3}^{[t]})$$ [Formula 41]

where
$\tilde{\sigma}$: predetermined value,
$c_3$: data c3,
$k_{Lv,n+2}^{[t]*}$: vector in which a predetermined value is set as a coefficient of a basis vector $b^{[t]*}_{n+2}$, and
$k_{Lv,n+3}^{[t]*}$: vector in which a predetermined value is set as a coefficient of a basis vector $b^{[t]*}_{n+3}$ $$f := \prod_{t=0}^{n-1} e(c^{[t]}, \tilde{kv}^{[t]})$$ [Formula 42]

$$g := \prod_{t=0}^{n-1} e(b_n^{[t]}, \tilde{kv}^{[t]})$$

where $$e(c^{[t]}, \tilde{kv}^{[t]}) := \prod_{t=0}^{N-1} e(c_i^{[t]} b_i^{[t]}, \tilde{kv}_i^{[t]} b_i^{[t]*})$$

$$t = 0, \ldots, n-1,$$

$$e(b_n^{[t]}, \tilde{kv}^{[t]}) := \prod_{i=0}^{N-1} e(b_n^{[t]}, \tilde{kv}_i^{[t]} b_i^{[t]*})$$

$$t = 0, \ldots, n-1,$$

if i=j for all i and j, then $\delta_{i,j}=1$, and if i≠j, then $\delta_{i,j}=0$,
$c_i^{[t]}$: coefficient of the basis vector $b^{[t]*}_i$ of the cipher vector $c^{[t]}$, and
$\widetilde{kv}_i^{[t]}$: coefficient of the basis vector $b^{[t]*}_i$ of the key vector $kv^{[t]}$ after being deformed.

41. A cryptographic processing system that performs a cryptographic process using dual modules of a space V and a space V* paired through a pairing operation, the cryptographic processing system comprising:
an encryption device that generates as a cipher vector a vector in the space V, the vector having predetermined information embedded therein; and
a decryption device that, using a predetermined vector in the space V* as a key vector, performs the pairing operation on the cipher vector generated by the encryption device and the key vector, to decrypt the cipher vector and to extract information concerning the predetermined information.

42. A key generation device that generates a key vector $k_{L,0}$ which is a secret key in a predicate encryption scheme, the key generation device comprising:
a master key storage unit that, when a space V and a space V* are dual modules paired through a pairing operation, stores in a storage device the space V* as a master secret key; and
a key vector generation unit that generates as a key vector $k_{L,0}$ a vector in which a predetermined value is set as a coefficient of a predetermined basis $b^*_n$ of basis vectors $b^*_i$ (i=0, ..., N−1) of a predetermined basis B* of the space V*, and in which each of predicate information $v_i$ (i=0, ..., $\mu_L$−1) is set as a coefficient of each of basis vectors $b^*_i$ ($i=0, \ldots, \mu_L-1$), the space $V^*$ being the master secret key stored by the master key storage unit.

43. A key delegation device that generates a key vector which is a secret key in a predicate encryption scheme, the key delegation device comprising:
   a key vector acquisition unit that, when a space V and a space $V^*$ are dual modules paired through a pairing operation, acquires a key vector in the space $V^*$ which can decrypt predetermined cipher vectors in the space V; and
   a key vector generation unit that, using a processing device and based on the key vector acquired by the key vector acquisition unit, generates a new key vector in the space $V^*$ which can decrypt some cipher vectors of the predetermined cipher vectors that can be decrypted by the key vector.

44. An encryption device comprising:
   a transmission information setting unit that, when a space V and a space $V^*$ are dual modules paired through a pairing operation, generates as a transmission information vector a vector in which ρ is set as a coefficient of a basis vector $b_n$ of basis vectors $b_i$ ($i=0, \ldots, N-1$) in a predetermined basis B of the space V; and
   a cipher vector generation unit that generates a cipher vector by adding an attribute vector in which each of attribute information $x_i$ ($i=0, \ldots, \mu_{Lx}-1$) is set as a coefficient of each of basis vectors $b_i$ ($i=0, \ldots, \mu_{Lx}-1$) to the transmission information vector generated by the transmission information setting unit.

45. A decryption device comprising:
   a vector input unit that, when a space V and a space $V^*$ are dual modules paired through a pairing operation, inputs as a cipher vector a vector in which ρ is set as a coefficient of a basis vector $b_n$ of basis vectors $b_i$ ($i=0, \ldots, N-1$) in a predetermined basis B of the space V, and in which each of attribute information $x_i$ ($i=0, \ldots, \mu_{Lx}-1$) is set as a coefficient of each predetermined basis vector of basis vectors $b_i$ ($i=0, \ldots, \mu_{Lx}-1$); and
   a key vector storage unit that stores, as the key vector and in a storage device, a vector in which a predetermined value is set as a coefficient of a predetermined basis vector $b^*_n$ of basis vectors $b^*_i$ ($i=0, \ldots, N-1$) in a predetermined basis $B^*$ of the space $V^*$, and in which each of predicate information $v_i$ ($i=0, \ldots, \mu_{Lv}-1$) is set as a coefficient of each of basis vectors $b^*_i$ ($i=0, \ldots, \mu_{Lv}-1$); and
   a pairing operation unit that performs the pairing operation on the cipher vector input by the vector input unit and the key vector stored by the key vector storage unit, and extracts from the cipher vector a value concerning the ρ set as the coefficient of the basis vector $b_n$.

46. A cryptographic processing method for performing a cryptographic process using dual vector spaces of a space V and a space $V^*$ paired through a pairing operation, the cryptographic processing method comprising:
   an encryption step of, by a processing device, generating as a cipher vector a vector in the space V, the vector having predetermined information embedded therein; and
   a decryption step of, by the processing device, using a predetermined vector in the space $V^*$ as a key vector and performing the pairing operation on the cipher vector generated in the encryption step and the key vector, to decrypt the cipher vector and to extract information concerning the predetermined information.

47. A non-transitory computer-readable medium for storing computer-readable instructions there that when executed by a computer cause the computer to perform a cryptographic method using dual vector spaces of a space V and a space $V^*$ paired through a pairing operation, the method comprising:
   an encryption step of generating as a cipher vector a vector in the space V, the vector having predetermined information embedded therein; and
   a decryption step of using a predetermined vector in the space $V^*$ as a key vector and performing the pairing operation on the cipher vector generated by the encryption process and the key vector, to decrypt the cipher vector and to extract information concerning the predetermined information.

* * * * *